United States Patent [19]

Soderberg et al.

[11] Patent Number: 4,577,283

[45] Date of Patent: Mar. 18, 1986

[54] POSTAGE METER WITH KEYBOARD KEYS FOR CAUSING METER OPERATIONS TO BE PERFORMED

[75] Inventors: John H. Soderberg, Stratford; Howell A. Jones, Southport; Alton B. Eckert, Norwalk; Edward E. Duwel, Trumbull, all of Conn.

[73] Assignee: Pitney Bowes Inc., Stamford, Conn.

[21] Appl. No.: 447,861

[22] Filed: Dec. 8, 1982

[51] Int. Cl.[4] .............................................. G06F 15/20

[52] U.S. Cl. ..................................... 364/464; 364/466

[58] Field of Search ........ 364/464, 466, 200 MS File, 364/900 MS File; 340/711, 712

[56] References Cited

U.S. PATENT DOCUMENTS

| | | | |
|---|---|---|---|
| 4,093,999 | 6/1978 | Fuller et al. | 364/900 |
| 4,280,180 | 7/1981 | Eckert et al. | 364/464 |
| 4,301,507 | 11/1981 | Soderberg et al. | 364/464 |
| 4,326,254 | 4/1982 | Uchimura et al. | 364/466 |
| 4,422,148 | 12/1982 | Soderberg et al. | 364/464 |
| 4,481,604 | 11/1984 | Gilham et al. | 364/900 |
| 4,495,581 | 1/1985 | Piccione | 364/466 |
| 4,535,419 | 8/1985 | Dlugos et al. | 364/900 |

*Primary Examiner*—Gareth D. Shaw
*Assistant Examiner*—Kevin A. Kriess
*Attorney, Agent, or Firm*—Donald P. Walker; William D. Soltow, Jr.; Albert W. Scribner

[57] ABSTRACT

In a postage meter having structures for entering data, for displaying numerical values and other data, and for printing postage, and having a computer electrically connected to each of the aforesaid structures and programmed for processing data for controlling their operation, wherein the data entering structure includes a keyboard having a plurality of depressable numeric keys, and wherein the computer means includes means for storing data and calculating amounts pertaining to the operation of said postage meter; there is provided apparatus and a method of operation of the postage meter. The method includes the steps of providing the keyboard with a depressable special purpose key, depressing selected numeric keys for causing the display of a predetermined numerical value, depressing the special purpose key when said numerical value on display, and programming the computer for causing a particular operation of the postage meter to be performed in response to the depression of the special purpose key. Preferably, the step of causing the display of a predetermined value includes the step of utilizing a predetermined value which includes at least one numeral and does not include a decimal.

25 Claims, 11 Drawing Figures

POSTAGE METER WITH KEYBOARD KEYS FOR CAUSING METER OPERATIONS TO BE PERFORMED

BACKGROUND OF INVENTION

This application is related to U.S. application Ser. No. 447,815 of D. P. Baun et al., for "Stand-Alone Electronic Mailing Machine", and to U.S. application Ser. No. 447,913 of A. B. Eckert, Jr. et. al., for "Initializing The Print Wheels In An Electronic Postage Meter"; both of which applications were filed concurrently herewith, are assigned to the assignee of the present invention and are hereby specifically incorporated herein by reference. In addition, this application is related to five additional concurrently filed co-pending patent applications, each of which is assigned to the assignee of the present invention, i.e., U.S. patent application Ser. Nos: 447,870, now U.S. Pat. No. 4,535,407 for POSTAGE METER WITH KEYBOARD KEYS FOR CHANGING POSTAGE UNUSED AMOUNT, issued Aug. 13, 1985 to A. B. Edert et al.; 447,901, for POSTAGE METER WITH KEYBOARD KEYS FOR COMMANDING AND REQUESTING PERFORMANCE OF METER OPERATIONS; 447,905, now U.S. Pat. No. 4,509,141 for POSTAGE METER WITH KEYBOARD KEYS USED FOR CHANGING OPERATING CONSTANTS, issued Apr. 2, 1985 to J. H. Soderberg et al.; 447,914, for POSTAGE METER WITH DATE CHECK REMINDER MEANS; and 447,919, for POSTAGE METER WITH KEYBOARD KEYS FOR CAUSING DISPLAY OF DATA PERTAINING TO METER OPERATIONS.

Currently available electronic postal meters of, for example, the type disclosed in U.S. Pat. No. 4,301,507 for an Electronic Postage Meter Having Plural Computing Systems, issued Nov. 17, 1981 to J. H. Soderberg et al., and assigned to the assignee of the present invention, are generally provided with a keyboard for entering numerical postal values that are to be printed, a display for visually indicating the entered postage and other values, a printing mechanism and a micro-computer including accounting means and means for controlling the various functions of the postal meter.

In the aforesaid U.S. Pat. No. 4,301,507 the various components of the postal meter are compartmented according to their functions to form three units, referred to as the control, accounting and printing units. Each of the units incorporates a dedicated microprocessor having a separately controlled clock and programs. And, two-way communications are conducted via serial channels between the units, and via serial channels between the postage meter and any external apparatus connected to the meter, in the form of serially transmitted single byte "header" only messages, consisting of ten bits including a start bit followed by an 8 bit byte which is in turn followed by a stop bit, or in the form of a multi-byte message consisting of a header and one or more additional bytes of information. All transmitted messages are followed by a no error pulse if the echoplex message was received error free. In practice, each of the units is capable of processing data independently and asynchronously of the other. Further, to allow for compatibility between the postal meter and any external apparatus, all operational data transmitted to, from and between each of the three units and all stored operator information is accessible via the postal meter interface, as a result of which the external apparatus (if any) may be adapted to have complete control of the postal meter as well as access to all current operational information in the postal meter. In addition, the flow of messages to, from and between the three internal units is in a predetermined, hierarchical direction. For example, any command message from the control unit is communicated to the accounting unit, where it is processed either for local action in the accounting unit and/or for a command message in the printing unit. On the other hand, any message from the printing unit is communicated to the accounting unit, where it is either used for internal information or merged with additional data and communicated to the control unit. And, any message from the accounting unit is initially directed to the printing unit or to the control unit.

Some commercially available postal meters which utilize the aforesaid communication system have been provided with a mechanically operable field service switch which is operable to indicate to the meter that a service mode of operation of the meter is in effect in which various messages are given an alternate interpretation, for example, commanding or requesting the postal meter to display selected values stored in the postal meter. In this connection reference is made to U.S. Pat. No. 4,280,180 for an Electronic Postage Meter Having Field Resettable Control Values, issued to A. B. Eckert et al. and assigned to the assignee of the present invention. In U.S. Pat. No. 4,280,180, a second, key controlled, three-position, mechanical switch, is also provided, to permit an authorized user to initiate a series of routines allowing the user to recharge the postal meter with a predetermined amount of additional postage.

To that end, the positions of the three position switch are identified as the "operate", "enter amount" and "enter combination" positions. By positioning the three-position switch in either the "enter combination" or "enter amount" positions the operator may enter the combination or amount respectively into the meter via the keyboard. In each instance the entry results in providing an indication on the display of the entered amount or combination, as the case may be. Leaving each position generates a message causing the displayed value to be entered into the accounting unit and blanking the display for the next entry. Return of the three-position switch to the operate position in either instance causes the accounting unit to complete the recharging routine and return the meter to normal usage with the amount added to the postage unused register. In practise, the combination for this feature is obtained by calling a Data Center having information relevant to remotely enabling the resetting of the postal meter/-mailing machine for which the value is being modified, such as the Data Center of Pitney Bowes Inc. To obtain the combination the operator identifies the meter by serial number, and provides the Data Center with the code which is generated and displayed to the operator upon initially moving the key from the operate position, and also provides the value of the postage which the operator is desirous of adding to the postage unused register. Whereupon the Data Center provides the operator with a unique combination for use with the enter combination key, which combination is a random or pseudorandom number which changes with each resetting of the postage used register for security reasons.

Aside from the aforesaid usage, the three position switch is disclosed in U.S. Pat. No. 4,280,180 as being operable in combination with the service switch for changing certain other values stored in the meter, including a settable limit value, consisting of a predetermined maximum postage value which will not be printed if equaled or exceeded, a low postage warning value, consisting of a predetermined value which causes the postal meter to provide a visual indicator informing the user that the postal meter should be recharged, and a dollar unlock value, consisting of a predetermined postal value which will not be printed at any one time unless something is additionally done by the operator after the select postage key is initially actuated.

An object of the present invention is to provide a simply constructed, non-compartmentalized postal meter/mailing machine which includes a modified version of the aforesaid prior art communication system;

Another object is to provide a simply constructed non-compartmentalized, stand-alone, mailing machine which includes an electronically controlled postal meter incorporating a modified version of the aforesaid prior art communication system, and which includes improved means for servicing the mailing machine;

Another object is to provide an electronically controlled postal meter/mailing machine, having a keyboard, with means for entering and modifying various values in the same, including the serial number of the meter/machine via the keyboard; and A further object is to provide an electronically controlled postal meter/mailing machine including a communication system having a single micro-computer which is programmed so as to retain the hierarchical communication and serial message transmission features of the aforesaid prior art communication system for implementing the control, accounting and printing functions of the postal meter/mailing machine, and which includes improved means for informing the user that the date should be checked, invoking various routines for displaying information stored in the postal meter and changing selected values stored in the postal meter.

SUMMARY OF THE INVENTION

In a postage meter having means for entering data, means for displaying numerical values and other data, means for printing postage, computer means electrically connected to each of the aforesaid means and programmed for processing data for controlling the operation thereof, wherein said data entering means includes a keyboard having a plurality of depressable numeric keys, and wherein said computer means includes means for storing data and calculating amounts pertaining to the operation of said postage meter; there is provided apparatus and a method of operation of said postage meter. The apparatus comprises the keyboard including a depressable special purpose key, the computer means being programmed for causing said displaying means to display a numerical value in response to the depression of selected numeric keys, the computer means being programmed for automatically processing said numerical value on display in response to the depression of said special purpose key, and the computer means being programmed for causing a particular operation of said postage meter to be performed in response to the depression of said special purpose key when said displayed numerical value is a predetermined value. Preferably the predetermined value includes at least one numeral and does not include a decimal.

BRIEF DESCRIPTION OF THE DRAWINGS

As shown in the drawings wherein like reference numerals designate like or corresponding parts throughout the several views.

DESCRIPTION OF THE PREFERRED EMBODIMENTS

Figure 1:
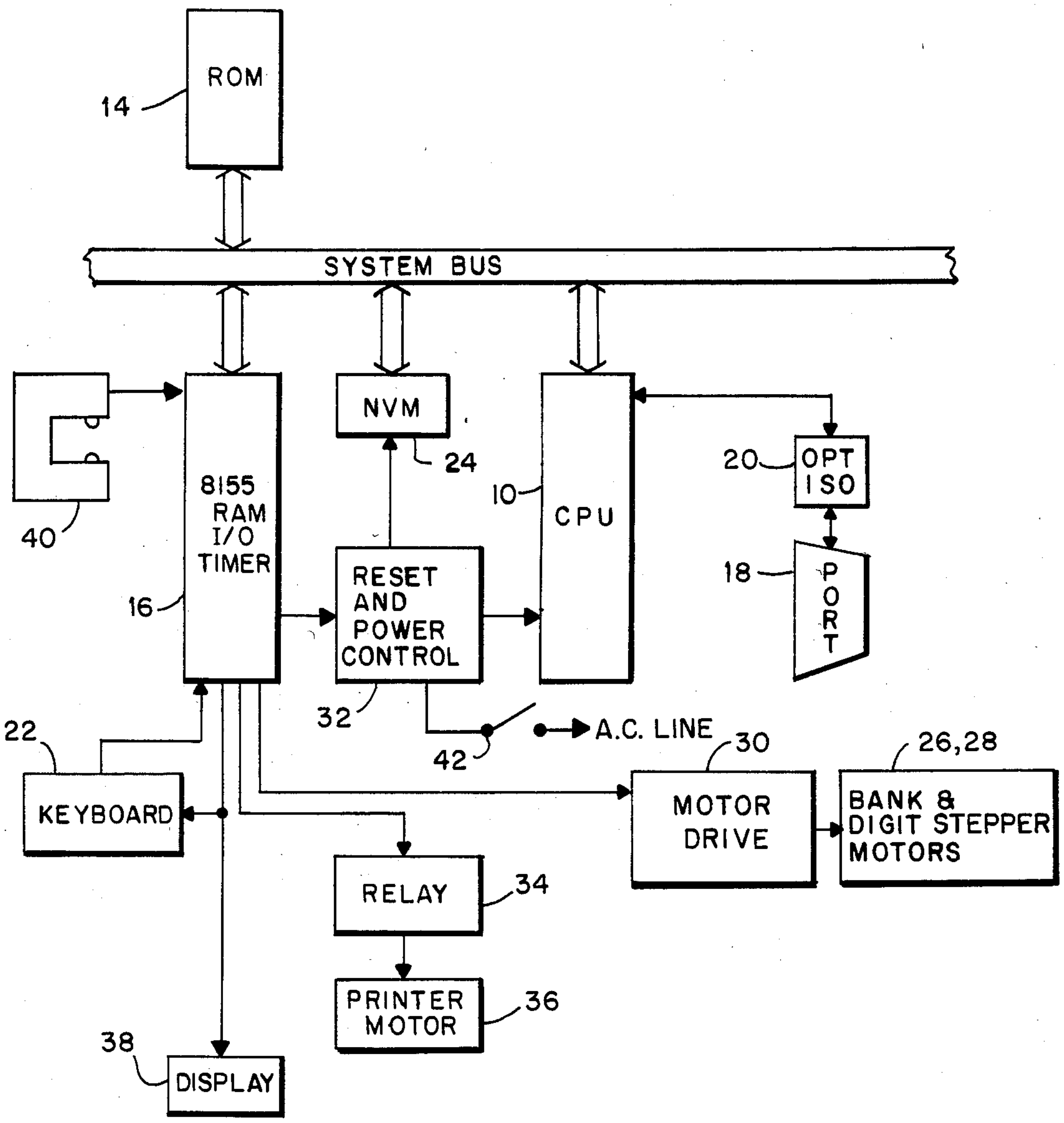
FIG. 1 is a block diagram of the electronic circuits of an electronic postage meter.

The electronic postal meter 130 (FIG. 3) includes an 8-bit microprocessor 10 (FIG. 1) (CPU), such as an Intel Model 8085A microprocessor which is connected to various electronically operable components through a system bus 12, including a ROM 14. The ROM 14, which is provided for storing the programs for controlling the postal meter, includes permanently programmed as well as reprogrammable devices. An integrated circuit 16, such as in Intel Model 8155, is connected to the system bus 12 and includes a RAM, input and output (I/O) lines and a timer. The RAM portion of the integrated circuit 16 has memory allocated for transient storage of the data for the ascending register and descending register. An external data communication port 18 which is connected to the microprocessor 10 through an optical isolator 20, allows for the connection to the postal meter of devices such as an electronic scale, external computer various types of servicing equipment and the like. Also electrically connected to the microprocessor 10 through the system bus 12 is the keyboard 22 of the postal meter and a non-volatile memory (NVM) 24. The bank and digit stepper motors 26, 28 of the postal meter are in electrical connection with the microprocessor 10 via a motor driver 30 and the integrated circuit 16. A reset and power control 32 is electrically connected between the integrated circuit 16, the NVM 24 and the microprocessor 10. A relay 34 connects the AC printer motor 36 to the integrated circuit 16. A display 38 is also electrically connected to the integrated circuit 16. Preferably the display 38 includes a plurality of, and preferably ten or less, seven segment (with decimal) digit display sections. And, for the purpose of this disclosure each decimal shall be considered to be a segment. And, a trip photosensor 40, which is connected to the microprocessor 10 through the integrated circuit 16, is provided for indicating the presence of an envelope to be imprinted, as described more fully in the aforementioned patent application entitled "Stand-Alone Electronic Mailing Machine".

The electronic postage meter is controlled by the microprocessor 10 operating under control of the programs stored in the ROM 14. The microprocessor 10 accepts information entered via the keyboard 22 or via the external communication port 18 from external message generators. Critical accounting data and other important information is stored in the non-volatile memory 24. The non-volatile memory 24, which may be an MNOS semiconductor type memory, a battery augmented CMOS memory, core memory, or other suitable non-volatile memory component, stores critical postal meter data during periods when power is not applied to the postal meter. This data includes, in addition to the serial number of the mailing machine or postal meter, information as to the value in the descending register (the amount of postage available for printing), the value in the ascending register (the total amount of postage printed by the meter), and the value in the piece count register (the total number of cycles the meter has performed), as well as other types of data, such as trip status, initialization and service information, which are desired to be retained in the memory even though no power is applied to the postal meter.

When an on/off power switch 42 is turned on (closed) a power supply internal to the mailing machine energizes the microprocessor 10 and the balance of the electronic components. Whereupon information stored in the non-volatile memory 24 is copied into the RAM by the microprocessor 10. Accordingly, after power up the RAM contains an image or copy of the information which was stored only in the non-volatile memory 24 prior to energization. During operation of the postal meter, certain portions of the data in the RAM are ordinarily modified. For example, whenever postage is printed, the value stored in descending register will be reduced by the value of the printed postage, the value in the ascending register will be increased by the value of the printed postage and the value stored in the piece counter register will be incremented. When the power switch 42 is turned off (opened), the updated data reflecting such changed values in the RAM is transferred via the microprocessor 10 back into a suitably prepared area of the non-volatile memory 24. A like transfer of information between the non-volatile memory 24 and the RAM takes place during power failure.

Figure 2A:
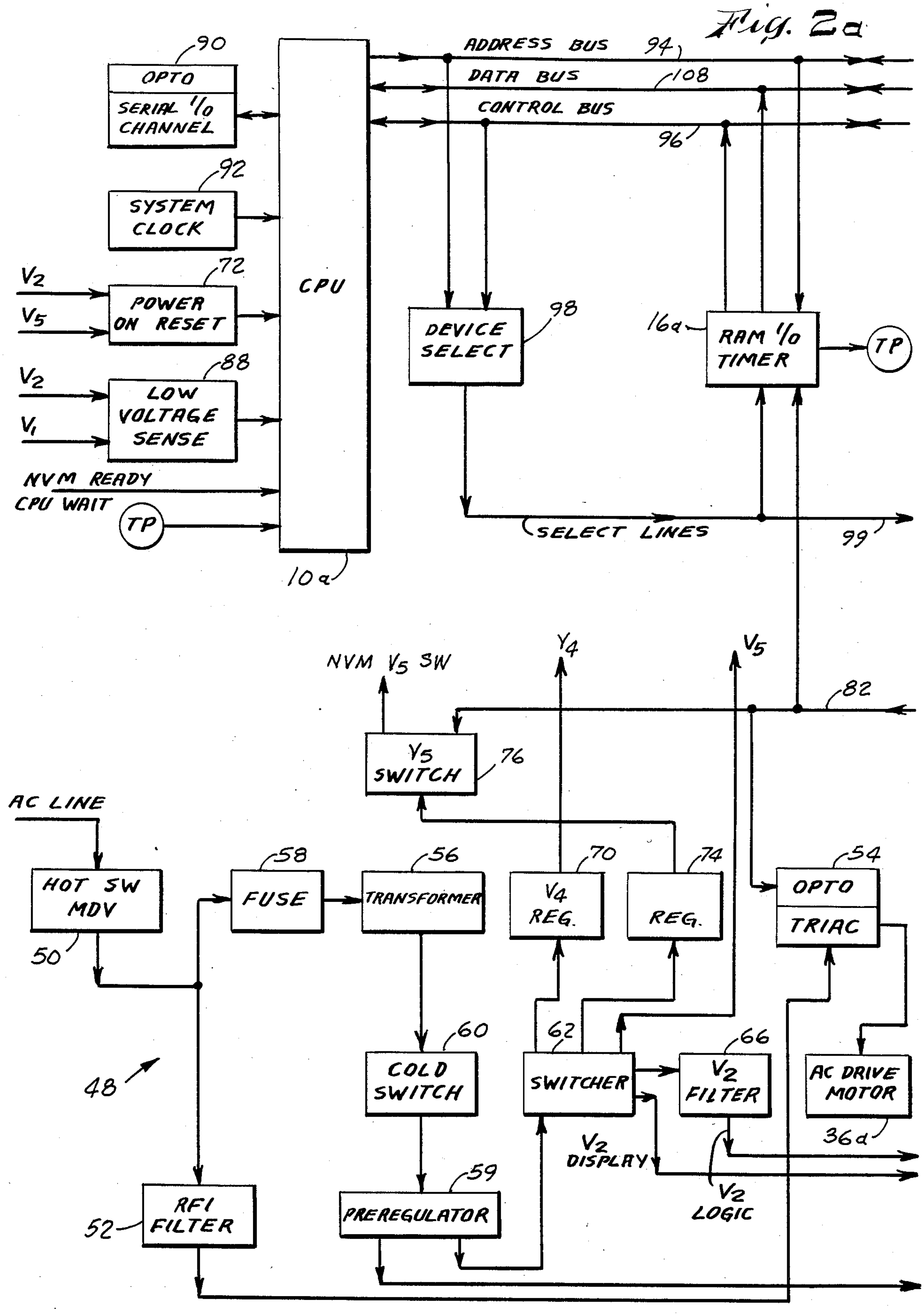
FIGS. 2A and 2B in combination are a detailed block diagram of the electronic circuits of the electronic postage meter.
Figure 2B:
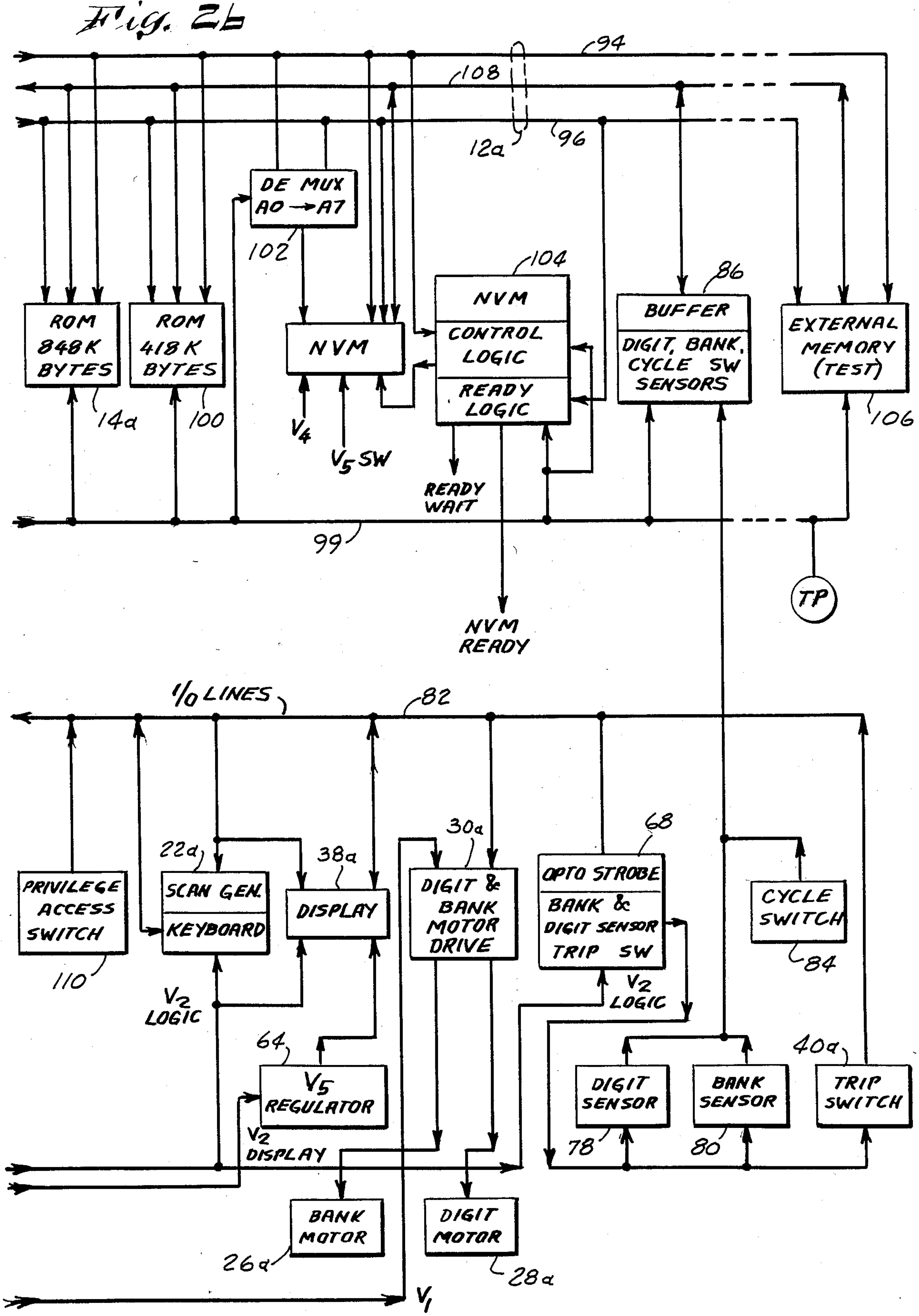

Referring to FIGS. 2A and 2B (hereafter referred to as FIG. 2), a more detailed block diagram of the arrangement of the electrical components of the postage meter is illustrated generally as 48. Power is supplied to the postage meter from the AC line voltage, typically 115 volts. This line voltage is applied to the meter through a hot switch 50 which cuts off power to the postage meter to protect the electrical components thereof if the temperature rises above a preset limit, nominally 70° C. The hot switch 50 is connected to the AC drive motor 36A through an RF filter 52 and an opto-triac 54 which provides isolation between the line voltage and the control logic for the meter. The hot switch 50 is also suitably connected to a transformer 56 protected by a fuse 58. The output of the transformer 56 is coupled to a pre-regulator 59 through a cold switch 60. The cold switch 60 cuts off power to the pre-regulator 59 if the temperature drops below a preset limit, nominally 0° C. The pre-regulator 59 provides an output voltage of a predetermined range to a switcher 62 which generates the output voltage +5 V; and the voltages for generating −12 V and −30 V.

The +5 V is applied to a +3 volt regulator 64 and then to the display 38A. The +5 V from the switcher 62 is also applied to a +5 V filter 66 which provides +5 V for logic circuits. Specifically, the +5 V is applied to the keyboard 22A, the display board 38A, and bank, digit and trip sensor logic 68 and to the integrated circuits. The −12 V is applied to a −12 V regulator 70 and then to the non-volatile memory 24A.

The −30 V output from the switcher 62 is also applied to a −30 V regulator 74 and then to a −30 V switch 76 which switches its output voltage on and off in response to the requirements of writing in NVM as dictated by a program. The output of the −30 V switch is applied to the non-volatile memory 24A. The −30 V supply is connected to the power on reset 72 of the microprocessor 10A.

+5 V from the switcher 62 is also supplied to one input of the power on reset 72; the other input receives −30 V from the regulator 74 as previously described. A low voltage sensor 88 also receives one input of +5 V from the switcher 62 and its other input from the pre-regulator 59 the output of the voltage sensor 88 is applied to the microprocessor 10A. The low voltage sensor 88 detects power failure and communicates this to the microprocessor 10A which in turn addresses the RAM through system bus 12A to transfer all security data present in the RAM to the non-volatile memory 24A.

Another output from the pre-regulator 59 in the from of +24 V is applied to the digit and bank motor drive 30A for the bank motor 26A and digit motor 28A, which respectively select the particular printing wheel (bank) which is to be activated and the particular digit of the selected printing wheel which is to be set.

An output strobe from the integrated circuit 16A is buffered through buffer driver 68 and applied to a digit sensor (encoder) 78, bank sensor (encoder) 80, and trip sensor 40A. The opto strobe applies power to the digit sensor 78, bank sensor 80 and trip sensor 40A when needed. The output from the trip sensor 40A is applied to the input/output lines 82 which are coupled to the integrated circuit 16A. The outputs from the digit sensor 78 and bank sensor 80 and cycle switch 84 are applied to a storage buffer 86.

During power up, the key switch 42 (FIG. 1) is closed, and the AC line voltage energizes the electrical components previously described and an Initialization process will occur. Such initialization may include a hard and/or soft initialization process as disclosed in the aforementioned U.S. Pat. No. 4,301,507. Preferably the initialization process for the mechanical components of the meter/machine is as disclosed in the aforementioned patent application entitled "Initializing The Print Wheels In An Electronic Postage Meter".

In operation, the microprocessor 10A under control of the ROM 14A and possibly the auxiliary ROM 100 communicates over the address bus 94 and control bus 98 with the device select 98. The output of the device select 98 communicates with the particular component to be addressed over select lines 99, including the RAM, the ROM 14A, an auxiliary ROM 100, a demultiplexer 102, NVM logic 104 and the buffer 86. The RAM of integrated circuit 16A provides the working memory for the postage meter and the microprocessor 10A. The ROM 14A stores the program; the auxiliary ROM 100 may be used to provide additional program storage space. The non-volatile memory 24A provides storage of all security information for the meter and retains such information during power down or power failure. The demultiplexer 102 latches the lower eight (8) bits of address information that defines a particular location which is used immediately thereafter. The NVM logic 104 controls the mode of operation of the NVM 24A and also provides ready, wait and NVM ready signals to the microprocessor 10A to indicate the presence of the slow speed device (NVM) as active on the bus 12A.

As previously mentioned, the digital sensor 78 (optical encoder) and bank sensor 80 (optical encoder) and cycle switch 84 whose current state is read, i.e., "Home" or "In Cycle", apply input signals to the buffer 86 which sends output signals over data bus 108 to the microprocessor 10A for storage in the proper RAM location.

The RAM is also electrically coupled to the I/O lines to transmit receive data from the trip sensor 40A, the display 38A, keyboard 22A, and, if present, a privileged access switch 110 which is kept under seal. The switch 110 is provided for use in applications which require manual resetting of meter postage by authorized personnel of, for example, the Postal Service.

Figure 3:
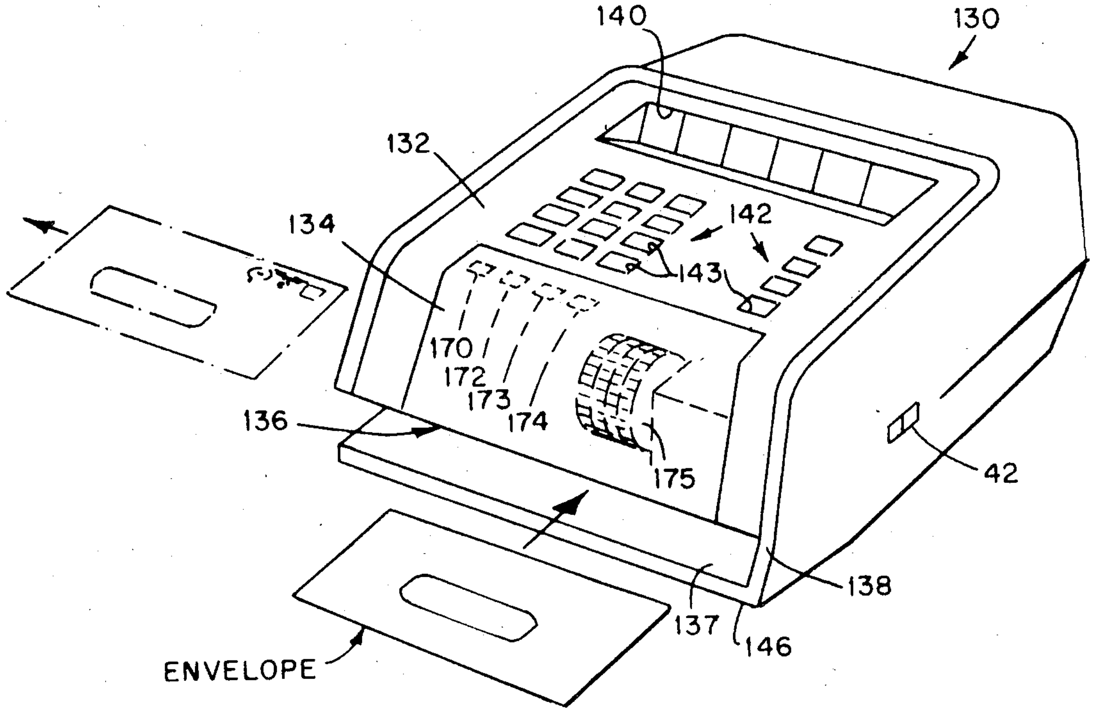
FIG. 3 is a front perspective view of a mailing machine, including a postal meter, which incorporates the features of the present invention.
Figure 4:
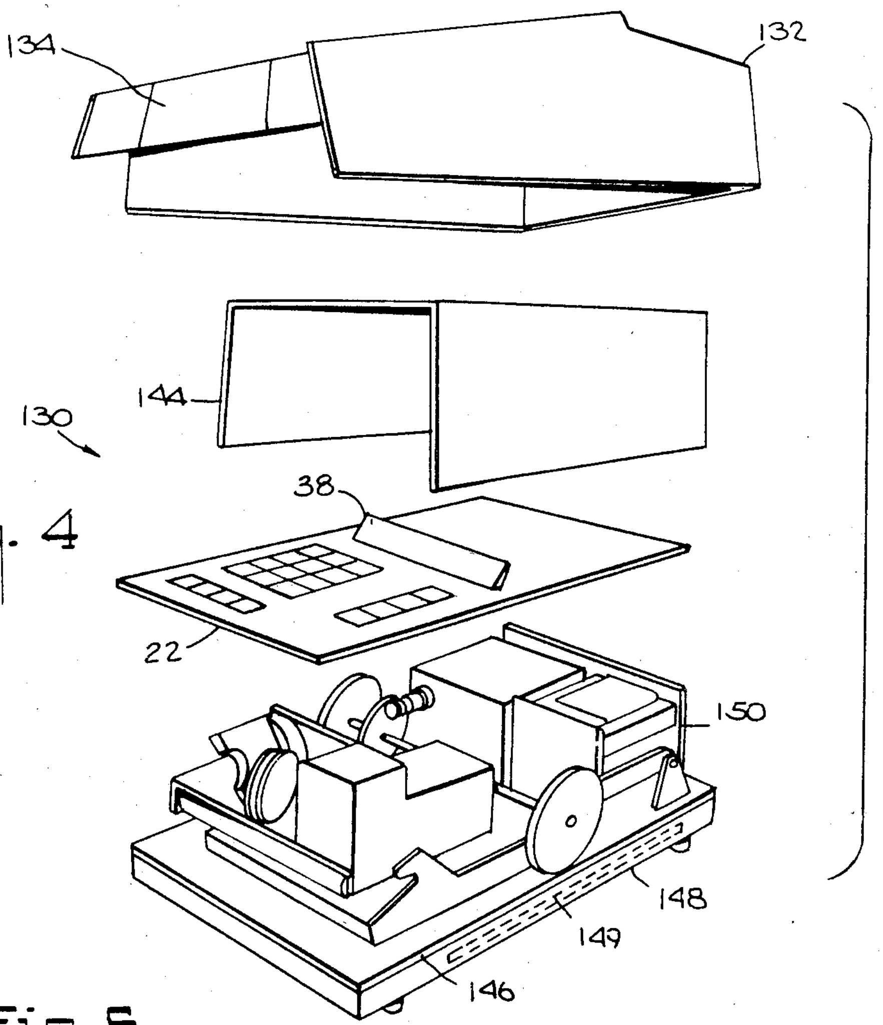
FIG. 4 is an exploded view of the mailing machine of FIG. 3.

As shown in FIG. 3, a mailing machine 130 adapted to house the aforesaid electronic postal meter includes a cover 132 having a hinged lid 134, and a slot 136 therein with a closed end 138 at the right hand side thereof. A portion of the slot 136 forms a deck 137 on which an envelope is placed when inserted into the slot 136 for printing postage thereon. At the top of the cover 132 is an opening 140, and a control panel 142 having a plurality of openings 143 formed therein. The cover 132 (FIG. 4) has nested therein an electromagnetic insulating shield 144. The cover 132 and shield 144 are attached to a base 146; the cover 132 and base 146 together forming a housing. Depending from the base 146 is a pan 148 that contains a logic board 149. A power supply board 150 is mounted on the base 146. The display 38 and the keyboard 22 are conventionally supported within the housing, with the display 38 aligned with the opening 140 in the cover 132. The keyboard 22 (FIG. 5), which serves as an information inputting and information retrieval device, has a plurality of keys which extend through the openings 143 of the control panel 142 for access by the operator. Such keys include the numeric setting keys 156 numbered 0–9, a clear key 158, a decimal key 160, a postage used key 162, a postage unused key 164, a piece count key 166 and a select postage key 168. In addition, towards the front of the mailing machine 130 (FIG. 3), located under the lid 134, are a plurality of special purpose keys of the keyboard 22. Such keys including an access code key 170, an enter amount key 172, an enter combination key 173 and a date key 174. Also located under the lid 134 are a plurality of thumbwheels 175 which are mechanically connected to the date printing mechanism for adjustment thereof as described more fully in the aforementioned application entitled "Stand-Alone Electronic Mailing Machine". Preferably the keys of the keyboard 22 are membrane switches.

In general, the electronic communication system of the postal meter is in many respects the same as the system disclosed in the aforesaid U.S. Pat. No. 4,301,507. In this connection it is noted that the software architecture of the communication system disclosed in U.S. Pat. No. 4,301,507 services three separately compartmented units of electronic structure, referred to as the control unit, accounting unit and printing unit. Each of such units includes a dedicated central processing unit connected by way of conventional data lines, control lines and address lines to, in the case of the control unit, a multipurpose conventional RAM/ROM/I/O timer circuit incorporating timing control elements and input/output interface hardware, in the case of the accounting unit, a conventional EAROM and a plurality of PROMs incorporating timing control elements and input/output interface hardware, and, in the case of the printing unit, conventional buffers, timing control elements and input/output interface hardware. And, communications between the three units are conducted via serial channels connected between the respective microprocessors of the control, accounting and printing units.

In the postal meter/mailing machine disclosed herein the functionally comparable units of electronic structure, although not compartmented from each other are treated and function as separate and independent structures. And, although a single microprocessor 10 is used, the ROM 14 is organized for storing three substantially independently functioning sets of routines, one for each of the control, accounting and printing functions. Further, although the serial channel communication lines between the compartmented units of the prior art have been eliminated, the RAM of the integrated circuit 16 includes dedicated control, accounting and printing registers for communication between the three functional modules, and includes dedicated buffers for communications with external devices. Accordingly, information is communicated in message form between the three functional modules and between the mailing machine 130 and any external device connected to the external ports 18. Aside from the foregoing, since the three crystal controlled clocks used in the compartmented units of the prior art communication system have been replaced in the present communication system with a single crystal controlled clock, the three functional modules of the present communications system are no longer internally asynchronously operable. Rather the control, accounting and printing routines are independently selected under the control of a single idle loop program stored in the ROM 14. On the other hand, as in the prior art communication system processing precedence is given to messages and requests received from external devices, over those that are internally generated for processing. Thus, as in the prior art, the external device may, as a general rule, take control of the operation of the postal meter/mailing machine. In addition, as a general rule, once the processing of a message has been commenced, such processing will proceed to completion. For example, when printing cycle has been commenced, by tripping the postal meter/mailing machine, nothing is permitted to interrupt the completion of the postage printing cycle and processing the postage value associated therewith under the control of the selected accounting routines.

In addition to the above referred to circuits of the control structure, the control structure includes the circuits of the integrated circuit 16. The control routines utilize two buffers in the RAM, one in which messages corresponding to the digits of the display are built and stored, and the other in which a bit for bit copy or image of displayed digits is stored. As information is entered into the keyboard 22 by depressing one or more keys, a copy of such information in numerical message format is built in the display buffer and transferred in bit format to the image buffer for driving the display. When the postal meter responds to any message from the keyboard 22, the response is communicated to the external device from the transmit buffer. And, with the exception of status responses any message stored in the transmit buffer is copied from the transmit buffer into the display buffer. On the other hand, when the postal meter responds to messages from the external device the responses are only communicated to the external device. Such messages are not displayed, with the exception of postal value messages which are copied into the display buffer as well as being communicated to the external device. Thus the display is mainly used for displaying responses to entries from the keyboard 22. And the keyboard 22 is utilized for inputting information to the microprocessor 10, which interprets each switch closure and in response thereto drives the display 38.

As is hereinafter more fully discussed, for reminding the user to adjust the date by manipulating the thumbwheels 175, the control structure is responsive to the application of power via the power supply board 150 to the mailing machine 130, for selectively energizing the LED display to visually display a predetermined code, which is preferably a single segment in the middle, or minus sign position, in the extreme left digit position of the LED display, and to concurrently intermittently flash the entire display until the lid 134 is opened and the date key 174 depressed.

Further, the control structure is selectively responsive to utilization of the appropriate numerical keys 156 in combination with the access code key 170 for generating command and request messages for which separate keys have not been provided, for example a command to enter or exit the service mode.

In addition, in the service mode of operation the control structure is selectively responsive to utilization of the remote resetting keys, including the enter amount key 172 and enter combination key 173, for generating data entry messages which invoke various accounting routines for modifying values stored in the RAM to conform to customer requests, for example, for modifying the settable limit value, low postage warning value and dollar unlock value. In addition, in the service mode of operation provision is made for modifying the serial number of the postal meter if it is stored in the postal meter in modifiable form.

Further, in the non-service mode of operation the control structure is selectively responsive to utilization of the access code key 170, enter amount key 172 and enter combination key 174 for generating data entry messages which invoke various accounting routines for, in the case of the access code key 170, displaying an access code which is used by the operator for calling into a Data Center to obtain a combination code, and in the case of the enter amount and enter combination keys, 172 and 174, for modifying (normally increasing) the postage unused value stored in the RAM to permit the postal meter to print additional postage.

In addition to the above referred to circuits thereof, the accounting structure includes the non-volatile memory 24 for storing critical data, including the serial number, current values in the ascending and descending and piece count registers. The accounting structures also includes volatile memories, including a plurality of registers in the RAM which function as working ascending, descending and piece count registers for storing total amounts that are appropriately adjusted whenever postage is printed or the remote resetting function keys are utilized. The working volatile memories store such critical operational data for current use and transfer the same to the non-volatile memory 24 at such time as a reduction in power is sensed or the main power switch 42 is moved to its off position.

In addition to the above referred to circuits thereof, the printing structure includes the circuits of the optical sensors, 78 and 80, which are respectively associated with the digit and bank selector stepper motors 28 and 26, respectively, for sensing the relative positioning of the print wheels of the postal meter. And the printing structure also includes the circuits of the photosensor 40 associated with the trip lever for sensing the movement of the lever in response to appropriate insertion of an envelope into the mailing machine slot 136 as discussed more fully in the aforesaid patent application entitled "Stand-Alone Electronic Mailing Machine".

Figure 6A:
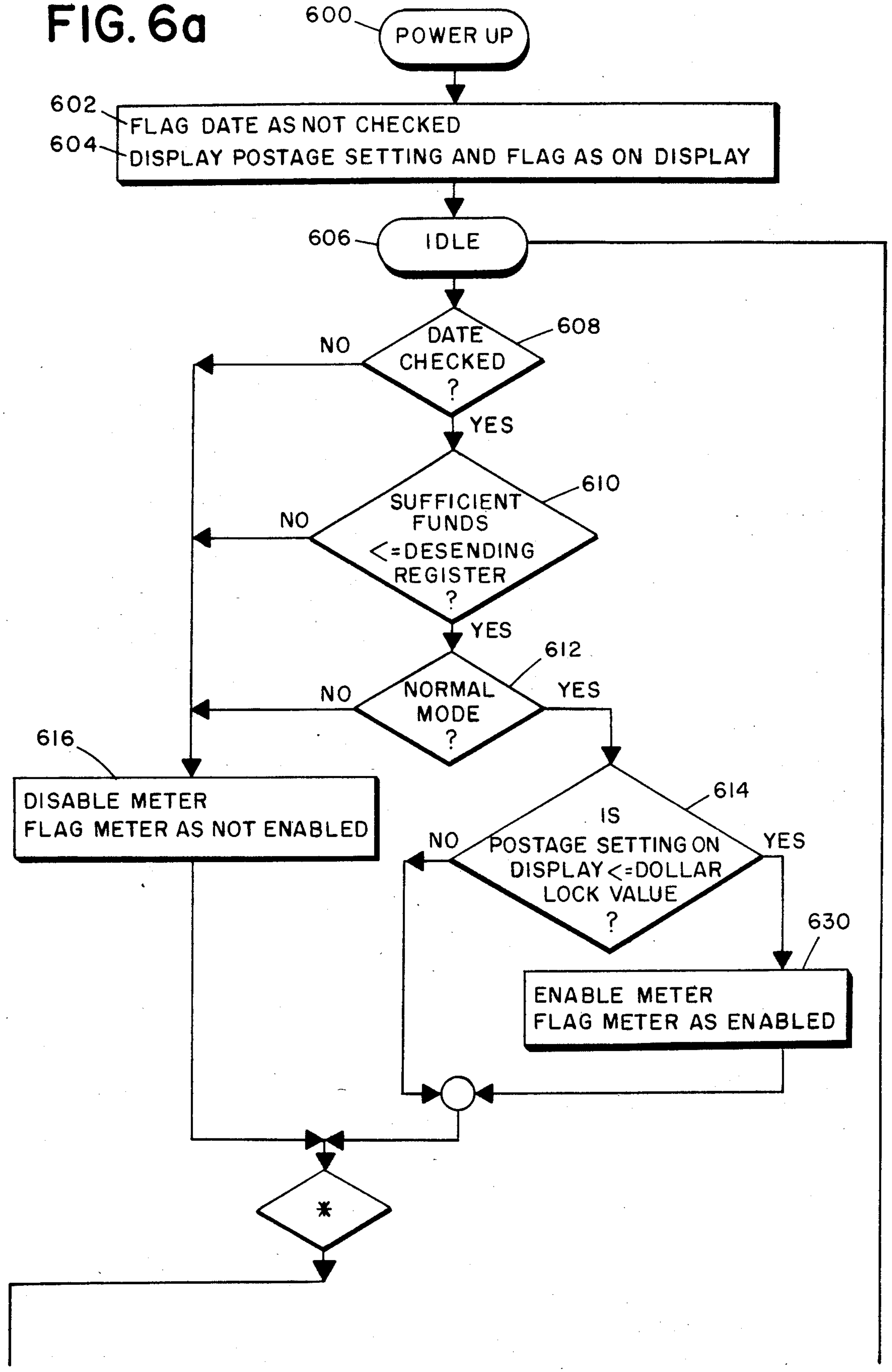
FIGS. 6A and 6B in combination are a flow chart of the date check logic routine according to the invention.
Figure 6B:
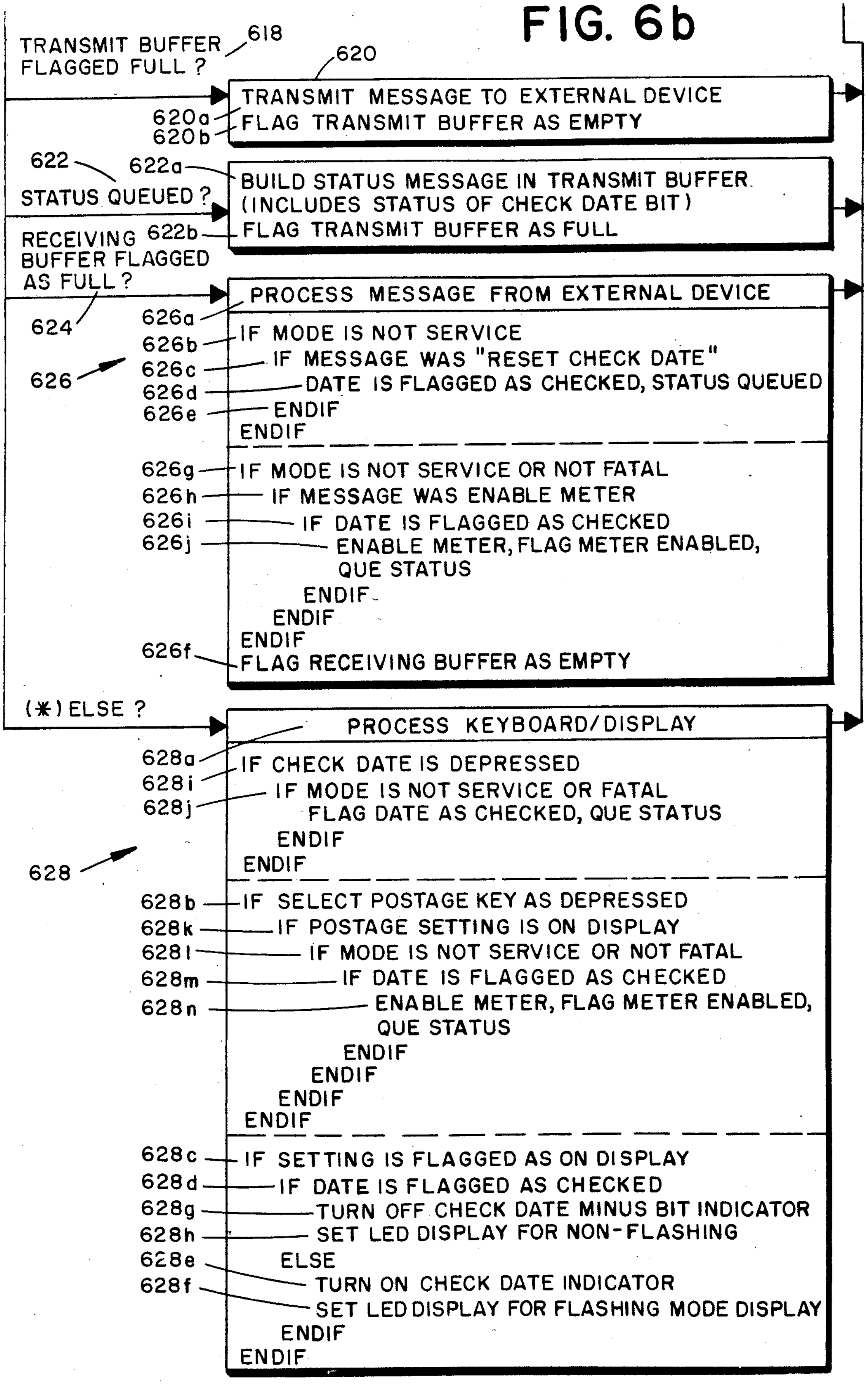

Assuming initialization of the postal meter has been completed for example as disclosed in U.S. Pat. No. 4,301,507 and in U.S. application Ser. No. 447,913 of A. B. Eckert et al., for "Initializing The Print Wheels In An Electronic Postage Meter", the microprocessor 10 executes a scan routine under the control of the idle loop program. The scan routine continuously searches the keyboard 22 for key closures resulting from depression of keys. When each key is depressed, thereby closing the associated switch, the microprocessor 10 executes a control routine which causes a subroutine stored in the control structure to drive the LED display in response to such key depressions. Upon turning the power switch to its "on" position 600 (FIGS. 6A and 6B, hereafter referred to as FIG. 6), the postal meter/-mailing machine flags the date key as not checked 602. Thereafter, in the course of the initialization process, a zero postal value is displayed and flagged as a postage setting being on display 604. Whereupon, according to the invention, the date check logic routine of FIG. 6 is invoked.

As shown in FIG. 6, wherein the 600 series of numbers is utilized to identify steps of the process shown therein, the microprocessor executes the program starting from idle 606, commencing with a determination as to whether or not the date has been checked 608. If it is not, the postal meter is disabled 616 and flagged as such, as a result of which the postal meter cannot print postage. If it were, determinations would also be made as to whether or not sufficient funds are available in the meter to print the displayed value 610, whether or not the postal meter is in the normal mode of operation 612, and whether or not the dollar unlock value stored in the meter is greater than the postage value which is displayed 614. Thus, if any one of these first three questions, 608, 610, 612, is answered in the negative, the postal meter is disabled 616 and flagged as such. On the other hand, if all of the first three questions, 608, 610 and 612, are answered in the affirmative, a determination is made as to whether or not the dollar unlock value is equalled or exceeded by the postage setting on display 614. If the dollar unlock value has not been equalled or exceeded the postage meter is enabled 630 and flagged as such, otherwise it is not; and, thereafter, in both instances, the transmit buffer 618, receiving buffer 624 and keyboard/display buffer/flags 628 are scanned for processing. For the purpose of this discussion, until otherwise stated, it will be assumed that the postage setting on display remains at the zero value displayed in the course of the initialization process, as a result of which the postage setting is less than the dollar unlock value 614. In addition it will be assumed that there are sufficient funds 610 and that the mode is normal 612.

As shown in FIG. 6, the remainder of the organization of the check date logic routine calls for processing precedence to be given in turn to transmitting messages to the external device which are stored in the transmit buffer 618, then to processing messages generated by the external device and stored in the receiving buffer 624 and then to processing messages generated by the keyboard 628. Before discussing the same in greater detail, there follows a general discussion of such processing steps.

The transmit buffer is initially scanned to determine whether it is full or empty 618. If it is full, then, as shown in the first block 620, the message stored in the transmit buffer is transmitted to the external device 620*a*, the transmit buffer is flagged as empty 620*b* and processing returns to idle 606. Thereafter the microprocessor scans the various flags to determine whether status information has been queued 622, that is, has been flagged to indicate that it is information which is to be transmitted to the external device. If status has been queued, a message corresponding to the status of the postage meter is built in the transmit buffer 622*a*, for example a message including a bit which indicates the status of the date as not being checked, and the transmit buffer is flagged as full 622*b*. Whereupon processing returns to idle 606. On the next scan, since the transmit buffer is now flagged as full 618, the message stored in the transmit buffer is transmitted to the external device 620*a* and the transmit buffer is again flagged as empty 620*b* and processing returns to idle 606. The aforesaid processing continues until all of the queue flags have resulted in a message being transmitted to the external device, one for each such queue flags. At this juncture, the transmit buffer having been flagged as empty, is available for filling with subsequent data to be transmitted, and processing returns to idle 606.

If on the next scan the receiving buffer is flagged as full 624, the check data message stored therein is processed provided the postal meter is not in the service mode of operation 626*b*, 626*g*. Date check processing does not occur in the service mode because the postal meter is not equipped to process and account for printed postage when it is in the service mode. Also, in the case of a meter enable message being processed 626*h*, processing is ended if the meter is in the fatal mode of operation. This occurs when, for example, the meter has experienced a malfunction requiring the attention of a qualified serviceman. If the receiving buffer is flagged as empty 624, processing occurs in the fourth block 628, wherein keyboard generated messages 628*a*, pertaining to the postage setting being on display 628*c*, are processed.

Referring now to the date check query 608, and assuming that the date is not checked, the meter is disabled 616 and flagged as such. Thereafter assuming the transmit buffer 618 and receive buffer 624 are both flagged as empty, processing occurs in the fourth block 628. If none of the keys 628*a* or 628*b* have been depressed, since the postage setting (zero value) is still flagged as on display 628*c* (from 604) and the date is still flagged as checked 628*d* (from 602), the check date indicator, preferably a minus sign in the extreme left digit position of the LED display, is turned on 628*e* and the entire LED display is set to a flashing mode of operation 628*f*. Thus the keyboard operator is visually reminded to check the setting of the thumbwheels 175 (FIG. 3). In addition, status is queued, 628*f*, 622 (FIG. 6) and processed as hereinbefore discussed in the case of an external device being utilized to operate the postal meter.

Assuming the postal meter is being operated from the keyboard, the operator would at this juncture check the setting of the date and change the same, if necessary, by manipulating the thumbwheels 175 (FIG. 3). Thereafter, the operator would depress the date key 174. Upon doing so, the date will not as yet have been checked 608 (FIG. 6). Accordingly, the meter would remain disabled 616 and flagged as such. On the other hand, since the transmit buffer is flagged as empty 618, the receiving buffer flagged as empty 624 and the check date key has been depressed 628*a*, the date is then flagged as checked 628*i*. In addition, since the postage setting is still on display 628*c* and the date flagged as checked 628*d*, the minus bit indicator is turned off 628*g*, the LED display set to its non-flashing mode 628*h*, and processing returned to idle 606. At this juncture since the date has now been flagged as checked 608 (from 628*j*), and the answer to the questions 610, 612 and 614 are all yes, the meter is enabled and flagged as such.

Assuming the postal meter is being operated from an external device, the external device would normally be operated to generate and transmit to the postal meter a "reset check date" message, i.e., a header only message which simulates the depression of the date key of the postal meter. Assuming this has occurred, the transmit buffer is flagged as full 624, and the message processed. Since the postal meter is not in the service mode 626*b* and the message was "reset check date" 626*c*, the date is flagged as checked 626*d*, the receiving buffer is flagged as empty 626*f* and processing returned to idle 606. Since the date has now been flagged as checked 608 (from 626*d*), and the questions 610, 612 and 614 are all answered affirmatively, the meter is enabled and flagged as such. Thereafter, all queued status is processed as hereinbefore discussed and transmitted to the external device. Then, since the date is flagged as checked (from 626*d*) and the setting is still flagged as on display 628*c*, the check date minus bit indicator is turned off 628*g*, the LED display set for the non-flashing mode 628*h*, and processing returned to idle 606.

As shown in FIG. 6, the external device can enable the meter 626*j* by transmitting an enable meter message to the postal meter. Assuming this occurs and the postage setting on display 614 is greater than the dollar unlock value, the receiving buffer will be flagged as full 624 and the message therein processed in block 626. Whereupon if the mode is not service or not fatal 626*g* and the date is flagged as checked 626*i*, the enabled meter message will be processed, preferably, on an unconditional basis. However it is within the scope of the invention to conditionally enable the meter 626*j*. This may be deemed to be a desirable occurrence due to it being generally impermissable to unconditionally enable the meter 626*j* when the postage value on display exceeds the dollar unlock value 614. For example, it may be desirable that the processing step 626*j* include a conventional subroutine to permit enablement of the postal meter by the external device when the enable meter message 626*h* simulates more than one discrete depression of the select postage key.

Similarly, the postal meter may be enabled from the keyboard by depressing the select postage key 628*b*. Again, assuming the postage is on display 628*k*, the mode not service or not fatal 628*l* and the date flagged as checked 628*m,* the meter will be, preferably, unconditionally enabled. However, as hereinbefore discussed it may be desirable to conditionally enable the postage meter, for example if the postage setting on display exceeds the dollar lock value. Thus the remarks hereinbefore made with regard to processing at step 626*j* apply with equal force to the processing at step 628*n,* except that meter enablement would occur, for example, when the select postage key 628*b* is actually depressed a second time.

Aside from the foregoing, if the date has been checked 608 but there are insufficient funds in the postal meter to print the displayed postage 610, the meter will be disabled 616 and flagged as such. Reading down the flow chart (FIG. 6) it will be noted that nothing in chart can cure this problem, as a result of which processing is ended and returns to idle 606. Ordinarily the operator would at this juncture recharge the meter.

If the date has been checked 608 and there are sufficient funds 610 but the meter is not in the normal mode 612, then, the meter will be disabled and flagged as such, processing ended and returned to idle 606 since there is nothing in the flow chart (FIG. 6) for curing this problem. Ordinarily, if the meter is in the service mode, the operator would have to take it out of the service mode before proceeding with check date processing. On the other hand, if the meter were not in the service mode but was in the fatal mode, the user would ordinarily call a serviceman to cure the problem.

Assuming that the problems which could occur with respect to insufficient funds 610 or not being in the normal mode 612, are cured, it will then be assumed that the date is checked 608, but the setting on display is less than the dollar lock value 614, as a result of which nothing is done. However, this state of affairs can be dealt with as hereinbefore discussed by the check date logic routine. Since the date was checked 608 at the outset, the operator can operate the select postage key 628*b* to depress the same a second time for overriding the dollar unlock feature of the postal meter. And, upon doing so, since the setting is on display 628*k,* the mode of operation is normal 628, and the date was flagged as checked 628*m,* the meter is enabled 628*n* to print postage. After which, processing is ended and returns to idle 606.

Accordingly, when the postal meter/machine is powered-up, the date is flagged as not checked, as a result of which the check date program is invoked and executed by the microprocessor to determine whether or not a postage setting is on display and, if it is and the date is not checked, the microprocessor disables the meter to prevent postage from being printed. In addition, the display is then driven to display at least one segment in a predetermined digit position of the display. In the preferred embodiment, a minus sign is displayed in the extreme left digit position. In addition, the entire LED display commences flashing, intermittently, to inform the user that the date has not been checked. Further, the postal meter/machine is programmed to respond to depression of the date key to turn off the minus sign bit in the extreme left hand digit position of the LED display and set the LED display to a non-flashing mode. In addition, the postal meter/machine is programmed to respond to messages from an external device for simulating depression of the date key and for enabling the meter/machine without operator intervention. Further, the postal meter is programmed to permit utilization of the select postage key for generating an enable meter message after the date has been checked although the postage setting on display exceeds the dollar unlock value; and provision is made to permit an external device to simulate such operation of the postage meter.

Figure 5:
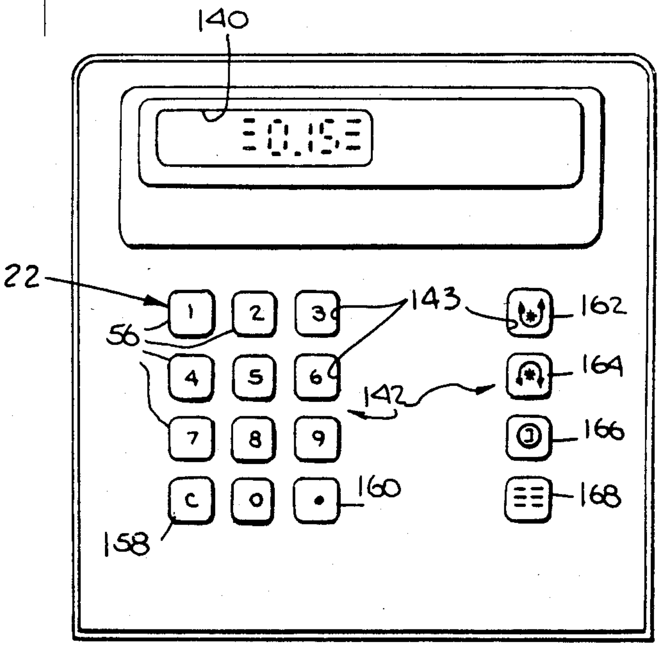
FIG. 5 is a plan view of the keyboard and display of the postal meter/mailing machine of FIG. 3.

Referring now to FIG. 5, in any mode of meter operation other than the service mode, depression of the postage used key 162 effects the display at the display panel 140 of the total value in the ascending register of all postage that has been printed, depression of the postage unused key 164 effects the display of the total value in the descending register of the postage then available for printing, and depression of the piece count key 166 effects the display of the total count of all printing operations of the mailing machine 130. In each instance the depression of the selected key results in the current value associated with the key being displayed for a predetermined time interval after the key is released, for example several seconds, after which time interval the display will return to the then current postage setting.

According to the invention, the numerical keys 156 (FIG. 5) in combination with the access code key 170 (FIG. 3) may be used for displaying the aforesaid information and other information which is not ordinarily the kind of information that a customer needs or is able to interpret. And, when the meter is in the service mode of operation, the postage used, postage unused and piece count keys, 162, 164 and 166 (FIG. 5) may each be used to effectuate the display of some of such other information. The latter case is hereinafter initially discussed since it exemplifies both usages of the keyboard.

In order to effectuate utilization of the keyboard 22 (FIG. 4) to initiate command or request functions for which separate keys have not been provided, a predetermined numerical code, having at least two and preferably four characters without a decimal, is entered in the keyboard 22 by depressing the appropriate numerical keys 156 (FIG. 5), followed by depression of the access code key 170 (FIG. 3). Upon depression of the access code key 70 a control routine is invoked which causes the generation of a request or command header corresponding to the two low order digits in the display. For example, although a service mode key has not been provided, entering the numerals 6946 in the keyboard followed by depression of the access code key 170 will cause the generation of a "46" command header. Whereupon the microprocessor will invoke a conventional subroutine causing the meter to enter the service mode of operation. When this occurs, a predetermined code, preferably consisting of a segment inserted in the low segment position of each blank digit position will be displayed to inform the user that the postal meter and thus the machine is in the service mode of operation. Thereafter, depression of the postage used key 162 will result in the display of the "dollar unlock" value, consisting of a predetermined value which if equaled or exceeded, in the course of use of the postal meter, will not be printed unless the operator depresses the select postage key a second time after the value is originally displayed. On the other hand, in the service mode of operation, the depression of the postage unused key 164 will result in the display of the "low postage warning" value, consisting of a predetermined postage value which results in the display of a warning signal informing the operator that the postal meter/mailing machine should be recharged. And, depression of the piece count key 166 will result in a diagnostic status display identifying the last fatal condition that occurred, even though that condition was subsequently cleared.

Figure 7:
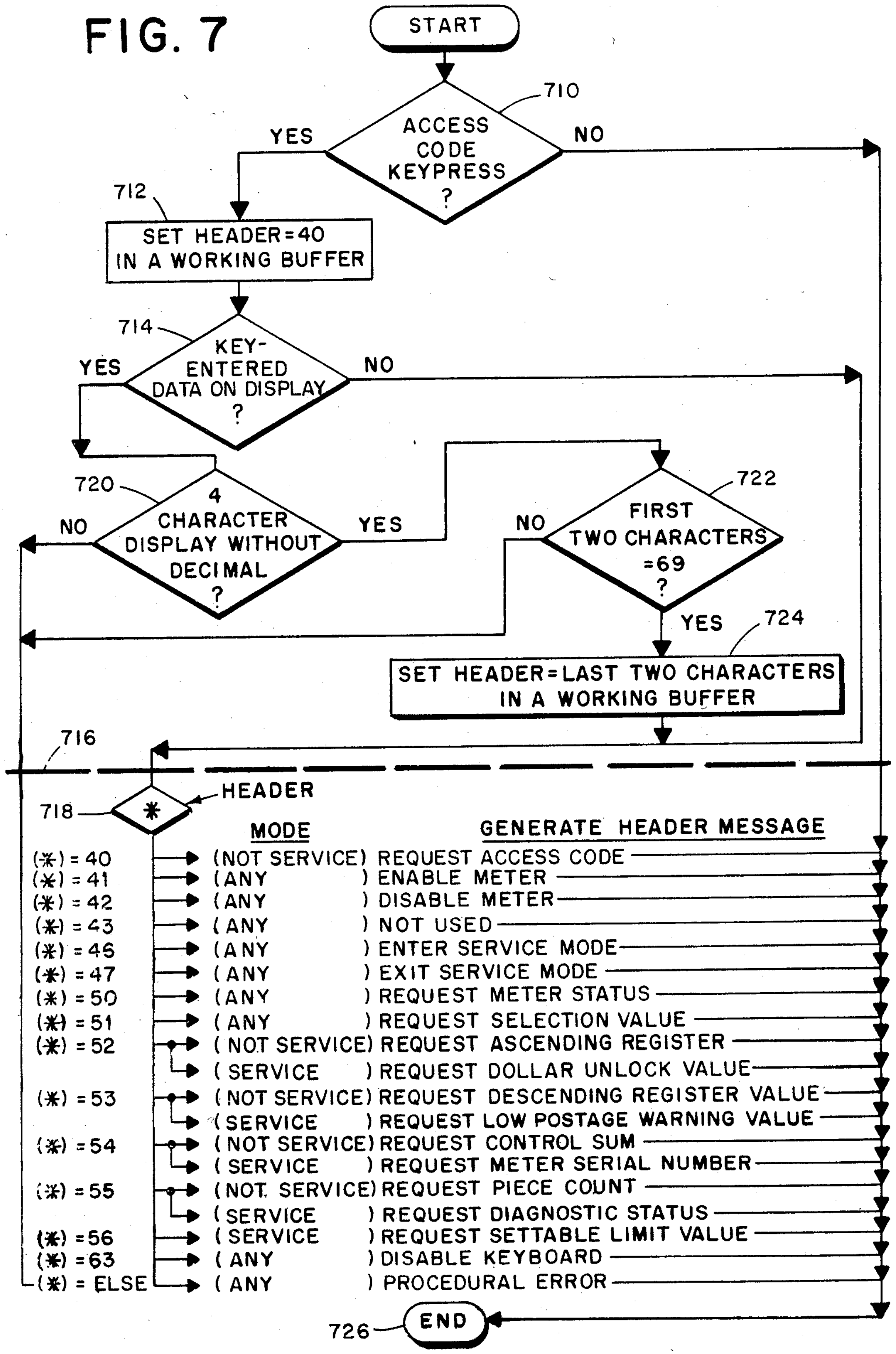
FIG. 7 is a flow chart of the header message logic routine according to the invention.

For the general case of usage of the numerical keys in combination with the access key 170 (FIG. 3) for displaying all of the above referred to information and still further information, reference is made to FIG. 7, wherein the 700 series of numbers are utilized to identify the steps of processing. As shown in FIG. 7, until the access code key is depressed 710, the microprocessor under the direction of the idle loop program continues its idle routine. When the access key is depressed 710, a single byte header message corresponding to the numerical value of "40" is built and stored in an available working buffer 712. If there is no key entered data in the display 714 at this juncture, the microprocessor invokes the header message execution routine 716 shown below the dashed line in FIG. 7 to execute the header message 718. Since the header message corresponds to the numeral 40, a "request access code" message is generated, which message results in the microprocessor invoking a conventional subroutine for building an access code in the display buffer. And, as hereinbefore discussed, the display buffer is copied into the image buffer in bit format for driving the LED display, as a result of which the access code is displayed to the operator, i.e., the code ordinarily used by the operator, for example for calling into Pitney Bowes Data Center, when charging the postal meter with additional postage. On the other hand, after the aforesaid numeral 40 header is generated 712 and set in the available buffer, if there is key entered data is in the display 714 the header will not be executed. Rather, the display buffer will be scanned, and, if the data in the display buffer is not a four character display without a decimal 720, then the microprocessor invokes a conventional sub-routine which generates a "procedural error" message, i.e., a meter status message having a procedural error bit, which message is transferred to the display image buffer to drive the LED display to display the notation "ERR". Similarly, if the display is a four character display without a decimal, but the first two characters 722 are not the numerals "69", the microprocessor invokes the aforesaid sub-routine to generate the procedural error message and display the same error notation. On the other hand, if the first two characters 722, of the four character display without a decimal, are the numerals "69", then, a single byte header message 724 utilizing the last two characters is generated and stored in an available working buffer, whereupon the microprocessor invokes the header message execution routine 716 below the dashed line in FIG. 37 and execute the same to generate a message corresponding to the last two digits.

Upon execution of the header message routine 716 (FIG. 7), if the aforesaid last two digit header message is "40", a "request access code" message is generated, resulting in the display hereinbefore discussed. If the two digit header message is "41" an "enable meter" message is generated, if it is "42" a "meter disable" message is generated, if it is "46" an "enter service mode" message is generated, if it is "47" an "exit service mode" message is generated, if it is "50" a "request status" message is generated, and if it is "51" a "request selection value" message is generated. If it is "52" and the meter is not in the service of operation a "request ascending register" message is generated. On the other hand, if it is "52" and the meter is in the service mode of operation the request ascending register message is interpreted as a "request dollar lock value" message. If the two digit code is "53", "54" or "55" and the meter is not in the service mode of operation, then the "request descending register", "request control sum" or "request piece count" messages will be respectively generated; whereas if it is "53", "54" or "55" and the meter is in the service mode of operation then these same messages will be respectively interpreted as the "request low postage warning value", "request meter serial number" or "request diagnostic status" messages. Further, if it is "56" and the meter is in the service mode of operation the "request settable limit value" message will be generated, if it is "63" the "disable keyboard" message will be generated, and, if the last two digits are any two digits other than one of the foregoing last two digits, then the "procedural error" message will be generated. In each instance, upon generating or otherwise providing the particular message, processing is ended 726, and thereafter the microprocessor invokes a conventional sub-routine which is executed by the microprocessor to cause the performance of the particular operation of the meter which corresponds to the message and to provide a display corresponding to the message. For example, when the message "request access code" and "procedural error" were respectively generated as hereinbefore discussed, an access code and the notation "ERR" were respectively displayed.

To effectuate utilization of the keyboard 22 to initiate data entry functions for which separate keys have not been provided, and to obviate the necessity of entering and end of entry command from the keyboard without providing a separate key therefor, the postal meter/-mailing machine is also programmed to permit an operator, usually a factory trained serviceman, to modify or initially store various predetermined values in the mailing machine which effect its operational characteristics. These values include the settable limit value, low postage warning value and dollar unlock value, which are usually modified to comply with customer needs or preferences. According to the invention, for modifying such values the machine is initially put into the service mode of operation as hereinbefore discussed. Having done so it should be noted that since the access code key is not involved with modifying values stored in the meter, the flow chart of FIG. 7 is not hereinafter referred to in the following discussion.

Figure 8A:
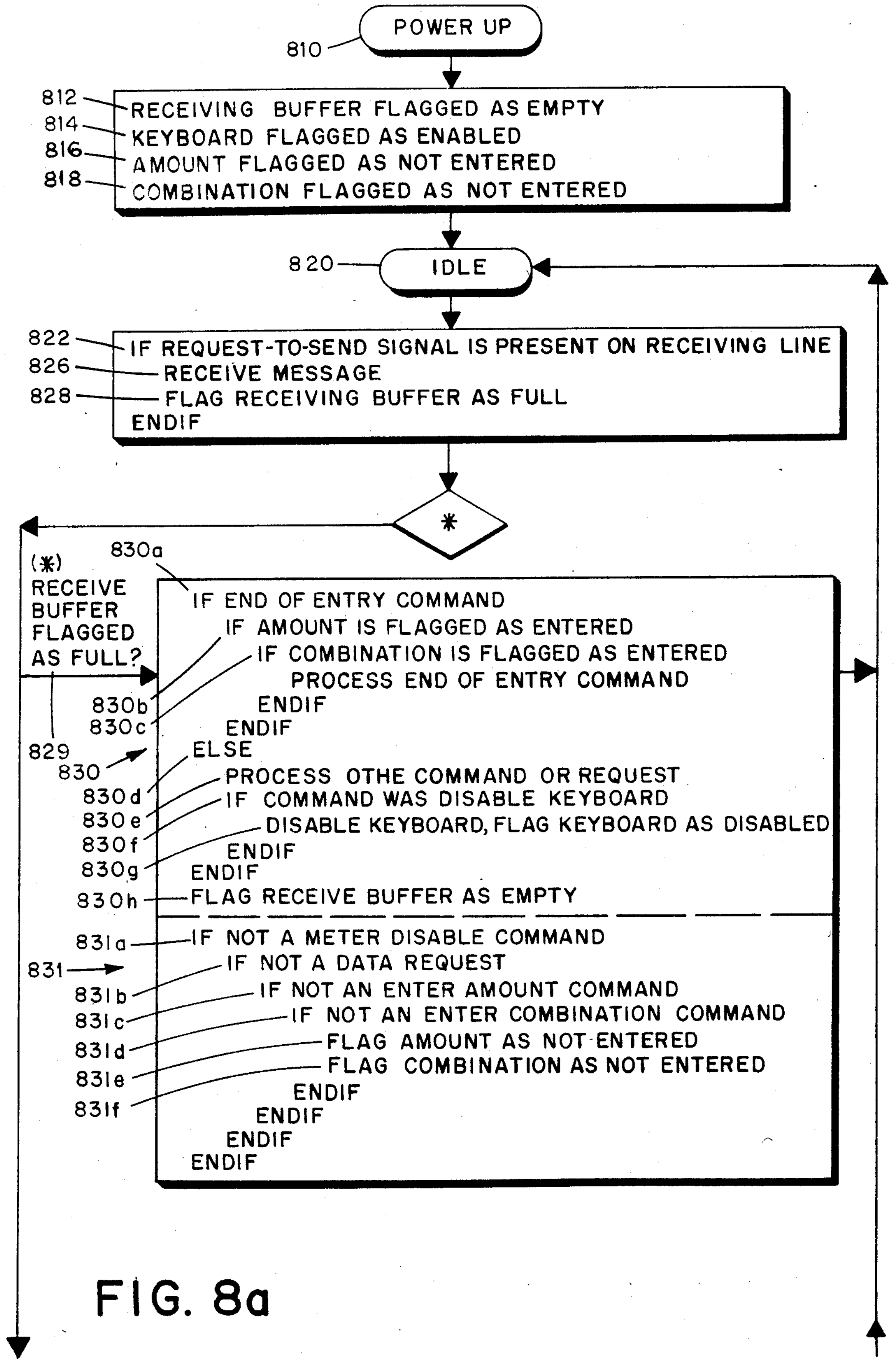
FIGS. 8A and 8B in combination are a flow chart of the amount and combination, end of entry, logic routine according to the invention.
Figure 8B:
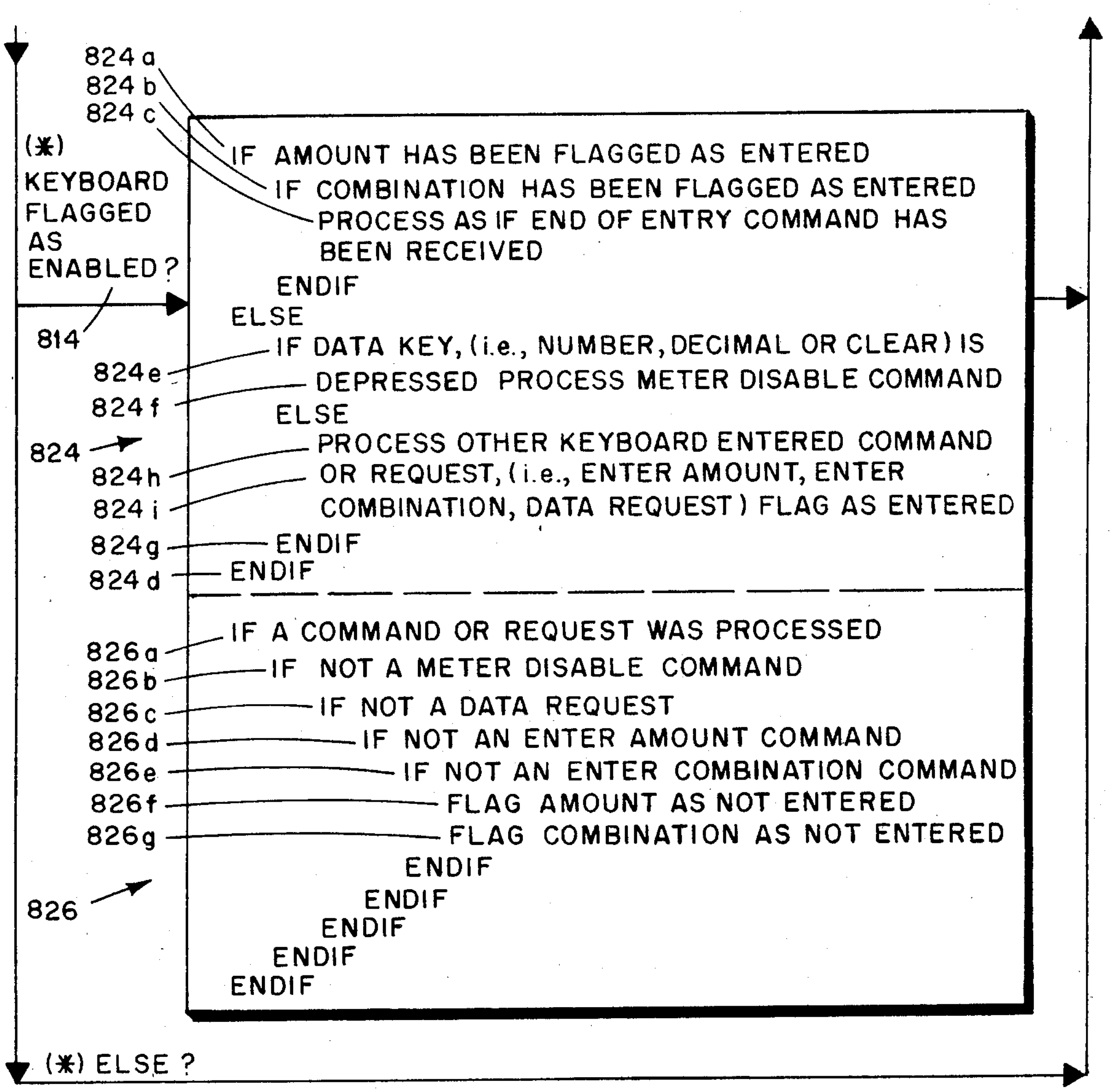

Before modifying the aforesaid values, after putting the postal meter in the service mode of operation, the operator may optionally check the values that are to be modified, by depressing the appropriate key 162, 164 or 166 (FIG. 5) to determine whether or not modification is necessary. Thereafter the operator ordinarily enters the new value to be stored into the keyboard 22, by depressing the appropriate numerical keys 156, which results in the display of the corresponding value, and then depressing the enter amount key 172 (FIG. 3), which results in the storage of the displayed amount and blanking the display. Either before or after entry of the new value, the operator may enter a predetermined combination, having at least one digit, into the keyboard by utilizing the numerical keys 156 (FIG. 5), which results in the display of the corresponding value, and then depressing the enter combination key 173 (FIG. 3), which results in the storage of the combination corresponding to the keyboard entry and blanking of the display. As a result of having entered both the amount and combination, the microprocessor automatically invokes the end of entry program shown in FIGS. 8A and 8B (hereafter referred to as FIG. 8) for processing the entered amount and combination, as if an end of entry command had been received, thereby causing the value stored in the register identified by the combination to be changed to the new value.

The end of entry program (FIG. 8) is executed by the microprocessor under the control of the appropriate accounting routine. As shown in FIG. 8, after power 810 is applied to the postal meter the receiving buffer is flagged as empty 812, the keyboard is flagged as enabled 814. In addition, the amount and combination working registers of the RAM are flagged as not entered, 816 and 818, in the course of initialization of the postal meter/machine. Under the control of the idle loop program, the microprocessor then searches for executable instruction in the various working buffers of the RAM.

As shown in FIG. 8, wherein the 800 series of numbers are used for identifying the processing steps, processing precedence from idle 820 is given to messages received from external devices, over those that are internally generated. For the purpose of this discussion, it will be assumed until otherwise stated that a request-to-send signal 822 has not been received from any external device since the initialization process was completed, and that the receiving buffer remains flagged as empty 812, the keyboard remains flagged as enabled 814, the amount remains flagged as not entered 816 and the combination remains flagged as not entered 818. Accordingly, messages are processed in accordance with the steps of the process set forth in the lower block 824 (FIG. 8). If the amount has been flagged as entered 824*a*, due to a new value having been entered in the keyboard and the enter amount key having been depressed, and if the combination code has also been flagged as entered 824*b*, due to the appropriate code having been entered in the keyboard and the enter combination key having been depressed, then, the amount and combination code are processed 824*c* as if an end of entry command has been received. On the other hand, if the amount has been flagged as entered 824*a* but the combination has not been so flagged, then, processing is ended 824*d*. If however the amount has not been flagged as entered 824*a* and if a numerical data key is depressed 824*e*, then, the keyed data 824*f* generates a meter disable command. In this connection it should be noted that disabling the meter prevents the same from printing postage, and that the keyboard remains enabled. Referring again to FIG. 8, if the amount has not been flagged as entered 824*a* and a numerical data key is not depressed 824*e*, processing is ended 824*g* unless some other key is depressed 824*h*, in which event the other command or request is processed 824*i*.

After the aforesaid processing is completed, all such processing is additionally subjected to the abort analysis subroutine 826 shown below the dashed line in the lower block 826. As shown in this subroutine 826, if a command or request has been processed above the dashed line 826*a*, and if it was not a meter disable command 826*b*, and it was not a keyboard entered data request 826*c* i.e., a message generated as a result of depression of any one of the postage used, postage unused or piece count keys, and it was not an enter amount command 826*d*, and it was not an enter combination command 826*e*, then, the amount 826*f* and combination 826*g* are both flagged as not entered. If however the command or request was processed above the dashed line 826*a* and it was a meter disable command 826*b* processing is ended; or, if it was not a meter disable 826*b* but was a keyed data request 826, then processing is ended; or, if it was neither a meter disable command 826*b* nor a numerically keyed data request 826*c*, but was an enter amount command 826*d*, then, processing is ended; or if it was not a meter disable command 826*b* nor data request 826*c* nor enter amount command 826*d*, but was an enter combination command 826*d*, then, processing is ended. And, in each instance in which processing is ended, the amount and combination, 826*b*, 826*g* are not flagged as not entered, or, otherwise stated, if one or the other of the amount or combination had been flagged as entered due to prior processing above the dashed line it will remain flagged as entered.

The aforesaid abort analysis subroutine 826 (FIG. 8) is provided to be sure that once the operator commences the process of modifying one of the values stored in the postal meter, and certain other information other than the appropriate information for completing the value modification process is entered into the keyboard before completing the value modification process, then the operator is forced to recommence the value modification process. For example, if after the operator enters an amount, the operator then enters a postage value via the keyboard 824*e*, the meter will be disabled due to a meter disable command being generated and processed 824*f* each time a key is depressed. Such entries will not clear the amount and combination entry flags since a meter disable command was processed 826*b*. However, when the operator depresses the select postage key, the message generated is a select postage command 826*b* not a data request 826*c*, not an enter amount command 826*d* and not an enter combination command 826*e*; as a result of which the amount and combination code will both be flagged as not entered. Thus the previously entered amount will have to be reentered by the operator. On the other hand, it is permissable to interrupt processing the new value/combination code entry sequence for the purpose of displaying values by depressing data request keys. Thus the postage used key may be depressed for displaying the "dollar unlock" value, the postage unused key may be depressed for displaying the "low postage warning" value, and the piece count key may be depressed for displaying the "diagnostic status"; these values, rather than those associated with the name of the key, being displayed since the new value/combination code is entered when the postal meter is in the service mode of operation. Under these circumstances, the amount and combination will not be flagged as not entered, since the depression of such keys results in generating a data request message and processing a data request message 826*a* results in ending the abort analysis subroutine. Accordingly, a previously entered amount or combination will not be flagged as not entered. Thus, although the postal meter is programmed for forcing the operator to complete the value modification process after having commenced the same, or, otherwise stated, is programmed for preventing the value modification process from being aborted after its commencement, information which is relevant to value modification processing may be displayed after the process has been commenced with respect to any of the values that are ordinarily modified.

At any time in the course of the foregoing procedures the operator of an external device may take control of the meter to transmit a command or message by sending a request-to-send signal. However, the message associated with the signal will not be processed until internal processing then in progress is completed.

As shown in FIG. 8, after idle 810, if there is not a request to send signal 822 on the receiving line nothing is done. If however a request to send signal 822 is on the receiving line, then the message is received 826 and the receive buffer is flagged as full 828. Having flagged the receive buffer as full 828, 829 the message will be processed in the upper block 830 whether or not the keyboard is enabled, due to processing receiving buffer messages taking precedence over processing keyboard entered messages.

As shown in the upper block 830, if the message following the request to send signal is an end of entry command 830*a* and the amount and combination are both flagged as entered 830*b* and 830*c*, then, the amount and combination are processed. However, it should be noted that if the keyboard entry routine hereinbefore discussed was interrupted by a request-to-send signal 822 after entry of the amount and combination via the keyboard, the amount and combination would not be effected, since processing would have already automatically occurred as if an end of entry command had been received, inasmuch as the end of entry message associated with the request-to-send signal 822 will not be processed until the processing then in progress is completed. Accordingly, the incoming end of entry command 830*a* would find both the amount and combination flagged as not entered 830*b* and 830*c*, as a result of which processing of the end of entry command in the upper block diagram would be ended. This would also occur if the external device operator were to consecutively enter the amount and then enter the combination, in any order, unless the operator of the external device initially disables the keyboard. Assuming the external device is equipped to disable the keyboard, the operator of the external device has the option of allowing automatic processing, as previously discussed, as if an end of entry command had been sent, or, preventing such processing until an end of entry command is transmitted.

Referring back to the upper block 830 (FIG. 8) assuming the message following the request-to-send signal 822 is not an end of entry command, but is something else 830*d*, that request or command is processed 830*e*. And if the message is a disable keyboard command 830*f*, the keyboard is flagged as not enabled 830*g*. In any event, after processing the request or command received from the external device, processing is ended and the receiving buffer is flagged as empty 830*h*.

As discussed in connection with processing the keyboard entries, commands and messages from the external device are also subjected to an abort analysis subroutine 831, in this instance as shown in the upper block 830. As shown below the dashed line 831, if a command or request was not a meter disable command 830*a*, not a numerical data request 830*b*, not an enter amount command 830*c* and not an enter combination command 830*d*, then, both the amount 830*a* and combination 830*f* are flagged as not entered. On the other hand, if the request or command was a meter disable command 830*a*, or, if it was not, but was a data request 830*b*; or, if it was neither a meter disable command 830*c* nor a data request 830*d* but was an enter amount command 830*e*; or if it was not a meter disable command 830*a* nor data request 830*b* nor enter amount command 830*c*, but was an enter combination command 830*d*; then, in each instance, processing below the dashed line is ended and returns to idle 820.

The main difference between the processing steps involved in modifying the values in the registers via the external device rather than via keyboard entries, is that an end of entry command 830*a* must be sent from the external device to commence processing the amount and combination code if the operator of the external device initially transmitted a disable keyboard command; whereas, as shown in the lower block 824, an end of entry command need not be initiated by the operator to commence processing the amount and combination code data, rather it is automatically processed when the last of the two (amount or combination) are entered. Thus the external operator has a choice of methodology which is unavailable to the keyboard operator.

Assuming the operator of the external device sends a disable keyboard command, it must be sent prior to entering either the amount or combination. For example, assuming the amount has been entered 830*b* but the combination has not been entered 830*c* and a disable keyboard command 831*a* has not as yet been sent by the operator of the external device, if at this time a request to send signal 822 is sent, followed by a disable keyboard command 826, since this is not an end of entry command 830 it would be processed by the upper block 830 as any other command or request 830*d* and, in addition, the keyboard would be flagged as not enabled 830*g*. However, since all processing above the dashed line of the upper block 830 is analyzed below the dashed line, and since the keyboard disable command is not a meter disable command 831*a*, and not a data request 830*b*, and not an enter amount command 830*c* and not an enter combination command 830*d*; the amount 830*e* and combination 830*e* will both be flagged as not entered. As a result, the previously entered amount would be cleared.

Assuming the external device operator chooses to disable the keyboard before entering the amount and combination, since he wants to avoid automatic processing, then, after such processing, unless the external operator transmits an enable keyboard command, the keyboard will remain disabled. If this state of affairs is not intended, the keyboard operator can cure the problem by turning the power switch "off" and then "on" again, as a result of which the keyboard will be flagged as enabled 814 in the course of the initialization process.

The aforesaid discussion concerning the end of entry processing is based on the assumption that the postal meter is in the service mode of operation. When the postal meter is in the non-service mode of operation, the amount and combination keys 172 and 714 are utilized in the same fashion to effectuate modifying the amount stored in the postage unused register of the RAM. And, processing any message generated by depression of the amount and combination keys 172 and 174 is in all respects the same as is hereinbefore discussed. In addition, the same may be said for processing messages generated by the external device. And all other remarks hereinbefore made with regard to utilization of other keys of the keyboard, and processing messages from the external device other than those pertaining to entry of the amount and combination, apply with equal force to utilization of the meter in the non-service mode. However, it is critical to the security of the postal meter that the combination code used for modifying the value stored in the postage unused register not be made available to anyone other than authorized users of the postal meter. Therefore the code is obtained from the Data Center by following the steps of depressing the access code key 170, which results in the display of a code other than the combination code, and then calling this code into the appropriate Data Center, as hereinbefore discussed, along with the serial number of the postal meter/machine and the amount which is to be added to the postage unused register, to obtain from the Data Center the then current combination code which must be used for entry in order to effectuate modification of the value stored in the postage unused register.

Since it is critical to the security of the postal meter to be sure that the serial number cannot be modified except by authorized personnel, any modification of the serial number is ordinarily undertaken in the course manufacture of the machine and, in any event, before the machine is placed in service. For preventing the serial number from being modified by unauthorized personnel, the above discussed modification procedure can only be used for modifying the serial number if it is stored in modifiable form. For example, assuming the postal meter/mailing machine does not have a serial number or has a serial number which is to be modified; the foregoing procedure may be followed, utilizing as the new value, a serial number having at least one digit prefixed by a "zero" digit, for either initial entry or any modification of an unlocked serial number. However, at such time as it is desirable to fix the serial number of the postal meter/mailing machine, the operator repeats the aforesaid modification procedure another time, utilizing the next previously entered serial number prefixed by a "one" digit rather than a "zero" digit, whereupon the microprocessor invokes a conventional subroutine which locks the next previously entered combination in place in the serial number register.

It is known and understood that the terms postage meter and postal meter, as used herein, refer to the general definition of a device for the imprinting of a defined unit value for governmental or private carrier parcel, envelope or package delivery, or other like application for unit value printing. Thus, although the term postal meter is utilized, it is both known and employed in the trade as a general term for devices utilized in conjunction with services other than those exclusively employed by governmental postal services. For example, private parcel or freight services purchase and employ postal meters as a means to provide unit value pricing for individual parcels, including acounting and printing functions.

A more detailed description of the programs hereinbefore discussed is disclosed in the appended program listing describing in detail all of the various routines incorporated in, and used in the operation of, the postal meter/mailing machine.

While the inventions disclosed herein have been described with reference to a simple embodiment thereof, it will be apparent to those skilled in the art that variations and modifications may be made therein without departing from the spirit and scope of the same. Accordingly, it is intended in the following claims to cover each such variation and modification as falls within the true spirit and scope of the claimed inventions.

PROGRAM APPENDIX

PATENT APPLICATION

OF: John H. Soderberg, Howell A. Jones, Alton B. Eckert and Edward C. Duwel

FOR: POSTAGE METER WITH KEYBOARD KEYS FOR CHANGING METER OPERATIONS TO BE PERFORMED

```
<<< ASSEMBLY COMMAND STRING >>>


/LIST=_DRA1:[OPT1.DEBUG]PATENT.LIS
/OBJECT=_DRA1:[OPT1.DEBUG]PATENT.OBJ
+       LINES 60
+       LIST    A,E,G,O,S,X
+       NLIST   M
_DRA1:[OPT1.DEBUG]SYMBOL.SRC
;       I N T E R R U P T   V E C T O R   T A B L E
_DRA1:[OPT1.DEBUG]VECTBL.SRC
;       I N T E R R U P T   P R O C E S S I N G
+       ORG     40H
_DRA1:[OPT1.NEWINT]CLKDEC
_DRA1:[OPT1.NEWINT]DBOUNC
_DRA1:[OPT1.NEWINT]DISPLY
_DRA1:[OPT1.NEWINT]INT75
_DRA1:[OPT1.NEWINT]KDIO
_DRA1:[OPT1.NEWINT]MVDDAT
_DRA1:[OPT1.NEWINT]RDROW
_DRA1:[OPT1.NEWINT]STPTMR
_DRA1:[OPT1.NEWINT]STRTMR
_DRA1:[OPT1.NEWINT]TIMINT
;       P O W E R   U P   &   D O W N
;_DRA1:[OPT1.DEBUG]PWRUP
_DRA1:[OPT1.NEWCTL]PWRABN
```

```
_DRA1:[OPT1.NEWCTL]PWRDN
_DRA1:[OPT1.NEWCTL]PWRNOR
_DRA1:[OPT1.NEWCTL]PWRUNG
_DRA1:[OPT1.NEWCTL]PWRUOK
;       K E Y B O A R D   &   D I S P L A Y
_DRA1:[OPT1.NEWKEY]CDBUF
_DRA1:[OPT1.NEWKEY]FILDIM
_DRA1:[OPT1.NEWKEY]KEYBRD
_DRA1:[OPT1.NEWKEY]MODDSP
_DRA1:[OPT1.NEWKEY]PAUTHK
_DRA1:[OPT1.NEWKEY]PCLRK
_DRA1:[OPT1.NEWKEY]PDCMK
_DRA1:[OPT1.NEWKEY]PERDSP
_DRA1:[OPT1.NEWKEY]PNUMK
_DRA1:[OPT1.NEWKEY]PROKEY
_DRA1:[OPT1.NEWKEY]PSETK
_DRA1:[OPT1.NEWKEY]SEGCOD
_DRA1:[OPT1.NEWKEY]VALDSP
;       C O N T R O L   &   P R O C E S S I N G
;+      ORG     400H
_DRA1:[OPT1.NEWCTL]CMDDSB
_DRA1:[OPT1.NEWCTL]CMDENB
_DRA1:[OPT1.NEWCTL]CONFIG
_DRA1:[OPT1.NEWCTL]CONSUM
_DRA1:[OPT1.NEWCTL]CTLSUM
_DRA1:[OPT1.NEWCTL]DBLHDR
_DRA1:[OPT1.NEWCTL]DECADD
_DRA1:[OPT1.NEWCTL]DECCOM
_DRA1:[OPT1.NEWCTL]DECERR
_DRA1:[OPT1.NEWCTL]DECSUB
_DRA1:[OPT1.NEWCTL]DOACCT
_DRA1:[OPT1.NEWCTL]DOSTAT
_DRA1:[OPT1.NEWCTL]DOTRIP
_DRA1:[OPT1.NEWCTL]ENDENT
_DRA1:[OPT1.NEWCTL]ENTAMT
_DRA1:[OPT1.NEWCTL]ENTSER
_DRA1:[OPT1.NEWCTL]EXTSER
_DRA1:[OPT1.NEWCTL]EXTTRP
_DRA1:[OPT1.NEWCTL]FATERR
_DRA1:[OPT1.NEWCTL]FINTRP
_DRA1:[OPT1.NEWCTL]HDRONY
_DRA1:[OPT1.NEWCTL]HDRPLS
_DRA1:[OPT1.NEWCTL]IDLE
_DRA1:[OPT1.NEWCTL]MANRST
_DRA1:[OPT1.NEWCTL]MESAGE
_DRA1:[OPT1.NEWCTL]MSERNO
_DRA1:[OPT1.NEWCTL]MSG2MU
_DRA1:[OPT1.NEWCTL]MTRSTS
_DRA1:[OPT1.NEWCTL]NPAUSE
_DRA1:[OPT1.NEWCTL]POSUPD
_DRA1:[OPT1.NEWCTL]PROERR
_DRA1:[OPT1.NEWCTL]RDCYC
_DRA1:[OPT1.NEWIO]RECEVE
_DRA1:[OPT1.NEWCTL]REDSTS
_DRA1:[OPT1.NEWCTL]SELVAL
_DRA1:[OPT1.NEWCTL]SEREOE
_DRA1:[OPT1.NEWCTL]SETPOS
_DRA1:[OPT1.NEWCTL]SRVCNV
_DRA1:[OPT1.NEWCTL]SRVREQ
_DRA1:[OPT1.NEWCTL]VALREQ
_DRA1:[OPT1.NEWCTL]XEQHDR
_DRA1:[OPT1.NEWIO]XMIT
;       U T I L I T I E S
_DRA1:[OPT1.NEWUTL]CLRBLK
_DRA1:[OPT1.NEWUTL]CMPARE
_DRA1:[OPT1.NEWUTL]CRC
_DRA1:[OPT1.NEWUTL]CRCNIB
_DRA1:[OPT1.NEWUTL]DBLANK
_DRA1:[OPT1.NEWUTL]DFLUSH
_DRA1:[OPT1.NEWUTL]DSBKBD
_DRA1:[OPT1.NEWUTL]ENAKBD
_DRA1:[OPT1.NEWUTL]FILNIB
_DRA1:[OPT1.NEWUTL]GETNIB
_DRA1:[OPT1.NEWUTL]LSTATE
_DRA1:[OPT1.NEWUTL]MOVBIT
_DRA1:[OPT1.NEWUTL]MVLNIB
_DRA1:[OPT1.NEWUTL]MVRNIB
_DRA1:[OPT1.NEWUTL]PUTNIB
_DRA1:[OPT1.NEWUTL]RSCAN
_DRA1:[OPT1.NEWUTL]TDBITM
_DRA1:[OPT1.NEWUTL]VCALL
_DRA1:[OPT1.NEWUTL]VCALLS
;       N O N   V O L A T I L E   M E M O R Y
_DRA1:[OPT1.NEWNVM]NVM30F
_DRA1:[OPT1.NEWNVM]NVM30T
_DRA1:[OPT1.NEWNVM]NVMBYT
_DRA1:[OPT1.NEWNVM]NVMCHG
_DRA1:[OPT1.NEWNVM]NVMDED
_DRA1:[OPT1.NEWNVM]NVMDXB
_DRA1:[OPT1.NEWNVM]NVMER
_DRA1:[OPT1.NEWNVM]NVMFND
_DRA1:[OPT1.NEWNVM]NVMLOD
_DRA1:[OPT1.NEWNVM]NVMMAP
_DRA1:[OPT1.NEWNVM]NVMNBK
_DRA1:[OPT1.NEWNVM]NVMNXT
_DRA1:[OPT1.NEWNVM]NVMOPN
_DRA1:[OPT1.NEWNVM]NVMPRP
_DRA1:[OPT1.NEWNVM]NVMRD
_DRA1:[OPT1.NEWNVM]NVMSTO
_DRA1:[OPT1.NEWNVM]NVMWN
_DRA1:[OPT1.NEWNVM]NVMWR
;       V R M R S
_DRA1:[OPT1.VRMRS]ACCODE
_DRA1:[OPT1.VRMRS]BINOCT
_DRA1:[OPT1.VRMRS]VRCDR
_DRA1:[OPT1.VRMRS]VRCLR
_DRA1:[OPT1.VRMRS]VRCREC
_DRA1:[OPT1.VRMRS]VRMRS
_DRA1:[OPT1.VRMRS]VRSET
_DRA1:[OPT1.DEBUG]PATENT
;       M O T O R   S U B S Y S T E M
;_DRA1:[OPT1.DEBUG]STUB
_DRA1:[EASWARAN.CONTROL]DMOVE
_DRA1:[EASWARAN.CONTROL]ENCMOV
_DRA1:[EASWARAN.CONTROL]ENDMOV
_DRA1:[EASWARAN.CONTROL]MDSEEK
_DRA1:[EASWARAN.CONTROL]MOPEN
_DRA1:[EASWARAN.CONTROL]MOTMOV
_DRA1:[EASWARAN.CONTROL]POHOME
_DRA1:[EASWARAN.CONTROL]RENC
_DRA1:[EASWARAN.CONTROL]SETCLS
```

```
                  LINES 60
                  NLIST   M
                ; *********************************
                ; ***   RAM LABEL DEFINATIONS   ***
                ; *********************************
     0000               +FIXSED   EQU    PTR
     0008               +VARSED   EQU    PTR
     0010               +CTLCRC   EQU    PTR
     0012               +RSTCNT   EQU    PTR
     0013               +ERRST   EQU    PTR
     0014               +ERRCOD   EQU    PTR
     0016               +ERRCNT   EQU    PTR
     0018               +UNLOCK   EQU    PTR
     001C               +LOWWRN   EQU    PTR
     001E               +SETLIM   EQU    PTR
     0020               +SERFLG   EQU    PTR
     0021               +SERNUM   EQU    PTR
     0028               +PCEREG   EQU    PTR
     002F               +DSCREG   EQU    PTR
     0036               +DSCCRC   EQU    PTR
     0038               +ASCREG   EQU    PTR
     0040               +ASCCRC   EQU    PTR
     0042               +POSREG   EQU    PTR
     0046               +MTRCHR   EQU    PTR
     0048               +MRSTS1   EQU    PTR
     004A               +MRSTS2   EQU    PTR
     004C               +NORFLG   EQU    PTR
     004E               +KDCTRL   EQU    PTR
     0050               +BLKTMR   EQU    PTR
     0052               +DSPTMR   EQU    PTR
     0054               +KEYBKT   EQU    PTR
     0056               +CTLBKT   EQU    PTR
     0058               +CHRBKT   EQU    PTR
     005A               +CURBKT   EQU    PTR
     005C               +DBCTR   EQU    PTR
     005E               +SKPVAL   EQU    PTR
     0060               +SKPCNT   EQU    PTR
     0062               +TIMVEC   EQU    PTR
     0066               +NVMCTL   EQU    PTR
     0068               +OLDSWT   EQU    PTR
     006A               +DIEDCM   EQU    PTR
     006C               +DEFDCM   EQU    PTR
     006E               +PORTBI   EQU    PTR
     0070               +SPARE   EQU    PTR
     0080               +DBUF   EQU    PTR
     008C               +SPARE1   EQU    PTR
     0090               +RECBUF   EQU    PTR
     00A0               +XMTBUF   EQU    PTR
     00B0               +SPARE2   EQU    PTR
     00C0               +WORK1   EQU    PTR
     00D0               +WORK2   EQU    PTR
     00E0               +AMTBUF   EQU    PTR
     00F0               +CMBBUF   EQU    PTR
     0000               +DIMAGE   EQU    PTR
                 NLIST M
SYMBOL TABLES

                  ;                      FLAG ASSIGNMENTS

                  ; RAM                   BIT
                  ; LABEL      BIT        LABEL      DESCRIPTION

                  ; Serflg     0          Dead       Unrecoverable Fatal Error
                  ;             1
                  ;              2        Weknvm     Retention qualities of NVM poor
                  ;               3       Snolck     Sernum can no longer be changed
```

```
                ;
                ; Mrsts1    0         Unksel    Unknown selection value
                ;            1        Datdor    Check date warning
                ;             2       Insfnd    Insufficient funds
                ;              3      Lowpos    Low postage warning
                ;               4     Sermod    In service mode
                ;                5    Enabld    Meter enabled
                ;                 6   Incyc     Trip mechanism in cycle
                ;                  7  Quereq    Trip request being processed
                ;
                ; Mrsts2    0         Fatmod    Detected fatal error condition
                ;            1
                ;             2
                ;              3
                ;               4     Trpsw     Trip switch status
                ;                5
                ;                 6
                ;                  7  Prvmod    Privileged mode set
                ;
                ; Norflg    0         Quests    Status is to be transmitted
                ;            1        Quepos    Current selection is to be transmitted
                ;             2       Cmbin     Combination entered
                ;              3      Amtin     Amount entered
                ;               4     Trpreq    Trip waiting to be processed
                ;                5    Comdsb    External communications disabled
                ;                 6   Unvsel    Selected postage not verified
                ;                  7  Latdsb    Commanded disable (latched)
                ;
                ; Kdctrl    0         Stgdsp    Setting is on display
                ;            1        Flsdsp    Flashing display
                ;             2       Timed     Display is timed
                ;              3
                ;               4
                ;                5    Flsdcm    Flashing decimal
                ;                 6
                ;                  7  Kbddsb    Keyboard disabled
                ;  *************************************
                ;  ***   HARDWARE ADDRESS POINTERS   ***
                ;  *************************************

7400            X        EQU   7400H  BASE ADDRESS OF RAM
7480            Y   EQU   7480H  BASE ADDRESS OF RAM UPPER HALF
7000            CTLREG   EQU   7000H  8155 CONTROL REGISTER
6800            DATA1    EQU   6800H  SWITCH DATA ADDRESS
02BE            KILCOD   EQU    2BEH  ADDRESS OF KILCODES IN NVM
4800            NVMWRT   EQU   4800H  WRITE ADDRESS FOR NON VOLATILE MEMORY
4400            NVMRED   EQU   4400H  READ ADDRESS FOR NON VOLATILE MEMORY
4000            NVMERS   EQU   4000H  ERASE ADDRESS FOR NON VOLATILE MEMORY
6800            PORT2A   EQU   DATA1
7001            PORTA    EQU   7001H  8155 PORT A ADDRESS
7002            PORTB    EQU   7002H  8155 PORT B ADDRESS
7003            PORTC    EQU   7003H  8155 PORT C ADDRESS
00FE            RETAIN   EQU    0FEH  ADDRESS OF NVM RETENTION LOCATION
8000            TEST     EQU   8000H  ADDRESS OF EXTERNAL TEST SOFTWARE
7004            TIMER    EQU   7004H  8155 TIMER DATA ADDRESS


                ;  ******************************
                ;  ***   P A R A M E T E R S  ***
                ;  ******************************

0002            DBVAL    EQU   2      DEBOUNCE COUNT
0007            DSPVAL   EQU   7.     COUNT FOR 5.5 SEC TIMED DISPLAY
0002            KDSKIP   EQU   2      TIMER INT SKIP COUNT
4C96            KEYINT   EQU   (18.*179.).OR.4000H   VALUE FOR 1.8 MILLI SEC INT RATE
```

```
7FA1      MAXINT  EQU   (91.*179.).OR.4000H  MAX TIMER INTERVAL , 9.1 MILLI SEC
0080      MULKEY  EQU   80H    VALUE ASSIGNED TO MULTI KEY DEPRESSION
0002      NDISP   EQU   2      NO. OF DISPLAY PACKS
0008      DSPCHR  EQU   (NDISP*4) MAX NO. OF CHAR DISPLAYABLE
          ;  NON-VOLATILE MEMORY PARAMETERS
0000      SRVSTR   EQU   FIXSED  NIBB OFFSET FOR START OF SERVICE BLOCK IN RAM
0028      NORSTR   EQU   PCEREG  NIBB OFFSET FOR START OF NORMAL BLOCK IN RAM
0028      SRVSIZ   EQU   NORSTR-SRVSTR
0022      NORSIZ   EQU   MRSTS2-NORSTR
          ;  *******************************************
          ; ***   VALUE SIZE IN NIBBLES ( DIGITS )   ***
          ; *******************************************

0008      ASCSIZ   EQU   8     ASCENDING REGISTER
0007      DSCSIZ   EQU   7     DESCENDING REGISTER
0004      NBANKS   EQU   4     BANKS FOR POSTAGE PRINTING
0007      PCESIZ   EQU   7     PIECE REGISTER



          ; ************************************
          ; ***   V A L U E   F O R M A T S   ***
          ; ************************************

          ; FORMAT OF DATA  2 DIGITS
          ;    LEFT DIGIT = NO. OF DIGITS
          ;    RIGHT DIGIT = NO. OF DECIMAL PLACES EXCEPT
          ;                = F HEX  NOT DECIMAL NO ( COUNT )
          ;                = 0 USE NO. OF DECIMALS INDICATED BY DIEDCM

008F      ACCFMT  EQU   8FH    ACCESS CODE
0080      ASCFMT  EQU   80H    ASCENDING REG
0080      CSMFMT  EQU   80H    CONTROL SUM
005F      DIAFMT  EQU   5FH    DIAGNOSTIC STATUS
0070      DSCFMT  EQU   70H    DESCENDING REG
0040      LOKFMT  EQU   40H    UNLOCK
007F      MSNFMT  EQU   7FH    METER SERIAL NO
007F      PCEFMT  EQU   7FH    PEICE COUNT
0040      POSFMT  EQU  NBANKS*10H SELECTION
          ; ************************************
          ; ***   MISSING ENTRY POINT TRAPS   ***
          ; ************************************



          ; ****************************
          ; ***   FATAL ERROR CODES   ***
          ; ****************************

0002      SFTWRE   EQU   02H   DETECTED INCONSISTANT SET OF ARGUMENTS ON CALL
0008      TRPTIM   EQU   08H   TRIP FAILED TO COMPLETE WITHIN ALLOWED TIME
0009      RSTTRY   EQU   09H   EXCEEDED ALLOWED NO OF UNSUCESSFUL RESET ATTEMPTS
0011      BADSW    EQU   11H   DETECTED ILLOGICAL SWITCH CONDITION
0012      BUFOVR   EQU   12H   INFORMATION WAS OVER WRITTEN IN TRANSMIT BUF
0017      BARF     EQU   17H   UNEXPECTED INTERRUPT
0018      NINCYC   EQU   18H   CYCLE SWITCH FAILED TO INDICATE NOT HOME



          ; *********************
          ; ***   KILL CODES   ***
          ; *********************
```

```
               ;  CODES 0 - 9 WILL RESULT IN THE METER BEING
               ;            PERMINITELY INOPERATIVE
               ;  CODES A - E WILL RESULT IN CPU BEING HALTED
               ;  CODE F  IS NORMAL OPERATION
0000           BADCRC   EQU   0H   DETECTED BAD CRC
0001           NVMBAD   EQU   1H   ERRASE OR WRITE TO NVM UNSUCESSFUL
0002           NVMRET   EQU   2H   READ BEFORE ERASE FAILED,  IE UNACCEPTABLE RETENTIO
0003           FATRST   EQU   3H   DESCENDING REG CLEARED WHILE FATAL MODE
0004           BADCYC   EQU   4H   UNACCEPTABLE RESPONSE FROM CYCLE SWITCH
               ;        EQU   5H   SPARE
               ;        EQU   6H   SPARE
               ;        EQU   7H   SPARE
               ;        EQU   8H   SPARE
               ;        EQU   9H   SPARE
               ;  WILL RESULT IN CPU HALTING ON POWER UP
000A           BADRAM   EQU   0AH  DETECTED BAD RAM ON POWERUP
               ;        EQU   0BH  SPARE
               ;        EQU   0CH  SPARE
               ;        EQU   0DH  SPARE
               ;        EQU   0EH  SPARE
               ;  ***************************
               ;  ***   MESSAGE HEADERS   ***
               ;  ***************************

               ;  COMMANDS
0041           HENABL  EQU   41H    ENABLE METER
0042           HDISAB  EQU   42H    DISABLE METER
0043           HENDEN  EQU   43H    END OF ENTRY
0046           HSETSV  EQU   46H    SET SERVICE MODE
0047           HCLRSV  EQU   47H    CLEAR SERVICE MODE
004E           HEXTRP  EQU   4EH    EXTERNAL TRIP
0062           HENAKB  EQU   62H    ENABLE KEYBOARD
0063           HDISKB  EQU   63H    DISABLE KEYBOARD

00C0           HSETMN  EQU   0C0H   ENTER METER SERIAL NUMBER
00C1           HSETPO  EQU   0C1H   SET POSTAGE
00C4           HSETDA  EQU   0C4H   CLEAR CHECK DATE
00C5           HENTAM  EQU   0C5H   ENTER AMOUNT
00C6           HENTCO  EQU   0C6H   ENTER COMBINATION
               ;  SERVICE
               ;  NAME             COMBO    AMT FMT MAX
               ;  UNLOCK VALUE       0         42
               ;  LOW POSTAGE WARN   1         2F
               ;  SETTABLE LIMIT     2         2F

               ;REQUESTS - NORMAL MODE
0040           HREQAC  EQU   40H    ACCESSCODE REQUEST
0050           HREQST  EQU   50H    STATUS REQUEST
0051           HREQPO  EQU   51H    CURRENT SELECTION VALUE
0052           HREQAR  EQU   52H    ASCENDING REGISTER VALUE
0053           HREQDR  EQU   53H    DESCENDING REGISTER VALUE
0054           HREQCS  EQU   54H    CONTROL SUM VALUE
0055           HREQPC  EQU   55H    PEICE COUNT VALUE
005B           HREQCF  EQU   5BH    CONFIGURATION REQUEST
005C           HREQSN  EQU   5CH    SERIAL NUMBER VALUE

               ;REQUESTS - SERVICE MODE

               ;             50H    STATUS REQUEST
               ;             51H    CURRENT SELECTION VALUE
0052           HREQDL  EQU   52H    LOCK VALUE
0053           HREQLP  EQU   53H    LOW POSTAGE WARNING
0054           HREQMN  EQU   54H    METER SERIAL NO.
0055           HREQDS  EQU   55H    DIAGNOSTIC STATUS
0056           HREQSL  EQU   56H    SETTABLE LIMIT
               ;             5CH    SERIAL NUMBER VALUE
0000           EJEC
```

```
                ;VALUE HEADERS
0080            HSTAT   EQU   80H    METER STATUS
0081            HPSET   EQU   81H    POSTAGE VALUE
0082            HAREG   EQU   82H    ASCENDING REGISTER
0083            HDREG   EQU   83H    DESCENDING REGISTER
0084            HCSUM   EQU   84H    CONTROL SUM
0085            HPCNT   EQU   85H    PIECE COUNT
008A            HDLOCK  EQU   8AH    UNLOCK VALUE
008B            HLOPOS  EQU   8BH    LOW POSTAGE WARNING
008C            HMTRNO  EQU   8CH    METER SERIAL NUMBER
008D            HDIAGS  EQU   8DH    DIAGNOSTIC STATUS
008E            HHSLIM  EQU   8EH    SETTABLE LIMIT
0090            HACODE  EQU   90H    ACCESS CODE
00AB            HCONFG  EQU   0ABH   METER CONFIGURATION
VECTOR INTERRUPTS

                ;   INTERRUPT JUMP TABLE TO VECTOR INTERRUPTS TO CORRECT ENTRY POINT
                 ORG   0
0000 C3 C5 01    JMP   PWRUP      RST 0  POWER ON RESET
                 ORG   8H         RST1
0008 C3 A1 0B    JMP   PROERR
                 ORG   10H        RST2
0010 C3 A1 0B    JMP   PROERR
                 ORG   18H        RST3
0018 C3 A1 0B    JMP   PROERR
                 ORG   20H        RST4
0020 C3 A1 0B    JMP   PROERR
                 ORG   24H        TRAP  ( WATCH DOG TIMER )
0024 C3 7E 08    JMP   FATINT
                 ORG   28H        RST5
0028 C3 A1 0B    JMP   PROERR
                 ORG   2CH        5.5  ( POWER FAIL )
002C C3 7E 08    JMP   FATINT
                 ORG   30H        RST6
0030 C3 A1 0B    JMP   PROERR
                 ORG   34H        6.5
0034 C3 B6 01    JMP   PWRDN
                 ORG   38H        RST7
0038 C3 A1 0B    JMP   PROERR
                 ORG   3CH        7.5  ( TIMER )
003C C3 9D 00    JMP   INT75
                    ORG     40H
CLKDEC

                ;CLKDEC/CLKDGT(KDCTRL,BLKMSK,PORTA )
                ;              (BITSTR,BYTE  ,BITSTR)
                ;              ( I    , I    , I/O  )
                ;              ( PSW  , B    , @HL  )
                ;              ( C    , NC   , C    )
                ;
                ;REGISTER A DESTROYED
                ;PSW DESTROYED
                ;
                ;CLOCK DECIMAL/DIGIT BITS FROM PORTA INTO DISPLAYS.
                ;MODIFIES BITS TO CAUSE BLINKING.
                ;
                CLKDEC;                ****ENTRY FROM DSPLY ONLY
0040 EA 46 00     JPE  CLKD01          IF(KDCTRL.FLSDCM .OR. KDCTRL.FLSDSP)
                ;                        .EQ. TRUE
                ;                        MODIFY BITS WITH BLINK CONTROL MASK
                ;                      ENDIF
                ;                      PULSE CLOCK BITS
                ;                      RETURN
                CLKDGT;                ****ENTRY FROM DSPLY ONLY
0043 C2 49 00     JNZ  CLKD02          IF KDCTRL.FLSDSP .EQ. TRUE
                CLKD01;                  MODIFY BITS WITH BLINK CONTROL MASK
0046 7E           MOV  A,M               PORTA = PORTA .OR. BLKMSK
```

```
0047 B0          ORA  B
0048 77          MOV  M,A
               CLKD02;               ENDIF
0049 35          DCR  M              PULSE CLOCK BIT
004A 34          INR  M
004B C9          RET                 RETURN
DBOUNC

               ;DBOUNC()(KEYBKT,CTLBKT,CHRBKT)(DBCTR)
               ;        (BYTE  ,BYTE  ,BYTE  )(UBYTE)
               ;        ( I    , O    , O    )( I/O )
               ;        ( RAM  , RAM  , RAM  )( RAM )
               ;        ( NC   , C    , C    )( C   )
               ;
               ;REGISTERS DESTROYED
               ;PSW DESTROYED
               ;
               ;DEFINES DEBOUNCED KEYCODES CTLBKT AND CHRBKT FOR USE OF
               ;MAINLINE KEYBOARD ROUTINE.  CHRBKT DIFFERS FROM CTLBKT
               ;IN THAT THE MAINLINE ROUTINE MAY SET CHRBKT = 0.
               ;
               DBOUNC;               ****ENTRY FROM KDIO ONLY
004C 3A 2A 74    LDA  KEYBKT/2+X     A = KEYBKT
               ;                     DECREMENT DBOUNCE COUNTER
004F 21 2E 74    LXI  H,DBCTR/2+X    HL = ADDRESS, DBCTR
0052 35          DCR  M              DBCTR = DBCTR - 1
               ;                     CHECK WHETHER COUNTER WAS STOPPED AT 1
0053 C2 5D 00    JNZ  DBOUN1         IF DBCTR .EQ. 0
               ;                       KEEP COUNTER AT 1
0056 34          INR  M                DBCTR = 1
               ;                       KEYBOARD IS DEBOUNCED
               ;                       DEFINE NEW KEYCODE OUTPUT BUCKETS
0057 32 2C 74    STA  CHRBKT/2+X       CHRBKT = KEYBKT
005A 32 2B 74    STA  CTLBKT/2+X       CTLBKT = KEYBKT
               DBOUN1;               ENDIF
               ;                     CHECK WHETHER KEY IS  PRESSED
005D B7          ORA  A              IF KEYBKT .NE. HEX00
005E C8          RZ
               ;                       SET DEBOUNCE PERIOD
005F 36 02       MVI  M,DBVAL          DBCTR = DBVAL
               ;                     ENDIF
0061 C9          RET                 RETURN
DISPLY

               ;DISPLY()(KDCTRL,BLKTMR,PORTA )
               ;        (BITSTR,BYTE  ,BITSTR)
               ;        ( I    , I    , I/O  )
               ;        ( RAM  , RAM  , 7001 )
               ;        ( NC   , NC   , C    )
               ;
               ;REGISTERS DESTROYED
               ;PSW DESTROYED
               ;
               ;DISPLAY ROUTINE
               ;
               DISPLY;               ****ENTRY FROM KDIO ONLY
               ;                     FETCH DISPLAY CONTROL BYTE
0062 2A 27 74    LHLD KDCTRL/2+X
               ;                     L = KDCTRL
               ;                     H = BLKTMR
0065 5D          MOV  E,L            E = KDCTRL
               ;                     DEFINE DISPLAY BLINK CONTROL MASK
0066 06 01       MVI  B,01H          B = BLKMSK = HEX01, FOR DISPLAY ON
0068 24          INR  H              IF (BLKTMR+1) .GE. 0
0069 FA 72 00    JM   DISP02
006C 2C          INR  L                IF KDCTRL.STGDSP .EQ. TRUE
006D F2 72 00    JP   DISP01
```

```
0070 06 0F        MVI  B,0FH          B = BLKMSK = HEX0F, FOR DISPLAY OFF
                 DISP01;                ENDIF
                 DISP02;              ENDIF
                 ;                    OUTPUT START BITS FOR DISPLAY LOAD
0072 21 01 70     LXI  H,PORTA        HL = ADDRESS, PORTA
0075 7E           MOV  A,M            PORTA = PORTA.AND.HEXF1, 3 START BITS
0076 E6 F1        ANI  0F1H
0078 77           MOV  M,A
0079 35           DCR  M              PULSE CLOCK BIT
007A 34           INR  M
                 ;                    SET TO LOAD 4 DIGITS INTO EACH DISPLAY
007B 0E 04        MVI  C,4            C = CHRCNT = 4
                 DISP03;              DO UNTIL CHRCNT .EQ. 0
                 ;                      DEFINE BIT SELECTION MASK
007D 16 80        MVI  D,80H            D = BITMSK = HEX80
                 DISP04;                DO UNTIL BITMSK .EQ. HEX01
                 ;                        MOVE DIGIT BITS FROM DIMAGE TO
                 ;                        PORTA
007F CD DE 00     CALL MVDDAT             MVDDAT(CHRCNT,BITMSK,KDCTRL,PORTA,
                 ;                               ( C    , D    , E    , @HL ,
                 ;                               ( I    , I    , I    , I/O ,
                 ;
                 ;                               KDCTRL)
                 ;                                PSW  )
                 ;                                0    )
                 ;                        CLOCK OUT DIGIT BITS
0082 CD 43 00     CALL CLKDGT             CLKDGT(KDCTRL,BLKMSK,PORTA )
                 ;                               ( PSW  , B    , @HL  )
                 ;                               ( I    , I    , I/O  )
                 ;                        SHIFT BIT SELECTION MASK TO RIGHT
0085 7A           MOV  A,D                D = BITMSK = BITMSK/2
0086 0F           RRC
0087 57           MOV  D,A
0088 1F           RAR                     TEST BITMSK
0089 D2 7F 00     JNC  DISP04
                 ;                      ENDDO
                 ;                      MOVE DECIMAL BITS FROM DIMAGE TO
                 ;                      PORTA
008C CD DE 00     CALL MVDDAT           MVDDAT(CHRCNT,BITMSK,KDCTRL,PORTA,
                 ;                             ( C    , D    , E    , @HL ,
                 ;                             ( I    , I    , I    , I/O ,
                 ;
                 ;                             KDCTRL)
                 ;                              PSW  )
                 ;                              0    )
                 ;                      CLOCK OUT DECIMAL BITS
008F CD 40 00     CALL CLKDEC           CLKDEC(KDCTRL,BLKMSK,PORTA)
                 ;                             ( PSW  , B    , @HL )
                 ;                             ( I    , I    , I/O )
0092 0D           DCR  C                C = CHRCNT = CHRCNT-1
0093 C2 7D 00     JNZ DISP03
                 ;                    ENDDO
0096 35           DCR  M              3 CLOCK CYCLES TO FINISH LOAD
0097 34           INR  M
0098 35           DCR  M
0099 34           INR  M
009A 35           DCR  M
009B 34           INR  M
009C C9           RET                 RETURN
INT75

                 ;INT75
                 ;
                 ;SERVICE INTERRUPT 7.5
                 ;
                 INT75;               ****INTERRUPT ENTRY 7.5
009D E5           PUSH H              SAVE HL
```

```
009E 21 7C 01    LXI  H,TIMINT      HL = ADRESS = ADDRESS, TIMINT
00A1 CD 25 10    CALL VCALLS        VCALLS(ADRESS)
               ;                          ( HL    )
               ;                          ( I     )
00A4 E1          POP  H             RESTORE HL
00A5 FB          EI                 ENABLE INTERRUPTS
00A6 C9          RET                RETURN
KDIO

               ;KDIO()(KDCTRL,PORTBI,PORTB ,BLKTMR,DSPTMR,KEYBKT)
               ;      (BITSTR,BITSTR,BITSTR,BYTE  ,UBYTE ,BITSTR)
               ;      ( I    , I    , I/O  , I/O  , I/O  , O     )
               ;      ( RAM  , RAM  , 7002 , RAM  , RAM  , RAM   )
               ;      ( NC   , NC   , C    , C    , C    , C     )
               ;
               ;REGISTERS DESTROYED
               ;PSW DESTROYED
               ;
               ;KEYBOARD/DISPLAY I/O ROUTINE MAKES REAL TIME ASPECTS OF
               ;KEYBOARD/DISPLAY PROCESSING INVISIBLE TO APPLICATION
               ;LEVEL ROUTINES.
               ;
               KDIO;                  ****ENTRY FROM TIMINT ONLY
               ;                      INCREMENT CONTINUOUS RUN BLINK TIMER
00A7 21 2B 74    LXI  H,BLKTMR/2+X  HL = ADDRESS, BLKTMR
00AA 34          INR  M             BLKTMR = BLKTMR+1
00AB 5E          MOV  E,M           E = BLKTMR
00AC C2 B7 00    JNZ  KDI002        IF BLKTMR .EQ. 0
               ;                      DECREMENT TIMED DISPLAY TIMER. 1=STOP
00AF 21 29 74    LXI  H,DSPTMR/2+X    HL = ADDRESS, DSPTMR
00B2 35          DCR  M               DSPTMR = DSPTMR-1
00B3 C2 B7 00    JNZ  KDI001          IF DSPTMR .EQ. 0
00B6 34          INR  M                 DSPTMR = 1
               KDI001;                ENDIF
               KDI002;                ENDIF
               ;                      TOGGLE MOTOR FOR HALF POWER HOLD
00B7 3A 37 74    LDA  PORTBI/2+X    A = PORTBI
00BA 21 02 70    LXI  H,PORTB       HL = ADDRESS, PORTB
00BD AE          XRA  M             PORTB = PORTB .XOR. PORTBI
00BE 77          MOV  M,A
               ;                      DEFINE PROGRAM CONTROL COUNTER
00BF 7B          MOV  A,E           E = IOCTR = BLKTMR .AND. HEX07
00C0 E6 07       ANI  07H
00C2 5F          MOV  E,A
               ;                      CASE (IOCTR)
00C3 FE 05       CPI  5
00C5 D2 D0 00    JNC  KDI003
               ;                        **0,1,2,3,4: READ KEYROWS
00C8 3A 27 74    LDA  KDCTRL/2+X          IF KDCTRL.KBDDSB .EQ. FALSE
00CB 1F          RAR
               ;                            KEYBOARD IS NOT DISABLED
00CC D2 0A 01    JNC  RDROW                 RDROW(IOCTR)
               ;                                 ( E   )
               ;                                 ( I   )
               ;                          ENDIF
00CF C9          RET
               KDI003;
00D0 C0          RNZ                    **5: START KEYBOARD/DISPLAY OUTPUT
00D1 CD 4C 00    CALL DBOUNC              DEBOUNCE KEYBOARD
               ;                          INITIALIZE FOR NEXT KEYBOARD SCAN
00D4 AF          XRA  A                   KEYBKT = 0
00D5 32 2A 74    STA  KEYBKT/2+X
00D8 CD F6 0E    CALL DFLUSH              FLUSH NOISE FROM DISPLAY SHIFT REG
00DB C3 62 00    JMP  DISPLY              OUTPUT TO DISPLAY
               ;                        **ELSE:
               ;                          COMPLETE PROCESSING INITIATED
               ;                          IN CASE **5:. THIS INTERRUPT LEVEL
```

```
                        ;                         ROUTINE IS ITSELF INTERRUPTED.
                        ;                      ENDCASE
                        ;                      RETURN
MVDDAT

                        ;MVDDAT(CHRCNT,BITMSK,KDCTRL,PORTA ,KDCTRL)(DIMAGE)
                        ;      (BYTE  ,BYTE  ,BITSTR,BITSTR,BITSTR)(BYTSTR)
                        ;      ( I    , I    , I    , I/O  , O    )( I    )
                        ;      ( C    , D    , E    , @HL  , PSW  )( RAM  )
                        ;      ( NC   , NC   , NC   , C    , C    )( NC   )
                        ;
                        ;REGISTER A DESTROYED
                        ;PSW DESTROYED
                        ;
                        ;FETCH SELECTED BITS FROM DIMAGE, INVERT THEM,
                        ;AND MOVE THEM TO PORTA.
                        ;COPY KDCTRL INTO PSW FOR LATER USE
                        ;
                        MVDDAT;                ****ENTRY FROM DSPLY ONLY
00DE C5                   PUSH B               SAVE REGISTERS
00DF E5                   PUSH H
                        ;                      SET DATA AND CLOCK BITS
00E0 7E                   MOV  A,M             PORTA = PORTA .OR. HEXOF
00E1 F6 0F                ORI  0FH
00E3 77                   MOV  M,A
                        ;                      DEFINE INVERTED OUTPUT BIT FOR PORTA
00E4 06 FD                MVI  B,0FDH          B = OUTBIT = HEXFD
                        ;                      CALCULATE INDEX
00E6 3E 04                MVI  A,4             A = INDEX = 4-CHRCNT
00E8 91                   SUB  C
                        ;                      SET TO MOVE 1 BIT INTO EACH DISPLAY
00E9 0E 02                MVI  C,NDISP         C = BITCTR = NDISP
                        ;                      HL = ADDRESS,
                        ;                      DIMAGE[INDEX+(NDISP-BITCTR)*4]
00EB 21 80 74             LXI  H,DIMAGE/2+Y
00EE 85                   ADD  L
00EF 6F                   MOV  L,A
                        MVDD01;                DO UNTIL BITCTR .EQ. 0
00F0 7E                   MOV  A,M               IF(DIMAGE[INDEX+(NDISP-BITCTR)*4]
                        ;                          .AND. BITMSK) .NE. 0
00F1 A2                   ANA  D
00F2 CA FA 00             JZ   MVDD02
                        ;                          PUT OUTBIT INTO PORTA
00F5 E3                   XTHL                     HL = ADDRESS, PORTA
00F6 7E                   MOV  A,M                 PORTA = PORTA .AND. OUTBIT
00F7 A0                   ANA  B
00F8 77                   MOV  M,A
00F9 E3                   XTHL                     HL = ADDRESS,
                        ;                          DIMAGE[INDEX+(NDISP-BITCTR)*4]
                        MVDD02;                  ENDIF
                        ;                        SHIFT OUTBIT TO LEFT
00FA 78                   MOV  A,B               B = OUTBIT = OUTBIT*2+1
00FB 07                   RLC
00FC 47                   MOV  B,A
00FD 0D                   DCR  C                 C = BITCTR = BITCTR-1
                        ;                        HL = ADDRESS,
                        ;                        DIMAGE[INDEX+(NDISP-BITCTR)*4]
00FE 23                   INX  H
00FF 23                   INX  H
0100 23                   INX  H
0101 23                   INX  H
0102 C2 F0 00             JNZ  MVDD01            TEST BITCTR
                        ;                      ENDDO
0105 E1                   POP  H               RESTORE REGISTERS
0106 C1                   POP  B
                        ;                      SET PSW FOR CALL TO CLKDEC/CLKDAT
0107 D5                   PUSH D               PSW = KDCTRL
```

```
0108 F1          POP  PSW
0109 C9          RET                 RETURN
RDROW

                 ;RDROW(IOCTR )(PORTA ,PORTC ,KEYBKT)
                 ;     ( MOD8 )(BITSTR,BITSTR,NIBSTR)
                 ;     ( I    )( I/O  , I     , I/O  )
                 ;     ( E    )( 7001 , 7002 , RAM  )
                 ;     ( C    )( C    , NC    , C    )
                 ;
                 ;REGISTERS DESTROYED
                 ;STATUS DESTROYED
                 ;
                 ;READS THE KEYROWS DESIGNATED BY IOCTR.  CONSOLIDATES
                 ;DATA AS THE SCAN OF 5 KEYROWS PROGRESSES.  OUTPUTS
                 ;CODES TO KEYBKT INDICATING WHICH KEY, OR WHETHER NO
                 ;SINGLE KEY IS DOWN.
                 ;
                 RDROW;              ****ENTRY FROM KDIO ONLY
                 ;                   FORM STROBE MASK
010A 7B          MOV  A,E            B = STRMSK = (2*IOCTR) .XOR. HEXFF
010B 07          RLC
010C 2F          CMA
010D 47          MOV  B,A
                 ;                   FORM ROW CODE
010E 2F          CMA                 C = ROWCOD = IOCTR*HEX10
010F 07          RLC
0110 07          RLC
0111 07          RLC
0112 4F          MOV  C,A
                 ;                   STROBE KEYROW
0113 21 01 70    LXI  H,PORTA        HL = ADDRESS, PORTA
0116 7E          MOV  A,M            PORTA =
                 ;                   PORTA .OR. HEXOF .AND. STRMSK
0117 F6 OF       ORI  OFH
0119 A0          ANA  B
011A 77          MOV  M,A
                 ;                   READ POSITIVE LOGIC IMAGE OF KEYROW
011B 3A 03 70    LDA  PORTC          A = COLCOD = PORTC .AND. HEXOF
011E E6 OF       ANI  OFH
0120 C8          RZ                  IF COLCOD .NE. 0
                 ;                     A KEY IN CURRENT ROW IS DOWN
0121 21 2A 74    LXI  H,KEYBKT/2+X     HL = ADDRESS, KEYBKT
0124 34          INR  M                PSW:Z = NOPREV = KEYBKT .EQ. 0
0125 35          DCR  M
                 ;                     ASSUME MULTIPLE KEYS DOWN
0126 36 80       MVI  M,MULKEY         KEYBKT = MULKEY
0128 C0          RNZ                   IF NOPREV .EQ. TRUE
                 ;                       NO KEY SEEN IN PREVIOUS ROW
0129 FE 09       CPI  9                  IF COLCOD .LT. 9
012B D0          RNC
                 ;                         COL CODE VALUES 1 THRU 8 REMAIN
012C B7          ORA  A                    PSW:P = PARITY, COLCOD
012D E8          RPE                       IF PARITY .EQ. ODD
                 ;                           COL CODES 1,2,4,7,8 REMAIN
012E FE 07       CPI  7                      IF COLCOD .NE. 7
0130 C8          RZ

                 ;                             A SINGLE KEY IN ROW IS DOWN
0131 B1          ORA  C                        KEYBKT = ROWCOD .OR. COLCOD
0132 77          MOV  M,A
                 ;                           ENDIF
                 ;                         ENDIF
                 ;                       ENDIF
                 ;                     ENDIF
                 ;                   ENDIF
0133 C9          RET                 RETURN
```

```
                ;STPTMR(WASOFF)(PORTBI,PORTB ,SKPCNT,CTLREG)
                ;      (BIT   )(BITSTR,BITSTR,UBYTE ,TIMCTL)
                ;      ( 0    )( I    , 0    , 0    , 0    )
                ;      (PSW:Z )(RAM   ,7002  ,RAM   ,7000  )
                ;      ( C    )( NC   , C    , C    , C    )
                ;
                ;PSW:CY = NO CHANGE
                ;PSW:S, Z, P CHANGED; CORRESPOND TO SKPCNT AT ENTRY
                ;
                ;STOP INTERRUPT TIMER
                ;
                STPTMR;                 ****ENTRY POINT
0134 E5           PUSH H                SAVE HL
                ;                       INDICATE TIMER STATUS AT ENTRY
0135 2A 30 74     LHLD SKPCNT/2+X       L = SKPCNT
0138 2C           INR  L                PSW:Z = WASOFF = SKPCNT .EQ. 0
0139 2D           DCR  L
013A E1           POP  H                RESTORE HL
013B F5           PUSH PSW              SAVE A, PSW:CY, WASOFF
                ;                       CHECK FOR RUNNING TIMER
013C CA 51 01     JZ   STPTM1           IF WASOFF .EQ. FALSE
013F 3E 43        MVI  A,43H              STOP TIMER
0141 32 00 70     STA  CTLREG
                ;                         DISABLE TIMER INTERRUPT
0144 3E 0D        MVI  A,0DH              A = HEX0D
0146 30           SIM
                ;                         INDICATE THAT TIMER IS STOPPED
0147 AF           XRA  A                  SKPCNT = 0
0148 32 30 74     STA  SKPCNT/2+X
                ;                         HOLD DIGIT MOTOR IN POSITION
014B 3A 37 74     LDA  PORTBI/2+X         PORTB = PORTBI
014E 32 02 70     STA  PORTB
                STPTM1;                 ENDIF
0151 F1           POP  PSW              RESTORE A, PSW:CY
                ;                       PSW:Z = WASOFF
0152 C9           RET                   RETURN
                ;STRTMR(ISADR,SKIPCT,PERIOD,WASOFF)(TIMER ,SKPCNT,SKPVAL,
                ;      (ADDR ,UBYTE ,TMODCT,BIT   )(TMODCT,UBYTE ,UBYTE ,
                ;      ( I   , I    , I    , 0    )( 0    , 0    , 0    ,
                ;      ( HL  , A    , DE   , PSW:Z)(7004  , RAM  , RAM  ,
                ;      ( NC  , NC   , NC   , C    )( C    , C    , C    ,
                ;
                ;      TIMVEC,CTLREG,PORTB ,PORTBI)
                ;      ADDR  ,TIMCTL,BYTE  ,BYTE  )
                ;       0    , 0    , I    , 0    )
                ;      RAM   ,7000  ,7002  , RAM  )
                ;       C    , C    , NC   , C    )
                ;
                ;PSW:CY = NO CHANGE
                ;PSW:S, Z, P CHANGED; CORRESPOND TO SKPCNT AT ENTRY
                ;
                ;STARTS TIMER INTERRUPTS AFTER DEFINING INFORMATION NEEDED
                ;BY TIMINT.  ISADR IS ADDRESS OF INTERRUPT SERVICE RTN
                ;WHICH WILL BE ENTERED EVERY SKIPCT(TH) OCCURRENCE OF
                ;INTERRUPT.
                ;PERIOD WILL CONTAIN THE PARAMETER VALUE KEYINT.
                ;
                STRTMR;                 ****ENTRY POINT
0153 E5           PUSH H                SAVE HL
                ;                       INDICATE TIMER STATUS AT ENTRY
0154 2A 30 74     LHLD SKPCNT/2+X       L = SKPCNT
0157 2C           INR  L                PSW:Z = WASOFF = SKPCNT .EQ. 0
0158 2D           DCR  L
0159 E1           POP  H                RESTORE HL
015A F5           PUSH PSW              SAVE A, PSW:CY, WASOFF
```

```
     ;                        CHECK FOR STOPPED TIMER
0158 C2 7A 01   JNZ  STRTM1        IF WASOFF .EQ. TRUE
     ;                          SET TIMER MODE AND COUNT
015E EB         XCHG                HL = PERIOD
     ;                          DE = ISADR
015F 22 04 70   SHLD TIMER          TIMER = PERIOD
0162 EB         XCHG                HL = ISADR
     ;                          DE = PERIOD
     ;                          INITIALIZE SKIP COUNTER
0163 32 30 74   STA  SKPCNT/2+X     SKPCNT = SKIPCT
     ;                          SET REINITIALIZATION VALUE
0166 32 2F 74   STA  SKPVAL/2+X     SKPVAL = SKIPCT
     ;                          SET INTERRUPT SERVICE ROUTINE ADDR
0169 22 31 74   SHLD TIMVEC/2+X     TIMVEC = ISADR
016C 3E 19      MVI  A,19H          RESET AND ENABLE TIMER INTERRUPT
016E 30         SIM
016F 3E C3      MVI  A,0C3H         START TIMER
0171 32 00 70   STA  CTLREG
     ;                          UPDATE IMAGE OF PORTB
0174 3A 02 70   LDA  PORTB          PORTBI = PORTB
0177 32 37 74   STA  PORTBI/2+X
     STRTM1;                    ENDIF
017A F1         POP  PSW            RESTORE A, PSW:CY
     ;                          PSW:Z = WASOFF
017B C9         RET                 RETURN
TIMINT

     ;TIMINT()(SKPCNT,SKPVAL,TIMVEC)
     ;        (UBYTE ,UBYTE ,ADDR  )
     ;        ( I/O  , I    , I    )
     ;        ( RAM  , RAM  , RAM  )
     ;        ( C    , NC   , NC   )
     ;
     ;PSW:S, Z, P, CY CHANGED
     ;
     ;DETERMINE WHETHER IT IS TIME TO TRANSFER CONTROL
     ;TO CURRENTLY ACTIVE INTERRUPT SERVICE ROUTINE.
     ;
     TIMINT;                    ****ENTRY FROM INT75 ONLY
017C CD C7 0B   CALL RECEVE         TRY TO RECEIVE MESSAGE
     ;                          DECREMENT SKIP COUNTER
017F 21 30 74   LXI  H,SKPCNT/2+X HL = ADDRESS, SKPCNT
0182 35         DCR  M              SKPCNT = SKPCNT-1
     ;                          CHECK FOR COMPLETED COUNTDOWN
0183 C0         RNZ                 IF SKPCNT .EQ. 0
     ;                            REINITIALIZE SKIP COUNTER
0184 3A 2F 74   LDA  SKPVAL/2+X       A = SKPVAL
0187 77         MOV  M,A              SKPCNT = SKPVAL
0188 FB         EI                    ENABLE INTERRUPT
     ;                            PERFORM CURRENT INTRPT SERVICE RTN
0189 2A 31 74   LHLD TIMVEC/2+X       HL = ADRESS = TIMVEC
018C E9         PCHL
     ;                          ENDIF
     ;                          RETURN
PWRABN

     ;PWRABN
     ;
     ;A,PSW DESTROYED
     ;REGISTERS DESTROYED
     ;
     ;ABNORMAL POWER-UP OF METER WHICH POWERED DOWN DURING
     ;SETTING OR TRIP CYCLE
     ;
     PWRABN;                      ****ENTRY POINT
018D 3A 24 74   LDA  MRSTS1/2+X     IF MRSTS1.QUEREG .EQ. TRUE
0190 1F         RAR
```

```
0191 D2 AA 01   JNC  PWRAB2
                ;                    POWERED DOWN DURING TRIP
0194 1F          RAR                 IF MRSTS1.INCYC .EQ. FALSE
0195 DA A7 01   JC   PWRAB1
                ;                      ACCOUNTING NOT COMPLETED
0198 CD 71 18   CALL SEKTRP            PREPARE TO TRIP
019B F3          DI                    DISABLE INTERRUPTS
019C CD 44 07   CALL DOACCT            DO ACCOUNTING
                ;                      INDICATE ACCOUNTING COMPLETE
019F 21 24 74   LXI  H,MRSTS1/2+X      HL = ADDRESS, MRSTS1
01A2 7E          MOV  A,M              MRSTS1.INCYC = TRUE
01A3 F6 02       ORI  2
01A5 77          MOV  M,A
01A6 FB          EI                    ENABLE INTERRUPTS
                PWRAB1;              ENDIF
01A7 C3 A0 08   JMP  FINTRP          COMPLETE TRIP CYCLE
                PWRAB2;            ENDIF
                ;                  TRIP CYCLE COMPLETE
                ;                  PREPARE TO ZERO SET METER
01AA CD 4E 0F   CALL LSTATE        LSTATE(FATMOD,NORMOD,SERMOD,PRVMOD)
                ;                        (PSW:S ,PSW:Z ,PSW:P ,PSW:CY)
                ;                        ( 0    , 0    , 0    , 0     )
01AD F8          RM                IF FATMOD .NE. TRUE
                ;                    METER IS HOME AND NOT DEAD
                ;                    DRIVE METER TO ZERO SETTING
01AE CD 25 16   CALL SEKPOS          SEKPOS(ERROR)
                ;                           ( A   )
                ;                           ( 0   )
01B1 B7          ORA  A              IF ERROR .NE. 0
                ;                      DECLARE FATAL ERROR
01B2 C2 80 08   JNZ  FATERR            FATERR(ERROR,ERRFLG)
                ;                             ( A   ,PSW:Z )
                ;                             ( I   , 0    )
                ;                    ENDIF
                ;                  ENDIF
01B5 C9          RET               RETURN
PWRDN/PWRUP

                ;PWRDN/PWRUP
                ;
                ;A,PSW DESTROYED
                ;REGISTERS DESTROYED
                ;
                ;ENFORCE ORDERLY POWER-UP AND POWER-DOWN
                ;
                PWRDN;             ****ENTRY POINT
01B6 F3          DI                DISABLE INTERRUPTS
                ;                  TURN OFF DEVICES ON PORTA AND PORTB
01B7 AF          XRA  A            PORTB = HEX00
01B8 32 02 70   STA  PORTB
01BB 3D          DCR  A            PORTA = HEXFF
01BC 32 01 70   STA  PORTA
01BF CD DE 0E   CALL DBLANK        CLEAR DISPLAY
                ;                  WRITE AND CLOSE ANY OPEN BLOCK
01C2 CD 9E 12   CALL NVMWR         NVMWR(ERRFLG)
                ;                       (PSW:Z )
                ;                       ( 0    )
                PWRUP;             ****ENTRY POINT
                PWRU01;            DO UNTIL INT6.5 .EQ. 0
01C5 20          RIM
01C6 07          RLC
01C7 07          RLC
01C8 07          RLC                 PSW:CY = INT6.5
                ;                    A.0  = INT5.5
01C9 DA C5 01   JC   PWRU01
                ;                  ENDDO
                ;                  POWER IS NOW FULLY ON
```

```
01CC B7          ORA  A              PSW:S = INT5.5
                 ;                   IF INT5.5 .EQ. TRUE
01CD FA 00 80    JM   TEST             GO TO SPECIAL SERVICE ROUTINE
                 ;                   ENDIF
                 ; >>OMITTED<<       PULSE DEAD STICK TIMER
                 ;                   INITIALIZE STACK POINTER
01D0 31 00 75    LXI  SP,7500H       SP = HEX7500
                 ;                   INITIALIZE 8155 TIMER AND PORTS
01D3 3E 43       MVI  A,043H         CTLREG = HEX43
01D5 32 00 70    STA  CTLREG
                 ;                   TIMER SET FOR REPETITIVE SQUARE WAVE
                 ;                   PORTA = PORTB = 0; OUTPUT MODE SET
                 ;                   PORTC; INPUT MODE SET
01D8 3E FF       MVI  A,0FFH         PORTA = HEXFF
01DA 32 01 70    STA  PORTA
                 ;                   TEST AND CLEAR ALL OF RAM
                 ;                   FILL 256 BYTES OF RAM WITH HEXAA
01DD 06 AA       MVI  B,0AAH         B = HEXAA
01DF 21 00 74    LXI  H,X            HL = ADDRESS, X(I=0)
                 PWRU02;             DO UNTIL (ADDR,X(I)) .EQ. (ADDR,X(0))
01E2 70          MOV  M,B              X(I) = HEXAA
01E3 2C          INR  L                HL = ADDRESS, X(I=I+1)
01E4 C2 E2 01    JNZ  PWRU02
                 ;                   ENDDO
                 ;                   XOR 256 BYTES OF RAM WITH HEX55
01E7 06 55       MVI  B,55H          B = HEX55
                 PWRU03;             DO UNTIL (ADDR,X(I)) .EQ. (ADDR,X(0))
01E9 7E          MOV  A,M              X(I) = X(I) .XOR. HEX55
01EA A8          XRA  B
01EB 77          MOV  M,A
01EC 2C          INR  L                HL = ADDRESS, X(I=I+1)
01ED C2 E9 01    JNZ  PWRU03
                 ;                   ENDDO
01F0 3E 0A       MVI  A,BADRAM       A = BADRAM
                 ;                   INCREMENT AND TEST 256 BYTES OF RAM
                 PWRU04;             DO UNTIL (ADDR,X(I)) .EQ. (ADDR,X(0))
01F2 34          INR  M                X(I) = X(I)+1
01F3 CA FC 01    JZ   PWRU05           IF X(I) .NE. 0
                 ;                       DECLARE DEAD METER. BAD RAM
01F6 CD 85 10    CALL NVMDED             NVMDED(BADRAM,ERRFLG)
                 ;                              ( A     ,PSW:Z )
                 ;                              ( I     , 0    )
01F9 C3 00 02    JMP  PWRU06             BREAK
                 PWRU05;               ENDIF
01FC 2C          INR  L                HL = ADDRESS, X(I=I+1)
01FD C2 F2 01    JNZ  PWRU04
                 PWRU06;             ENDDO
                 ;                   READ SPECIAL NVM LOCATION
0200 3A BE 46    LDA  NVMRED+KILCOD  A = NVMRED[KILCOD]
0203 3C          INR  A              IF (A .GE. 10).AND.(A .LT. 15) = TRUE
0204 E6 0F       ANI  0FH
0206 FE 0B       CPI  11
0208 DA 0C 02    JC   PWRU07
                 ;                     METER IS OUT OF SERVICE
020B 76          HLT                   HALT
                 PWRU07;             ENDIF
020C CD 6D 15    CALL INITSM         INITIALIZE STEPPER MOTORS
                 ;                   FILL NVM DATA AREA WITH HEXFF
020F 01 00 48    LXI  B,((MTRCHR+1)-(FIXSED+0)+1)*100H+(FIXSED+0)
                 ;                   B = NIBCNT; NVM DATA AREA
                 ;                   C = OFFSET, FIXSED[0]
0212 3E FF       MVI  A,0FFH         A = HEXFF
0214 CD 24 0F    CALL FILNIB         FILNIB(FIXSED[0],HEXFF,NIBCNT)
                 ;                         ( @C       , A   , B     )
                 ;                         ( 0        , I   , I     )
                 ;                   CLEAR DISPLAY IMAGE
0217 AF          XRA  A              A = HEX00
```

```
0218 CD 22 03   CALL FILDIM          FILDIM(HEX00)
               ;                       ( A   )
               ;                       ( I   )
               ;                     ENABLE INTERRUPT 6.5
021B 3E 0D      MVI  A,0DH           INTMSK = HEX0D
021D 30         SIM
021E CD 6B 11   CALL NVMLOD          LOAD AND CHECK NON VOLATILE MEMORY
               ;                     CHECK METER STATUS
0221 CD 4E 0F   CALL LSTATE          LSTATE(FATMOD,NORMOD,SERMOD,PRVMOD)
               ;                           (PSW:S ,PSW:Z ,PSW:P ,PSW:CY)
               ;                           ( 0    , 0    , 0    , 0     )
0224 FA 45 02   JM   PWRU09          IF FATMOD .EQ. FALSE
               ;                       NVM LOADED OK
               ;                       DEFINE DECIMAL POSITIONS ON DIE
0227 3A 23 74   LDA  MTRCHR/2+X        A = MTRCHR
022A E6 03      ANI  3                 DIEDCM = MTRCHR .AND. HEX03
022C 32 35 74   STA  DIEDCM/2+X
               ;                       DEFINE DEFAULT DECIMAL POSITION
022F E6 02      ANI  2                 DEFDCM = DIEDCM .AND. HEX02
0231 32 36 74   STA  DEFDCM/2+X
               ;                       CHECK NVM STATUS
0234 21 45 02   LXI  H,PWRU08          SET TO RETURN TO ENDIF
0237 E5         PUSH H
0238 3A BE 46   LDA  NVMRED+KILCOD     A = CODE = NVMRED[KILCOD]
023B E6 0F      ANI  0FH
023D FE 0F      CPI  0FH               IF NVMRED[KILCOD] .EQ. HEX0F
023F CA 9B 02   JZ   PWRUOK              CONTINUE NORMAL INITIALIZATION
               ;                       ELSE
               ;                         CONTINUE FATAL INITIALIZATION
0242 C2 83 02   JNZ  PWRUNG              PWRUNG(CODE)
               ;                               ( A  )
               ;                               ( I  )
               PWRU08;                 ENDIF
               PWRU09;               ENDIF
               ;                     RECHECK METER STATUS
0245 CD 4E 0F   CALL LSTATE          LSTATE(FATMOD,NORMOD,SERMOD,PRVMOD)
               ;                           (PSW:S ,PSW:Z ,PSW:P ,PSW:CY)
               ;                           ( 0    , 0    , 0    , 0     )
0248 F2 50 02   JP   PWRU10          IF FATMOD .EQ. TRUE
               ;                       TURN ON SENSOR LEDS FOR SERVICE CHECK
024B 3E DF      MVI  A,0DFH            PORTA = HEXDF
024D 32 01 70   STA  PORTA
               PWRU10;               ENDIF
               ;                     INITIALIZE DEBOUNCE COUNTER
0250 3E 01      MVI  A,1             DBCTR = 1
0252 32 2E 74   STA DBCTR/2+X
0255 C3 7E 09   JMP  IDLE            ENTER IDLE STATE
PWRNOR

               ;PWRNOR
               ;
               ;A,PSW DESTROYED
               ;REGISTERS DESTROYED
               ;
               ;CONTINUE POWER-UP FOR NORMAL SITUATION THAT POWER-DOWN
               ;OCCURRED WHEN METER WAS HOME
               ;
               PWRNOR;               ****ENTRY POINT
               ;                     SET METER TO ALL NINES
0258 21 24 74   LXI  H,MRSTS1/2+X    HL = ADDRESS, MRSTS1
025B 7E         MOV  A,M             MRSTS1.UNKSEL = TRUE
025C F6 80      ORI  80H
025E 77         MOV  M,A
025F 01 CC 04   LXI  B,NBANKS*100H+(WORK1+16-NBANKS)
               ;                     B = NIBCNT = NBANKS
               ;                     C = OFFSET, WORK1[I=16-NBANKS]
0262 3E 09      MVI  A,9             A = HEX09
```

```
0264 CD 24 0F   CALL FILNIB         FILNIB(WORK1[I],HEX09,NIBCNT)
                ;                         ( @C      , A    , B     )
                ;                         ( O       , I    , I     )
0267 CD 25 1A   CALL MVPOST         MVPOST(ERROR)
                ;                         ( A    )
                ;                         ( O    )
026A B7         ORA  A              IF ERROR .NE. 0
                ;                     SETTING ERROR IS FATAL
026B C2 80 08   JNZ  FATERR           FATERR(ERROR,ERRFLG)
                ;                           ( A    ,PSW:Z )
                ;                           ( I    , O    )
                ;                   ELSE
                ;                     UPDATE BUFFER TO AGREE WITH SETTING
026E 01 42 04   LXI  B,NBANKS*100H+POSREG
                ;                     B = NIBCNT = NBANKS
                ;                     C = OFFSET, POSREG
0271 3E 09      MVI  A,9              A = HEX09
0273 CD 24 0F   CALL FILNIB           FILNIB(POSREG,HEX09,NIBCNT)
                ;                           ( @C    , A    , B     )
                ;                           ( O     , I    , I     )
                ;                     SET METER TO ALL ZEROES
0276 3E C0      MVI  A,WORK1          A = OFFSET, WORK1
0278 CD 85 0E   CALL CLRBLK           CLRBLK(WORK1)
                ;                           ( @A  )
                ;                           ( O   )
027B CD 25 1A   CALL MVPOST           MVPOST(ERROR)
                ;                           ( A   )
                ;                           ( O   )
027E B7         ORA  A                IF ERROR .NE. 0
                ;                       SETTING ERROR IS FATAL
027F C2 80 08   JNZ  FATERR             FATERR(ERROR,ERRFLG)
                ;                             ( A    ,PSW:Z )
                ;                             ( I    , O    )
                ;                     ENDIF
                ;                   ENDIF
0282 C9         RET                 RETURN
PWRUNG

                ;PWRUNG(CODE  )
                ;      (NIBBLE)
                ;      ( I    )
                ;      ( A    )
                ;      ( C    )
                ;
                ;A,PSW DESTROYED
                ;REGISTERS CHANGED
                ;
                ;HANDLE POWER-UP OF METER PREVIOUSLY DECLARED DEAD
                ;
                PWRUNG;             ****ENTRY POINT
0283 F5         PUSH PSW            SAVE A,PSW
                ;                   DECLARE FATAL ERROR
                ;                   FLAG METER DEAD
0284 47         MOV  B,A            B = CODE
0285 CD 99 10   CALL NVMDE1         NVMDE1(CODE,ERRFLG)
                ;                         ( B  ,PSW:Z )
                ;                         ( I  , O    )
0288 F1         POP  PSW            RESTORE A,PSW
0289 FE 03      CPI  FATRST         IF CODE .EQ. FATRST
028B C0         RNZ
                ;                     FAILED WHILE CLEARING DESC REGISTER
                ;                     CLEAR DESCENDING REGISTER
028C 01 2F 07   LXI  B,DSCSIZ*100H+DSCREG
                ;                     B = NIBCNT = DSCSIZ
                ;                     C = OFFSET, DSCREG
028F AF         XRA  A                A = HEX00
0290 CD 24 0F   CALL FILNIB           FILNIB(DSCREG,HEX00,NIBCNT)
```

```
                         ;                     ( @C    , A    , B     )
                         ;                     ( 0     , I    , I     )
                         ;                  UPDATE CRC
0293 CD B1 0E    CALL CRC                   CRC(DSCREG,NIBCNT,CRCVAL)
                         ;                     ( @C    , B     , D     )
                         ;                     ( I     , I     , 0     )
0296 7A          MOV  A,D                   DSCCRC = CRCVAL
0297 32 1B 74    STA  DSCCRC/2+X
                         ;                 ENDIF
029A C9          RET                       RETURN
PWRUOK

                 ;PWRUOK
                 ;
                 ;A,PSW DESTROYED
                 ;REGISTERS DESTROYED
                 ;
                 ;CONTINUATION OF SUCCESSFUL POWER-UP SEQUENCE
                 ;
                 PWRUOK;                   ****ENTRY POINT
                 ;                         OPEN NORMAL NVM BLOCK
029B CD C4 11    CALL NVMOPN               NVMOPN(ERRFLG)
                 ;                               (PSW:Z )
                 ;                               ( 0    )
029E C8          RZ                        IF ERRFLG .EQ. FALSE
                 ;                           NVM BLOCK IS NOW OPEN
029F 21 AD 02    LXI  H,PWRU01               SET TO RETURN TO ENDIF
02A2 E5          PUSH H
02A3 3A 24 74    LDA  MRSTS1/2+X             IF MRSTS1.UNKSEL .EQ. TRUE
02A6 B7          ORA  A
                 ;                             POWERED DOWN DURING SETTING OR TRIP
02A7 FA 8D 01    JM   PWRABN                   PERFORM ABNORMAL POWER-UP
                 ;                           ELSE
02AA F2 58 02    JP   PWRNOR                   PERFORM NORMAL POWER-UP
                 PWRU01;                     ENDIF
                 ;                           CHECK METER STATUS
02AD CD 4E 0F    CALL LSTATE                 LSTATE(FATMOD,NORMOD,SERMOD,PRVMOD)
                 ;                                 (PSW:S ,PSW:Z ,PSW:P ,PSW:CY)
                 ;                                 ( 0    , 0    , 0    , 0     )
02B0 FA C1 02    JM   PWRU02                 IF FATMOD .EQ. FALSE
                 ;                             POWER-UP COMPLETED
                 ;                             CONTINUE WITH INITIALIZATION
                 ;                             CLEAR POSTAGE REGISTER
02B3 01 42 04    LXI  B,NBANKS*100H+POSREG
                 ;                             B = NIBCNT = NBANKS
                 ;                             C = OFFSET, POSREG
02B6 AF          XRA  A                        A = HEX00
02B7 CD 24 0F    CALL FILNIB                   FILNIB(POSREG,HEX00,NIBCNT)
                 ;                                    ( @C    , A    , B     )
                 ;                                    ( 0     , I    , I     )
                 ;                             REGISTER NOW MATCHES SETTING
02BA 21 24 74    LXI  H,MRSTS1/2+X             HL = ADDRESS, MRSTS1
02BD 7E          MOV  A,M                      MRSTS1.UNKSEL = FALSE
02BE E6 7F       ANI  7FH
02C0 77          MOV  M,A
                 PWRU02;                     ENDIF
                 ;                           CHECK MEMORY RETENTION OF NVM
02C1 3A FE 44    LDA  NVMRED+RETAIN          A = NVMRED[RETAIN]
02C4 E6 0F       ANI  0FH
02C6 FE 0A       CPI  0AH                    IF NVMRED[RETAIN] .NE. HEX0A
02C8 CA DE 02    JZ   PWRU04
                 ;                             MEMORY IS FAILING
02CB 21 10 74    LXI  H,SERFLG/2+X             HL = ADDRESS, SERFLG
02CE 7E          MOV  A,M                      IF SERFLG.WEKNVM .EQ. FALSE
02CF E6 20       ANI  20H
02D1 C2 DE 02    JNZ  PWRU03
                 ;                               SERFLG.WEKNVM NOT SET IN NVM
```

```
02D4 7E          MOV  A,M               SERFLG.WEKNVM = TRUE
02D5 F6 20       ORI  20H
02D7 77          MOV  M,A
                ;                       WRITE NORMAL BLOCK
                ;                       LEAVE NO BLOCKS OPEN
02D8 CD 9E 12    CALL NVMWR             NVMWR(ERRFLG)
                ;                             (PSW:Z )
                ;                             ( 0    )
                ;                       WRITE NEW SERVICE BLOCK
                ;                       OPEN ERASED NORMAL BLOCK
02DB CD 19 12    CALL NVMSTO            NVMSTO(ERRFLG)
                ;                              (PSW:Z )
                ;                              ( 0    )
                PWRU03;               ENDIF
                PWRU04;             ENDIF
02DE CD 47 10    CALL NVM30T        TURN ON -30V FOR NVM
                ;                   START ERASING RETENTION LOCATION
02E1 32 FE 40    STA  NVMERS+RETAIN NVMERS[RETAIN] = A
                ;                   PAUSE FOR 10 MSEC
02E4 01 64 00    LXI  B,100         BC = LOOPCT = 100
                PWRU05;             DO UNTIL LOOPCT .EQ. 0
02E7 CD 19 0B    CALL NPAUSE          NPAUSE(LOOPCT,ZROFLG)
                ;                           ( BC    ,PSW:Z )
                ;                           ( I/O   , 0    )
02EA C2 E7 02    JNZ  PWRU05
                ;                   ENDDO
                ;                   TERMINATE ERASURE
02ED 3A FE 44    LDA  NVMRED+RETAIN A[1] = NVMRED[RETAIN] = GARBAGE
                ;                   CHECK ERASURE
02F0 3A FE 44    LDA  NVMRED+RETAIN A[1] = NVMRED[RETAIN]
02F3 F6 F0       ORI  0F0H          A[0] = HEXF
02F5 3C          INR  A             PSW:Z=ERASED=NVMRED[RETAIN].EQ.HEXF
02F6 3E 01       MVI  A,NVMBAD      A = NVMBAD
                ;                   IF ERASED .EQ. FALSE
                ;                     DECLARE DEAD METER. BAD NVM.
02F8 C2 85 10    JNZ  NVMDED          NVMDED(NVMBAD,ERRFLG)
                ;                           ( A     ,PSW:Z )
                ;                           ( I     , 0    )
                ;                   ENDIF
                ;                   WRITE HEX0A INTO RETENTION LOCATION
02FB 21 FE 00    LXI  H,RETAIN      HL = BASE = ADDRESS, RETAIN
02FE 3E 0A       MVI  A,0AH         A = HEX0A
0300 CD 61 12    CALL NVMWN         NVMWN(HEX0A,BASE,ERRFLG)
                ;                         ( A[1], HL ,PSW:Z )
                ;                         ( I    , I  , 0    )
0303 C3 31 10    JMP  NVM30F        TURN OFF -30 V TO NVM
                ;                 ENDIF
                ;                 RETURN
CDBUF

                ;CDBUF/CDBUFC/CDBUFD()(DBUF  )
                ;                     (NIBSTR)
                ;                     ( I/O  )
                ;                     ( RAM  )
                ;                     ( C    )
                ;
                ;PSW:S, Z, P, CY = NO CHANGE
                ;
                ;----------------------------------------------------
                ;                 DISABLE METER AND CLEAR DBUF ONLY ON
                ;                 CONDITION THAT DISPLAYED VALUE WAS
                ;                 NOT ENTERED FROM KEYBOARD
                ;
                CDBUFC;           ****ENTRY POINT
0306 F5          PUSH PSW         SAVE A, PSW
                ;                 CHECK FOR KEY ENTERED DISPLAY
0307 3A 40 74    LDA  DBUF/2+X    A = DBUF[0..1]
```

```
030A B7          ORA  A            IF DBUF[0..1] .EQ. HEX00
030B CA 20 03    JZ   CDBUF1
                ; >>JUMP AHEAD<<
                ;                   DISPLAY WAS KEY ENTERED
                ;                   RESTORE A, PSW
                ;                   RETURN
                ;                  ENDIF
030E F1          POP  PSW          RESTORE A, PSW
                ;-------------------------------------------------------
                ;                  DISABLE METER AND CLEAR DISPLAY BUFFER
                ;
                CDBUFD;            ****ENTRY POINT
030F F5          PUSH PSW          SAVE A, PSW
                ;                  DISABLE METER
0310 3E 42       MVI  A,HDISAB     A = HDISAB
0312 CD C7 0D    CALL XEQHDR       XEQHDR(HDISAB,ERROR)
                ;                        ( A    ,PSW:Z)
                ;                        ( I    , O   )
0315 F1          POP  PSW          RESTORE A, PSW
                ;-------------------------------------------------------
                ;                  CLEAR DISPLAY BUFFER
                ;
                CDBUF;             ****ENTRY POINT
0316 F5          PUSH PSW          SAVE A, PSW
                ;                  SET DBUF HEADER TO KEY ENTRY
0317 AF          XRA  A            A = HEX00
0318 32 40 74    STA  DBUF/2+X     OUTPUT DBUF[0..1] = HEX00
                ;                  SET DBUF FORMAT FOR NUL MESSAGE
031B 3E 0F       MVI  A,0FH        DBUF[2..3] = HEX0F
031D 32 41 74    STA  DBUF/2+X+1
                CDBUF1;            >>TARGET OF JUMP AHEAD<<
0320 F1          POP  PSW          RESTORE A, PSW
0321 C9          RET               RETURN
FILDIM

                ;FILDIM(VALUE )(DIMAGE)
                ;      (UBYTE )(BITSTR)
                ;      ( I    )( O    )
                ;      ( A    )( RAM  )
                ;      ( NC   )( C    )
                ;
                ;PSW DESTROYED
                ;REGISTERS DESTROYED
                ;
                ;FILL DISPLAY IMAGE BUFFER WITH VALUE
                ;
                FILDIM;              ****ENTRY POINT
                ;                    SET TO FILL (NDISP*4) BYTES
0322 06 07       MVI  B,NDISP*4-1    B = BYTNO = NDISP*4-1
0324 21 87 74    LXI  H,DIMAGE/2+Y+NDISP*4-1
                ;                    HL = ADDRESS, DIMAGE[BYTNO]
                FILDI1;              DO UNTIL BYTNO .LT. 0
0327 77          MOV  M,A              DIMAGE[BYTNO] = VALUE
0328 05          DCR  B                BYTNO = BYTNO-1
0329 2B          DCX  H                HL = ADDRESS, DIMAGE[BYTNO]
032A F2 27 03    JP   FILDI1           TEST BYTNO
                ;                    ENDDO
032D C9          RET                 RETURN
KEYBRD

                ;KEYBRD()(NORFLG,CTLBKT,CHRBKT,KDCTRL,DSPTMR,CURBKT)
                ;        (BITSTR,BYTE  ,BYTE  ,BITSTR,UBYTE ,BYTE  )
                ;        ( I    , I    , I/O  , I    , I    , O    )
                ;        ( RAM  , RAM  , RAM  , RAM  , RAM  , RAM  )
                ;        ( NC   , NC   , C    , NC   , NC   , C    )
                ;
                ;PSW AND REGISTERS DESTROYED
```

```
                  ;
                  ;SAMPLES INTERRUPT LEVEL KEYCODE BUCKETS.  DEFINES A
                  ;STABLE KEYCODE BUCKET FOR APPLICATION USE.  INITIATES
                  ;PROCESSING OF KEYPRESS.  UPDATES DISPLAY TO CONFORM TO
                  ;METER STATUS.  INITIATES END OF ENTRY PROCESSING.
                  ;
                  KEYBRD;                 ****ENTRY POINT
032E 3A 27 74       LDA   KDCTRL/2+X      IF (KDCTRL.KBDDSB .EQ. FALSE) .AND.
0331 1F             RAR                     ((NORFLG.CMBIN .AND. NORFLG.AMTIN).EQ.
0332 DA 4A 03       JC    KEYB01            TRUE)
0335 3A 26 74       LDA   NORFLG/2+X
0338 E6 30          ANI   30H
033A FE 30          CPI   30H
033C C2 4A 03       JNZ   KEYB01
033F CD DE 0E       CALL  DBLANK            BLANK DISPLAY
                  ;                         EXECUTE END OF ENTRY
0342 3E 43          MVI   A,HENDEN          A = HENDEN
0344 CD C7 0D       CALL  XEQHDR            XEQHDR(HENDEN,ERROR)
                  ;                               ( A    ,PSW:Z)
                  ;                               ( I    , 0   )
0347 C3 8C 03       JMP   KEYB09
                  KEYB01;                 ELSE
                  ;                         READ INTERRUPT BUCKETS TOGETHER
034A 2A 2B 74       LHLD  CTLBKT/2+X
034D EB             XCHG                    E = CTLBKT
                  ;                         D = CHRBKT
034E 1C             INR   E                 IF CTLBKT .EQ. HEX00
034F 1D             DCR   E
0350 C2 78 03       JNZ   KEYB06
                  ;                           NO KEY IS DOWN
0353 21 27 74       LXI   H,KDCTRL/2+X        HL = ADDRESS, KDCTRL
0356 7E             MOV   A,M                 A = KDCTRL
0357 E6 20          ANI   20H                 IF KDCTRL.TIMED .EQ. TRUE
0359 CA 75 03       JZ    KEYB05
                  ;                             CURRENT DISPLAY IS TIMED
035C 3A 29 74       LDA   DSPTMR/2+X            A = DSPTMR
035F 3D             DCR   A                     IF DSPTMR .EQ. 1
0360 C2 75 03       JNZ   KEYB04
                  ;                               DISPLAY TIME IS UP
                  ;                               REVERT TO POSTAGE DISPLAY
                  ;                               CHECK FOR FATAL ERROR
0363 CD 4E 0F       CALL  LSTATE                  LSTATE(FATAL,NORM,SERV,PRIV)
                  ;                                     (PSW:S, :Z , :P , :C )
                  ;                                     ( 0   , 0  , 0  , 0  )
0366 F2 70 03       JP    KEYB02                  IF FATAL .EQ. TRUE
                  ;                                 SET FOR FATAL SETTING DISPLY
0369 7E             MOV   A,M                       KDCTRL.STGDSP = TRUE
036A F6 80          ORI   80H
036C 77             MOV   M,A
036D C3 75 03       JMP   KEYB03
                  KEYB02;                         ELSE
                  ;                                 MAKE NORMAL SETTING DISPLAY
0370 3E 51          MVI   A,HREQPO                  A = HREQPO
0372 CD C7 0D       CALL  XEQHDR                    XEQHDR(HREQPO,ERROR)
                  ;                                       ( A    ,PSW:Z)
                  ;                                       ( I    , 0   )
                  KEYB03;                         ENDIF
                  KEYB04;                       ENDIF
                  KEYB05;                     ENDIF
0375 C3 8C 03       JMP   KEYB08
                  KEYB06;                   ELSE
                  ;                           KEYS ARE DOWN
                  ;                           RESTART DISPLAY TIMER
0378 3E 07          MVI   A,DSPVAL              DSPTMR = DSPVAL
037A 32 29 74       STA   DSPTMR/2+X
037D 7A             MOV   A,D                 A = CHRBKT
037E B7             ORA   A                   IF CHRBKT .NE. HEX00
```

```
037F CA 8C 03   JZ   KEYB07
                ;                          A SINGLE UNPROCESSED KEY IS DOWN
                ;                          DEFINE A STABLE KEYBUCKET
0382 32 2D 74   STA  CURBKT/2+X            CURBKT = CHRBKT
                ;                          PREVENT REPROCESSING KEYPRESS
0385 AF         XRA  A                     CHRBKT = NOKEY
0386 32 2C 74   STA  CHRBKT/2+X
0389 CD CE 04   CALL PROKEY                PROCESS KEYPRESS
               KEYB07;                   ENDIF
               KEYB08;                 ENDIF
               KEYB09;               ENDIF
038C 3A 26 74   LDA  NORFLG/2+X      IF NORFLG.QUEPOS .EQ. TRUE
038F E6 40      ANI  40H
0391 C0         RNZ                    RETURN
                ;                    ELSE
0392 CD A0 03   CALL MODDSP            MODIFY DISPLAY TO MATCH METER STATUS
                ;                      START KEYBOARD/DISPLAY INTERRUPTS
0395 21 A7 00   LXI  H,KDIO            HL = ADRESS = ADDRESS, KDIO
0398 3E 02      MVI  A,KDSKIP          A = KDSKIP
039A 11 96 4C   LXI  D,KEYINT          DE = KEYINT
039D C3 53 01   JMP  STRTMR            STRTMR(ADRESS,KDSKIP,KEYINT,WASOFF)
                ;                            ( HL    , A    , DE    ,PSW:Z )
                ;                            ( I     , I    , I     , O    )
                ;                      RETURN
                ;                    ENDIF
MODDSP

               ;MODDSP()(DIMAGE, MRSTS1, KDCTRL)
                ;        (BYTSTR, BITSTR, BITSTR)
                ;        (  O   ,   I   ,   O   )
                ;        ( RAM  ,  RAM  ,  RAM  )
                ;        (  C   ,  NC   ,   C   )
                ;
               ;ALL REGISTERS CHANGED
               ;PSW: S, Z, P, CY CHANGED
                ;
               ;UPDATE DISPLAY CONTROL FLAGS AND DISPLAY IMAGE
               ;TO REFLECT CURRENT METER STATUS
                ;
               MODDSP;               ****ENTRY POINT
                ;                     CHECK DISPLAY TYPE
03A0 21 27 74   LXI  H,KDCTRL/2+X     HL = ADDRESS, KDCTRL
03A3 7E         MOV  A,M              A = KDCTRL
03A4 E6 BB      ANI  0BBH             A.FLSDSP = FALSE
                ;                     A.FLSDCM = FALSE
                ;                     PSW:S = KDCTRL.STGDSP
03A6 FA AD 03   JM   MODD01           IF KDCTRL.STGDSP .EQ. FALSE
                ;                       SETTING NOT ON DISPLAY
                ;                       PREVENT FLASHING DISPLAY
03A9 77         MOV  M,A                KDCTRL.FLSDSP = FALSE
                ;                       KDCTRL.FLSDCM = FALSE
03AA C3 FF 03   JMP  MODD07
               MODD01;                ELSE
                ;                       SETTING IS ON DISPLAY
                ;                       DECIDE WHETHER TO FLASH DISPLAY
03AD 3A 24 74   LDA  MRSTS1/2+X         B = MRSTS1
03B0 47         MOV  B,A
                ;                       D.DATDOR = D.0 = MRSTS1.DATDOR
                ;                       E.FLSDSP = E.1 = MRSTS1.DATDOR .OR.
                ;                                        MRSTS1.INSPND
                ;                       E.FLSDCM = E.5 = MRSTS1.LOWPOS
03B1 E6 70      ANI  70H
03B3 57         MOV  D,A
03B4 0F         RRC
03B5 0F         RRC
03B6 B2         ORA  D
03B7 57         MOV  D,A
```

```
03B8 07          RLC
03B9 B2          ORA  D
03BA 57          MOV  D,A
03BB E6 44       ANI  44H
03BD 5F          MOV  E,A
                ;                       KDCTRL.FLSDSP = E.FLSDSP
                ;                       KDCTRL.FLSDCM = E.FLSDCM
03BE 21 27 74    LXI  H,KDCTRL/2+X
03C1 7E          MOV  A,M
03C2 E6 BB       ANI  0BBH
03C4 B3          ORA  E
03C5 77          MOV  M,A
                ;                       DETERMINE METER STATUS
03C6 CD 4E 0F    CALL LSTATE            LSTATE(FATMOD,NORMOD,SERMOD,PRVMOD)
                ;                             (PSW:S ,PSW:Z ,PSW:P ,PSW:CY)
                ;                             ( 0    , 0    , 0    , 0     )
03C9 FA F5 03    JM   MODD04            IF FATMOD .EQ. FALSE
                ;                         METER NOT FATAL
                ;                         TURN DATER DOOR LAMP ON OR OFF
03CC 21 80 74    LXI  H,DIMAGE/2+Y        HL = ADDRESS, DIMAGE
03CF 7E          MOV  A,M                 A = DIMAGE
03D0 E6 FD       ANI  0FDH                A.DATLMP = FALSE
03D2 14          INR  D                   PSW:S = D.DATDOR
03D3 F2 D8 03    JP   MODD02              IF D.DATDOR .EQ. TRUE
03D6 F6 02       ORI  2                     A.DATLMP = TRUE
                MODD02;                   ENDIF
03D8 77          MOV  M,A                 DIMAGE = A
                ;                         SELECT WING TYPE
03D9 16 02       MVI  D,02H               D = WING, DISABLED
03DB 3E 04       MVI  A,04H               A = MRSTS1.ENABLD
03DD A0          ANA  B
03DE CA E3 03    JZ   MODD03              IF MRSTS1.ENABLD .EQ. TRUE
03E1 16 92       MVI  D,92H                 D = WING, ENABLED
                MODD03;                   ENDIF
                ;                         INSERT RIGHT HAND WING
03E3 21 87 74    LXI  H,DIMAGE/2+Y+(NDISP*4-1)
                ;                         HL = ADDRESS, DIMAGE[(NDISP*4-1)]
03E6 72          MOV  M,D                 DIMAGE[(NDISP*4-1)] = WING
                ;                         INSERT LEFT HAND WING
03E7 06 82       MVI  B,DBUF+2            B = OFFSET, DBUF[2]
03E9 CD 35 0F    CALL GETNIB              GETNIB(NCHAR,ZERO ,DBUF[2])
                ;                               ( A    ,PSW:Z, @B    )
                ;                               ( 0    , 0   , I     )
03EC 2F          CMA                      BC = -NCHAR-1
03ED 4F          MOV  C,A
03EE 06 FF       MVI  B,0FFH
03F0 09          DAD  B                   HL = ADDRESS,
                ;                         DIMAGE[(NDISP*4-2)-NCHAR]
03F1 72          MOV  M,D                 DIMAGE[(NDISP*4-2)-NCHAR] = WING
03F2 C3 FF 03    JMP  MODD06
                MODD04;                 ELSE
                ;                         METER IS FATAL
                ;                         SET TO DISPLAY ALL DECIMALS
03F5 3E 01       MVI  A,01H               A = DECBIT = HEX01
03F7 E2 FC 03    JPO  MODD05              IF SERMOD .EQ. TRUE
                ;                           SET TO DISPLAY DECIMALS+DASHES
03FA 3E 11       MVI  A,11H                 A = DECBIT = HEX11
                MODD05;                   ENDIF
03FC CD 22 03    CALL FILDIM              FILDIM(DECBIT)
                ;                               ( A    )
                ;                               ( I    )
                MODD06;                 ENDIF
                MODD07;               ENDIF
                ;                     BUILD SERVICE/NORMAL MODE EDIT MASK
03FF AF          XRA  A               A = MASK, BLANK
0400 CD 4E 0F    CALL LSTATE          LSTATE(FATMOD,NORMOD,SERMOD,PRVMOD)
                ;                           (PSW:S ,PSW:Z ,PSW:P ,PSW:CY)
```

```
                   ;                    ( 0    , 0    , 0    , 0    )
0403 E2 08 04       JPO   MODD08        IF SERMOD .EQ. TRUE
0406 3E 10          MVI   A,10H           A = MASK, UNDERSCORE
                   MODD08;              ENDIF
0408 4F             MOV   C,A           C = MASK
                   ;                    EDIT MASK INTO DISPLAY
0409 06 07          MVI   B,(NDISP*4-1) B = DISPNO = (NDISP*4-1)
MODDSP

040B 21 87 74       LXI   H,DIMAGE/2+Y+(NDISP*4-1)
                   ;                    HL = ADDRESS, DIMAGE[DISPNO]
                   MODD09;              FOR DISPNO = (NDISP*4-1) DOWNTO 0
040E 7E             MOV   A,M             IF(DIMAGE[DISPNO] .AND. HEXEE).EQ.0
040F E6 EE          ANI   0EEH
0411 C2 19 04       JNZ   MODD10
                   ;                        COPY MASK INTO DISPLAY
0414 7E             MOV   A,M               A = IMAGE = DIMAGE[DISPNO]
0415 E6 EF          ANI   0EFH              IMAGE = IMAGE, WITHOUT UNDERSCORE
0417 B1             ORA   C                 IMAGE = IMAGE, WITH EDIT MASK
0418 77             MOV   M,A               DIMAGE[DISPNO] = IMAGE
                   MODD10;                ENDIF
0419 05             DCR   B               B = DISPNO = DISPNO-1
041A 2B             DCX   H               HL = ADDRESS, DIMAGE[DISPNO]
041B F2 0E 04       JP    MODD09          TEST DISPNO
                   ;                    ENDFOR
041E C9             RET                 RETURN
PAUTHK

                   ;PAUTHK()(DBUF  ,NORFLG)
                   ;        (NIBSTR,BITSTR)
                   ;        ( I    , I    )
                   ;        ( RAM  , RAM  )
                   ;
                   ;PSW DESTROYED
                   ;REGISTERS DESTROYED
                   ;
                   ;PROCESS AUTHORIZATION KEY
                   ;
                   PAUTHK;              ****ENTRY POINT
                   ;                    TEST DISPLAY HEADER
041F 21 40 74       LXI   H,DBUF/2+X    HL = ADDRESS, DBUF[0..1]
0422 7E             MOV   A,M           A = DHEAD = DBUF[0..1]
0423 B7             ORA   A             PSW:Z = KEYDAT = DHEAD .EQ. 0
                   ;                    DEFINE REQUEST HEADER
0424 3E 40          MVI   A,HREQAC      A = RHEAD = HREQAC
                   ;                    IF KEYDAT .EQ. FALSE
                   ;                      NO KEYENTERED DATA IN DISPLAY
                   ;                      REQUEST AUTHORIZATION CODE
0426 C2 C7 0D       JNZ   XEQHDR          XEQHDR(RHEAD,ERRFLG)
                   ;                             ( A    ,PSW:Z )
                   ;                             ( I    , 0    )
                   ;                    ELSE
0429 23             INX   H             HL = ADDRESS, DBUF[2..3]
042A 7E             MOV   A,M           A = FORMAT = DBUF[2..3]
042B FE 4F          CPI   4FH           IF FORMAT .NE. HEX4F
                   ;                      DISPLAY NOT 4 CHAR WITHOUT DECIMAL
                   ;                      DECLARE PROCEDURAL ERROR
042D C2 A1 0B       JNZ   PROERR          PROERR(ERRFLG)
                   ;                            (PSW:Z )
                   ;                            ( 0    )
                   ;                    ELSE
0430 23             INX   H             HL = ADDRESS, DBUF[4..5]
0431 7E             MOV   A,M           A = CODE = DBUF[4..5]
0432 FE 69          CPI   69H           IF CODE .NE. HEX69
                   ;                      FIRST 2 CHARACTERS IN DISPLAY NOT 69
                   ;                      DECLARE PROCEDURAL ERROR
0434 C2 A1 0B       JNZ   PROERR          PROERR(ERRFLG)
```

```
                      ;                       (PSW:Z )
                      ;                       ( 0    )
                      ;                   ELSE
                      ;                     ISSUE LAST 2 CHARACTERS OF DISPLAY
                      ;                     AS REQUEST HEADER
0437 23         INX  H                      HL = ADDRESS, DBUF[6..7]
0438 7E         MOV  A,M                    A = RHEAD = DBUF[6..7]
0439 CD C7 0D   CALL XEQHDR                 XEQHDR(RHEAD,ERRFLG)
                      ;                       ( A   ,PSW:Z )
                      ;                       ( I   , 0    )
                      ;                     TEST THE REQUEST HEADER
043C FE 46      CPI  HSETSV                 IF RHEAD .EQ. HSETSV
043E C0         RNZ
                      ;                       SERVICE MODE ENTERED VIA KEYBOARD
                      ;                       DISABLE COMMUNICATIONS
043F 21 26 74   LXI  H,NORFLG/2+X             HL = ADDRESS, NORFLG
0442 7E         MOV  A,M                      NORFLG.COMDSB = TRUE
0443 F6 04    - ORI  04H
0445 77         MOV  M,A
                      ;                     ENDIF
                      ;                   ENDIF
0446 C9         RET                       RETURN
PCLRK

                      ;PCLRK
                      ;
                      ;PSW:S, Z, P, CY = NO CHANGE
                      ;
                      ;PROCESS CLEAR KEY
                      ;
                      PCLRK;              ****ENTRY POINT
0447 CD 06 03   CALL CDBUFC               IF DISPLAY WAS NOT KEY ENTERED
                      ;                     DISABLE METER
                      ;                     CLEAR DISPLAY BUFFER
                      ;                   ENDIF
044A CD 16 03   CALL CDBUF                CLEAR DISPLAY BUFFER
044D C3 5A 05   JMP  VALDSP               DISPLAY VALUE IN DBUF
                      ;                   RETURN
PDCMK

                      ;PDCMK()(DBUF   )
                      ;       (NIBSTR)
                      ;       ( I/O  )
                      ;       ( RAM  )
                      ;       ( C    )
                      ;
                      ;PSW AND REGISTERS DESTROYED
                      ;
                      ;PROCESS DECIMAL KEY
                      ;
                      PDCMK;              ****ENTRY POINT
                      ;                   CHECK FOR NON KEYENTRY DISPLAY
                      ;                   IF DBUF[0..1] .NE. HEX00
0450 CD 06 03   CALL CDBUFC                 PUT NUL MESSAGE IN DBUF
                      ;                     DISABLE METER
                      ;                   ENDIF
                      ;                   CHECK THAT DECIMAL NOT ALREADY ENTERED
0453 01 83 83   LXI B,(DBUF+3)*100H+DBUF+3
                      ;                   B = OFFSET, DBUF[3]
                      ;                   C = OFFSET, DBUF[3]
0456 CD 35 0F   CALL GETNIB               GETNIB(DECPOS,ZERO ,DBUF[3])
                      ;                     ( A    ,PSW:Z, @B    )
                      ;                     ( 0    , 0   , I     )
0459 D6 0F      SUI  0FH                  IF DECPOS .EQ. HEX0F
045B C2 61 04   JNZ  PDCMK1
                      ;                     A = DECPOS = 0, RIGHTMOST POSITION
                      ;                     OUTPUT DECPOS
```

```
     045E CD EE 0F   CALL PUTNIB        PUTNIB(DBUF[3],DECPOS)
                    ;                          ( @C    , A    )
                    ;                          ( 0     , I    )
                    PDCMK1;             ENDIF
     0461 C3 5A 05   JMP  VALDSP        MAKE NEW DISPLAY
                    ;                   RETURN
PERDSP

                    ;PERDSP()(KDCTRL,DIMAGE,DSPTMR)
                    ;        (BITSTR,BYTSTR,UBYTE )
                    ;        ( 0    , 0    , 0    )
                    ;        ( RAM  , RAM  , RAM  )
                    ;        ( C    , C    , C    )
                    ;
                    ;PSW:S, Z, P, CY = NO CHANGE
                    ;
                    ;MAKE PROCEDURAL ERROR DISPLAY
                    ;
                    PERDSP;             ****ENTRY POINT
     0464 F5         PUSH PSW           SAVE A, PSW
                    ;                   CLEAR SETTING-ON-DISPLAY FLAG
     0465 3A 27 74   LDA  KDCTRL/2+X    A = KDCTRL
     0468 E6 7F      ANI  7FH           KDCTRL.STGDSP = FALSE
                    ;                   SET DISPLAY-IS-TIMED FLAG
     046A F6 20      ORI  20H           KDCTRL.TIMED = TRUE
     046C 32 27 74   STA  KDCTRL/2+X
     046F CD 16 03   CALL CDBUF         CLEAR DISPLAY BUFFER
                    ;                   CLEAR DISPLAY IMAGE BUFFER
     0472 AF         XRA  A             A = BLANK
     0473 CD 22 03   CALL FILDIM        FILDIM(BLANK)
                    ;                          ( A    )
                    ;                          ( I    )
                    ;                   INSERT 'ERR' IN DISPLAY IMAGE
     0476 3E 9E      MVI  A,9EH         DIMAGE[0] = 'E'
     0478 32 80 74   STA  DIMAGE/2+Y
     047B 3E 0A      MVI  A,0AH         DIMAGE[1] = 'r'
     047D 32 81 74   STA  DIMAGE/2+Y+1
     0480 32 82 74   STA  DIMAGE/2+Y+2 DIMAGE[2] = 'r'
                    ;                   START DISPLAY TIMER
     0483 3E 07      MVI  A,DSPVAL      DSPTMR = DSPVAL
     0485 32 29 74   STA  DSPTMR/2+X
     0488 F1         POP  PSW           RESTORE A, PSW
     0489 C9         RET                RETURN
PNUMK

                    ;PNUMK(CURKEY)(DBUF  ,WORK1 )
                    ;     (BYTE  )(NIBSTR,NIBSTR)
                    ;     ( I    )( I/O  , 0    )
                    ;     ( A    )( RAM  , RAM  )
                    ;     ( C    )( C    , C    )
                    ;
                    ;PSW AND REGISTERS DESTROYED
                    ;
                    ;PROCESS NUMERIC KEY
                    ;
                    PNUMK;              ****ENTRY POINT
     048A 57         MOV  D,A           D = CURKEY
     048B CD 06 03   CALL CDBUFC        IF DBUF[0..1] .NE. HEX00
                    ;                     NOT IN KEYENTRY MODE
                    ;                     DISABLE METER
                    ;                     ENTER KEYENTRY MODE
                    ;                     DBUF[0..1] = HEADER = HEX00
                    ;                     DECLARE DBUF CLEAR
                    ;                     DBUF[2..3] = FORMAT = HEX0F
                    ;                   ENDIF
                    ;                   CHECK DATA LENGTH IN DISPLAY
     048E 21 41 74   LXI  H,(DBUF+2)/2+X
```

```
                ;                          HL = ADDRESS, DBUF[2..3]
0491 7E          MOV  A,M                  E = NCHAR*16 = DBUF[2]*16
0492 E6 F0       ANI  0F0H
0494 5F          MOV  E,A
0495 FE 80       CPI  DSPCHR*16            IF NCHAR .LT. DSPCHR
0497 D0          RNC
                ;                            THERE IS ROOM IN DISPLAY FOR CHAR
                ;                            CALCULATE NEXT DECIMAL POSITION
0498 7E          MOV  A,M                    A = DECPOS = (DBUF[3]+1) .AND. HEX0F
0499 3C          INR  A
049A E6 0F       ANI  0FH
049C FE 08       CPI  DSPCHR                 IF DECPOS .LT. DSPCHR
049E D0          RNC
                ;                              THERE IS ROOM TO SHIFT DECIMAL
049F B7          ORA  A                        IF DECPOS .EQ. 0
04A0 C2 A5 04    JNZ  PNUMK1
                ;                                DECIMAL HASN'T BEEN ENTERED
                ;                                INDICATE NO DECIMAL
04A3 3E 0F       MVI  A,0FH                      A = DECPOS = HEX0F
                PNUMK1;                        ENDIF
                ;                              UPDATE FORMAT BYTE
04A5 B3          ORA  E                        DBUF[2..3] = (NCHAR+1)*16+DECPOS
04A6 C6 10       ADI  10H
04A8 77          MOV  M,A
04A9 06 82       MVI  B,DBUF+2                 B = OFFSET, DBUF[2]
04AB CD 35 0F    CALL GETNIB                   GETNIB(NCHAR,ZROFLG,DBUF[2])
                ;                                     ( A    ,PSW:Z , @B     )
                ;                                     ( 0    , 0    , I      )
04AE 5F          MOV  E,A                      E = NCHAR
                ;                              COPY DBUF INTO WORK AREA
04AF 01 C0 84    LXI  B,(DBUF+4)*100H+(WORK1+0)
                ;                              B = OFFSET, DBUF[I=4]
                ;                              C = OFFSET, WORK1[J=0]
04B2 CD B3 0F    CALL MVLNIB                   MVLNIB(WORK1[J],DBUF[I],NCHAR,
                ;                                     ( @C     , @B    , A   ,
PNUMK

                ;                                     ( 0      , I     , I   ,
                ;
                ;                                     NONBCD,ZROFLG)
                ;                                     PSW:S ,PSW:Z )
                ;                                      0    , 0    )
                ;                              ZERO PAD DISPLAY BUFFER
04B5 23          INX  H                        HL = ADDRESS, DBUF[4..5]
04B6 36 00       MVI  M,0                      DBUF[4..5] = 0
                ;                              INSERT NEW CHAR IN WORK AREA
04B8 81          ADD  C                        C=OFFSET, WORK1[J=NCHAR.AND.HEXFE]
04B9 E6 FE       ANI  0FEH
04BB 4F          MOV  C,A
04BC 7A          MOV  A,D                      A = CURKEY
04BD CD EE 0F    CALL PUTNIB                   PUTNIB(WORK1[J],CURKEY)
                ;                                     ( @C     , A    )
                ;                                     ( 0      , I    )
                ;                              MOVE WORK AREA TO DISPLAY BUFFER
04C0 41          MOV  B,C                      B = OFFSET, WORK1[I=J]
04C1 3E 83       MVI  A,DBUF+3                 C=OFFSET,DBUF[J=(3+NCHAR).OR.HEX01]
04C3 83          ADD  E
04C4 F6 01       ORI  1
04C6 4F          MOV  C,A
04C7 7B          MOV  A,E                      A = NCHAR
04C8 CD C2 0F    CALL MVRNIB                   MVRNIB(DBUF[J],WORK1[I],NCHAR,
                ;                                     ( @C    , @B     , A   ,
                ;                                     ( 0     , I      , I   ,
                ;
                ;                                     NONBCD,ZROFLG)
                ;                                     PSW:S ,PSW:Z )
                ;                                      0    , 0    )
```

```
04CB C3 5A 05   JMP  VALDSP             UPDATE DISPLAY IMAGE
               ;                       ENDIF
               ;                     ENDIF
               ;                     RETURN
PROKEY

               ;PROKEY()(CURBKT)
               ;         ( BYTE )
               ;         ( I    )
               ;         ( RAM  )
               ;         ( NC   )
               ;
               ;PSW AND REGISTERS DESTROYED
               ;
               ;INITIATE PROCESSING OF A KEYPRESS
               ;
               PROKEY;              ****ENTRY POINT
04CE CD DE 0E   CALL DBLANK         STOP TIMER, BLANK DISPLAY
               ;                    BUILD INDEX FOR TABLE LOOKUP
               ;                    CURBKT = ORRR CCCC WHERE:
               ;                    RRR = 0, 1, 2, 3, OR 4 = ROW CODE
               ;                    CCCC= 1, 2, 4, OR 8 = COLUMN CODE
04D1 3A 2D 74   LDA CURBKT/2+X      A = CURBKT
04D4 57         MOV  D,A            D = CURBKT
04D5 E6 70      ANI  70H            E = INDEX = (CURBKT .AND. HEX70)/4
04D7 0F         RRC
04D8 0F         RRC
04D9 5F         MOV  E,A
04DA 7A         MOV  A,D            A = CURBKT
               PROKE1;              DO WHILE COLUMN CODE BIT NOT IN CARRY
04DB 1F         RAR
04DC DA E3 04   JC   PROKE2
04DF 1C         INR  E                E = INDEX = INDEX + 1
04E0 C3 DB 04   JMP  PROKE1
               PROKE2;              ENDDO
               ;                    DEFINE CURRENT KEYCODE OR HEADER
04E3 16 00      MVI  D,0            DE = INDEX
04E5 21 02 05   LXI  H,PROKE3       HL = ADDRESS, PROKE3
04E8 19         DAD  D              HL = ADDRESS, PROKE3[INDEX]
04E9 7E         MOV  A,M            A = CURKEY = PROKE3[INDEX]
               ;                    PROCESS CURRENT KEYCODE
04EA FE 0A      CPI  10             IF CURKEY .LT. 10
               ;                      PROCESS NUMERIC KEY
04EC DA 8A 04   JC   PNUMK            PNUMK(CURKEY)
               ;                           ( A     )
               ;                           ( I     )
               ;                      RETURN
               ;                    ELSE IF CURKEY .EQ. 10
04EF CA 47 04   JZ   PCLRK            PROCESS CLEAR KEY
               ;                      RETURN
04F2 FE 0C      CPI  12             ELSE IF CURKEY .EQ. 11
04F4 DA 50 04   JC   PDCMK            PROCESS DECIMAL KEY
               ;                      RETURN
               ;                    ELSE IF CURKEY .EQ. 12
04F7 CA 16 05   JZ   PSETK            PROCESS SET KEY
               ;                      RETURN
04FA FE 0D      CPI  13             ELSE IF CURKEY .EQ. 13
04FC CA 1F 04   JZ   PAUTHK           PROCESS AUTHORIZATION KEY
               ;                      RETURN
               ;                    ELSE
               ;                      A = HEADER = PROKE3[INDEX]
               ;                      EXECUTE HEADER
04FF C3 C7 0D   JMP  XEQHDR           XEQHDR(HEADER,ERROR)
               ;                            ( A     ,PSW:Z)
               ;                            ( I     , O   )
               ;                      RETURN
               ;                    ENDIF
```

```
                PROKE3;   CURKEY    INDEX   DESCRIPTION
                ;           OR
                ;         HEADER
                ;
0502 C4           DB      HSETDA      0     SET DATE
0503 C6           DB      HENTCO      1     ENTER COMBINATION
0504 C5           DB      HENTAM      2     ENTER AMOUNT
0505 0D           DB      13          3     AUTHORIZATION KEY
0506 0C           DB      12          4     SET KEY
0507 0B           DB      11          5     DECIMAL KEY
0508 00           DB       0          6     0 KEY
0509 0A           DB      10          7     CLEAR KEY
050A 55           DB      HREQPC      8     REQUEST PIECE COUNT
050B 09           DB       9          9     9 KEY
050C 08           DB       8         10     8 KEY
050D 07           DB       7         11     7 KEY
050E 53           DB      HREQDR     12     REQUEST DESCENDING REGISTER
050F 06           DB       6         13     6 KEY
0510 05           DB       5         14     5 KEY
0511 04           DB       4         15     4 KEY
0512 52           DB      HREQAR     16     REQUEST ASCENDING REGISTER
0513 03           DB       3         17     3 KEY
0514 02           DB       2         18     2 KEY
0515 01           DB       1         19     1 KEY
PSETK

                ;PSETK()(DBUF  ,NORFLG)
                ;       (NIBSTR,BITSTR)
                ;       ( I    , O    )
                ;       ( RAM  , RAM  )
                ;       ( C    , C    )
                ;
                ;PSW AND REGISTERS DESTROYED
                ;
                ;PROCESS SET KEY
                ;
                PSETK;                  ****ENTRY POINT
                ;                       PROCESS SET KEY ACCORDING TO DISPLAY
0516 3A 40 74     LDA  DBUF/2+X         A = DBUF[0..1]
0519 B7           ORA  A                IF DBUF[0..1] .EQ. HEX00
051A C2 2F 05     JNZ  PSETK1
                ;                         DISPLAY IS IN KEYENTRY MODE
051D 21 36 05     LXI  H,PSETK2           SET TO QUE POSTAGE VIA RETURN
0520 E5           PUSH H
0521 3A 41 74     LDA  (DBUF+2)/2+X       A = DBUF[2..3]
0524 FE 0F        CPI  0FH                IF DBUF[2..3] .EQ. HEX0F
0526 C8           RZ                        DISPLAY IS CLEAR
                ; >>RETURN AHEAD<<          QUE POSTAGE REQUEST
                ;                           NORFLG.QUEPOS = TRUE
                ;                         ELSE
                ;                           DISPLAY CONTAINS KEYENTERED VALUE
                ;                           SET POSTAGE
0527 3E C1        MVI  A,HSETPO             A = HSETPO
0529 CD C7 0D     CALL XEQHDR               XEQHDR(HSETPO,ERRFLG)
                ;                                 ( A    ,PSW:Z )
                ;                                 ( I    , O    )
052C C0           RNZ                       IF ERRFLG .EQ. FALSE
                ; >>RETURN AHEAD<<            QUE POSTAGE REQUEST
                ;                             NORFLG.QUEPOS = TRUE
                ;                           ENDIF
                ;                         ENDIF
052D E1           POP  H                  CLEAN UP STACK
052E C9           RET
                PSETK1;                 ELSE
                ;                         DISPLAY NOT IN KEYENTRY MODE
052F FE 81        CPI  HPSET              PSW:Z = SETTING=DBUF[0..1].EQ.HPSET
0531 3E 41        MVI  A,HENABL           A = HENABL
```

```
                     ;                       IF SETTING .EQ. TRUE
                     ;                         SETTING IS ON DISPLAY
                     ;                         ENABLE METER
0533 CA C7 0D          JZ    XEQHDR            XEQHDR(HENABL,ERRFLG)
                     ;                                ( A    ,PSW:Z )
                     ;                                ( I    , 0    )
                     ;                       ELSE
                     ;                         SETTING IS NOT ON DISPLAY
                     PSETK2;                   >>TARGET OF RETURN AHEAD<<
                     ;                         QUE POSTAGE REQUEST
0536 21 26 74          LXI   H,NORFLG/2+X      HL = ADDRESS, NORFLG
0539 7E                MOV   A,M               A = NORFLG
053A F6 40             ORI   40H               NORFLG.QUEPOS = TRUE
053C 77                MOV   M,A
                     ;                       ENDIF
                     ;                     ENDIF
053D C9                RET                 RETURN
SEGCOD

                     ;SEGCOD(CODE)
                     ;      (BYTE)
                     ;      (I/O )
                     ;      ( A  )
                     ;      ( C  )
                     ;
                     ;PSW:S, Z, P, CY DESTROYED
                     ;
                     ;CONVERT 4 BIT HEX VALUE INTO 7 SEGMENT DISPLAY CODE
                     ;
                     SEGCOD;               ****ENTRY POINT
053E E5                PUSH H              SAVE HL
                     ;                     FETCH 7 SEGMENT DISPLAY CODE
053F C6 4A             ADI  >SEGC01        HL = ADDRESS, SEGC01[CODE]
0541 6F                MOV  L,A
0542 3E 00             MVI  A,0
0544 CE 05             ACI  <SEGC01
0546 67                MOV  H,A
0547 7E                MOV  A,M            A = CODE = SEGC01[CODE]
0548 E1                POP  H              RESTORE HL
0549 C9                RET                 RETURN
                     ;
                     SEGC01; 7 SEG CODE;  HEX VALUE;  GRAPHIC
                     ;
054A FC                DB     0FCH          0         0
054B 60                DB     060H          1         1
054C DA                DB     0DAH          2         2
054D F2                DB     0F2H          3         3
054E 66                DB     066H          4         4
054F B6                DB     0B6H          5         5
0550 BE                DB     0BEH          6         6
0551 E0                DB     0E0H          7         7
0552 FE                DB     0FEH          8         8
0553 F6                DB     0F6H          9         9
0554 9E                DB     09EH          A         E
0555 0A                DB     00AH          B         r
0556 3A                DB     03AH          C         o
0557 92                DB     092H          D         WING, ENABLED
0558 02                DB     002H          E         WING, DISABLED
0559 00                DB     000H          F         BLANK
VALDSP

                     ;VALDSP()(DIMAGE,KDCTRL,DBUF  ,DSPTMR)
                     ;        (BYTSTR,BITSTR,NIBSTR,UBYTE )
                     ;        ( 0    , 0    , I    , 0    )
                     ;        ( RAM  , RAM  , RAM  , RAM  )
                     ;        ( C    , C    , NC   , C    )
                     ;
```

```
                 ;PSW:S, Z, P, CY = NO CHANGE
                 ;
                 ;TRANSLATE CONTENTS OF DISPLAY BUFFER INTO 7 SEGMENT
                 ;CHARACTER CODES WHICH ARE PLACED IN THE DISPLAY IMAGE
                 ;BUFFER
                 ;
                 VALDSP;           ****ENTRY POINT
055A E5            PUSH H          SAVE HL
055B D5            PUSH D          SAVE DE
055C C5            PUSH B          SAVE BC
055D F5            PUSH PSW        SAVE A, PSW
                 ;                 CLEAR DISPLAY IMAGE BUFFER
055E AF            XRA A           A = BLANK
055F CD 22 03      CALL FILDIM     FILDIM(BLANK)
                 ;                       ( A    )
                 ;                       ( I    )
                 ;                 DEFINE DEFAULT DISPLAY MODE
0562 3A 27 74      LDA  KDCTRL/2+X  A = KDCTRL
0565 E6 7F         ANI  7FH        KDCTRL.STGDSP = FALSE
0567 F6 20         ORI  20H        KDCTRL.TIMED = TRUE
0569 57            MOV  D,A        D = KDCTRL
                 ;                 FETCH VALUES FROM DBUF'S FORMAT BYTE
056A 06 82         MVI  B,DBUF+2   B = OFFSET, DBUF[2]
056C CD 35 0F      CALL GETNIB     GETNIB(NCHAR,ZERO ,DBUF[2])
                 ;                       ( A    ,PSW:Z, @B    )
                 ;                       ( O    , O   , I     )
056F 4F            MOV  C,A        C = NCHAR
0570 04            INR  B          B = OFFSET, DBUF[3]
0571 CD 35 0F      CALL GETNIB     GETNIB(DECPOS,ZERO ,DBUF[3])
                 ;                       ( A     ,PSW:Z, @B    )
                 ;                       ( O     , O   , I     )
0574 5F            MOV  E,A        E = DECPOS
                 ;                 POINT AT L/O OF DISPLAY IMAGE BUFFER
0575 21 87 74      LXI  H,DIMAGE/2+Y+(NDISP*4-1)
                 ;                 HL = ADDRESS, DIMAGE[NDISP*4-1]
                 ;                 CHECK FOR KEYENTRY IN DISPLAY BUFFER
0578 3A 40 74      LDA  DBUF/2+X   A = DBUF[0..1]
057B B7            ORA  A          IF DBUF[0..1] .EQ. HEX00
057C C2 8D 05      JNZ  VALDS2
                 ;                   CHECK FOR NULL MESSAGE IN DBUF
057F 3A 41 74      LDA  (DBUF+2)/2+X  A = DBUF[2..3]
0582 FE 0F         CPI  0FH          IF DBUF[2..3] .EQ. HEX0F
0584 C2 89 05      JNZ  VALDS1
                 ;                     PUT SMALL O IN DISPLAY
0587 36 3A         MVI  M,3AH          OUTPUT DIMAGE[NDISP*4-1] = 'o'
                 VALDS1;             ENDIF
0589 7A            MOV  A,D          A = KDCTRL
                 ;                   MAKE UNTIMED DISPLAY
058A C3 97 05      JMP  VALDS3
                 ; >>JUMP AHEAD<<
                 VALDS2;           ENDIF
                 ;                 CHECK WHETHER SETTING IS ON DISPLAY
058D FE 81         CPI  HPSET      COMPARE DBUF[0..1] WITH HPSET
058F 7A            MOV  A,D        A = KDCTRL
0590 C2 99 05      JNZ  VALDS4     IF DBUF[0..1] .EQ. HPSET
                 ;                   SHIFT DESTINATION TO LEFT
0593 1C            INR  E            E = DECPOS = DECPOS + 1
0594 2B            DCX  H            HL = ADDRESS, DIMAGE[DST=NDISP*4-2]
                 ;                   SET SETTING-ON-DISPLAY FLAG
0595 F6 80         ORI  80H          KDCTRL.STGDSP = TRUE
                 VALDS3;             >>TARGET OF JUMP AHEAD<<
                 ;                   CLEAR DISPLAY-IS-TIMED FLAG
0597 E6 DF         ANI  0DFH         KDCTRL.TIMED = FALSE
                 VALDS4;           ENDIF
0599 32 27 74      STA  KDCTRL/2+X  OUTPUT KDCTRL
                 ;                 POINT AT L/O DATA IN DBUF
059C 79            MOV  A,C        A = N = NCHAR
```

```
059D B7          ORA  A              A = N/2;  CY = N .MOD. 2
059E 1F          RAR
059F CE 00       ACI  0              B = OFFSET, DBUF[SRC=(N/2+N.MOD.2)*2+3]
05A1 17          RAL
05A2 C6 83       ADI  DBUF+3
05A4 47          MOV  B,A
                VALDS5;              DO WHILE NCHAR .GT. 0
05A5 0D          DCR  C
05A6 FA B5 05    JM   VALDS6
                ;                      FETCH BCD CHARACTER FROM DBUF
05A9 CD 35 0F    CALL GETNIB           GETNIB(CODE,ZERO ,DBUF[SRC])
                ;                             ( A   ,PSW:Z, @B       )
                ;                             ( O   , O   , I        )
                ;                      TRANSLATE TO 7 BIT DISPLAY CODE
05AC CD 3E 05    CALL SEGCOD           SEGCOD(CODE)
                ;                             ( A  )
                ;                             ( I/O)
                ;                      PUT CODE INTO DISPLAY IMAGE BUFFER
05AF 77          MOV  M,A              DIMAGE[DST] = CODE
                ;                      MOVE INDICES LEFT
05B0 05          DCR  B                B = OFFSET, DBUF[SRC=SRC-1]
05B1 2B          DCX  H                HL = ADDRESS, DIMAGE[DST=DST-1]
05B2 C3 A5 05    JMP  VALDS5
                VALDS6;              ENDDO
                ;                    CHECK WHETHER DECIMAL IS DISPLAYABLE
05B5 7B          MOV  A,E            A = DECPOS
05B6 FE 08       CPI  DSPCHR         IF DECPOS .LT. DSPCHR
05B8 D2 C3 05    JNC  VALDS7
                ;                      CALC DECIMAL'S ADDRESS IN DIAMGE
05BB 2F          CMA                   A = -DECPOS-1
05BC C6 88       ADI  (DIMAGE/2+Y-X)+(NDISP*4)
05BE 6F          MOV  L,A
                ;                      HL = ADDRESS,
                ;                      DIMAGE[N=(NDISP*4-1)-DECPOS]
                ;                      INSERT DECIMAL INTO DISPLAY
05BF 7E          MOV  A,M              DIMAGE[N] = DIMAGE[N] .OR. HEX01
05C0 F6 01       ORI  01H
05C2 77          MOV  M,A
                VALDS7;              ENDIF
                ;                    START DISPLAY TIMER
05C3 3E 07       MVI  A,DSPVAL       DSPTMR = DSPVAL
05C5 32 29 74    STA  DSPTMR/2+X
05C8 F1          POP  PSW            RESTORE A, PSW
05C9 C1          POP  B              RESTORE BC
05CA D1          POP  D              RESTORE DE
05CB E1          POP  H              RESTORE HL
05CC C9          RET                 RETURN
CMDDSB

                ;CMDDSB/DISABL()(MRSTS1,NORFLG)
                ;                (BITSTR,BITSTR)
                ;                ( I/O  , O     )
                ;                ( RAM  , RAM   )
                ;                ( C    , C     )
                ;
                ;PSW = NO CHANGE
                ;
                ;DISABLE METER
                ;
                CMDDSB;              ****ENTRY POINT FOR EXTERNAL DISABLES
05CD F5          PUSH PSW            SAVE A, PSW
                ;                    SET TO SET NORFLG.LATDSB = TRUE
05CE 3E 01       MVI  A,1            A = LATMSK = HEX01
05D0 C3 D5 05    JMP  DISAB1
                ; >>JUMP AHEAD<<
                DISABL;              ****ENTRY POINT FOR INTERNAL DISABLES
05D3 F5          PUSH PSW            SAVE A,PSW
```

```
                     ;                      SET TO PRESERVE NORFLG.LATSDB
05D4 AF                XRA  A               A = LATMSK = HEX00
                     DISAB1;                >>TARGET OF JUMP AHEAD<<
05D5 D5                PUSH D               SAVE DE
05D6 E5                PUSH H               SAVE HL
05D7 21 26 74          LXI  H,NORFLG/2+X    HL = ADDRESS, NORFLG
                     ;                      UPDATE NORFLG.LATDSB
05DA B6                ORA  M               NORFLG = NORFLG .OR. LATMSK
05DB 77                MOV  M,A
05DC 11 24 74          LXI  D,MRSTS1/2+X    DE = ADDRESS, MRSTS1
05DF 1A                LDAX D               IF MRSTS1.ENABLD .EQ. TRUE
05E0 E6 04             ANI  4
05E2 CA EF 05          JZ   DISAB2
05E5 1A                LDAX D                 MRSTS1.ENABLD = FALSE
05E6 E6 FB             ANI  0FBH
05E8 12                STAX D
05E9 7E                MOV  A,M               NORFLG.TRPREQ = FALSE
05EA E6 F7             ANI  0F7H
05EC F6 80             ORI  80H               NORFLG QUESTS = TRUE
05EE 77                MOV  M,A
                     DISAB2;                ENDIF
05EF E1                POP  H               RESTORE HL
05F0 D1                POP  D               RESTORE DE
05F1 F1                POP  PSW             RESTORE A, PSW
05F2 C9                RET                  RETURN
CMDENB

                     ;CMDENB/ENABLE()(MRSTS1,NORFLG,NVMCTL)
                     ;                (BITSTR,BITSTR,BITSTR)
                     ;                ( I/O  , I/O  , I    )
                     ;                ( RAM  , RAM  , RAM  )
                     ;                ( C    , C    , NC   )
                     ;
                     ;PSW = NO CHANGE
                     ;
                     ;ENABLE METER
                     ;
                     CMDENB;                ****ENTRY POINT FOR EXTERNAL ENABLES
05F3 F5                PUSH PSW             SAVE A, PSW
                     ;                      SET TO SET NORFLG.LATDSB = FALSE
05F4 3E FE             MVI  A,0FEH          A = LATMSK = HEXFE
05F6 C3 FC 05          JMP  ENABL1
                     ; >>JUMP AHEAD<<
                     ENABLE;                ****ENTRY POINT FOR INTERNAL ENABLES
05F9 F5                PUSH PSW             SAVE A, PSW
                     ;                      SET TO PRESERVE NORFLG.LATDSB
05FA 3E FF             MVI  A,0FFH          A = LATMSK = HEXFF
                     ENABL1;                >>TARGET OF JUMP AHEAD<<
05FC C5                PUSH B               SAVE BC
05FD D5                PUSH D               SAVE DE
05FE E5                PUSH H               SAVE HL
05FF 21 26 74          LXI  H,NORFLG/2+X    HL = ADDRESS, NORFLG
                     ;                      UPDATE NORFLG.LATDSB
0602 A6                ANA  M               NORFLG = NORFLG .AND. LATMSK
0603 77                MOV  M,A
0604 3A 33 74          LDA  NVMCTL/2+X      IF NVMCTL[0] .NE. HEXF
0607 B7                ORA  A
0608 FA 27 06          JM   ENABL4
                     ;                        A BLOCK IS OPEN
060B CD 4E 0F          CALL LSTATE            LSTATE(FATMOD,NORMOD,SERMOD,PRVMOD)
                     ;                               (PSW:S ,PSW:Z ,PSW:P ,PSW:CY)
                     ;                               ( 0    , 0    , 0    , 0    )
060E C2 27 06          JNZ  ENABL3            IF NORMOD .EQ. TRUE
0611 11 24 74          LXI  D,MRSTS1/2+X        DE = ADDRESS, MRSTS1
0614 1A                LDAX D
0615 E6 EC             ANI  0ECH
0617 47                MOV  B,A                 B = FLAGS = MRSTS1.UNKSEL,
```

```
                    ;                                    MRSTS1.DATDOR,
                    ;                                    MRSTS1.INSFND,
                    ;                                    MRSTS1.ENABLD
0618 7E               MOV  A,M
0619 E6 03            ANI  3
061B B0               ORA  B                A = FLAGS = FLAGS .OR.
                    ;                                    NORFLG.UNVSEL,
                    ;                                    NORFLG.LATDSB
061C C2 27 06         JNZ  ENABL2            IF FLAGS .EQ. FALSE
061F 7E               MOV  A,M                 NORFLG.QUESTS = TRUE
0620 F6 80            ORI  80H
0622 77               MOV  M,A
0623 1A               LDAX D                   MRSTS1.ENABLD = TRUE
0624 F6 04            ORI  4
0626 12               STAX D
                    ENABL2;                  ENDIF
                    ENABL3;                ENDIF
                    ENABL4;              ENDIF
0627 E1               POP  H             RESTORE HL
0628 D1               POP  D             RESTORE DE
0629 C1               POP  B             RESTORE BC
062A F1               POP  PSW           RESTORE A, PSW
062B C9               RET                RETURN
CONFIG

                    ;CONFIG(ERRFLG)(MTRCHR,XMTBUF)
                    ;      (BIT   )(BYTE  ,BYTSTR)
                    ;      ( O    )( I    , O    )
                    ;      (PSW:S )( RAM  , RAM  )
                    ;      ( C    )( NC   , C    )
                    ;
                    ;REGISTERS DESTROYED
                    ;PSW DESTROYED
                    ;
                    ;PUT METER CONFIGURATION MESSAGE IN TRANSMIT BUFFER
                    ;
                    CONFIG;              ****ENTRY POINT
062C 21 50 74         LXI  H,XMTBUF/2+X  HL = ADDRESS, XMTBUF[0]
                    ;                    DEFINE MESSAGE LENGTH
062F 36 02            MVI  M,2           XMTBUF[0] = 2
                    ;                    DEFINE MESSAGE HEADER
0631 23               INX  H             HL = ADDRESS, XMTBUF[1]
0632 36 AB            MVI  M,HCONFG      XMTBUF[1] = HCONFG
                    ;                    DEFINE ERROR FLAG
0634 2C               INR  L             HL = ADDRESS, XMTBUF[2]
                    ;                    PSW:Z = ERRFLG = FALSE
                    ;                    DEFINE METER CHARACTERISTICS
0635 3A 23 74         LDA  MTRCHR/2+X    XMTBUF[2] = MTRCHR
0638 77               MOV  M,A
0639 C9               RET                RETURN
CONSUM

                    ;CONSUM(ERRFLG)(CTLCRC)
                    ;      (BIT   )(BYTE  )
                    ;      ( O    )( I    )
                    ;      (PSW:Z )( RAM  )
                    ;      ( C    )( NC   )
                    ;
                    ;REGISTERS DESTROYED
                    ;PSW DESTROYED
                    ;
                    ;CHECK CONTROL SUM CRC AGAINST EXPECTED CRC
                    ;
                    CONSUM;              ****ENTRY POINT
                    ;                    CALCULATE CONTROL SUM CRC
063A CD 4E 06         CALL CTLSUM        CTLSUM(CSMCRC,ERRFLG)
                    ;                          ( D    ,PSW:Z )
```

```
                   ;                      ( 0    , 0    )
063D CA 47 06       JZ   CONSU1        IF ERRFLG .EQ. TRUE
                   ; >>JUMP AHEAD<<       DECLARE DEAD METER. BAD CRC
                   ;                      A = BADCRC
                   ;                      NVMDED(BADCRC,ERRFLG)
                   ;                            ( A    ,PSW:Z )
                   ;                            ( I    , 0    )
                   ;                   ELSE
0640 3A 08 74       LDA  CTLCRC/2+X    A = DIF = CTLCRC-CSMCRC
0643 92             SUB  D
0644 CA 4C 06       JZ   CONSU2        IF DIF .NE. 0
                   CONSU1;                >>TARGET OF JUMP AHEAD<<
                   ;                      DECLARE DEAD METER. BAD CRC
0647 3E 00          MVI  A,BADCRC         A = BADCRC
0649 C3 85 10       JMP  NVMDED           NVMDED(BADCRC,ERRFLG)
                   ;                            ( A    ,PSW:Z )
                   ;                            ( I    , 0    )
                   CONSU2;             ELSE
064C 3C             INR  A                PSW:Z = ERRFLG = FALSE
                   ;                   ENDIF
064D C9             RET                RETURN
                   ;CTLSUM(CSMCRC,ERRFLG)(ASCREG,DSCREG,WORK1 )
                   ;      (BYTE  ,BIT   )(NIBSTR,NIBSTR,NIBSTR)
                   ;      ( 0    , 0    )( I    , I    , 0    )
                   ;      ( D    ,PSW:Z )( RAM  , RAM  , RAM  )
                   ;      ( C    , C    )( NC   , NC   , C    )
                   ;
                   ;REGISTERS DESTROYED
                   ;PSW DESTROYED
                   ;
                   ;CALCULATE CONTROL SUM AND ITS CRC FOR THE CURRENT VALUES
                   ;OF THE ASCENDING AND DESCENDING REGISTERS
                   ;
                   CTLSUM;             ****ENTRY POINT
                   ;                   COPY ASCENDING REGISTER INTO WORK AREA
064E 01 C9 3F       LXI  B,(ASCREG+ASCSIZ-1)*100H+(WORK1+9)
                   ;                   B = OFFSET, ASCREG[I=ASCSIZ-1]
                   ;                   C = OFFSET, WORK1[J=10-1]
0651 3E 08          MVI  A,ASCSIZ      A = ASCSIZ
0653 CD C2 0F       CALL MVRNIB        MVRNIB(WORK1[J],ASCREG[I],ASCSIZ,
                   ;                         ( @C     , @B     , A     ,
                   ;                         ( 0      , I      , I     ,
                   ;
                   ;                         NONBCD,ZROFLG)
                   ;                         PSW:S ,PSW:Z )
                   ;                          0    , 0    )
0656 F2 5B 06       JP   CTLSU1        IF NONBCD .EQ. TRUE
0659 AF             XRA  A                PSW:Z = ERRFLG = TRUE
065A C9             RET
                   CTLSU1;             ELSE
065B 3A 17 74       LDA  DSCREG/2+X    IF DSCREG[0..1] .EQ. HEXFF
065E FE FF          CPI  0FFH             PSW:Z = ERRFLG = TRUE
0660 C8             RZ
                   ;                   ELSE
                   ;                      CALCULATE CONTROL SUM IN WORK AREA
0661 06 35          MVI  B,DSCREG+DSCSIZ-1
                   ;                      B = OFFSET, DSCREG[K=DSCSIZ-1]
0663 11 08 07       LXI  D,DSCSIZ*100H+ASCSIZ
                   ;                      D = DSCSIZ
                   ;                      E = ASCSIZ
0666 CD F8 06       CALL DECADD           DECADD(WORK1[J],DSCREG[K],
                   ;                            ( 0      , I      ,
                   ;                            ( @C     , @B     ,
                   ;
                   ;                            ASCSIZ,DSCSIZ,OVRFLO)
                   ;                             I    , I    , 0    )
                   ;                             E    , D    ,PSW:CY)
```

```
                    ;                 CALCULATE CRC FOR CONTROL SUM
0669 01 C2 08   LXI  B,(ASCSIZ)*100H+(WORK1+10-ASCSIZ)
                ;                     B = ASCSIZ
                ;                     C = OFFSET, WORK1[L=10-ASCSIZ]
066C CD B1 0E   CALL CRC              CRC(WORK1[L],ASCSIZ,CSMCRC)
                ;                        ( I      , I    , O     )
                ;                        ( @C     , B    , D     )
066F 04         INR  B                PSW:Z = ERRFLG = FALSE
                ;                     ENDIF
0670 C9         RET                   RETURN
DBLHDR

                ;DBLHDR(HEADER,ERRFLG)(LOWWRN,SERNUM,ERRST ,SETLIM,ASCREG,
                ;      (BYTE  ,BIT   )(NIBSTR,NIBSTR,NIBSTR,NIBSTR,NIBSTR,
                ;      ( I    , O    )( I    , I    , I    , I    , I    ,
                ;      ( A    ,PSW:Z )( RAM  , RAM  , RAM  , RAM  , RAM  ,
                ;      ( NC   , C    )( NC   , NC   , NC   , NC   , NC   ,
                ;
                ;      DSCREG,WORK1 ,PCEREG,MRSTS1)
                ;      NIBSTR,NIBSTR,NIBSTR,BITSTR)
                ;       I    , I    , I    , O    )
                ;       RAM  , RAM  , RAM  , RAM  )
                ;       NC   , NC   , NC   , C    )
                ;
                ;REGISTERS DESTROYED
                ;PSW DESTROYED
                ;
                ;PROCESS DOUBLY DEFINED HEADERS
                ;
                DBLHDR;               ****ENTRY POINT
0671 CD 4E 0F   CALL LSTATE           LSTATE(FATMOD,NORMOD,SERMOD,PRVMOD)
                ;                           (PSW:S ,PSW:Z ,PSW:P ,PSW:CY)
                ;                           ( O    , O    , O    , O     )
0674 21 E2 06   LXI  H,DBLH04         SET TO RETURN TO ENDCASE
0677 E5         PUSH H
0678 E2 A6 06   JPO  DBLH02           IF SERMOD .EQ. TRUE
                ;                     --CASE (HEADER)
067B FE 52      CPI  HREQDL             **52: DOLLAR LOCK VALUE REQUEST
067D 11 E3 06   LXI  D,DBLH05+0
0680 CA 5B 0D   JZ   VALREQ             VALREQ(UNLOCK,LOKFMT,HDLOCK,ERRFLG)
                ;                             (@@DE+0,@DE+1 ,@DE+2 ,PSW:Z )
                ;                             ( I    , I    , I    , O     )
0683 FE 53      CPI  HREQLP             **53: LOW POSTAGE WARNING VALUE REQ
0685 01 8B 1C   LXI  B,LOWWRN*100H+HLOPOS
0688 CA 34 0D   JZ   SRVREQ             SRVREQ(LOWWRN,HLOPOS,ERRFLG)
                ;                             ( @B    , C     ,PSW:Z )
                ;                             ( I     , I     , O     )
068B FE 54      CPI  HREQMN             **54: METER SERIAL NUMBER REQUEST
                DBLH01;                 ****ALTERNATE ENTRY POINT
068D 11 E6 06   LXI  D,DBLH05+3
0690 CA 5B 0D   JZ   VALREQ             VALREQ(SERNUM,MSNFMT,HMTRNO,ERRFLG)
                ;                             (@@DE+0,@DE+1 ,@DE+2 ,PSW:Z )
                ;                             ( I    , I    , I    , O     )
0693 FE 55      CPI  HREQDS             **55: DIAGNOSTIC REQUEST
0695 11 E9 06   LXI  D,DBLH05+6
0698 CA 5B 0D   JZ   VALREQ             VALREQ(ERRST ,DIAFMT,HDIAGS,ERRFLG)
                ;                             (@@DE+0,@DE+1 ,@DE+2 ,PSW:Z )
                ;                             ( I    , I    , I    , O     )
069B FE 56      CPI  HREQSL             **56: SETTING LIMIT VALUE REQUEST
069D 01 8E 1E   LXI  B,SETLIM*100H+HHSLIM
06A0 CA 34 0D   JZ   SRVREQ             SRVREQ(SETLIM,HHSLIM,ERRFLG)
                ;                             ( @B    , C     ,PSW:Z )
                ;                             ( I     , I     , O     )
                ;                       **ELSE: PROCESS ERROR
06A3 C3 A1 0B   JMP  PROERR             PROERR(ERRFLG)
                ;                             (PSW:Z )
                ;                             ( O    )
```

```
                    ;                       --ENDCASE
                    DBLH02;                 ELSE
                    ;                       --CASE (HEADER)
06A6 FE 52            CPI  HREQAR             **52: ASCENDING REGISTER REQUEST
06A8 11 EC 06         LXI D,DBLH05+9
06AB CA 5B 0D         JZ   VALREQ             VALREQ(ASCREG,ASCFMT,HAREG ,ERRFLG)
                    ;                               (@@DE+0,@DE+1 ,@DE+2 ,PSW:Z )
                    ;                               ( I    , I    , I    , O    )
06AE FE 53            CPI  HREQDR             **53: DESCENDING REGISTER REQUEST
06B0 11 EF 06         LXI  D,DBLH05+12
06B3 CA 5B 0D         JZ   VALREQ             VALREQ(DSCREG,DSCFMT,HDREG ,ERRFLG)
                    ;                               (@@DE+0,@DE+1 ,@DE+2 ,PSW:Z )
                    ;                               ( I    , I    , I    , O    )
06B6 FE 54            CPI  HREQCS             **54: CONTROL SUM REQUEST
06B8 C2 C5 06         JNZ  DBLH03
06BB CD 3A 06         CALL CONSUM             CONSUM(ERRFLG)
                    ;                               (PSW:Z )
                    ;                               ( O    )
06BE 11 F2 06         LXI  D,DBLH05+15
                    ;                         IF ERRFLG .EQ. FALSE
                    ;                           I = 10-ASCSIZ
06C1 C4 5B 0D         CNZ  VALREQ               VALREQ(WORK1[I],CSMFMT,HCSUM,ERRFLG)
                    ;                                 (@@DE+0  ,@DE+1 ,@DE+2,PSW:Z )
                    ;                                 ( I      , I    , I   , O     )
                    ;                         ENDIF
06C4 C9               RET
                    DBLH03;
06C5 FE 55            CPI  HREQPC             **55: PIECE COUNT REQUEST
06C7 11 F5 06         LXI  D,DBLH05+18
06CA CA 5B 0D         JZ   VALREQ             VALREQ(PCEREG,PCEFMT,HPCNT ,ERRFLG)
                    ;                               (@@DE+0,@DE+1 ,@DE+2 ,PSW:Z )
                    ;                               ( I    , I    , I    , O    )
06CD FE 5B            CPI  HREQCF             **5B: CONFIGURATION DATA REQUEST
06CF CA 2C 06         JZ   CONFIG             CONFIG(ERRFLG)
                    ;                               (PSW:Z )
                    ;                               ( O    )
06D2 FE C4            CPI  HSETDA             **C4: RESET DATER DOOR
06D4 C2 A1 0B         JNZ  PROERR
06D7 21 24 74         LXI  H,MRSTS1/2+X       HL = ADDRESS, MRSTS1
06DA 7E               MOV  A,M                MRSTS1.DATDOR = FALSE
06DB E6 BF            ANI  0BFH
06DD 77               MOV  M,A
06DE 24               INR  H                  PSW:Z = ERRFLG = FALSE
06DF C3 48 0C         JMP  SELVAL             DISPLAY SELECTION VALUE
                    ;                         **ELSE: PROCESS ERROR
                    ;                         PROERR(ERRFLG)
                    ;                               (PSW:Z )
                    ;                               ( O    )
                    DBLH04;                 --ENDCASE
                    ;                       ENDIF
06E2 C9               RET                   RETURN
                    DBLH05;                 ARGUMENTS FOR VALREQ
06E3 18 40 8A         DB   UNLOCK,LOKFMT,HDLOCK             ;+0
06E6 21 7F 8C         DB   SERNUM,MSNFMT,HMTRNO             ;+3
06E9 13 5F 8D         DB   ERRST,DIAFMT,HDIAGS              ;+6
06EC 38 80 82         DB   ASCREG,ASCFMT,HAREG              ;+9
06EF 2F 70 83         DB   DSCREG,DSCFMT,HDREG              ;+12
06F2 C2 80 84         DB   WORK1+10-ASCSIZ,CSMFMT,HCSUM     ;+15
06F5 28 7F 85         DB   PCEREG,PCEFMT,HPCNT              ;+18
DECADD

                    ;DECADD(V1[V1DGTS-1],V2[V2DGTS-1],V1DGTS,V2DGTS,OVRFLO)
                    ;       (NIBSTR     ,NIBSTR     ,BYTE  ,BYTE  , BIT  )
                    ;       ( I/O       , I         , I    , I    , O    )
                    ;       ( @C        , @B        , E    , D    ,PSW:CY)
                    ;       ( C         , NC        , C    , C    , C    )
                    ;
```

```
                    ;PSW DESTROYED
                    ;REGISTERS DESTROYED
                    ;
                    ;BCD ADDITION OF UNSIGNED BCD VALUE STRINGS
                    ;V1[0..V1DGTS-1] = V1[0..V1DGTS-1] + V2[0..V2DGTS-1]
                    ;WHERE V1DGTS .GE. V2DGTS
                    ;
                    DECADD;                    ****ENTRY POINT
                    ;                          C  OFFSET, V1[I=V1DGTS-1]
                    ;                          B  OFFSET, V2[J=V2DGTS-1]
06F8 7B               MOV  A,E                 IF V1DGTS .LT. V2DGTS
06F9 BA               CMP  D
06FA DA 20 07         JC   DECERR                DECLARE BAD ARGUMENT
                    ;                            ENTER FATAL ERROR MODE
                    ;                          ENDIF
06FD AF               XRA  A                   PSW:CY = CARRY = FALSE
                    DECAD1;                    DO WHILE V1DGTS .GE. 0
06FE 1D               DCR  E                     E = V1DGTS = V1DGTS-1
06FF F8               RM
0700 CD 0C 07         CALL DECCOM                DECCOM(V1[I],V2[J],V1DGTS,V2DGTS,
                    ;                                   ( @C  , @B  , E    , D    ,
                    ;                                   ( I   , I/O , -    , I/O  ,
                    ;
                    ;                                   VAL1,VAL2)
                    ;                                    L   , A  )
                    ;                                    0   , 0  )
                    ;                            L[0..1] = VAL1 = HEX90 .OR. V1[I]
                    ;                            A[0..1] = VAL2 = V2[J]
                    ;                            B = OFFSET, V2[J=J-1]
                    ;                            D = V2DGTS = V2DGTS-1
0703 8D               ADC  L                     A[1] = VAL1 = VAL1+VAL2+CARRY
0704 27               DAA
                    ;                            PSW:CY = CARRY
0705 CD EE 0F         CALL PUTNIB                PUTNIB(V1[I],VAL1)
                    ;                                   ( @C  ,A[1])
                    ;                                   ( 0   , I  )
0708 0D               DCR  C                     C = OFFSET, V1[I=I-1]
0709 C3 FE 06         JMP  DECAD1
                    ;                          ENDDO
                    ;                          RETURN
DECCOM

                    ;DECCOM(V1[I] ,V2[J] ,V1DGTS,V2DGTS,VAL1,VAL2)
                    ;      (NIBBLE,NIBBLE,BYTE  ,BYTE  ,BYTE,BYTE)
                    ;      ( I    , I/O  , -    , I/O  , 0  , 0  )
                    ;      ( @C   , @B   , E    , D    , L  , A  )
                    ;      ( NC   , C    , NC   , C    , C  , C  )
                    ;
                    ;PSW:CY = NO CHANGE
                    ;PSW:S, Z, P CHANGED
                    ;REGISTERS DESTROYED
                    ;
                    ;COMMON ROUTINE CALLED BY DECADD AND DECSUB
                    ;FETCHES NEXT PAIR OF OPERANDS
                    ;VAL1 = HEX90 .OR. V1[I]
                    ;VAL2 = V2[J]
                    ;J AND V2DGTS WILL BE DECREMENTED
                    ;
                    DECCOM;                    ****ENTRY POINT
070C F5               PUSH PSW                 SAVE PSW:CY
070D 60               MOV  H,B                 H = OFFSET, V2[J]
070E 41               MOV  B,C                 B = OFFSET, V1[I]
070F CD 35 0F         CALL GETNIB              GETNIB(VAL1,ZROFLG,V1[I])
                    ;                                 ( A   ,PSW:Z , @B  )
                    ;                                 ( 0   , 0    , I   )
0712 F6 90            ORI  90H                 L[0..1] = VAL1 = HEX90 .OR. VAL1
0714 6F               MOV  L,A
```

```
0715 44         MOV  B,H          B = OFFSET, V2[J]
0716 F1         POP  PSW          RESTORE PSW:CY
0717 3E 00      MVI  A,0          A[0..1] = VAL2 = 0
0719 15         DCR  D            D = V2DGTS = V2DGTS-1
071A F8         RM                IF V2DGTS .GE. 0
071B CD 35 0F   CALL GETNIB         GETNIB(VAL2    ,ZROFLG,V2[J])
               ;                          (A[0..1],PSW:Z , @B  )
               ;                          ( 0      , 0    , I   )
071E 05         DCR  B              B = OFFSET, V2[J=J-1]
               ;                  ENDIF
071F C9         RET               RETURN
DECERR

               ;DECERR()
               ;
               ;PSW DESTROYED
               ;ALL REGISTERS DESTROYED
               ;
               ;ERROR ROUTINE CALLED BY DECADD AND DECSUB
               ;
               DECERR;            ****ENTRY POINT
0720 3E 02      MVI  A,SFTWRE     A = SFTWRE
0722 CD 80 08   CALL FATERR       ENTER FATAL MODE. SOFTWARE ERROR
0725 CD 68 10   CALL NVMCHG       SAVE NONVOLATILE MEMORY
0728 C3 B6 01   JMP  PWRDN        FREEZE UNTIL NEXT POWER UP
DECSUB

               ;DECSUB(V1[V1DIGS-1],V2[V2DGTS-1],V1DGTS,V2DGTS)
               ;      (NIBSTR      ,NIBSTR      ,BYTE  ,BYTE  )
               ;      ( I/O        , I          , I    , I    )
               ;      ( @C         , @B         , E    , D    )
               ;      ( C          , NC         , C    , C    )
               ;
               ;PSW DESTROYED
               ;REGISTERS DESTROYED
               ;
               ;BCD SUBTRACTION OF UNSIGNED BCD VALUE STRINGS
               ;V1[0..V1DGTS-1] = V1[0..V1DGTS-1] - V2[0..V2DGTS-1]
               ;WHERE V1DGTS .GE. V2DGTS
               ;
               DECSUB;            ****ENTRY POINT
               ;                  C = OFFSET, V1[I=V1DGTS-1]
               ;                  B = OFFSET, V2[J=V2DGTS-1]
072B 7B         MOV  A,E          IF V1DGTS .LT. V2DGTS
072C BA         CMP  D
072D DA 20 07   JC   DECERR         DECLARE BAD ARGUEMENT
               ;                    ENTER FATAL ERROR MODE
               ;                  ENDIF
0730 AF         XRA  A            PSW:CY = BORROW = FALSE
               DECSU1;            DO WHILE V1DGTS .GE. 0
0731 1D         DCR  E              E = V1DGTS = V1DGTS-1
0732 F8         RM
0733 CD 0C 07   CALL DECCOM         DECCOM(V1[I],V2[J],V1DGTS,V2DGTS,
               ;                          ( @C  , @B  , E    , D     ,
               ;                          ( I   , I/O , -    , I/O   ,
               ;
               ;                          VAL1,VAL2)
               ;                           L  , A  )
               ;                           0  , 0  )
               ;                    L[0..1] = VAL1 = HEX90 .OR. V1[I]
               ;                    A[0..1] = VAL2 = V2[J]
               ;                    B = OFFSET, V2[J=J-1]
               ;                    D = V2DGTS = V2DGTS-1
0736 CE F6      ACI  -10            A[1] = VAL1-VAL2-BORROW
0738 2F         CMA
0739 3C         INR  A
073A 85         ADD  L
```

```
073B 27          DAA
073C 3F          CMC                 PSW:CY = BORROW
073D CD EE 0F    CALL PUTNIB         PUTNIB(V1[I],VAL1)
                ;                          ( @C  , A  )
                ;                          ( O   , I  )
0740 0D          DCR  C              C = OFFSET, V1[I=I-1]
0741 C3 31 07    JMP  DECSU1
                ;                  ENDDO
                ;                  RETURN
DOACCT

                ;DOACCT()(POSREG,ASCCRC,ASCREG,DSCCRC,DSCREG,PCEREG,WORK1 )
                ;        (NIBSTR,BYTE  ,NIBSTR,BYTE  ,NIBSTR,NIBSTR,NIBSTR)
                ;        ( I    , O    , I/O  , O    , I/O  , I/O  , O    )
                ;        ( RAM  , RAM  , RAM  , RAM  , RAM  , RAM  , RAM  )
                ;        ( NC   , C    , C    , C    , C    , C    , C    )
                ;
                ;PSW DESTROYED
                ;REGISTERS DESTROYED
                ;
                ;DO ACCOUNTING FOR METER TRIP
                ;
                DOACCT;            ****ENTRY POINT
                ;                  ADD POSTAGE TO ASCENDING REGISTER
0744 11 08 04    LXI  D,NBANKS*100H+ASCSIZ
                ;                  D = NBANKS
                ;                  E = ASCSIZ
0747 01 3F 45    LXI  B,(POSREG+NBANKS-1)*100H+(ASCREG+ASCSIZ-1)
                ;                  B = OFFSET, POSREG[I=NBANKS-1]
                ;                  C = OFFSET, ASCREG[J=ASCSIZ-1]
074A CD F8 06    CALL DECADD       DECADD(ASCREG[J],POSREG[I],
                ;                        ( @C      , @B      ,
                ;                        ( I/O     , I       ,
                ;
                ;                        ASCSIZ,NBANKS)
                ;                         E    , D    )
                ;                         I    , I    )
                ;                  COMPUTE CRC FOR ASCENDING REGISTER
074D 01 38 08    LXI  B,ASCSIZ*100H+ASCREG
                ;                  B = ASCSIZ
                ;                  C = OFFSET, ASCREG
0750 CD B1 0E    CALL CRC          CRC(ASCREG,ASCSIZ,CRCVAL)
                ;                     ( @C    , B     , D     )
                ;                     ( I     , I     , O     )
0753 7A          MOV  A,D          ASCCRC = CRCVAL
0754 32 20 74    STA  ASCCRC/2+X
                ;                  SUBTRACT POSTAGE FROM DESCENDING REG
0757 11 07 04    LXI  D,NBANKS*100H+DSCSIZ
                ;                  D = NBANKS
                ;                  E = DSCSIZ
075A 01 35 45    LXI  B,(POSREG+NBANKS-1)*100H+(DSCREG+DSCSIZ-1)
                ;                  B = OFFSET, POSREG[I=NBANKS-1]
                ;                  C = OFFSET, DSCREG[J=DSCSIZ-1]
075D CD 2B 07    CALL DECSUB       DECSUB(DESCREG[J],POSREG[I],
                ;                        ( @C       , @B      ,
                ;                        ( I/O      , I       ,
                ;
                ;                        DSCSIZ,NBANKS)
                ;                         E    , D    )
                ;                         I    , I    )
                ;                  COMPUTE CRC FOR DESCENDING REGISTER
0760 01 2F 07    LXI  B,DSCSIZ*100H+DSCREG
                ;                  B = DSCSIZ
                ;                  C = OFFSET,DSCREG
0763 CD B1 0E    CALL CRC          CRC(DSCREG,DSCSIZ,CRCVAL)
                ;                     ( @C    , B     , D     )
                ;                     ( I     , I     , O     )
0766 7A          MOV  A,D          DSCCRC = CRCVAL
```

```
0767 32 1B 74   STA  DSCCRC/2+X
                ;                       INCREMENT THE PIECE COUNT
076A 3E 10      MVI  A,10H              WORK1[0] = 1
076C 32 60 74   STA  WORK1/2+X
076F 11 07 01   LXI  D,1*100H+PCESIZ
                ;                       D = ONESIZ = 1
                ;                       E = PCESIZ
0772 01 2E C0   LXI  B,(WORK1+1-1)*100H+(PCEREG+PCESIZ-1)
                ;                       B = OFFSET, WORK1[I=ONESIZ-1]
                ;                       C = OFFSET, PCEREG[J=PCESIZ-1]
0775 C3 F8 06   JMP  DECADD             DECADD(PCEREG[J],WORK1[I],
                ;                             ( @C      , @B     ,
                ;                             ( I/O     , I      ,
                ;
                ;                             PCESIZ,ONESIZ)
                ;                              E    , D    )
                ;                              I    , I    )
                ;                       RETURN
DOSTAT

                ;DOSTAT()(MRSTS1,MRSTS2,NORFLG)
                ;        (BITSTR,BITSTR,BITSTR)
                ;        ( I    , I/O  , I/O  )
                ;        ( RAM  , RAM  , RAM  )
                ;        ( NC   , C    , C    )
                ;
                ;REGISTERS DESTROYED
                ;PSW DESTROYED
                ;
                ;UPDATE METER STATUS TO AGREE WITH SWITCHES AND SENSORS
                ;
                DOSTAT;                 ****ENTRY POINT
                ;                       FETCH PRESENT SWITCH VALUES
0778 CD 31 0C   CALL REDSTS             REDSTS(TRPSW,PRVSW)
                ;                             ( B    , A    )
                ;                             ( 0    , 0    )
077B E6 01      ANI  1                  C = PRVSW = PRVSW .AND. HEX01
077D 4F         MOV  C,A
077E 78         MOV  A,B                B = TRPSW = TRPSW .AND. HEX08
077F E6 08      ANI  8
0781 47         MOV  B,A
0782 81         ADD  C                  C = NEWSWS = PRVSW + TRPSW
0783 4F         MOV  C,A
0784 21 25 74   LXI  H,MRSTS2/2+X       HL = ADDRESS, MRSTS2
                ;                       SAVE ENTRY STATUS
0787 7E         MOV  A,M                A = MRSTS2
0788 57         MOV  D,A                D = OLDST2 = MRSTS2
                ;                       UPDATE STATUS
                ;                       MRSTS2.TRPSW = TRPSW
                ;                       MRSTS2.PRVMOD = PRVSW
0789 E6 F6      ANI  0F6H               MRSTS2 = MRSTS2.AND.HEXF6.OR.NEWSWS
078B B1         ORA  C
078C 77         MOV  M,A
                ;                       CHECK METER STATUS
078D CD 4E 0F   CALL LSTATE             LSTATE(FATMOD,NORMOD,SERMOD,PRVMOD)
                ;                             (PSW:S ,PSW:Z ,PSW:P ,PSW:CY)
                ;                             ( 0    , 0    , 0    , 0    )
0790 F8         RM                      IF FATMOD .EQ. FALSE
                ;                         READ CYCLE SWITCH
0791 CD AF 0B   CALL RDCYC                RDCYC(INCYC,INCYC,ADRESS,MRSTS1)
                ;                              ( A    ,PSW:C, HL   , @HL  )
                ;                              ( 0    , 0   , 0    , -    )
0794 3E 04      MVI  A,BADCYC             A = BADCYC
                ;                         IF INCYC .EQ. TRUE
                ;                           CYCLE SWITCH SAYS METER NOT HOME
                ;                           DECLARE DEAD METER, BAD SWITCH
0796 DA 85 10   JC   NVMDED                 NVMDED(BADCYC,ERRFLG)
```

```
                  ;                           ( A     ,PSW:Z )
                  ;                           ( I     , 0    )
                  ;                       ELSE
                  ;                         CALC SEQ SWITCH CLOSURE VALUE
0799 7A             MOV   A,D
079A A0             ANA   B
079B A8             XRA   B
079C 4F             MOV   C,A               C = CLOSUR = OLDST2.TRPSW .AND.
                  ;                                      TRPSW .XOR. TRPSW
                  ;                         DEFINE TRIP REQUEST VALUE
079D 7E             MOV   A,M               A=TRPREQ=MRSTS1.ENABLD.AND.CLOSUR
079E 17             RAL
079F A1             ANA   C

                  ;                         UPDATE TRIP REQUEST STATUS
                  ;                         NORFLG.TRPREQ = TRPREQ
07A0 23             INX   H                 HL = ADDRESS, NORFLG
07A1 23             INX   H
07A2 B6             ORA   M                 NORFLG = TRPREQ .OR. NORFLG
07A3 77             MOV   M,A
                  ;                       ENDIF
                  ;                     ENDIF
07A4 C9             RET                 RETURN
DOTRIP

                  ;DOTRIP()(MRSTS1,NORFLG,PORTA )
                  ;        (BITSTR,BITSTR,BITSTR)
                  ;        ( 0    , 0    , 0    )
                  ;        ( RAM  , RAM  , 7001 )
                  ;        ( C    , C    , C    )
                  ;
                  ;REGISTERS DESTROYED
                  ;PSW DESTROYED
                  ;
                  ;TRIP METER
                  ;
                  DOTRIP;               ****ENTRY POINT
07A5 CD DE 0E       CALL DBLANK         TURN OFF DISPLAY
                  ;                     CHECK CYCLE SWITCH WHILE METER HOME
07A8 CD AF 0B       CALL RDCYC          RDCYC(INCYC,INCYC,ADRESS,MRSTS1)
                  ;                          ( A    ,PSW:C, HL    , @HL  )
                  ;                          ( 0    , 0   , 0     , -    )
07AB 3E 04          MVI   A,BADCYC      A = BADCYC
                  ;                     IF INCYC .EQ. TRUE
                  ;                       CYCLE SWITCH SAYS METER NOT HOME
                  ;                       DECLARE DEAD METER, BAD SWITCH
07AD DA 85 10       JC    NVMDED          NVMDED(BADCYC,ERRFLG)
                  ;                              ( A     ,PSW:Z )
                  ;                              ( I     , 0    )
                  ;                     ELSE
                  ;                       CYCLE SWITCH SAYS METER IS HOME
                  ;                       INDICATE TRIP HAS STARTED
07B0 7E             MOV   A,M             A = MRSTS1
07B1 F6 81          ORI   81H             MRSTS1.UNKSEL = TRUE
                  ;                       MRSTS1.QUEREG = TRUE
07B3 77             MOV   M,A
07B4 23             INX   H               HL = ADDRESS, NORFLG
07B5 23             INX   H
07B6 7E             MOV   A,M             NORFLG.TRPREQ = FALSE
07B7 E6 F7          ANI   0F7H
07B9 F6 40          ORI   40H             NORFLG.QUEPOS = TRUE
07BB 77             MOV   M,A
                  ;                       TRIP METER
07BC CD 7C 18       CALL MVTRIP           MVTRIP(ERROR)
                  ;                              ( A    )
                  ;                              ( 0    )
07BF B7             ORA   A               IF ERROR .NE. 0
                  ;                         DECLARE TRIP ERROR
```

```
07C0 C2 80 08   JNZ  FATERR           FATERR(ERROR,ERRFLG)
              ;                              ( A    ,PSW:Z )
              ;                              ( I    , 0    )
              ;                     ELSE
              ;                       TRIP STARTED OK
              ;                       START AC MOTOR TO CONTINUE CYCLE
07C3 21 01 70   LXI  H,PORTA          HL = ADDRESS, PORTA
07C6 7E         MOV  A,M              PORTA = PORTA .AND. HEXEF
07C7 E6 EF      ANI  0EFH
07C9 77         MOV  M,A
07CA F3         DI                    DISABLE INTERRUPT
07CB CD 44 07   CALL DOACCT           ACCOUNT FOR TRIP
              ;                       PREVENT DOUBLE ACCOUNTING
07CE 21 24 74   LXI  H,MRSTS1/2+X     HL = ADDRESS, MRSTS1
07D1 7E         MOV  A,M              MRSTS1.INCYC = TRUE
07D2 F6 02      ORI  2
07D4 77         MOV  M,A
07D5 FB         EI                    ENABLE INTERRUPT
              ;                       CHECK CYCLE SWITCH WHILE NOT HOME
07D6 01 B8 0B   LXI  B,3000           BC = N = 3000 ;FOR 300 MSEC LOOP
              DOTR01;                 LOOP
07D9 CD AF 0B   CALL RDCYC              RDCYC(INCYC,INCYC,ADRESS,MRSTS1)
              ;                               ( A   ,PSW:C, HL   , @HL  )
              ;                               ( 0   , 0   , 0    , -    )
              ;                         IF INCYC .EQ. TRUE
07DC DA ED 07   JC   DOTR02               BREAK
              ;                         ENDIF
07DF CD 19 0B   CALL NPAUSE             NPAUSE(N  ,ZROFLG)
              ;                                (BC ,PSW:Z )
              ;                                (I/O, 0    )
07E2 C2 D9 07   JNZ  DOTR01             IF N .EQ. 0
              ;                           TIMEOUT
              ;                           CYC SWT SAYS MOTOR STILL HOME
              ;                           FATAL ERROR, NOT IN CYCLE
07E5 3E 18      MVI  A,NINCYC             A = NINCYC
07E7 CD 80 08   CALL FATERR               FATERR(NINCYC,ERRFLG)
              ;                                  ( A    ,PSW:Z )
              ;                                  ( I    , 0    )
07EA C3 A0 08   JMP  FINTRP               TRY TO DRIVE METER HOME
              ;                           RETURN
              ;                         ENDIF
              DOTR02;                 ENDLOOP
              ;                       CYCLE SWITCH SAYS CYCLE STARTED
              ;                       MOVE FROM TRIP TO LOCK
07ED CD 96 18   CALL MVLOCK           MVLOCK(ERROR)
              ;                              ( A   )
              ;                              ( 0   )
07F0 B7         ORA  A                IF ERROR .NE. 0
              ;                         DECLARE LOCK ERROR
07F1 C4 80 08   CNZ  FATERR             FATERR(ERROR,ERRFLG)
              ;                                ( A   ,PSW:Z )
              ;                                ( I   , 0    )
              ;                       ENDIF
              ;                       CHECK CYCLE SWITCH WHEN HOME AGAIN
07F4 01 10 27   LXI  B,10000          BC = N = 10000 ;FOR 1 SEC LOOP
              DOTR03;                 LOOP
07F7 CD AF 0B   CALL RDCYC              RDCYC(INCYC,INCYC,ADRESS,MRSTS1)
              ;                               ( A   ,PSW:C, HL   , @HL  )
              ;                               ( 0   , 0   , 0    , -    )
              ;                         IF INCYC .EQ. FALSE
07FA D2 0D 08   JNC  DOTR04               BREAK
              ;                         ENDIF
07FD CD 19 0B   CALL NPAUSE             NPAUSE(N  ,ZROFLG)
              ;                                (BC ,PSW:Z )
              ;                                (I/O, 0    )
0800 C2 F7 07   JNZ  DOTR03             IF N .EQ. 0
              ;                           TIMEOUT
```

```
                    ;                             CYC SWT SAYS MOTOR NOT HOME
0803 E5               PUSH H                      SAVE HL
0804 CD D0 08         CALL FINTR4                 FATAL ERROR, SLOW TRIP
0807 E1               POP  H                      RESTORE HL
0808 3E FB            MVI  A,0FBH                 A = MASK, WILL SET:
                    ;                             MRSTS1.ENABLD = FALSE
080A C3 0F 08         JMP  DOTR05                 DISABLE METER
                    ; >>JUMP AHEAD<<              STOP AC MOTOR
                    ;                             RETURN
                    ;                           ENDIF
                    DOTR04;                   ENDLOOP
                    ;                         CYCLE SWITCH SAYS METER CAME HOME
                    ;                         INDICATE TRIP COMPLETION
080D 3E 7B            MVI  A,7BH              A = MASK, WILL SET:
                    ;                         MRSTS1.ENABLD = FALSE
                    ;                         MRSTS1.UNKSEL = FALSE
                    DOTR05;                   >>TARGET OF JUMP AHEAD<<
                    ;                         UPDATE MRSTS1 ACCORDING TO MASK
080F A6               ANA  M                  MRSTS1 = MASK .AND. MRSTS1
0810 77               MOV  M,A
                    DOTR06;                   ****ALTERNATE ENTRY POINT
                    ;                         STOP AC MOTOR
0811 21 01 70         LXI  H,PORTA            HL = ADDRESS, PORTA
0814 7E               MOV  A,M                PORTA = PORTA .OR. HEX10
0815 F6 10            ORI  10H
0817 77               MOV  M,A
                    ;                       ENDIF
                    ;                     ENDIF
0818 C9               RET                 RETURN
ENDENT

                    ;ENDENT(ERRFLG)(NORFLG)
                    ;      (BIT   )(BITSTR)
                    ;      ( 0    )( I    )
                    ;      (PSW:Z )( RAM  )
                    ;      ( C    )( NC   )
                    ;
                    ;PSW DESTROYED
                    ;REGISTERS DESTROYED
                    ;
                    ;PROCESS END OF ENTRY HEADER
                    ;
                    ENDENT;               ****ENTRY POINT
0819 3A 26 74         LDA  NORFLG/2+X     IF(NORFLG.CMBIN .AND.
                    ;                        NORFLG.AMTIN) .NE. TRUE
081C 2F               CMA
081D E6 30            ANI  30H
                    ;                       PROCEEDURAL ERROR
081F C2 A1 0B         JNZ  PROERR           PROERR(ERRFLG)
                    ;                             (PSW:Z )
                    ;                             ( 0    )
                    ;                     ELSE
0822 CD 4E 0F         CALL LSTATE           LSTATE(FATMOD,NORMOD,SERMOD,PRVMOD)
                    ;                             (PSW:S ,PSW:Z ,PSW:P ,PSW:CY)
                    ;                             ( 0    , 0    , 0    , 0    )
                    ;                       IF SERMOD .EQ. TRUE
                    ;                         SERVICE MODE END OF ENTRY
0825 EA 63 0C         JPE  SEREOE             SEREOE(ERRFLG)
                    ;                               (PSW:Z )
                    ;                               ( 0    )
                    ;                       ELSE
                    ;                       IF PRVMOD .EQ. TRUE
                    ;                         MANUAL RESET
0828 DA E9 09         JC   MANRST             MANRST(ERRFLG)
                    ;                               (PSW:Z )
                    ;                               ( 0    )
                    ;                       ELSE
```

```
                  ;                       VARIABLE REMOTE RESET
082B C3 BE 13      JMP  VRMRS             VRMRS(ERRFLG)
                  ;                              (PSW:Z )
                  ;                              ( 0    )
                  ;                         ENDIF
                  ;                       ENDIF
ENTAMT

                  ;ENTAMT/ENTCMB(MSGBUF)(AMTBUF,CMBBUF,NORFLG)
                  ;              (NIBSTR)(NIBSTR,NIBSTR,BITSTR)
                  ;              ( I    )( O    , O    , O    )
                  ;              ( @B   )( RAM  , RAM  , RAM  )
                  ;              ( NC   )( C    , C    , C    )
                  ;REGISTERS DESTROYED
                  ;PSW DESTROYED
                  ;
                  ;MOVE FIELD, FORMAT AND VALUE
                  ;FROM MESSAGE BUFFER TO APPROPRIATE RESET BUFFER
                  ;
                  ENTAMT;                 ****ENTRY POINT FOR RESET AMOUNT
082E 0E E0         MVI  C,AMTBUF          C = OFFSET, DEST = OFFSET, AMTBUF
                  ;                       SET TO SET NORFLG.AMTIN = TRUE
0830 3E 10         MVI  A,10H             A = MASK = HEX10
0832 C3 39 08      JMP  ENTCM1
                  ; >>JUMP AHEAD<<
                  ENTCMB;                 ****ENTRY POINT FOR RESET COMBINATION
0835 0E F0         MVI  C,CMBBUF          C = OFFSET, DEST = OFFSET, CMBBUF
                  ;                       SET TO SET NORFLG.CMBIN = TRUE
0837 3E 20         MVI  A,20H             A = MASK = HEX20
                  ENTCM1;                 >>TARGET OF JUMP AHEAD<<
0839 21 26 74      LXI  H,NORFLG/2+X      HL = ADDRESS, NORFLG
                  ;                       UPDATE FLAG
083C B6            ORA  M                 NORFLG = NORFLG .OR. MASK
083D 77            MOV  M,A
                  ;                       FETCH COUNT FROM MESSAGE FORMAT
083E CD 35 0F      CALL GETNIB            GETNIB(CNT,ZERO,MSGBUF)
                  ;                              ( A ,PSW:Z, @B  )
                  ;                              ( O , O   , I   )
                  ;                       INCLUDE LEAD ZERO AND FORMAT IN COUNT
0841 C6 03         ADI  3                 CNT = (CNT+3) .AND. HEXFE
0843 E6 FE         ANI  0FEH
                  ;                       MOVE MESSAGE TO DESTINATION BUFFER
0845 C3 B3 0F      JMP  MVLNIB            MVLNIB(DEST,MSGBUF,CNT,PSW)
                  ;                              ( @C , @B   , A ,PSW)
                  ;                              ( O  , I    , I , O )
                  ;                       RETURN
ENTSER

                  ;ENTSER()(MRSTS1)
                  ;        (BITSTR)
                  ;        ( O    )
                  ;        ( RAM  )
                  ;        ( C    )
                  ;
                  ;PSW DESTROYED
                  ;REGISTERS DESTROYED
                  ;
                  ;ENTER SERVICE MODE
                  ;
                  ENTSER;                 ****ENTRY POINT
0848 21 24 74      LXI  H,MRSTS1/2+X      HL = ADDRESS, MRSTS1
084B 7E            MOV  A,M               MRSTS1.SERMOD = TRUE
084C F6 08         ORI  08H
084E E6 FB         ANI  0FBH              MRSTS1.ENABLD = FALSE
0850 77            MOV  M,A
0851 C9            RET                    RETURN
```

EXTSER

```
                   ;EXTSER()(MRSTS1,NORFLG)
                   ;        (BITSTR,BITSTR)
                   ;        ( O    , O    )
                   ;        ( RAM  , RAM  )
                   ;        ( C    , C    )
                   ;
                   ;PSW DESTROYED
                   ;REGISTERS DESTROYED
                   ;
                   ;EXIT SERVICE MODE
                   ;
                   EXTSER;              ****ENTRY POINT
0852 21 24 74        LXI  H,MRSTS1/2+X  HL = ADDRESS, MRSTS1
0855 7E              MOV  A,M           MRSTS1.SERMOD = FALSE
0856 E6 F7           ANI  0F7H
0858 77              MOV  M,A
0859 23              INX  H             HL = ADDRESS, NORFLG
085A 23              INX  H
085B 7E              MOV  A,M           NORFLG.COMDSB = FALSE
085C E6 FB           ANI  0FBH
085E 77              MOV  M,A
085F C9              RET                RETURN
```

EXTTRP

```
                   ;EXTTRP()(KDCTRL,MRSTS1,MTRCHR,SERFLG)
                   ;        (BITSTR,BITSTR,BITSTR,BITSTR)
                   ;        ( I    , I    , I    , I    )
                   ;        ( RAM  , RAM  , RAM  , RAM  )
                   ;        ( NC   , NC   , NC   , NC   )
                   ;
                   ;REGISTERS DESTROYED
                   ;PSW DESTROYED
                   ;
                   ;INITIATE TRIP IN RESPONSE TO EXTERNAL MESSAGE
                   ;
                   EXTTRP;              ****ENTRY POINT
                   ;                    SET TO REACH PROERR VIA RETURN
0860 21 A1 0B        LXI  H,PROERR
0863 E5              PUSH H
0864 3A 27 74        LDA KDCTRL/2+X     PSW:CY = KDCTRL.KBDDSB
0867 1F              RAR
                   ;                    IF KDCTRL.KBDDSB .EQ. FALSE
                   ;                      KEYBOARD HAS NOT BEEN DISABLED
0868 D0              RNC                  PROERR(ERRFLG)
                   ;                    ELSE
0869 21 24 74        LXI  H,MRSTS1/2+X  HL = ADDRESS, MRSTS1
086C 7E              MOV  A,M           PSW:Z =DISABL=MRSTS1.ENABLD .EQ. FALSE
086D E6 04           ANI  4
                   ;                    IF DISABL .EQ. TRUE
                   ;                      METER IS DISABLED
086F C8              RZ                   PROERR(ERRFLG)
                   ;                    ELSE
0870 2B              DCX  H               HL = ADDRESS, MTRCHR
0871 3A 10 74        LDA  SERFLG/2+X      A.2 = (.NOT. SERFLG.SNOLCK) .OR.
                   ;                            MTRCHR.TRPCTL
0874 17              RAL
0875 2F              CMA
0876 B6              ORA  M
0877 E6 20           ANI  20H             PSW:Z = TRPLCK = A.2 .EQ. FALSE
                   ;                      IF TRPLCK .EQ. TRUE
                   ;                        RESPONSE TO EXT TRIP IS FORBIDDEN
0879 C8              RZ                     PROERR(ERRFLG)
                   ;                      ELSE
                   ;                        EXTERNAL TRIPPING ALLOWED
087A E1              POP  H                 CLEAN UP STACK
```

```
087B C3 A5 07   JMP  DOTRIP            TRIP METER
                ;                    ENDIF
                ;                   ENDIF
                ;                   RETURN
FATERR

                ;FATERR(CODE,ERRFLG)(MRSTS2,ERRCOD,NORFLG,ERRCNT)
                ;      (BYTE,BIT   )(BITSTR,BYTE  ,BITSTR,NIBSTR)
                ;      ( I  , 0    )( 0     , 0    , 0    , 0    )
                ;      ( A  ,PSW:Z )( RAM   , RAM  , RAM  , RAM  )
                ;      ( C  , C    )( C     , C    , C    , C    )
                ;
                ;PSW DESTROYED
                ;REGISTERS DESTROYED
                ;
                ;PROCESS FATAL ERROR
                ;
                FATINT;             ****ENTRY POINT FROM INTERRUPT VECTOR
                ;                   INDICATE WATCHDOG INTERRUPT OR
                ;                   INCORRECTLY ENABLED TEST INTERRUPT
087E 3E 17      MVI  A,BARF         A = BARF
                FATERR;             ****ENTRY POINT
0880 21 25 74   LXI  H,MRSTS2/2+X   HL = ADDRESS, MRSTS2
0883 46         MOV  B,M            IF MRSTS2.FATMOD .EQ. FALSE
0884 04         INR  B
0885 FA 9E 08   JM   FATE01
0888 32 0A 74   STA  ERRCOD/2+X       ERRCOD = CODE
088B 7E         MOV  A,M              MRSTS2.FATMOD = TRUE
088C F6 80      ORI  80H
088E 77         MOV  M,A
088F 23         INX  H                HL = ADDRESS, NORFLG
0890 7E         MOV  A,M              NORFLG.QUESTS = TRUE
0891 F6 80      ORI  80H
0893 77         MOV  M,A
0894 21 0B 74   LXI  H,ERRCNT/2+X     HL = ADDRESS, ERRCNT
0897 7E         MOV  A,M              ERRCNT[0..1] = ERRCNT[0..1]+1
0898 3C         INR  A
0899 27         DAA
089A 77         MOV  M,A
089B CD 64 04   CALL PERDSP           MAKE ERROR DISPLAY
                FATE01;             ENDIF
089E AF         XRA  A              PSW:Z = ERRFLG = TRUE
089F C9         RET                 RETURN
FINTRP

                ;FINTRP()(MRSTS1,PORTA )
                ;        (BITSTR,BITSTR)
                ;        ( 0    , 0    )
                ;        ( RAM  , 7001 )
                ;        ( C    , C    )
                ;
                ;REGISTERS DESTROYED
                ;PSW DESTROYED
                ;
                ;ATTEMPT TO DRIVE METER HOME
                ;
                FINTRP;             ****ENTRY POINT
                ;                   START AC MOTOR
08A0 21 01 70   LXI  H,PORTA        HL = ADDRESS, PORTA
08A3 7E         MOV  A,M            PORTA = PORTA .AND. HEXEF
08A4 E6 EF      ANI  0EFH
08A6 77         MOV  M,A
                ;                   DRIVE METER FOR 0.2 SEC. TO INSURE
                ;                   THAT METER AT START OF TRIP CYCLE IS
                ;                   DRIVEN FAR ENOUGH TO MAKE THE CYCLE
                ;                   SWITCH AGREE WITH THE METER STATE.
08A7 01 D0 07   LXI  B,2000         BC = N = 2000; FOR 0.2 SEC. LOOP
```

```
                 FINTR1;                 DO UNTIL N .EQ. 0
08AA CD 19 0B      CALL NPAUSE             NPAUSE(N  ,ZROFLG)
                 ;                               (BC ,PSW:Z )
                 ;                               (I/O, 0    )
08AD C2 AA 08      JNZ  FINTR1
                 ;                       ENDDO
                 ;                       NOW DRIVE METER HOME
08B0 01 40 1F      LXI  B,8000           BC = N = 8000; FOR 0.8 SEC. LOOP
                 FINTR2;                 LOOP
                 ;                         READ CYCLE SWITCH
08B3 CD AF 0B      CALL RDCYC              RDCYC(INCYC,INCYC,ADRESS,MRSTS1)
                 ;                              ( A   ,PSW:C, HL   , @HL  )
                 ;                              ( 0   , 0   , 0    , -    )
                 ;                         IF INCYC .EQ. FALSE
08B6 D2 BF 08      JNC  FINTR3               BREAK
                 ;                         ENDIF
08B9 CD 19 0B      CALL NPAUSE             NPAUSE(N  ,ZROFLG)
                 ;                               (BC ,PSW:Z )
                 ;                               (I/O, 0    )
08BC C2 B3 08      JNZ  FINTR2             IF N .EQ. 0
                 ;                           BREAK
                 ;                         ENDIF
                 FINTR3;                 ENDLOOP
08BF CD 11 08      CALL DOTR06           STOP AC MOTOR
                 ;                       READ CYCLE SWITCH
08C2 CD AF 0B      CALL RDCYC            RDCYC(INCYC,INCYC,ADRESS,MRSTS1)
                 ;                            ( A   ,PSW:C, HL   , @HL  )
                 ;                            ( 0   , 0   , 0    , -    )
08C5 F5            PUSH PSW              SAVE A, PSW
                 ;                       COPY INCYC INTO MRSTS1
08C6 E6 82         ANI  82H
08C8 57            MOV  D,A
08C9 7E            MOV  A,M
08CA E6 7D         ANI  7DH
08CC B2            ORA  D
FINTRP

08CD 77            MOV  M,A              MRSTS1.UNKSEL = INCYC
                 ;                       MRSTS1.INCYC  = INCYC
08CE F1            POP  PSW              RESTORE A, PSW
08CF D0            RNC                   IF INCYC .EQ. TRUE
                 ;                         CYC SWT SAYS METER DIDN'T COME HOME
                 FINTR4;                   ****ALTERNATE ENTRY POINT
                 ;                         FATAL ERROR, SLOW TRIP
08D0 3E 08         MVI  A,TRPTIM           A = TRPTIM
08D2 C3 80 08      JMP  FATERR             FATERR(TRPTIM,ERRFLG)
                 ;                               ( A    ,PSW:Z )
                 ;                               ( I    , 0    )
                 ;                       ENDIF
                 ;                       RETURN
HDRONY

                 ;HDRONY(HEADER,ERRFLG)(NORFLG,XMTBUF)
                 ;      (BYTE  ,BIT   )(BITSTR,NIBSTR)
                 ;      ( I    , 0    )( 0    , I    )
                 ;      ( A    ,PSW:Z )( RAM  , RAM  )
                 ;      ( NC   , C    )( C    , NC   )
                 ;
                 ;REGISTERS DESTROYED
                 ;PSW DESTROYED
                 ;
                 ;INITIATE PROCESSING  RELATED TO HEADERS WHICH CONSIST
                 ;OF A HEADER NOT FOLLOWED BY DATA
                 ;
                 HDRONY;                 ****ENTRY POINT
08D5 B7            ORA  A                PSW:Z = ERRFLG = HEADER .EQ. HEX00
08D6 F5            PUSH PSW              SAVE A, PSW
```

```
08D7 21 1F 09   LXI  H,HDR002       SET TO RETURN TO ENDCASE
08DA E5         PUSH H
               ;                    CASE (HEADER)
08DB FE 41      CPI  HENABL           **41: ENABLE METER
08DD CA F3 05   JZ   CMDENB
08E0 FE 42      CPI  HDISAB           **42: DISABLE METER
08E2 CA CD 05   JZ   CMDDSB
08E5 FE 46      CPI  HSETSV           **46: ENTER SERVICE MODE
08E7 CA 48 08   JZ   ENTSER
08EA FE 47      CPI  HCLRSV           **47: EXIT SERVICE MODE
08EC CA 52 08   JZ   EXTSER
08EF FE 4E      CPI  HEXTRP           **4E: EXTERNAL TRIP
08F1 CA 60 08   JZ   EXTTRP
08F4 FE 50      CPI  HREQST           **50: STATUS REQUEST
08F6 C8         RZ                          CONTINUE
08F7 FE 62      CPI  HENAKB           **62: ENABLE KEYBOARD
08F9 CA 14 0F   JZ   ENAKBD
08FC FE 63      CPI  HDISKB           **63: DISABLE KEYBOARD
08FE CA 02 0F   JZ   DSBKBD
0901 21 1C 09   LXI  H,HDR001         SET TO RETURN TO ALTERNATE ENDCASE
0904 E3         XTHL
0905 FE 40      CPI  HREQAC           **40: ACCESS CODE REQUEST
0907 CA EE 12   JZ   ACCODE                 ACCODE(ERRFLG)
               ;                                  (PSW:Z )
               ;                                  ( 0    )
090A FE 43      CPI  HENDEN           **43: END OF ENTRY
090C CA 19 08   JZ   ENDENT                 ENDENT(ERRFLG)
               ;                                  (PSW:Z )
               ;                                  ( 0    )
090F FE 51      CPI  HREQPO           **51: SELECTION VALUE REQUEST
0911 CA 48 0C   JZ   SELVAL                 SELVAL(ERRFLG)
               ;                                  (PSW:Z )
               ;                                  ( 0    )
0914 FE 5C      CPI  HREQSN           **5C: SERIAL NUMBER REQUEST
0916 CA 8D 06   JZ   DBLH01                 DBLH01(TRUE ,ERRFLG)
               ;                                  (PSW:Z,PSW:Z )
               ;                                  ( I   , 0    )
               ;                      **ELSE: DOUBLY DEFINED HEADER
0919 C3 71 06   JMP  DBLHDR                 DBLHDR(HEADER,ERRFLG)
               ;                                  ( A    ,PSW:Z )
               ;                                  ( I    , 0    )
               HDR001;                ALTERNATE ENDCASE, SAVES NEW ERRFLG
HDRONY

               ;                      PSW:Z = ERRFLG
091C C1         POP  B                A = HEADER
091D 78         MOV  A,B
091E F5         PUSH PSW              SAVE A, PSW
               HDR002;              ENDCASE
091F 21 26 74   LXI  H,NORFLG/2+X   HL = ADDRESS, NORFLG
0922 3A 50 74   LDA  XMTBUF/2+X     IF XMTBUF[0..1] .EQ. 0
0925 B7         ORA  A
0926 C2 2D 09   JNZ  HDR003
               ;                      QUE DEFAULT STATUS MESSAGE
0929 7E         MOV  A,M              NORFLG.QUESTS = TRUE
092A F6 80      ORI  80H
092C 77         MOV  M,A
               HDR003;              ENDIF
092D F1         POP  PSW            A = HEADER
092E F5         PUSH PSW
092F FE 42      CPI  HDISAB         IF HEADER .NE. HDISAB
0931 CA 3F 09   JZ   HDR005
0934 E6 F0      ANI  0F0H             IF (HEADER .AND. HEXF0) .NE. HEX50
0936 FE 50      CPI  50H
0938 CA 3F 09   JZ   HDR004
               ;                        CANCEL ANY RESET IN PROGRESS
093B 7E         MOV  A,M
```

```
     093C E6 CF       ANI  0CFH
     093E 77          MOV  M,A                  NORFLG.CMBIN = FALSE
                                                NORFLG.AMTIN = FALSE
                     ;                        ENDIF
                     HDR004;                  ENDIF
                     HDR005;
     093F F1          POP  PSW             A = HEADER
                     ;                     PSW:Z = ERRFLG
     0940 C9          RET                  RETURN
HDRPLS

                     ;HDRPLS(HEADER,MSGBUF,ERRFLG)(NORFLG)
                     ;      (BYTE  ,NIBSTR,BIT   )(BITSTR)
                     ;      ( I    , I    , O    )( O     )
                     ;      ( A    , @B   ,PSW:Z )( RAM   )
                     ;      ( NC   , NC   , C    )( C     )
                     ;
                     ;REGISTERS DESTROYED
                     ;PSW DESTROYED
                     ;
                     ;INITIATE PROCESSING RELATED TO HEADERS WHICH CONSIST
                     ;OF A HEADER ASSOCIATED WITH DATA
                     ;
                     HDRPLS;               ****ENTRY POINT
     0941 B7          ORA  A               PSW:Z = ERRFLG = HEADER .EQ. HEX00
     0942 F5          PUSH PSW             SAVE A, PSW
     0943 21 26 74    LXI  H,NORFLG/2+X    HL = ADDRESS, NORFLG
                     ;                     CHECK FOR INTERRUPTED RESET SEQUENCE
     0946 FE C5       CPI  HENTAM          IF HEADER .NE. HENTAM
     0948 CA 54 09    JZ   HDRP02
     094B FE C6       CPI  HENTCO            IF HEADER .NE. HENTCO
     094D CA 54 09    JZ   HDRP01
     0950 7E          MOV  A,M
     0951 E6 CF       ANI  0CFH
     0953 77          MOV  M,A                  NORFLG.CMBIN. = FALSE
                     ;                          NORFLG.AMTIN = FALSE
                     HDRP01;                  ENDIF
                     HDRP02;               ENDIF
                     ;                     QUE STATUS MESSAGE
     0954 7E          MOV  A,M             NORFLG.QUESTS = TRUE
     0955 F6 80       ORI  80H
     0957 77          MOV  M,A
     0958 F1          POP  PSW             A = HEADER
     0959 F5          PUSH PSW
     095A 21 7C 09    LXI  H,HDRP04        SET TO RETURN TO ENDCASE
     095D E5          PUSH H
                     ;                     CASE (HEADER)
     095E FE C5       CPI  HENTAM            **C5: ENTER AMOUNT
     0960 CA 2E 08    JZ   ENTAMT                  ENTAMT(MSGBUF)
                     ;                                    ( @B    )
                     ;                                    ( I     )
     0963 FE C6       CPI  HENTCO            **C6: ENTER COMBINATION
     0965 CA 35 08    JZ   ENTCMB                  ENTCMB(MSGBUF)
                     ;                                    ( @B    )
                     ;                                    ( I     )
     0968 21 79 09    LXI  H,HDRP03          SET TO RETURN TO ALTERNATE ENDCASE
     096B E3          XTHL
     096C FE C0       CPI  HSETMN            **C0: ENTER SERIAL NUMBER
     096E CA 38 0A    JZ   MSERNO                  MSERNO(MSGBUF,ERRFLG)
                     ;                                    ( @B    ,PSW:Z )
                     ;                                    ( I     , O    )
     0971 FE C1       CPI  HSETPO            **C1: SET POSTAGE
     0973 CA 9F 0C    JZ   SETPOS                  SETPOS(MSGBUF,ERRFLG)
                     ;                                    ( @B    ,PSW:Z )
                     ;                                    ( I     , O    )
                     ;                       **ELSE: PROCESS ERROR
     0976 C3 A1 0B    JMP   PROERR                 PROERR(ERRFLG)
                     ;                                    (PSW:Z )
```

```
HDRPLS

                    ;                                   ( O     )
                    HDRP03;               ALTERNATE ENDCASE, SAVES NEW ERRFLG
     0979 C1          POP  B                A = HEADER
     097A 78          MOV  A,B              PSW:Z = ERRFLG
     097B F5          PUSH PSW              SAVE A, PSW
                    HDRP04;               ENDCASE
     097C F1          POP  PSW            A = HEADER
                    ;                     PSW:Z = ERRFLG
     097D C9          RET                 RETURN
IDLE

                    ;IDLE()(CTLBKT,KDCTRL,MRSTS1,NORFLG,RECBUF,XMTBUF)
                    ;      (BYTE  ,BITSTR,BITSTR,BITSTR,BYTSTR,BYTSTR)
                    ;      ( I    , I    , I/O  , I    , I    , I     )
                    ;      ( RAM  , RAM  , RAM  , RAM  , RAM  , RAM   )
                    ;      ( NC   , NC   , C    , NC   , NC   , NC    )
                    ;
                    ;MAINLINE IDLE LOOP
                    ;
                    IDLE;                 LOOP
     097E FB          EI                    ENABLE INTERRUPTS
                    ;                       SET TO RESTART LOOP
     097F 21 7E 09    LXI  H,IDLE           HL = ADDRESS, IDLE
     0982 E5          PUSH H                PUSH HL, USED BY RETURN STATEMENTS
                    ;                       UPDATE METER STATUS:
     0983 CD 78 07    CALL DOSTAT           WITH RESPECT TO SWITCHES/SENSORS
     0986 CD 23 0B    CALL POSUPD           WITH RESPECT TO POSTAGE SETTING
     0989 CD 68 10    CALL NVMCHG           WITH RESPECT TO NONVOLATILE MEMORY
     098C 3A 50 74    LDA  XMTBUF/2+X       A = XMTBUF[0]
     098F B7          ORA  A                IF XMTBUF[0] .NE. 0
     0990 C2 15 0E    JNZ  XMIT               TRANSMIT MESSAGE
                    ;                       ELSE
     0993 3A 26 74    LDA  NORFLG/2+X       A = NORFLG
     0996 4F          MOV  C,A              C = NORFLG
     0997 17          RAL                   PSW:CY = NORFLG.QUESTS
                    ;                       IF NORFLG.QUESTS .EQ. TRUE
     0998 DA F4 0A    JC   MTRSTS             TRANSMIT METER STATUS
                    ;                       ELSE
     099B 17          RAL                   PSW:CY = NORFLG.QUEPOS
     099C D2 A4 09    JNC  IDLE01           IF NORFLG.QUEPOS .EQ. TRUE
                    ;                         REQUEST POSTAGE SETTING
     099F 3E 51       MVI  A,HREQPO           A = HREQPO
     09A1 C3 C7 0D    JMP  XEQHDR             XEQHDR(HREQPO,ERRFLG)
                    ;                               ( A    ,PSW:Z )
                    ;                               ( I    , O     )
                    IDLE01;
                    ;                       ELSE
     09A4 CD 4E 0F    CALL LSTATE           LSTATE(FATMOD,NORMOD,SERMOD,PRVMOD)
                    ;                             (PSW:S ,PSW:Z ,PSW:P ,PSW:CY)
                    ;                             ( O    , O    , O    , O     )
     09A7 C2 D1 09    JNZ  IDLE03           IF NORMOD .EQ. TRUE
     09AA 21 24 74    LXI  H,MRSTS1/2+X       HL = ADDRESS, MRSTS1
     09AD 7E          MOV  A,M                PSW:CY = MRSTS1.QUEREG
     09AE 1F          RAR
     09AF D2 D1 09    JNC  IDLE02             IF MRSTS1.QUEREG .EQ. TRUE
                    ;                           TRIP HAS COMPLETED NORMALLY
     09B2 B7          ORA  A                    MRSTS1.QUEREG = FALSE
     09B3 17          RAL
     09B4 77          MOV  M,A
     09B5 21 2B 74    LXI  H,CTLBKT/2+X         HL = ADDRESS, CTLBKT
     09B8 3E 41       MVI  A,41H                PSW:Z = CTLBKT .EQ. HEX41
     09BA AE          XRA  M
     09BB 3E 52       MVI  A,HREQAR             A = HREQAR
                    ;                           IF CTLBKT .EQ. HEX41
                    ;                             REQUEST ASCENDING REGISTER
```

```
09BD CA C7 0D   JZ    XEQHDR              XEQHDR(HREQAR,ERRFLG)
                ;                                ( A    ,PSW:Z )
                ;                                ( I    , O    )
IDLE

                ;                         ELSE
09C0 3E 31        MVI  A,31H              PSW:Z = CTLBKT .EQ. HEX31
09C2 AE           XRA  M
09C3 3E 53        MVI  A,HREQDR           A = HREQDR
                ;                         IF CTLBKT .EQ. HEX31
                ;                           REQUEST DESCENDING REGISTER
09C5 CA C7 0D     JZ   XEQHDR               XEQHDR(HREQDR,ERRFLG)
                ;                                ( A    ,PSW:Z )
                ;                                ( I    , O    )
                ;                         ELSE
09C8 3E 21        MVI  A,21H              PSW:Z = CTLBKT .EQ. HEX21
09CA AE           XRA  M
09CB 3E 55        MVI  A,HREQPC           A = HREQPC
                ;                         IF CTLBKT .EQ. HEX21
                ;                           REQUEST PIECE COUNT
09CD CA C7 0D     JZ   XEQHDR               XEQHDR(HREQPC,ERRFLG)
                ;                                ( A    ,PSW:Z )
                ;                                ( I    , O    )
                ;                         ENDIF
09D0 C9           RET
                IDLE02;                 ENDIF
                IDLE03;               ELSE
09D1 3A 48 74     LDA  RECBUF/2+X     A = RECBUF[0]
09D4 B7           ORA  A              IF RECBUF[0] .NE. 0
09D5 C2 EE 09     JNZ  MESAGE           PROCESS MESSAGE
                ;                     ELSE
09D8 3E 08        MVI  A,08H          PSW:Z = NORFLG.TRPREQ .EQ. FALSE
09DA A1           ANA  C
09DB CA E6 09     JZ   IDLE04         IF NORFLG.TRPREQ .EQ. TRUE
09DE 3A 27 74     LDA  KDCTRL/2+X       PSW:CY = KDCTRL.KBDDSB
09E1 1F           RAR
                ;                       IF KDCTRL.KBDDSB .EQ. FALSE
09E2 D2 A5 07     JNC  DOTRIP             PROCESS TRIP REQUEST
                ;                       ENDIF
09E5 C9           RET
                IDLE04;               ELSE
09E6 C3 2E 03     JMP  KEYBRD           PROCESS KEYBOARD
                ;                     ENDIF
                ;                   ENDLOOP
MANRST

                ;MANRST
                ;
                ;REGISTERS DESTROYED
                ;PSW DESTROYED
                ;
                ;MANUAL METER RESET
                ;
                MANRST;             ****ENTRY POINT
                ;                   DECLARE SOFTWARE ERROR
09E9 3E 02        MVI  A,SFTWRE     A = SFTWRE
09EB C3 80 08     JMP  FATERR       FATERR(SFTWRE,ERRFLG)
                ;                          ( A    ,PSW:Z )
                ;                          ( I    , O    )
                ;                   RETURN
MESAGE

                ;MESAGE()(RECBUF,XMTBUF,DBUF  )
                ;        (NIBSTR,NIBSTR,NIBSTR)
                ;        ( I/O  , I    , O    )
                ;        ( RAM  , RAM  , RAM  )
                ;        ( C    , NC   , C    )
```

```
                    ;
                    ;PSW DESTROYED
                    ;REGISTERS DESTROYED
                    ;
                    ;PROCESS MESSAGE RECEIVED FROM EXTERNAL DEVICE
                    ;
                    MESAGE;                 ****ENTRY POINT
                    ;                       REMEMBER IF XMTBUF CLEAR ON ENTRY
09EE 3A 50 74         LDA  XMTBUF/2+X       PSW:Z = XMTCLR = XMTBUF[0..1] .EQ. 0
09F1 B7               ORA  A
09F2 F5               PUSH PSW              SAVE A, PSW
09F3 21 48 74         LXI  H,RECBUF/2+X     HL = ADDRESS, RECBUF[0..1]
                    ;                       FETCH MESSAGE SIZE, IN BYTES
09F6 4E               MOV  C,M              C = SIZE = RECBUF[0..1]
                    ;                       FLAG MESSAGE AS PROCESSED
09F7 36 00            MVI  M,0              RECBUF[0..1] = 0
09F9 23               INX  H                HL = ADDRESS, RECBUF[2..3]
09FA 0D               DCR  C                C = SIZE-1
09FB C2 1A 0A         JNZ  MESAG3           IF (SIZE-1) .EQ. 0
09FE 7E               MOV  A,M                A = HEADER = RECBUF[2..3]
                    ;                         PROCESS MESSAGE WITHOUT DATA
09FF CD D5 08         CALL HDRONY             HDRONY(HEADER,ERRFLG)
                    ;                               ( A    ,PSW:Z )
                    ;                               ( I    , O    )
0A02 CA 17 0A         JZ   MESAG2             IF ERRFLG .EQ. FALSE
0A05 FE 51            CPI  HREQPO               IF HEADER .EQ. HREQPO
0A07 C2 17 0A         JNZ  MESAG1
                    ;                             REVERT TO SETTING DISPLAY
0A0A 01 80 A2         LXI  B,(XMTBUF+2)*100H+DBUF+0
                    ;                             B = OFFSET, XMTBUF[2]
                    ;                             C = OFFSET, DBUF[0]
0A0D 3A 50 74         LDA  XMTBUF/2+X             A = NIBCNT = XMTBUF[0..1]*2
0A10 87               ADD  A
0A11 CD B3 0F         CALL MVLNIB                 MVLNIB(DBUF[0],XMTBUF[2],NIBCNT,
                    ;                                    ( @C    , @B      , A    ,
                    ;                                    ( O     , I       , I    ,
                    ;
                    ;                                    NONBCD,ZERO )
                    ;                                    PSW:S ,PSW:Z)
                    ;                                     O    , O   )
0A14 CD 5A 05         CALL VALDSP                 DISPLAY CONTENTS OF DBUF
                    MESAG1;                     ENDIF
                    MESAG2;                   ENDIF
0A17 C3 31 0A         JMP  MESAG6
                    MESAG3;                 ELSE
                    ;                         CHECK FORMAT AGAINST MESSAGE SIZE
0A1A 06 94            MVI  B,RECBUF+4         B = OFFSET, RECBUF[4]
0A1C CD 35 0F         CALL GETNIB             GETNIB(NIBCNT,ZERO ,RECBUF[4])
                    ;                               ( A    ,PSW:Z, @B      )
                    ;                               ( O    , O   , I       )
0A1F 3C               INR  A                  A = BYTCNT = (NIBCNT+1)/2
0A20 B7               ORA  A
MESAGE

0A21 1F               RAR
0A22 0D               DCR  C                  C = SIZE-2
0A23 B9               CMP  C                  IF BYTCNT .EQ. (SIZE-2)
0A24 C2 2E 0A         JNZ  MESAG4
                    ;                           PROCESS MESSAGE WITH DATA
0A27 7E               MOV  A,M                  A = HEADER = RECBUF[2..3]
0A28 CD 41 09         CALL HDRPLS               HDRPLS(HEADER,RECBUF[4],ERRFLG)
                    ;                                 ( A    , @B      ,PSW:Z )
                    ;                                 ( I    , I       , O    )
0A2B C3 31 0A         JMP  MESAG5
                    MESAG4;                   ELSE
                    ;                           BAD MESSAGE, PROCEEDURAL ERROR
0A2E CD A1 0B         CALL PROERR               PROERR(ERRFLG)
```

```
                ;                       (PSW:Z )
                ;                       ( 0    )
                MESAG5;                 ENDIF
                MESAG6;               ENDIF
                ;                     CHECK FOR OVERLAY OF TRANSMIT BUFFER
0A31 F1           POP  PSW            PSW:Z = XMTCLR
0A32 3E 12        MVI  A,BUFOVR       A = BUFOVR
                ;                     IF XMTCLR .EQ. FALSE
                ;                       BUFFER OVERLAY, FATAL ERROR
0A34 C4 80 08     CNZ  FATERR           FATERR(BUFOVR,ERRFLG)
                ;                             ( A    ,PSW:Z )
                ;                             ( I    , 0    )
                ;                     ENDIF
0A37 C9           RET                 RETURN
MSERNO

                ;MSERNO(MSGBUF,ERRFLG)(ASCCRC,ASCREG,CTLCRC,DSCCRC,DSCREG,
                ;      (NIBSTR,BIT   )(BYTE  ,NIBSTR,BYTE  ,BYTE  ,NIBSTR,
                ;      ( I    , 0    )( 0    , 0    , 0    , 0    , 0    ,
                ;      ( @B   ,PSW:Z )( RAM  , RAM  , RAM  , RAM  , RAM  ,
                ;      ( NC   , C    )( C    , C    , C    , C    , C    ,
                ;
                ;      ERRCNT,ERRCOD,PCEREG,SERFLG,SERNUM)
                ;      NIBSTR,BYTE  ,NIBSTR,BITSTR,NIBSTR)
                ;       0    , 0    , 0    , I/O  , I/O  )
                ;       RAM  , RAM  , RAM  , RAM  , RAM  )
                ;       C    , C    , C    , C    , C    )
                ;
                ;PSW DESTROYED
                ;REGISTERS DESTROYED
                ;
                ;REDEFINE UNLOCKED SERIAL NUMBER OR
                ;LOCK SERIAL NUMBER TO PREVENT FURTHER REDEFINITION
                ;
                MSERNO;               ****ENTRY POINT
                ;                     SET TO REACH PROERR VIA RETURN
0A38 21 A1 0B     LXI  H,PROERR
0A3B E5           PUSH H
                ;                     CONVERT OFFSET INTO ADDRESS
0A3C 16 74        MVI  D,X/100H       DE = ADDRESS, MSGBUF[0..1]
0A3E AF           XRA  A
0A3F 78           MOV  A,B
0A40 1F           RAR
0A41 5F           MOV  E,A
                ;                     ADJUST OFFSET
0A42 04           INR  B              B = OFFSET, MSGBUF[3]
0A43 04           INR  B
0A44 04           INR  B
                ;                     CHECK FOR VARIOUS ERROR CONDITIONS
0A45 CD 4E 0F     CALL LSTATE         LSTATE(FATMOD,NORMOD,SERMOD,PRVMOD)
                ;                           (PSW:S ,PSW:Z ,PSW:P ,PSW:CY)
                ;                           ( 0    , 0    , 0    , 0    )
                ;                     IF FATMOD .EQ. TRUE
                ;                       METER HAS FATALED
0A48 F8           RM                    PROERR(ERRFLG)
                ;                       RETURN
                ;                     ELSE
                ;                     IF SERMOD .EQ. FALSE
                ;                       METER NOT IN SERVICE MODE
0A49 E0           RPO                   PROERR(ERRFLG)
                ;                       RETURN
                ;                     ELSE
0A4A 3A 10 74     LDA  SERFLG/2+X     PSW:Z = OPEN = SERFLG.SNOLCK .EQ. TRUE
0A4D E6 10        ANI  10H
                ;                     IF OPEN .EQ. FALSE
                ;                       METER NUMBER ALREADY LOCKED
0A4F C0           RNZ                   PROERR(ERRFLG)
```

```
                    ;               RETURN
                    ;             ELSE
0A50 1A              LDAX D       PSW:Z = FMTOK = MSGBUF[0..1].EQ.HEX8F
0A51 FE 8F           CPI  8FH
                    ;             IF FMTOK .EQ. FALSE
                    ;               NOT 8 CHARACTERS WITHOUT DECIMAL
0A53 C0              RNZ            PROERR(ERRFLG)
                    ;               RETURN
                    ;             ELSE
0A54 13              INX  D       DE = ADDRESS, MSGBUF[2..3]
0A55 1A              LDAX D       A = MSGBUF[2..3]
0A56 FE 20           CPI  20H     PSW:CY = CODEOK = MSGBUF[2..3].LT.HEX20
                    ;             IF CODEOK .EQ. FALSE
                    ;               CODE IS NOT 0 OR 1
0A58 D0              RNC            PROERR(ERRFLG)
                    ;               RETURN
                    ;             ENDIF
                    ;             PROCESS ACCORDING TO CODE IN MSGBUF[2]
0A59 FE 10           CPI  10H     PSW:CY = CODE0 = MSGBUF[2..3].LT.HEX10
0A5B 3E 07           MVI  A,7     A = NIBCNT = 7
0A5D D2 6D 0A        JNC MSERN1   IF CODE0 .EQ. TRUE
                    ;               SERIAL NUMBER IS BEING ENTERED
                    ;               CHECK INPUT.DATA
0A60 48              MOV  C,B       C = OFFSET, MSGBUF[3]
0A61 CD B3 0F        CALL MVLNIB    MVLNIB(MSGBUF[3],MSGBUF[3],NIBCNT,
                    ;                      ( @C      , @B      , A    ,
                    ;                      ( O       , I       , I    ,
                    ;
                    ;                      NONBCD,ZROFLG)
                    ;                      PSW:S ,PSW:Z )
                    ;                       0    , 0    )
                    ;               IF NONBCD .EQ. TRUE
                    ;                 BAD INPUT
0A64 F8              RM               PROERR(ERRFLG)
                    ;               ELSE
                    ;                 STORE NEW SERIAL NUMBER
0A65 0E 21           MVI  C,SERNUM    C = OFFSET, SERNUM
0A67 CD B3 0F        CALL MVLNIB      MVLNIB(SERNUM[0],MSGBUF[3],NIBCNT,
                    ;                        ( @C      , @B      , A    ,
                    ;                        ( O       , I       , I    ,
                    ;
                    ;                        NONBCD,ZROFLG)
                    ;                        PSW:S ,PSW:Z )
                    ;                         0    , 0    )
                    ;               ENDIF
0A6A E1              POP  H         CLEAN UP STACK
0A6B 0C              INR  C         PSW:Z = ERRFLG = (C+1).EQ.0 = FALSE
0A6C C9              RET
                    MSERN1;       ELSE
                    ;               SERIAL NUMBER IS BEING LOCKED
                    ;               CHECK INPUT DATA
0A6D 50              MOV  D,B       D = OFFSET, MSGBUF[3]
0A6E 1E 21           MVI  E,SERNUM  E = OFFSET, SERNUM[0]
0A70 CD 8E 0E        CALL CMPARE    CMPARE(MSGBUF[3],SERNUM[0],NIBCNT,
                    ;                      ( @D      , @E      , A    ,
                    ;                      ( I       , I       , I    ,
                    ;
                    ;                      NEGFLG,ZROFLG)
                    ;                      PSW:S ,PSW:Z )
                    ;                       0    , 0    )
                    ;               IF ZROFLG .EQ. FALSE
                    ;                 INPUT DOESN'T MATCH SERIAL NUMBER
0A73 C0              RNZ              PROERR(ERRFLG)
                    ;               ELSE
0A74 CD 9E 12        CALL NVMWR       WRITE NEW ACTIVE SERVICE BLOCK
                    ;                 NO BLOCK IS NOW OPEN
                    ;                 LOCK SERIAL NUMBER
```

```
0A77 21 10 74   LXI  H,SERFLG/2+X        HL = ADDRESS, SERFLG
0A7A 7E         MOV  A,M                 SERFLG.SNOLCK = TRUE
0A7B F6 10      ORI  10H
0A7D 77         MOV  M,A
                ;                        UPDATE DATA FOR NORMAL BLOCK
                ;                        CLEAR PIECE COUNT REGISTER
                ;                        CLEAR ASCENDING REGISTER
                ;                        CLEAR DESCENDING REGISTER
0A7E AF         XRA A                    A = NULL = 0
0A7F 01 28 1A   LXI  B,(4+PCESIZ+DSCSIZ+ASCSIZ)*100H+PCEREG
                ;                        B = NIBCNT = 4+PCESIZ+DSCSIZ+ASCSIZ
                ;                        C = OFFSET, PCEREG
0A82 CD 24 0F   CALL FILNIB              FILNIB(PCEREG,NULL,NIBCNT)
                ;                              ( @C    , A   , B    )
                ;                              ( O     , I   , I    )
                ;                        CLEAR ERROR CODE
0A85 32 0A 74   STA  ERRCOD/2+X          ERRCOD = 0
                ;                        CLEAR ERROR COUNT
0A88 32 0B 74   STA  ERRCNT/2+X          ERRCNT = 0
                ;                        STORE NEW CONTROL SUM CRC
0A8B CD 4E 06   CALL CTLSUM              CTLSUM(CSMCRC,ERRFLG)
                ;                              ( D     ,PSW:Z )
                ;                              ( O     , O    )
0A8E 7A         MOV  A,D                 CTLCRC = CSMCRC
0A8F 32 08 74   STA  CTLCRC/2+X
                ;                        STORE NEW ASCENDING REGISTER CRC
0A92 01 38 08   LXI  B,ASCSIZ*100H+ASCREG
                ;                        B = NIBCNT = ASCSIZ
                ;                        C = OFFSET, ASCREG
0A95 CD B1 0E   CALL CRC                 CRC(ASCREG,NIBCNT,CRCVAL)
                ;                           ( @C    , B     , D     )
0A98 7A         MOV  A,D                 ASCCRC = CRCVAL
0A99 32 20 74   STA  ASCCRC/2+X
                ;                        STORE NEW DESCENDING REGISTER CRC
0A9C 01 2F 07   LXI  B,DSCSIZ*100H+DSCREG
                ;                        B = NIBCNT = DSCSIZ
                ;                        C = OFFSET, DSCREG
0A9F CD B1 0E   CALL CRC                 CRC(DSCREG,NIBCNT,CRCVAL)
                ;                           ( @C    , B     , D     )
                ;                           ( I     , I     , O     )
0AA2 7A         MOV  A,D                 DSCCRC = CRCVAL
0AA3 32 1B 74   STA  DSCCRC/2+X
0AA6 E1         POP  H                   CLEAN UP STACK
                ;                        WRITE NORMAL BLOCK AND
                ;                        OPEN ERASED SERVICE BLOCK
0AA7 C3 19 12   JMP  NVMSTO              NVMSTO(ERRFLG)
                ;                              (PSW:Z )
                ;                              ( O    )
                ;                     ENDIF
                ;                  ENDIF
                ;                  RETURN
MSG2MU

                ;MSG2MU(FMTNIB,DSTSIZ,ERRFLG)(WORK1 ,DEFDCM,DIEDCM)
                ;      (NIBSTR,UBYTE ,BIT   )(NIBSTR,BYTE  ,BYTE  )
                ;      ( I    , I    , O    )( O    , I    , I    )
                ;      ( @B   , D    ,PSW:Z )( RAM  , RAM  , RAM  )
                ;      ( NC   , NC   , C    )( C    , NC   , NC   )
                ;
                ;PSW DESTROYED
                ;REGISTERS DESTROYED
                ;
                ;TRANSFORM FORMAT AND DATA IN MESSAGE FORMAT INTO A  METER
                ;UNIT FORMAT BCD STRING RIGHT JUSTIFIED IN WORK1.
                ;
                MSG2MU;            ****ENTRY POINT
                ;                  CLEAR OUTPUT BLOCK
```

```
0AAA 3E C0       MVI  A,WORK1      A = OFFSET, WORK1[J=0]
0AAC CD 85 0E    CALL CLRBLK       CLRBLK(WORK1)
                ;                        ( @A  )
                ;                        ( 0   )
0AAF 2E 01       MVI  L,1          L = FLAGV = 1; WHICH DECREMENTS TO 0
                ;                  PRODUCING:
                ;                  PSW:Z = ERRFLG = TRUE
                ;                  CALCULATE TOTAL CHARACTER COUNT
                ;                  INCLUDING POSSIBLE LEADING ZERO
                ;                  B = OFFSET, FMTNIB[I=0]
0AB1 CD 35 0F    CALL GETNIB       GETNIB(NTOTAL,ZERO ,FMTNIB[I])
                ;                        ( A    ,PSW:Z, @B       )
                ;                        ( 0    , 0   , I        )
0AB4 3C          INR  A            H = NTOTAL = (NTOTAL+1) .AND. HEXFE
0AB5 E6 FE       ANI  0FEH
0AB7 67          MOV  H,A
                ;                  CALCULATE COUNT OF CHARACTERS TO RIGHT
                ;                  OF DECIMAL POINT
0AB8 04          INR  B            B = OFFSET, FMTNIB[I=1]
0AB9 CD 35 0F    CALL GETNIB       GETNIB(NFRAC,ZERO ,FMTNIB[I])
                ;                        ( A    ,PSW:Z, @B       )
                ;                        ( 0    , 0   , I        )
                ;                  CHECK FOR UNSPECIFIED DECIMAL POSITION
0ABC FE 0F       CPI  0FH          IF NFRAC .EQ. HEX0F
0ABE C2 C4 0A    JNZ  MSG2M1
                ;                    USE DEFAULT DECIMAL POSITION
0AC1 3A 36 74    LDA  DEFDCM/2+X     A = NFRAC = DEFDCM
                MSG2M1;            ENDIF
                ;                  CHECK FOR TOO MANY FRACTIONAL DIGITS
0AC4 4F          MOV  C,A          C = NFRAC
0AC5 3A 35 74    LDA  DIEDCM/2+X   A = DIEDCM
0AC8 B9          CMP  C            IF DIEDCM .GE. NFRAC
0AC9 DA F2 0A    JC   MSG2M5
                ;                    THERE IS ROOM FOR FRACTIONAL DIGITS
                ;                    CALCULATE INDEX FOR LOW ORDER DIGIT
0ACC 2F          CMA                 A = J = 15-DIEDCM+NFRAC
0ACD C6 10       ADI  16
0ACF 81          ADD  C
                ;                    CHECK DATA LENGTH AND ALIGNMENT WITH
                ;                    RESPECT TO WORK AREA
0AD0 BC          CMP  H              IF DINDEX .GE. NTOTAL
0AD1 DA F2 0A    JC   MSG2M4
                ;                      DATA FITS IN WORK AREA
                ;                      MOVE DATA INTO WORK AREA
0AD4 C6 C0       ADI  WORK1            C = OFFSET, WORK1[J]
0AD6 4F          MOV  C,A
0AD7 78          MOV  A,B              B = OFFSET, FMTNIB[I=NTOTAL+1]
0AD8 84          ADD  H
0AD9 47          MOV  B,A
0ADA 7C          MOV  A,H              A = NTOTAL
0ADB CD C2 0F    CALL MVRNIB           MVRNIB(WORK1[J],FMTNIB[I],NTOTAL,
                ;                             ( @C     , @B       , A    ,
                ;                             ( 0      , I        , I    ,
                ;
                ;
                ;                      NONBCD,ZROFLG)
                ;                      PSW:S ,PSW:Z )
                ;                       0    , 0    )
                ;                      CHECK CHARACTERS MOVED
0ADE FA F2 0A    JM   MSG2M3           IF NONBCD .EQ. FALSE
                ;                        ONLY NUMERIC CHARS WERE MOVED.
                ;                        CHECK DATA LENGTH WITH RESPECT TO
                ;                        DECLARED SIZE OF DESTINATION.
                ;                        SET INDEX TO LEFT OF DECLARED
                ;                        HIGH ORDER DIGIT POSITION.
0AE1 7A          MOV  A,D                A = I = 15-DSTSIZ
0AE2 2F          CMA
```

```
0AE3 C6 10      ADI  16
               ;                         CALCULATE NUMBER OF DIGIT
               ;                         POSITIONS ABOVE HIGH ORDER
               ;                         DIGIT POSITION
0AE5 67         MOV  H,A                 H = NTOTAL = 16-DSTSIZ
0AE6 24         INR  H
               ;                         SCAN POSITIONS ABOVE HIGH ORDER
               ;                         DIGIT POSITION
0AE7 C6 C0      ADI  WORK1               B = OFFSET, WORK1[I]
0AE9 47         MOV  B,A
0AEA 7C         MOV  A,H                 A = NTOTAL
0AEB CD 0F 10   CALL RSCAN               RSCAN(WORK1[I],NTOTAL,
               ;                              ( @B     , A    ,
               ;                              ( I      , I    ,
               ;
               ;                              NONBCD,ZROFLG)
               ;                              PSW:S ,PSW:Z )
               ;                               0    , 0    )
               ;                         CHECK CHARACTERS SCANNED
0AEE C2 F2 0A   JNZ  MSG2M2              IF ZROFLG .EQ. FALSE
               ;                           DECLARED DATA LENGTH EXCEEDED
0AF1 2C         INR  L                     L = FLAGV = 2; DECREMENTS TO 1
               ;                           PRODUCING:
               ;                           PSW:Z = ERRFLG = FALSE
               MSG2M2;                   ENDIF
               MSG2M3;                 ENDIF
               MSG2M4;               ENDIF
               MSG2M5;             ENDIF
0AF2 2D         DCR  L             PSW:Z = ERRFLG
0AF3 C9         RET                RETURN
MTRSTS

               ;MTRSTS()(XMTBUF,KDCTRL,MRSTS1,MRSTS2,NORFLG)
               ;        (BYTSTR,BITSTR,BITSTR,BITSTR,BITSTR)
               ;        ( O    , I    , I    , I    , O    )
               ;        ( RAM  , RAM  , RAM  , RAM  , RAM  )
               ;        ( C    , NC   , NC   , NC   , C    )
               ;
               ;ALL REGISTERS DESTROYED
               ;PSW DESTROYED
               ;
               ;PUT CURRENT STATUS MESSAGE INTO TRANSMIT BUFFER
               ;
               MTRSTS;             ****ENTRY POINT
0AF4 21 03 80   LXI  H,HSTAT*100H+3
               ;                   L = BYTCNT = 3
               ;                   H = HSTAT
0AF7 22 50 74   SHLD XMTBUF/2+X+0  XMTBUF[0] = BYTCNT
               ;                   XMTBUF[1] = HSTAT
0AFA 11 52 74   LXI  D,XMTBUF/2+X+2
               ;                   DE = ADDRESS, XMTBUF[2]
0AFD 21 24 74   LXI  H,MRSTS1/2+X  HL = ADDRESS, MRSTS1
               ;                   XMTBUF[2].0 = 0
               ;                   XMTBUF[2].1 = MRSTS1.DATDOR
               ;                   XMTBUF[2].2 = MRSTS1.INSFND
               ;                   XMTBUF[2].3 = MRSTS1.LOWPOS
               ;                   XMTBUF[2].4 = MRSTS1.SERMOD
               ;                   XMTBUF[2].5 = MRSTS1.ENABLD
               ;                   XMTBUF[2].6 = 0
               ;                   XMTBUF[2].7 = MRSTS1.QUEREG
0B00 7E         MOV  A,M
0B01 E6 7D      ANI  7DH
0B03 12         STAX D
0B04 23         INX  H             HL = ADDRESS, MRSTS2
0B05 13         INX  D             DE = ADDRESS, XMTBUF[3]
               ;                   XMTBUF[3].0 = MRSTS2.FATMOD
               ;                   XMTBUF[3].1 = KDCTRL.KBDDSB
```

```
                    ;                       XMTBUF[3].2..7 = 0
 0B06 7E              MOV  A,M
 0B07 E6 80           ANI  80H
 0B09 47              MOV  B,A
 0B0A 3A 27 74        LDA  KDCTRL/2+X
 0B0D 0F              RRC
 0B0E 0F              RRC
 0B0F E6 40           ANI  40H
 0B11 B0              ORA  B
 0B12 12              STAX D
 0B13 23              INX  H             HL = ADDRESS, NORFLG
 0B14 7E              MOV  A,M           NORFLG.QUESTS = FALSE
 0B15 E6 7F           ANI  7FH
 0B17 77              MOV  M,A
 0B18 C9              RET                RETURN
NPAUSE

                    ;NPAUSE(N    ,ZROFLG)
                    ;      (WORD,BIT    )
                    ;      (I/O ,O      )
                    ;      (BC  ,PSW:Z  )
                    ;      ( C  , C     )
                    ;
                    ;REGISTERS DESTROYED
                    ;PSW DESTROYED
                    ;
                    ;PAUSE FOR ABOUT 100 USEC, AND DECREMENT N
                    ;
                    NPAUSE;                 ****ENTRY POINT
                    ;                       PAUSE
 0B19 3E 0A           MVI  A,10          A = 10
                    NPAUS1;                 DO UNTIL A = 0
 0B1B 3D              DCR  A               A = A-1
 0B1C C2 1B 0B        JNZ  NPAUS1
                    ;                       ENDDO
                    ;                       DECREMENT N
 0B1F 0B              DCX  B             BC = N = N-1
                    ;                       DEFINE STATUS OF N
 0B20 78              MOV  A,B           PSW:Z = ZROFLG = N .EQ. 0
 0B21 B1              ORA  C
 0B22 C9              RET                RETURN
POSUPD

                    ;POSUPD()(WORK1 ,LOWWRN,POSREG,ASCREG,DSCREG,
                    ;        (NIBSTR,NIBSTR,NIBSTR,NIBSTR,NIBSTR,
                    ;        ( I/O  , I    , I    , I    , I    ,
                    ;        ( RAM  , RAM  , RAM  , RAM  , RAM  ,
                    ;        ( C    , NC   , NC   , C    , C    ,
                    ;
                    ;         ASCCRC,DSCCRC,UNLOCK,MRSTS1,MRSTS2)
                    ;         BYTE  ,BYTE  ,NIBSTR,BITSTR,BITSTR)
                    ;          I    , I    , I    , I/O  , I    )
                    ;          RAM  , RAM  , RAM  , RAM  , RAM  )
                    ;          NC   , NC   , NC   , C    , NC   )
                    ;
                    ;PSW DESTROYED
                    ;REGISTERS DESTROYED
                    ;
                    ;UPDATE METER STATUS FOR CURRENT POSTAGE SETTING
                    ;
                    POSUPD;                 ****ENTRY POINT
                    ;-----------------------------------------------------
                    ;                       BUILD WARNING VALUE SAME LENGTH AS
                    ;                       DESCENDING REGISTER STARTING AT
                    ;                       WORK1[0]
                    ;                       CLEAR WORK AREA
 0B23 3E C0           MVI  A,WORK1       A = OFFSET, WORK1
```

```
0B25 CD 85 0E   CALL CLRBLK        CLRBLK(WORK1)
               ;                         ( @A  )
               ;                         ( 0   )
0B28 06 1D      MVI  B,LOWWRN+1    B = OFFSET, LOWWRN[1]
0B2A CD 35 0F   CALL GETNIB        GETNIB(EXPONT,ZROFLG,LOWWRN[1])
               ;                         ( A     ,PSW:Z , @B       )
               ;                         ( 0     , 0    , I        )
0B2D 2F         CMA                A = -EXPONT-1
0B2E C6 C7      ADI  WORK1+DSCSIZ  C = OFFSET, WORK1[DSCSIZ-1-EXPONT]
0B30 4F         MOV  C,A
0B31 05         DCR  B             B = OFFSET, LOWWRN[0]
0B32 3E 01      MVI  A,1           A = NIBCNT = 1
0B34 CD B3 0F   CALL MVLNIB        MVLNIB(WORK1[DSCSIZ-1-EXPONT],
               ;                         ( @C                        ,
               ;                         ( 0                         ,
               ;
               ;                         LOWWRN[0],NIBCNT,NONBCD,ZROFLG)
               ;                          @B       , A     ,PSW:S ,PSW:Z )
               ;                          I        , I     , 0    , 0    )
               ;-------------------------------------------------------------
               ;                   INITIALIZE FOR CALLS TO POSUP1
0B37 21 24 74   LXI  H,MRSTS1/2+X  HL = ADDRESS, MRSTS1
0B3A 7E         MOV  A,M
0B3B E6 CF      ANI  0CFH
0B3D 77         MOV  M,A           MRSTS1.INSFND = FALSE
               ;                   MRSTS1.LOWPOS = FALSE
               ;-------------------------------------------------------------
               ;                   COMPARE DESCENDING REGISTER WITH
               ;                   WARNING VALUE
0B3E 06 10      MVI  B,10H         B.LOWPOS = TRUE
0B40 CD 85 0B   CALL POSUP1        IF DSCREG .LT. WORK1[0]
               ;                     MRSTS1.LOWPOS = B.LOWPOS = TRUE
               ;                   ENDIF
               ;-------------------------------------------------------------
               ;                   BUILD POSTAGE SETTING REGISTER SAME
               ;                   LENGTH AS DESCENDING REGISTER
               ;                   STARTING AT WORK1[0]
               ;                   CLEAR WORK AREA
0B43 3E C0      MVI  A,WORK1       A = OFFSET, WORK1
0B45 CD 85 0E   CALL CLRBLK        CLRBLK(WORK1)
               ;                         ( @A  )
               ;                         ( 0   )
0B48 01 C3 42   LXI  B,POSREG*100H+WORK1+0+DSCSIZ-NBANKS
               ;                   B = OFFSET, POSREG
               ;                   C = OFFSET, WORK1[0+DSCSIZ-NBANKS]
0B4B 3E 04      MVI  A,NBANKS      A = NBANKS
0B4D CD B3 0F   CALL MVLNIB        MVLNIB(WORK1[0+DSCSIZ-NBANKS],
               ;                         ( @C                        ,
               ;                         ( 0                         ,
               ;
               ;                         POSREG,NBANKS,NONBCD,ZROFLG)
               ;                          @B   , A    ,PSW:S ,PSW:Z )
               ;                          I    , I    , 0    , 0    )
               ;-------------------------------------------------------------
               ;                   COMPARE DESCENDING REGISTER WITH
               ;                   POSTAGE SETTING
0B50 06 20      MVI  B,20H         B.INSFND = TRUE
0B52 CD 85 0B   CALL POSUP1        IF DSCREG .LT. WORK1[0]
               ;                     MRSTS1.INSFND = B.INSFND = TRUE
               ;                   ENDIF
               ;-------------------------------------------------------------
               ;                   CHECK ASCENDING REGISTER CRC
0B55 01 38 08   LXI  B,ASCSIZ*100H+ASCREG
               ;                   B = ASCSIZ
               ;                   C = OFFSET, ASCREG[0]
0B58 3A 20 74   LDA  ASCCRC/2+X    A = ASCCRC
0B5B CD 92 0B   CALL POSUP2        IF ASCCRC INCORRECT
```

```
                   ;                     FILL ASCREG WITH HEXOF
                   ;                     DECLARE DEAD METER. BAD CRC
                   ;                   ENDIF
                   ;-------------------------------------------------------
                   ;                   CHECK DESCENDING REGISTER CRC
0B5E 01 2F 07       LXI  B,DSCSIZ*100H+DSCREG
                   ;                   B = DSCSIZ
                   ;                   C = OFFSET, DSCREG[0]
0B61 3A 1B 74       LDA  DSCCRC/2+X    A = DSCCRC
0B64 CD 92 0B       CALL POSUP2        IF DSCCRC INCORRECT
                   ;                     FILL DSCREG WITH HEXOF
                   ;                     DECLARE DEAD METER. BAD CRC
                   ;                   ENDIF
                   ;-------------------------------------------------------
                   ;                   CHECK CONTROL SUM CRC
                   ;                   MRSTS2.FATMOD WILL BE USED VS ERRFLG
0B67 CD 3A 06       CALL CONSUM        CONSUM(ERRFLG)
                   ;                         (PSW:Z )
                   ;                         ( 0    )
                   ;-------------------------------------------------------
                   ;                   ENABLE OR DISABLE METER
0B6A 01 24 74       LXI  B,MRSTS1/2+X  BC = ADDRESS, MRSTS1
0B6D 0A             LDAX B
0B6E E6 68          ANI  68H
0B70 67             MOV  H,A           H = FLAGS = MRSTS1.DATDOR,
                   ;                               MRSTS1.INSFND,
                   ;                               MRSTS1.SERMOD
0B71 03             INX  B             BC = ADDRESS, MRSTS2
0B72 0A             LDAX B
0B73 E6 81          ANI  81H
0B75 B4             ORA  H             A = FLAGS = FLAGS .OR.
                   ;                               MRSTS2.FATMOD,
                   ;                               MRSTS2.PRVMOD
                   ;                   IF FLAGS .NE. 0
0B76 C2 D3 05       JNZ  DISABL          DISABLE
                   ;                   ELSE
                   ;                     COMPARE $ UNLOCK VALUE WITH SETTING
0B79 11 18 42       LXI  D,POSREG*100H+UNLOCK
                   ;                     D = OFFSET, POSREG
                   ;                     E = OFFSET, UNLOCK
0B7C 3E 04          MVI  A,NBANKS        A = NBANKS
0B7E CD 8E 0E       CALL CMPARE          CMPARE(POSREG,UNLOCK,NBANKS,
                   ;                            ( @D    , @E    , A    ,
                   ;                            ( I     , I     , I    ,
                   ;
                   ;                            NEGFLG,ZROFLG)
                   ;                            PSW:S ,PSW:Z )
                   ;                             0    , 0     )
0B81 FC F9 05       CM   ENABLE          IF NEGFLG .EQ. TRUE
                   ;                       ENABLE
                   ;                     ENDIF
                   ;                   ENDIF
                   ;-------------------------------------------------------
0B84 C9             RET                RETURN
                   ;-------------------------------------------------------
                   ;-------------------------------------------------------
                   ;-------------------------------------------------------
                  POSUP1;              ****LOCAL ENTRY POINT
0B85 11 C0 2F       LXI  D,DSCREG*100H+WORK1+0
                   ;                   D = OFFSET, DSCREG[0]
                   ;                   E = OFFSET, WORK1[0]
0B88 3E 07          MVI  A,DSCSIZ      A = DSCSIZ
0B8A CD 8E 0E       CALL CMPARE        CMPARE(DSCREG[0],WORK1[0],DSCSIZ,
                   ;                         ( @D       , @E      , A    ,
                   ;                         ( I        , I       , I    ,
                   ;
                   ;                           NEGFLG,ZROFLG)
```

```
                     ;                        PSW:S ,PSW:Z )
                     ;                         O    , O     )
0B8D F0                RP                  IF NEGFLG .EQ. TRUE
0B8E 7E                MOV  A,M              MRSTS1.FLAG = B.FLAG = TRUE
0B8F B0                ORA  B
0B90 77                MOV  M,A
                     ;                     ENDIF
0B91 C9                RET                 RETURN
                     ;-------------------------------------------------------
                     ;-------------------------------------------------------
                     ;-------------------------------------------------------
                     POSUP2;               ****LOCAL ENTRY POINT
0B92 CD B1 0E          CALL CRC            CRC(REGSTR[0],REGSIZ,CRCVAL)
                     ;                        ( @C      , B    , D     )
                     ;                        ( I       , I    , O     )
0B95 BA                CMP  D              PSW:Z = NOERR = REGCRC .EQ. CRCVAL
0B96 C8                RZ                  IF NOERR .EQ. FALSE
                     ;                       FILL BAD REGISTER WITH HEXOF
0B97 3E 0F             MVI  A,0FH            A = HEXOF
0B99 C3 24 0F          JMP  FILNIB           FILNIB(REGSTR[0],HEXOF,REGSIZ)
                     ;                              ( @C      , A    , B     )
                     ;                              ( O       , I    , I     )
                     ;                       DECLARE DEAD METER. BAD CRC
0B9C 3E 00             MVI  A,BADCRC         A = CODE = BADCRC
0B9E C3 85 10          JMP NVMDED            NVMDED(CODE,ERRFLG)
                     ;                              ( A  ,PSW:Z )
                     ;                              ( I  , O    )
                     ;                     ENDIF
                     ;                     RETURN
                     ;-------------------------------------------------------
                     ;-------------------------------------------------------
                     ;-------------------------------------------------------
PROERR

                     ;PROERR(ERRFLG)(XMTBUF)
                     ;      (BIT   )(BYTSTR)
                     ;      ( O    )( O     )
                     ;      (PSW:Z )( RAM   )
                     ;      ( C    )( C     )
                     ;
                     ;REGISTERS DESTROYED
                     ;PSW DESTROYED
                     ;
                     ;PROCESS PROCEDURAL ERROR
                     ;
                     PROERR;               ****ENTRY POINT
0BA1 CD F4 0A          CALL MTRSTS         PUT STATUS MESSAGE IN TRANSMIT BUFFER
0BA4 11 53 74          LXI  D,XMTBUF/2+X+3
                     ;                     DE =  ADDRESS, XMTBUF[3]
                     ;                     DECLARE PROCEDURAL ERROR
0BA7 1A                LDAX D              XMTBUF[3].PROERR = TRUE
0BA8 F6 02             ORI  2
0BAA 12                STAX D
0BAB AF                XRA  A              PSW:Z = ERRFLG = TRUE
0BAC C3 64 04          JMP  PERDSP         MAKE PROCEDURAL ERROR DISPLAY
                     ;                     RETURN
RDCYC

                     ;RDCYC(INCYC ,INCYC,ADRESS,MRSTS1)(DATA1 )
                     ;     (BITSTR,BIT  ,ADRESS,BITSTR)(BITSTR)
                     ;     ( O    , O   , O    , -    )( I     )
                     ;     ( A    ,PSW:C, HL   , @HL  )( 6800  )
                     ;     ( C    , C   , C    , NC   )( NC    )
                     ;
                     ;REGISTERS NOT CHANGED
                     ;PSW DESTROYED
                     ;
```

```
                 ;RETURN STATUS OF METER CYCLE SWITCH
                 ;
                 RDCYC;                 ****ENTRY POINT
                 ;                      DEFINE ADDRESS FOR CALLING ROUTINES
0BAF 21 24 74     LXI  H,MRSTS1/2+X     HL = ADDRESS, MRSTS1
                 ;                      READ CYCLE SWITCH
0BB2 3A 00 68     LDA  DATA1            A = INCYC,INCYCN = DATA1.2,DATA1.3
0BB5 E6 30        ANI  30H
0BB7 C2 C2 0B     JNZ  RDCYC1           IF BOTH SIDES OF SWITCH CLOSED
                 ;                        DECLARE DEAD METER; BAD CYCLE SWITCH
0BBA 3E 04        MVI  A,BADCYC           A = BADCYC
0BBC CD 85 10     CALL NVMDED             NVMDED(BADCYC,ERRFLG)
                 ;                               ( A     ,PSW:Z )
                 ;                               ( I     , O    )
0BBF C3 B6 01     JMP PWRDN               ABORT
                 RDCYC1;                ELSE
0BC2 17           RAL                     PSW:C = INCYC = DATA1.2
0BC3 17           RAL
0BC4 17           RAL
0BC5 9F           SBB  A                  A.0..7 = INCYC
0BC6 C9           RET                     RETURN
                 ;                      ENDIF
RECEVE

                 ;RECEVE()(SID,SOD,SOE,RECBUF,NORFLG)
                 ;        (BIT,BIT,BIT,BYTSTR,BITSTR)
                 ;        ( I , O , O , O     , I     )
                 ;        (RIM,SIM,SIM, RAM   , RAM   )
                 ;        ( NC, C , C , C     , NC    )
                 ;
                 ;REGISTERS DESTROYED
                 ;PSW DESTROYED
                 ;
                 ;RECEIVE INCOMING MESSAGE IF EXTERNAL RTS IS PRESENT.
                 ;RECBUF[0], THE MESSAGE BYTE COUNT, IS CLEARED IF A
                 ;REQUEST TO SEND IS DETECTED.
                 ;
                 RECEVE;                ****ENTRY POINT
0BC7 3A 26 74     LDA  NORFLG/2+X       IF NORFLG.COMDSB .EQ. TRUE
0BCA E6 04        ANI  4
                 ;                        COMMUNICATIONS ARE DISABLED
0BCC C0           RNZ                     RETURN
                 ;                      END IF
0BCD 20           RIM                   INPUT BIT
                 ;                      A.0 = BIT = RIM.SID ;RTS OR IDLE
0BCE B7           ORA A                 IF RIM.SID .NE. RTS
                 ;                        NO INCOMING REQUEST TO SEND PRESENT
0BCF F0           RP                      RETURN
                 ;                      ENDIF
                 ;                      STOP TIMER
0BD0 CD 34 01     CALL STPTMR           STPTMR(WASOFF)
                 ;                            (PSW:Z )
                 ;                            ( O    )
0BD3 21 27 0C     LXI  H,RECE06         SET TO REACH QUIT ROUTINE VIA RETURN
0BD6 E5           PUSH H
0BD7 21 48 74     LXI  H,RECBUF/2+X     HL = ADDRESS, RECBUF[N=0]
                 ;                      (2 MVI VS 1 LXI FOR T3 = 100.012 USEC)
0BDA 06 00        MVI  B,0              B = BYTCNT = 0
0BDC 0E 80        MVI  C,80H            C = SIM*2 .AND. HEXFF, WHERE
                 ;                          SIM.SOE = ENABLD = 1
0BDE 70           MOV  M,B              RECBUF[0] = 0

                 RECE01;                DO UNTIL BIT .EQ. EOM
0BDF 3E C0        MVI  A,0C0H             SIM.SOD = ONEBIT=1 ;CTS,OR EOB ECHO
                 ;                        SIM.SOE = ENABLD = 1
0BE1 30           SIM                     OUTPUT ONEBIT
0BE2 11 FB FE     LXI  D,-261             DE = COUNT ;FOR T13 = 3.494 MSEC
```

```
                   RECE02;              DO UNTIL (BIT .EQ. START) .OR.
                                          (COUNT .GE. 0)
0BE5 20              RIM                  INPUT BIT
                   ;                      A.0 = BIT = RIM.SID ;START,RTS,EOB
0BE6 13              INX  D               DE = COUNT = COUNT+1
0BE7 A2              ANA  D               A.0 = BIT .AND. COUNT.0
0BE8 FA E5 0B        JM   RECE02
                   ;                    ENDDO
                   ;
0BEB B2              ORA  D             IF COUNT .GE. 0
                   ;                      T13 TIMEOUT OCCURRED
                   ;                      START NOT RECEIVED AFTER RTS
0BEC F0              RP                   QUIT
                   ;                    ENDIF
                   ;                    THE FIRST BYTE'S START BIT HAS BEEN
                   ;                    READ. IT WILL BE READ AGAIN AND
                   ;                    ECHOED LATER.
                   ;                    POINT AT NEXT BYTE IN RECBUF.
0BED 23              INX  H             HL = ADDRESS, RECBUF[N=N+1]
                   ;                    CHECK FOR BUFFER OVERFLOW
0BEE 04              INR  B             B = BYTCNT = BYTCNT+1
0BEF 3E 07           MVI  A,7           IF 7 .LT. BYTCNT
0BF1 B8              CMP  B
                   ;                      TRYING TO RECEIVE 8TH BYTE
0BF2 D8              RC                   QUIT
                   ;                    ENDIF
                   ;                    SET TO INPUT 10 BITS
                   ;                    1 START, 8 DATA, AND 1 EOB OR EOM
0BF3 16 0A           MVI  D,10          D = BITCNT = 10

                   RECE03;              LOOP ;BREAK ON BITCNT .EQ. 0
0BF5 20              RIM                  INPUT BIT
                   ;                      A.0 = BIT = RIM.SID
0BF6 17              RAL                  PSW:CY  = BIT
0BF7 79              MOV  A,C             PSW:CY,A = SIM*2
0BF8 1F              RAR                  A = SIM
                   ;                      SIM.SOD = ECHO = BIT
                   ;                      SIM.SOE = ENABLD = 1
0BF9 30              SIM                  OUTPUT 10 ECHO BITS
0BFA 15              DCR  D               D = BITCNT = BITCNT-1
                   ;                      IF BITCNT .EQ. 0
0BFB CA 0C 0C        JZ   RECE04            BREAK
                   ;                      ENDIF
0BFE 17              RAL                  PSW:CY = BIT
                   ;                      SHIFT 9 BITS INTO BUFFER
                   ;                      1 START,(LOST); 8 DATA,(KEPT)
0BFF 7E              MOV  A,M             PSW:CY,A = RECBUF[N]*2
0C00 1F              RAR                  RECBUF[N] = (PSW:CY,A)/2
0C01 77              MOV  M,A
0C02 77              MOV  M,A             DELAY ;BIT PERIOD = 103.923 USEC
0C03 3E 07           MVI  A,7
0C05 3D              DCR  A
0C06 F2 05 0C        JP   $-1
0C09 C3 F5 0B        JMP  RECE03
                   RECE04;                ENDLOOP
0C0C B7              ORA  A               CHECK FOR EOM
0C0D FA DF 0B        JM   RECE01
                   ;                    ENDDO
0C10 3E 21           MVI  A,33          DELAY ;T8 = 1264.965 USEC
0C12 3D              DCR  A
0C13 F2 12 0C        JP   $-1
                   ;                    CHECK FOR NO-ERROR PULSE
0C16 20              RIM                INPUT BIT
                   ;                    A.0 = BIT = RIM.SID
0C17 B7              ORA  A             IF BIT .EQ. ACK
0C18 F2 1F 0C        JP   RECE05
                   ;                      MESSAGE RECEIVED WITHOUT ERROR
```

```
                  ;                  PUT NONZERO BYTE COUNT IN BUFFER
0C1B 78             MOV  A,B           RECBUF[0] = BYTCNT
0C1C 32 48 74       STA  RECBUF/2+X
                  RECE05;            ENDIF
0C1F F1             POP  PSW         CLEAN UP STACK
0C20 16 22          MVI  D,34        DELAY ;T15 = 1560.533 USEC
0C22 15             DCR  D
0C23 F2 22 0C       JP   $-1
0C26 C9             RET              RETURN
                  ;
                  RECE06;            QUIT RECEIVE ROUTINE
0C27 3E 40          MVI  A,40H       SIM.SOD = IDLE = 0
                  ;                  SIM.SOE = ENABLD = 1
0C29 30             SIM              OUTPUT IDLE
0C2A 16 C2          MVI  D,194       DELAY ;T15 = 1558.298 USEC
0C2C 15             DCR  D
0C2D F2 2C 0C       JP   $-1
0C30 C9             RET              RETURN
REDSTS

                  ;REDSTS(TRPSW,PRVSW)(PORTA ,PORTC )
                  ;      (BYTE ,BYTE )(BITSTR,BITSTR)
                  ;      ( O   , O   )( I/O  , I    )
                  ;      ( B   , A   )( 7001 , 7003 )
                  ;      ( C   , C   )( C    , NC   )
                  ;
                  ;REGISTERS DESTROYED
                  ;PSW DESTROYED
                  ;
                  ;RETURNS VALUES FOR TRIP SWITCH AND PRIVELEGED SWITCH
                  ;OFF = HEX00
                  ;ON  = HEXFF
                  ;
                  REDSTS;            ****ENTRY POINT
                  ;                  FETCH PORTA IMAGE
                  ;                  SENSOR LEDS ASSUMED TO BE OFF
0C31 21 01 70       LXI  H,PORTA     HL = ADDRESS, PORTA
0C34 56             MOV  D,M         D = LEDOFF = PORTA
                  ;                  TURN SENSOR LEDS ON
0C35 7A             MOV  A,D         PORTA = PORTA .AND. HEXDF
0C36 E6 DF          ANI  0DFH
0C38 77             MOV  M,A
                  ;                  READ SENSORS
0C39 3A 03 70       LDA  PORTC
0C3C 07             RLC
0C3D 07             RLC
0C3E 07             RLC              PSW:CY = TRPBIT = PORTC.2
0C3F 4F             MOV  C,A         C.0    = PRVBIT = PORTC.3
0C40 9F             SBB  A           B = TRPSW = TRPBIT*HEXFF
0C41 47             MOV  B,A
0C42 79             MOV  A,C         A = PRVSW = (.NOT. PRVBIT)*HEXFF
0C43 07             RLC
0C44 3F             CMC
0C45 9F             SBB  A
                  ;                  TURN SENSOR LEDS OFF
0C46 72             MOV  M,D         PORTA = LEDOFF
0C47 C9             RET              RETURN
SELVAL

                  ;SELVAL(ERRFLG)(NORFLG,MRSTS1,POSREG)
                  ;      (BIT   )(BITSTR,BITSTR,NIBSTR)
                  ;      ( O    )( O    , I    , I    )
                  ;      (PSW:Z )( RAM  , RAM  , RAM  )
                  ;      ( C    )( C    , NC   , NC   )
                  ;
                  ;REGISTERS DESTROYED
                  ;PSW DESTROYED
```

```
                    ;
                    ;PROCESS SELECTION VALUE REQUEST
                    ;
                    SELVAL;                ****ENTRY POINT
0C48 21 26 74         LXI  H,NORFLG/2+X   HL = ADDRESS, NORFLG
0C4B 7E               MOV  A,M            NORFLG.QUEPOS = FALSE
0C4C E6 BF            ANI  0BFH
0C4E 77               MOV  M,A
0C4F 3A 24 74         LDA  MRSTS1/2+X     IF MRSTS1.UNKSEL .EQ. TRUE
0C52 B7               ORA  A
                    ;                       SELECTION VALUE IS UNKNOWN
0C53 FA A1 0B         JM   PROERR           PROERR(ERRFLG)
                    ;                             (PSW:Z )
                    ;                             ( 0    )
                    ;                       RETURN
                    ;                     ELSE
                    ;                       FLAG VERIFICATION OF SELECTION VALUE
0C56 7E               MOV  A,M              NORFLG.UNVSEL = FALSE
0C57 E6 FD            ANI  0FDH
0C59 77               MOV  M,A
0C5A 11 60 0C         LXI  D,SELV01         DE = ADDRESS, SELV01
                    ;                       PUT REPLY IN TRANSMIT BUFFER
0C5D C3 5B 0D         JMP  VALREQ           VALREQ(POSREG,POSFMT,HPSET,ERRFLG)
                    ;                             (@@DE+0,@DE+1 ,@DE+2,PSW:Z )
                    ;                             ( I     , I     , I    , 0     )
                    ;                       RETURN
                    ;                     ENDIF
                    SELV01;               ARGUMENT LIST FOR VALREQ
0C60 42 40 81         DB   POSREG,POSFMT,HPSET
SEREOE

                    ;SEREOE(ERRFLG)(CMBBUF,LOWWRN,SETLIM,AMTBUF,WORK1 ,UNLOCK)
                    ;      (BIT   )(NIBSTR,NIBSTR,NIBSTR,NIBSTR,NIBSTR,NIBSTR)
                    ;      ( 0    )( I    , 0     , 0     , I     , I/0   , 0     )
                    ;      (PSW:Z )( RAM  , RAM   , RAM   , RAM   , RAM   , RAM   )
                    ;      ( C    )( C    , C     , C     , NC    , C     , C     )
                    ;
                    ;PSW DESTROYED
                    ;REGISTERS DESTROYED
                    ;
                    ;PERFORM SERVICE FUNCTIONS WHICH ARE INITIATED BY THE
                    ;ENTRY OF AN AMOUNT AND COMBINATION
                    ;
                    SEREOE;               ****ENTRY POINT
                    ;                     CHECK METER STATUS
0C63 CD 4E 0F         CALL LSTATE         LSTATE(FATMOD,NORMOD,SERMOD,PRVMOD)
                    ;                           (PSW:S ,PSW:Z ,PSW:P ,PSW:C )
                    ;                           ( 0    , 0    , 0    , 0    )
                    ;                     IF FATMOD .EQ. TRUE
                    ;                       PROCESS ERROR
0C66 FA A1 0B         JM   PROERR           PROERR(ERRFLG)
                    ;                             (PSW:Z )
                    ;                             ( 0    )
                    ;                     ELSE
                    ;                       CHECK FORMAT BYTE IN CMBBUF
0C69 21 78 74         LXI  H,CMBBUF/2+X     HL = ADDRESS, CMBBUF[0..1]
0C6C 7E               MOV  A,M              IF CMBBUF[0..1] .NE. HEX1F
0C6D FE 1F            CPI  1FH
                    ;                         BAD FORMAT, PROCEEDURAL ERROR
0C6F C2 A1 0B         JNZ  PROERR             PROERR(ERRFLG)
                    ;                               (PSW:Z )
                    ;                               ( 0    )
                    ;                       ELSE
                    ;                       CHECK FOR OUT OF RANGE COMBINATION
0C72 23               INX  H                HL = ADDRESS, CMBBUF[2..3]
0C73 7E               MOV  A,M              A = CMBBUF[2..3]
0C74 FE 04            CPI  4                IF CMBBUF[2..3] .GE. 4
```

```
                         ;                      BAD COMBINATION, PROCEEDURAL ERROR
     0C76 D2 A1 0B    JNC  PROERR               PROERR(ERRFLG)
                         ;                             (PSW:Z )
                         ;                             ( 0    )
                         ;                    ELSE
                         ;                    --CASE (CMBBUF[2..3])
     0C79 11 1C 07    LXI  D,DSCSIZ*100H+LOWWRN
     0C7C FE 01       CPI  1                    **01:
                         ;                        CHANGE LOW POSTAGE WARN LIMIT
     0C7E CA FB 0C    JZ   SRVCNV                 SRVCNV(LOWWRN,DSCSIZ,ERRFLG)
                         ;                              ( @E   , D    ,PSW:Z )
                         ;                              ( 0    , I    , 0    )
     0C81 11 1E 05    LXI  D,(NBANKS+1)*100H+SETLIM
     0C84 FE 02       CPI  2                    **02:
                         ;                        CHANGE SETTING LIMIT
     0C86 CA FB 0C    JZ   SRVCNV                 SRVCNV(SETLIM,NBANKS+1,ERRFLG)
                         ;                              ( @E   , D       ,PSW:Z )
                         ;                              ( 0    , I       , 0    )
     0C89 06 E0       MVI  B,AMTBUF
                         ;                      **03:
                         ;                        CHANGE SERIAL NUMBER
     0C8B F2 38 0A    JP   MSERNO                 MSERNO(AMTBUF,ERRFLG)
                         ;                              ( @B   ,PSW:Z )
                         ;                              ( I    , 0    )
                         ;                      **00:
     0C8E 15          DCR  D                      D = NBANKS
                         ;                        CHANGE DOLLAR UNLOCK VALUE
     0C8F CD AA 0A    CALL MSG2MU                 MSG2MU(AMTBUF,NBANKS,ERRFLG)
                         ;                              ( @B   , D    ,PSW:Z )
                         ;                              ( I    , I    , 0    )
                         ;                        IF ERRFLG .EQ. TRUE
                         ;                          BAD AMOUNT, PROCEEDURAL ERROR
     0C92 CA A1 0B    JZ   PROERR                   PROERR(ERRFLG)
                         ;                               (PSW:Z )
                         ;                               ( 0    )
                         ;                        ELSE
                         ;                          REDEFINE $ UNLOCK VALUE
     0C95 3E 04       MVI  A,NBANKS                 A = NBANKS
     0C97 01 18 CC    LXI  B,(WORK1+16-NBANKS)*100H+UNLOCK
                         ;                          B = OFFSET, WORK1[16-NBANKS]
                         ;                          C = OFFSET, UNLOCK
     0C9A CD B3 0F    CALL MVLNIB                   MVLNIB(UNLOCK,WORK1[16-NBANKS],
                         ;                                ( @C   , @B              ,
                         ;                                ( 0    , I               ,
                         ;
                         ;                          NBANKS,NONBCD,ZERO )
                         ;                           A    ,PSW:S ,PSW:Z)
                         ;                           I    , 0    , 0    )
     0C9D 0C          INR  C                        PSW:Z = ERRFLG = FALSE
                         ;                        ENDIF
                         ;                    --ENDCASE
                         ;                    ENDIF
                         ;                  ENDIF
     0C9E C9          RET                   RETURN
SETPOS

                         ;SETPOS(MSGBUF,ERRFLG)(SETLIM,WORK1 ,WORK2 ,MRSTS1,
                         ;     (NIBSTR,BIT   )(NIBSTR,NIBSTR,NIBSTR,BITSTR,
                         ;     ( I    , 0    )( I    , 0    , 0    , 0    ,
                         ;     ( @B   ,PSW:Z )( RAM  , RAM  , RAM  , RAM  ,
                         ;     ( NC   , C    )( NC   , C    , C    , C    ,
                         ;
                         ;     NORFLG,POSREG)
                         ;     BITSTR,NIBSTR)
                         ;      0    , 0    )
                         ;      RAM  , RAM  )
                         ;      C    , C    )
```

```
                        ;
                        ;REGISTERS DESTROYED
                        ;PSW DESTROYED
                        ;
                        ;PROCESS SET POSTAGE COMMAND
                        ;
                        SETPOS;                ****ENTRY POINT
                        ;                      SET TO REACH PROERR VIA RETURN
0C9F 21 A1 0B            LXI  H,PROERR
0CA2 E5                  PUSH H
0CA3 CD 4E 0F            CALL LSTATE           LSTATE(FATMOD,NORMOD,SERMOD,PRVMOD)
                        ;                            (PSW:S ,PSW:Z ,PSW:P ,PSW:CY)
                        ;                            ( 0    , 0    , 0    , 0    )
                        ;                      IF NORMOD .EQ. FALSE
                        ;                        METER NOT IN NORMAL MODE
0CA6 C0                  RNZ                     PROERR(ERRFLG)
                        ;                      ELSE
                        ;                        PUT NEW SETTING VALUE INTO WORK1
0CA7 16 04               MVI  D,NBANKS           D = NIBCNT = NBANKS
0CA9 CD AA 0A            CALL MSG2MU             MSG2MU(MSGBUF,NIBCNT,ERRFLG)
                        ;                              ( @B    , D    ,PSW:Z )
                        ;                              ( I     , I    , 0    )
0CAC F5                  PUSH PSW                SAVE A,PSW
0CAD 21 24 74            LXI  H,MRSTS1/2+X       HL = ADDRESS, MRSTS1
0CB0 7E                  MOV  A,M                MRSTS1.ENABLD = FALSE
0CB1 E6 FB               ANI  0FBH
0CB3 77                  MOV  M,A
0CB4 F1                  POP  PSW                RESTORE A,PSW
                        ;                        IF ERRFLG .EQ. TRUE
                        ;                          NEW SETTING VALUE IS IMPROPER
0CB5 C8                  RZ                        PROERR(ERRFLG)
                        ;                        ELSE
                        ;                          FETCH SETTING LIMIT EXPONENT
0CB6 06 1F               MVI  B,SETLIM+1           B = OFFSET, SETLIM[1]
0CB8 CD 35 0F            CALL GETNIB               GETNIB(EXPONT,ZROFLG,SETLIM[1])
                        ;                                ( A     ,PSW:Z , @B      )
                        ;                                ( 0     , 0    , I       )
                        ;                          CALCULATE WORK2 INDEX FOR MANTISSA
0CBB 2F                  CMA                       A = -EXPONT-1
0CBC C6 10               ADI  16                   C = I = 15-EXPONT
0CBE 4F                  MOV  C,A
                        ;                          CLEAR WORK2
0CBF 3E D0               MVI  A,WORK2              A = OFFSET, WORK2
0CC1 CD 85 0E            CALL CLRBLK               CLRBLK(WORK2)
                        ;                                ( @A  )
                        ;                                ( 0   )
                        ;                          PUT SET LIMIT MANTISSA INTO WORK2
0CC4 81                  ADD  C                    C = OFFSET, WORK2[I]
0CC5 4F                  MOV  C,A
0CC6 05                  DCR  B                    B = OFFSET, SETLIM[0]
0CC7 CD 35 0F            CALL GETNIB               GETNIB(MANTIS,ZROFLG,SETLIM[0])
                        ;                                ( A     ,PSW:Z , @B      )
                        ;                                ( 0     , 0    , I       )
0CCA CD EE 0F            CALL PUTNIB               PUTNIB(WORK2[I],MANTIS)
                        ;                                ( @C      , A     )
                        ;                                ( 0       , I     )
                        ;                          COMPARE NEW SETTING VS SETTING LIM
0CCD 11 DB CB            LXI  D,(WORK1+15-NBANKS)*100H+(WORK2+15-NBANKS)
                        ;                      D = OFFSET, WORK1[N=15-NBANKS]
                        ;                      E = OFFSET, WORK2[N]
0CD0 3E 05               MVI  A,NBANKS+1       A = NIBCNT = NBANKS+1
0CD2 CD 8E 0E            CALL CMPARE           CMPARE(WORK1[N],WORK2[N],NIBCNT,
                        ;                            ( @D      , @E      , A     ,
                        ;                            ( I       , I       , I     ,
                        ;
                        ;                             NEGFLG,ZROFLG)
                        ;                             PSW:S ,PSW:Z )
```

```
                  ;                          0    , 0    )
                  ;                      IF NEGFLG .EQ. FALSE
                  ;                        NEW SETTING EXCEEDS LIMIT
 0CD5 F0           RP                      PROERR(ERRFLG)
                  ;                      ELSE
 0CD6 F1           POP  PSW                CLEAN UP STACK
                  ;                        SET POSTAGE
 0CD7 11 26 74     LXI  D,NORFLG/2+X       DE = ADDRESS, NORFLG
 0CDA 1A           LDAX D                  NORFLG.LATDSB = FALSE
 0CDB E6 FE        ANI  0FEH
 0CDD F6 02        ORI  2                  NORFLG.UNVSEL = TRUE
 0CDF 12           STAX D
 0CE0 7E           MOV  A,M                MRSTS1.UNKSEL = TRUE
 0CE1 F6 80        ORI  80H
 0CE3 77           MOV  M,A
 0CE4 E5           PUSH H                  SAVE HL
 0CE5 CD 25 1A     CALL MVPOST             MVPOST(ERROR)
                  ;                               ( A   )
                  ;                               ( 0   )
 0CE8 E1           POP  H                  RESTORE HL
 0CE9 B7           ORA  A                  PSW:Z = NOERR = ERROR .EQ. 0
                  ;                        IF NOERR .EQ. FALSE
                  ;                          METER DID NOT SET
 0CEA C2 80 08     JNZ  FATERR               FATERR(ERROR,ERRFLG)
                  ;                                 ( A    ,PSW:Z )
                  ;                                 ( I    , 0    )
                  ;                        ELSE
                  ;                          REPORT SUCCESSFUL SETTING
 0CED 01 42 CC     LXI  B,(WORK1+16-NBANKS)*100H+POSREG
                  ;                          B = OFFSET, WORK1[N]
                  ;                          C = OFFSET, POSREG
 0CF0 3E 04        MVI  A,NBANKS             A = NIBCNT = NBANKS
 0CF2 CD B3 0F     CALL MVLNIB               MVLNIB(POSREG,WORK1[N],NBANKS,
                  ;                                 ( @C    , @B     , A    ,
                  ;                                 ( 0     , I      , I    ,
                  ;
                  ;                                 NONBCD,ZROFLG)
                  ;                                 PSW:S ,PSW:Z )
                  ;                                  0    , 0    )
 0CF5 7E           MOV  A,M                  MRSTS1.UNKSEL = FALSE
 0CF6 E6 7F        ANI  7FH
 0CF8 77           MOV  M,A
                  ;                          CLEAR ERROR FLAG
 0CF9 0C           INR  C                    C = OFFSET, POSREG[1]
                  ;                          PSW:Z = ERRFLG = C.EQ.0=FALSE
                  ;                        ENDIF
                  ;                      ENDIF
                  ;                    ENDIF
                  ;                  ENDIF
 0CFA C9           RET               RETURN
SRVCNV

                  ;SRVCNV(SRVREG,MAXCNT,ERRFLG)(AMTBUF,DIEDCM)
                  ;      (NIBSTR,BYTE  ,BIT   )(NIBSTR,BYTE  )
                  ;      ( 0    , I    , 0    )( I    , I    )
                  ;      ( @E   , D    ,PSW:Z )( RAM  , RAM  )
                  ;      ( C    , C    , C    )( NC   , NC   )
                  ;
                  ;PSW DESTROYED
                  ;REGISTERS DESTROYED
                  ;
                  ;CONVERT MESSAGE FORMATTED VALUE IN AMTBUF INTO A
                  ;SPECIAL SERVICE REGISTER FORMAT IN THE FORM:
                  ;MANTISSA*10**EXPONENT, IN WHICH
                  ;SRVREG[0] = MANTISSA
                  ;SRVREG[1] = EXPONENT
                  ;
```

```
                        SRVCNV;             ****ENTRY POINT
                         ;                  SET TO REACH PROERR VIA RETURN
0CFB 21 A1 0B           LXI  H,PROERR
0CFE E5                 PUSH H
                         ;                  FETCH VALUES FROM MESSAGE FORMAT
0CFF 06 E1              MVI  B,AMTBUF+1     B = OFFSET, AMTBUF[1]
0D01 CD 35 0F           CALL GETNIB         GETNIB(DECPOS,ZROFLG,AMTBUF[1])
                         ;                        ( A    ,PSW:Z , @B      )
                         ;                        ( O    , O    , I       )
0D04 6F                 MOV  L,A            L = DECPOS
0D05 05                 DCR  B              B = OFFSET, AMTBUF[0]
0D06 CD 35 0F           CALL GETNIB         GETNIB(MSGCNT,ZROFLG,AMTBUF[0])
                         ;                        ( A    ,PSW:Z , @B      )
                         ;                        ( O    , O    , I       )
0D09 67                 MOV  H,A            H = MSGCNT
                         ;                  IF ZROFLG .EQ. TRUE
                         ;                    NO VALUE WAS ENTERED
0D0A C8                 RZ                    PROERR(ERRFLG)
                         ;                  ELSE
                         ;                  POINT TO RIGHT OF H/O MESSAGE DIGIT
0D0B E6 01              ANI  1              B = OFFSET, AMTBUF[I=
                         ;                              (MSGCNT .AND. HEX01)+3]
0D0D C6 E3              ADI AMTBUF+3
0D0F 47                 MOV  B,A
0D10 4F                 MOV  C,A            C = OFFSET, AMTBUF[I]
                         ;                  SCAN DIGITS TO RIGHT OF H/O MSG DIGIT
0D11 7C                 MOV  A,H            A = NIBCNT = MSGCNT-1
0D12 3D                 DCR  A
0D13 CD B3 0F           CALL MVLNIB         MVLNIB(AMTBUF[I],AMTBUF[I],NIBCNT,
                         ;                        ( @C      , @B       , A     ,
                         ;                        ( O       , I        , I     ,
                         ;
                         ;                         NONBCD,ZROFLG)
                         ;                         PSW:S ,PSW:Z )
                         ;                          O    , O    )
                         ;                  IF ZROFLG .EQ. FALSE
                         ;                    NOT ALL DIGITS SCANNED WERE ZEROES
0D16 C0                 RNZ                   PROERR(ERRFLG)
                         ;                  ELSE
0D17 3A 35 74           LDA  DIEDCM/2+X     A = DIEDCM-DECPOS
0D1A 95                 SUB  L
                         ;                  IF (DIEDCM-DECPOS) .LT. 0
                         ;                    BAD DECIMAL IN MESSAGE FORMAT
0D1B D8                 RC                    PROERR(ERRFLG)
                         ;                  ELSE
                         ;                  CALCULATE EXPONENT
0D1C 84                 ADD  H              L = EXPONT = MSGCNT-1+DIEDCM-DECPOS
0D1D 3D                 DCR  A
0D1E 6F                 MOV  L,A
0D1F BA                 CMP  D              IF EXPONT .GE. MAXCNT
                         ;                    MESSAGE IS TOO LONG
0D20 D0                 RNC                   PROERR(ERRFLG)
                         ;                  ELSE
                         ;                  FETCH H/O MESSAGE DIGIT AS MANTISSA
0D21 05                 DCR  B              B = OFFSET, AMTBUF[I=I-1]
0D22 CD 35 0F           CALL GETNIB         GETNIB(MANTIS,ZROFLG,AMTBUF[I])
                         ;                        ( A    ,PSW:Z , @B      )
0D25 FE 0A              CPI  10             IF MANTIS .GE. 10
                         ;                    NON BCD CHAR IN MESSAGE
0D27 D0                 RNC                   PROERR(ERRFLG)
                         ;                  ELSE
0D28 C1                 POP  B                CLEAN UP STACK
                         ;                    PUT MANTISSA IN SERVICE REGISTER
0D29 4B                 MOV  C,E              C = OFFSET, SRVREG[0]
0D2A CD EE 0F           CALL PUTNIB           PUTNIB(SRVREG[0],MANTIS)
                         ;                          ( @C      , A    )
                         ;                          ( O       , I    )
```

```
                 ;                      PUT EXPONENT IN SERVICE REGISTER
0D2D 0C            INR  C               C = OFFSET, SRVREG[1]
0D2E 7D            MOV  A,L             A = EXPONT
0D2F CD EE 0F      CALL PUTNIB          PUTNIB(SRVREG[1],EXPONT)
                 ;                            ( @C      , A     )
                 ;                            ( O       , I     )
0D32 0C            INR  C               PSW:Z = ERRFLG = FALSE
                 ;                      ENDIF
0D33 C9            RET                  RETURN
SRVREQ

                 ;SRVREQ(SRVVAL,SRVHDR,ERRFLG)(WORK1 ,WORK2 ,DIEDCM)
                 ;      (NIBSTR,BYTE  ,BIT   )(NIBSTR,NIBSTR,BYTE  )
                 ;      ( I     , I    , O    )( O     , O     , I     )
                 ;      ( @B    , C    ,PSW:Z )( RAM   , RAM   , RAM   )
                 ;      ( NC    , C    , C    )( C     , C     , NC    )
                 ;
                 ;PSW DESTROYED
                 ;REGISTERS DESTROYED
                 ;
                 ;EXPAND COMPRESSED SERVICE REGISTER TO WORK BUFFER.
                 ;CALL VALREQ TO BUILD MESSAGE IN XMTBUF.
                 ;
                 SRVREQ;                ****ENTRY POINT
                 ;                      CLEAR WORK AREA
0D34 3E C0         MVI A,WORK1          A = OFFSET, WORK1
0D36 CD 85 0E      CALL CLRBLK          CLRBLK(WORK1)
                 ;                            ( @A  )
                 ;                            ( O   )
0D39 21 6A 74      LXI  H,(WORK2+4)/2+X
                 ;                      HL = ADDRESS, WORK2[4..5]
0D3C 71            MOV  M,C             WORK2[4..5] = SRVHDR
0D3D 0E C4         MVI  C,WORK1+4       C = OFFSET, WORK1[4]
                 ;                      MOVE MANTISSA INTO WORK AREA
0D3F 3E 01         MVI  A,1             A = NIBCNT = 1
0D41 CD B3 0F      CALL MVLNIB          MVLNIB(WORK1[4],SRVVAL[0],NIBCNT,PSW)
                 ;                            ( @C      , @B       , A     ,PSW)
                 ;                            ( O       , I        , I     , O )
0D44 04            INR  B               B = OFFSET, SRVVAL[1]
                 ;                      FETCH EXPONENT
0D45 CD 35 0F      CALL GETNIB          GETNIB(EXPONT,PSW,SRVVAL[1])
                 ;                            ( A     ,PSW, @B        )
                 ;                            ( O     , O , I         )
0D48 3C            INR  A               A = NIBCNT = EXPONT+1
0D49 07            RLC                  B = FORMAT = HEX10*NIBCNT
0D4A 07            RLC
0D4B 07            RLC
0D4C 07            RLC
0D4D 47            MOV  B,A
0D4E 3A 35 74      LDA  DIEDCM/2+X      A = FORMAT = FORMAT+DIEDCM
0D51 80            ADD  B
0D52 2B            DCX  H               HL = ADDRESS, WORK2[2..3]
0D53 77            MOV  M,A             WORK2[2..3] = FORMAT
0D54 2B            DCX  H               HL = ADDRESS, WORK2[0..1]
0D55 36 C4         MVI  M,WORK1+4       WORK2[0..1] = OFFSET, WORK1[4]
0D57 EB            XCHG                 DE = ADDRESS, WORK2[0..1]
                   ;                    PUT REPLY INTO TRANSMIT BUFFER
0D58 C3 5B 0D      JMP  VALREQ          VALREQ(WORK1[4],WORK2[2],WORK2[4],
                 ;                            (@@DE+0  ,@DE+1   ,@DE+2   ,
                 ;                            ( I      , I      , I      ,
                 ;
                 ;                            ERRFLG)
                 ;                            PSW:Z )
                 ;                             O    )
                 ;                      RETURN
VALREQ

                 ;VALREQ(SOURCE,VALFMT,ANSHDR,ERRFLG)(DIEDCM,DEFDCM,XMTBUF)
                 ;      (NIBSTR,BYTE  ,BYTE  ,BYTE  )(BYTE  ,BYTE  ,NIBSTR)
```

```
                 ;      ( I     , I     , I     , 0    )( I     , I     , 0     )
                 ;      (@@DE+0, @DE+1, @DE+2,PSW:Z )( RAM   , RAM   , RAM   )
                 ;      ( NC    , NC    , NC    , C    )( NC    , NC    , C     )
                 ;
                 ;PSW DESTROYED
                 ;ALL REGISTERS DESTROYED
                 ;
                 ;BUILD VALUE REPLY MESSAGE IN TRANSMIT BUFFER
                 ;
                 VALREQ;                ****ENTRY POINT
                 ;                      FETCH OFFSET OF SOURCE
0D5B EB            XCHG                 HL = ADDRESS, (OFFSET, SOURCE[L=0])
0D5C 46            MOV  B,M             B = OFFSET, SOURCE[L=0]
                 ;                      FETCH FORMAT TEMPLATE FOR MESSAGE
0D5D 23            INX  H               HL = ADDRESS, VALFMT
0D5E 7E            MOV  A,M             E = DECPOS = VALFMT[1]
0D5F E6 0F         ANI  0FH
0D61 5F            MOV  E,A
0D62 7E            MOV  A,M             D = NDIGIT = VALFMT[0]
0D63 AB            XRA  E
0D64 0F            RRC
0D65 0F            RRC
0D66 0F            RRC
0D67 0F            RRC
0D68 57            MOV  D,A
                 ;                      FETCH HEADER FOR REPLY
0D69 23            INX  H               HL = ADDRESS, ANSHDR
0D6A 4E            MOV  C,M             C = ANSHDR
                 ;                      SCAN FOR MOST SIGNIFICANT DIGIT
                 VALR01;                DO WHILE SOURCE[L] .EQ. 0
0D6B CD 35 0F      CALL GETNIB            GETNIB(LDIGIT,ZROFLG,SOURCE[L])
                 ;                               ( A     , PSW:Z, @B      )
                 ;                               ( 0     , 0    , I       )
0D6E C2 78 0D      JNZ  VALR02
0D71 04            INR  B                 B = OFFSET, SOURCE[L=L+1]
0D72 15            DCR  D                 D = NDIGIT = NDIGIT-1
0D73 C2 6B 0D      JNZ  VALR01            IF NDIGIT .EQ. 0
0D76 14            INR  D                   D = NDIGIT = 1
0D77 05            DCR  B                   B = OFFSET, SOURCE[L=L-1]
                 ;                          BREAK
                 ;                        ENDIF
                 VALR02;                ENDDO
0D78 1C            INR  E               IF DECPOS .EQ. 0
0D79 1D            DCR  E
0D7A C2 9E 0D      JNZ  VALR05
                 ;                        METER CHARACTERISTCS WILL
                 ;                        DETERMINE FORMAT.
                 ;                        ADJUST VALUES SO THAT AT LEAST ONE
                 ;                        DIGIT WILL BE TO LEFT OF DECIMAL.
0D7D 2A 35 74      LHLD DIEDCM/2+X        L = DIEDCM
                 ;                        H = DEFDCM
0D80 5D            MOV  E,L               E = DECPOS = DIEDCM
0D81 7D            MOV  A,L               A = ADJUST = DIEDCM+1-NDIGIT
0D82 3C            INR  A
0D83 92            SUB  D
0D84 FA 8D 0D      JM   VALR03            IF ADJUST .GE. 0
0D87 6F            MOV  L,A                 L = ADJUST
0D88 82            ADD  D                   D = NDIGIT = NDIGIT+ADJUST
0D89 57            MOV  D,A
0D8A 78            MOV  A,B                 B = OFFSET, SOURCE[L=L-ADJUST]
0D8B 95            SUB  L
0D8C 47            MOV  B,A
                 VALR03;                  ENDIF
                 ;                        SUPPRESS TRAILING ZERO IN THE
                 ;                        EVENT DIEDCM .GT. DEFDCM
0D8D C5            PUSH B                 SAVE BC
0D8E 78            MOV  A,B               B = OFFSET, SOURCE[R=L+NDIGIT-1]
```

```
0D8F 82          ADD  D
0D90 3D          DCR  A
0D91 47          MOV  B,A
0D92 CD 35 0F    CALL GETNIB         GETNIB(RDIGIT,ZROFLG,SOURCE[R])
                ;                          ( A    , PSW:Z, @B      )
                ;                          ( O    , O    , I       )
0D95 C1          POP  B              B = SOURCE[L]
                ;                    C = ANSHDR
0D96 C2 9E 0D    JNZ  VALR04         IF RDIGIT .EQ. 0
                ;                      TRAILING ZERO IS PRESENT
0D99 7A          MOV  A,D              D = NDIGIT = NDIGIT+DEFDCM-DECPOS
0D9A 93          SUB  E
0D9B 84          ADD H
0D9C 57          MOV  D,A
0D9D 5C          MOV  E,H              E = DECPOS = DEFDCM
                VALR04;              ENDIF
                VALR05;            ENDIF
                ;                  CLEAR TRANSMIT BUFFER
0D9E 3E A0       MVI  A,XMTBUF     A = OFFSET, XMTBUF
0DA0 CD 85 0E    CALL CLRBLK       CLRBLK(XMTBUF)
                ;                        ( @A   )
                ;                        ( O    )
                ;                  BUILD MESSAGE IN TRANSMIT BUFFER
0DA3 7A          MOV  A,D          L = MSGSIZ = 2+(NDIGIT+1)/2
0DA4 B7          ORA  A
0DA5 1F          RAR
0DA6 CE 02       ACI  2
0DA8 6F          MOV  L,A
0DA9 61          MOV  H,C          H = ANSHDR
0DAA 22 50 74    SHLD XMTBUF/2+X   XMTBUF[0..1] = MSGSIZ
                ;                  XMTBUF[2..3] = ANSHDR
0DAD 0E A4       MVI  C,XMTBUF+4   C = OFFSET, XMTBUF[4]
0DAF 7A          MOV  A,D          A = NDIGIT
0DB0 CD EE 0F    CALL PUTNIB       PUTNIB(XMTBUF[4],NDIGIT)
                ;                        ( @C       , A    )
                ;                        ( O        , I    )
0DB3 0C          INR  C            C = OFFSET, XMTBUF[5]
0DB4 7B          MOV  A,E          A = DECPOS
0DB5 CD EE 0F    CALL PUTNIB       PUTNIB(XMTBUF[5],DECPOS)
                ;                        ( @C       , A    )
                ;                        ( O        , I    )
0DB8 0C          INR  C            C = OFFSET, XMTBUF[I=6+(NDIGIT.MOD.2)]
0DB9 7A          MOV  A,D
0DBA E6 01       ANI  1
0DBC 81          ADD  C
0DBD 4F          MOV  C,A
0DBE 7A          MOV  A,D          A = NDIGIT
0DBF CD B3 0F    CALL MVLNIB       MVLNIB(XMTBUF[I],SOURCE[L],NDIGIT,
                ;                        ( @C       , @B      , A     ,
                ;                        ( O        , I       , I     ,
                ;
                ;                         NONBCD,ZROFLG)
                ;                         PSW:S ,PSW:Z )
                ;                          O    , O    )
0DC2 FA A1 0B    JM   PROERR       IF NONBCD .EQ. TRUE
                ;                    PROCESS ERROR
                ;                    PROERR(ERRFLG)
                ;                          ( A    )
                ;                          ( O    )
                ;                    RETURN
                ;                  ELSE
0DC5 0C          INR  C              PSW:Z = ERRFLG = FALSE
0DC6 C9          RET                 RETURN
                ;                  ENDIF
XEQHDR

                ;XEQHDR(HEADER,ERRFLG)(DBUF  ,XMTBUF,NORFLG)
                ;       (BYTE  ,BIT   )(NIBSTR,NIBSTR,BITSTR)
```

```
                  ;      ( I    , O    )( I/O  , I    , O    )
                  ;      ( A    ,PSW:Z )( RAM  , RAM  , RAM  )
                  ;      ( NC   , C    )( C    , NC   , C    )
                  ;
                  ;PSW = DESTROYED
                  ;
                  ;SUPERVISES THE EXECUTION OF INTERNALLY GENERATED HEADERS
                  ;
                  XEQHDR;                 ****ENTRY POINT
0DC7 E5             PUSH H                SAVE HL
0DC8 D5             PUSH D                SAVE DE
0DC9 C5             PUSH B                SAVE BC
0DCA 47             MOV  B,A              B = HEADER
                  ;                       STOP TIMER
0DCB CD 34 01       CALL STPTMR           STPTMR(WASOFF)
                  ;                             (PSW:Z )
                  ;                             ( O    )
0DCE 3A 40 74       LDA  DBUF/2+X         A = DBUF[0..1]
0DD1 B7             ORA  A                PSW:Z = DBUF[0..1] .EQ. 0
0DD2 78             MOV  A,B              A = HEADER
0DD3 C2 E7 0D       JNZ  XEQH02           IF DBUF[0..1] .EQ. 0
                  ;                         DISPLAY HAS KEYENTERED DATA
0DD6 FE C4          CPI  HSETDA             IF(HEADER .LT .0) .AND.
                  ;                           (HEADER .NE. HSETDA)
0DD8 CA E7 0D       JZ   XEQH01
0DDB B7             ORA  A
0DDC F2 E7 0D       JP   XEQH01
                  ;                           PROCESS HEADER WITH DATA IN DBUF
0DDF 06 82          MVI  B,DBUF+2             B = OFFSET, DBUF[2]
0DE1 CD 41 09       CALL HDRPLS               HDRPLS(HEADER,DBUF[2],ERRFLG)
                  ;                                  ( A     , @B    ,PSW:Z)
                  ;                                  ( I     , I     , O   )
0DE4 C3 EA 0D       JMP  XEQH03
                  XEQH01;                   ELSE
                  ;                           PROCESS HEADER WITHOUT DATA
                  ;                           HDRONY(HEADER,ERRFLG)
                  ;                                  ( A     ,PSW:Z)
                  ;                                  ( I     , O    )
                  ;                         ENDIF
                  XEQH02;                 ELSE
                  ;                         PROCESS HEADER WITHOUT DATA
0DE7 CD D5 08       CALL HDRONY             HDRONY(HEADER,ERRFLG)
                  ;                                ( A     ,PSW:Z)
                  ;                                ( I     , O    )
                  XEQH03;                 ENDIF
0DEA CA 11 0E       JZ   XEQH07           IF ERRFLG .EQ. FALSE
0DED F5             PUSH PSW                SAVE A, PSW
0DEE 3A 50 74       LDA  XMTBUF/2+X         A = BYTCNT = XMTBUF[0..1]
0DF1 B7             ORA  A                  PSW:Z = BYTCNT .EQ. 0
                  ;                         PSW:CY = 0
0DF2 CA 02 0E       JZ   XEQH04             IF BYTCNT .NE. 0
                  ;                           CONVERT BYTE COUNT TO NIBBLE COUNT
0DF5 17             RAL                       A = NIBCNT = 2*BYTCNT
0DF6 01 80 A2       LXI  B,(XMTBUF+2)*100H+DBUF
                  ;                           B = OFFSET, XMTBUF[2]
XEQHDR

                  ;                           C = OFFSET, DBUF[0]
                  ;                           MOVE DATA INTO DBUF
0DF9 CD B3 0F       CALL MVLNIB               MVLNIB(DBUF[0],XMTBUF[2],NIBCNT)
                  ;                                  ( @C     , @B      , A    )
                  ;                                  ( O      , I       , I    )
0DFC CD 5A 05       CALL VALDSP               MOVE DBUF INTO DISPLAY
0DFF C3 10 0E       JMP  XEQH06
                  XEQH04;                   ELSE
                  ;                           BYTCNT .EQ. 0
                  ;                           COMMAND AFFECTED STATUS ONLY
```

```
0E02 3A 40 74   LDA  DBUF/2+X          IF DBUF[0..1] = HEX00
0E05 B7         ORA  A
0E06 C2 10 0E   JNZ  XEQH05
               ;                         KEYENTERED DISPLAY UNCHANGED
               ;                         QUE POSTAGE REQUEST
0E09 21 26 74   LXI  H,NORFLG/2+X        HL = ADDRESS, NORFLG
0E0C 7E         MOV  A,M                 NORFLG.QUEPOS = TRUE
0E0D F6 40      ORI  40H
0E0F 77         MOV  M,A
               XEQH05;                 ENDIF
               XEQH06;               ENDIF
0E10 F1         POP  PSW             A = HEADER
               ;                     PSW:Z = ERRFLG
               XEQH07;             ENDIF
0E11 C1         POP  B             RESTORE BC
0E12 D1         POP  D             RESTORE DE
0E13 E1         POP  H             RESTORE HL
0E14 C9         RET                RETURN
XMIT

               ;XMIT()(SID,SOD,SOE,XMTBUF,NORFLG)
               ;      (BIT,BIT,BIT,BYTSTR,BYTSTR)
               ;      ( I , O , O , I/O  , I    )
               ;      (RIM,SIM,SIM, RAM  , RAM  )
               ;      ( NC, C , C , C    , NC   )
               ;
               ;REGISTERS DESTROYED
               ;PSW DESTROYED
               ;
               ;ATTEMPT TO TRANSMIT MESSAGE IN XMTBUF.
               ;ONE ATTEMPT ONLY.  XMTBUF[0], THE MESSAGE BYTE COUNT,
               ;IS CLEARED WHETHER OR NOT THE MESSAGE IS ACTUALLY SENT.
               ;XMTBUF[0] IS ASSUMED .GT. 0, AND .LE. 7 ON ENTRY.
               ;
               XMIT;               ****ENTRY POINT
               ;                   FETCH BYTE COUNT OF OUTBOUND MESSAGE
0E15 21 50 74   LXI  H,XMTBUF/2+X  HL =  ADDRESS, XMTBUF[N=0]
0E18 4E         MOV  C,M           C = BYTCNT = XMTBUF[N]
               ;                   CANCEL MSG BY CLEARING XMTBUF[0]
0E19 36 00      MVI  M,0           XMTBUF[N] = 0
0E1B 3A 26 74   LDA  NORFLG/2+X    IF NORFLG.COMDSB .EQ. TRUE
0E1E E6 04      ANI  4
               ;                     COMMUNICATIONS ARE DISABLED
0E20 C0         RNZ                  RETURN
               ;                   ENDIF
               ;                   STOP TIMER
0E21 CD 34 01   CALL STPTMR        STPTMR(WASOFF)
               ;                         (PSW:Z )
               ;                         ( 0    )
0E24 E5         PUSH H             SAVE HL
0E25 C5         PUSH B             SAVE BC
0E26 CD C7 0B   CALL RECEVE        IF INCOMING RTS IS PRESENT
               ;                     RECEIVE MESSAGE
               ;                   ENDIF
0E29 3E C0      MVI  A,0C0H        SIM.SOD = RTS = 1
               ;                   SIM.SOE = ENABLD = 1
0E2B 30         SIM                OUTPUT RTS
0E2C C1         POP  B             RESTORE BC
0E2D E1         POP  H             RESTORE HL
0E2E 16 D9      MVI  D,217         D = COUNT ;FOR T13 = 3.509 MSEC
               XMIT01;             DO UNTIL BIT .EQ. CTS
0E30 15         DCR  D               COUNT = COUNT-1
0E31 CA 7B 0E   JZ   XMIT06          IF COUNT+1 .EQ. 0
               ; >>JUMP AHEAD<<        TIMEOUT HAS OCCURRED
               ;                       QUIT
               ;                     ENDIF
0E34 20         RIM                  INPUT BIT
```

```
                   ;                 A.0 = BIT = RIM.SID ;CTS OR IDLE
0E35 B7              ORA  A           CHECK BIT
0E36 F2 30 0E        JP   XMIT01
                   ;                ENDDO

                   XMIT03;          DO UNTIL BYTCNT .EQ. 0
                   ;                  DEFINE STOP BIT
0E39 3E 01           MVI  A,1         IF 1 .LT. BYTCNT
0E3B B9              CMP  C
                   ;                    THIS IS NOT LAST BYTE
                   ;                    PSW:CY = STOP = EOB = 1
                   ;                  ELSE
                   ;                    THIS IS THE LAST BYTE
                   ;                    PSW:CY = STOP = EOM = 0
                   ;                  ENDIF
0E3C 23              INX  H           HL = ADDRESS, XMTBUF[N=N+1]
0E3D 3E 12           MVI  A,18        DELAY ;FOR T4 = 178.234 USEC
0E3F 3D              DCR  A
0E40 F2 3F 0E        JP   $-1
                   ;                  SET TO OUTPUT 9 BITS FROM LOOP
                   ;                  8 DATA, AND 1 EOB OR EOM
0E43 06 0A           MVI  B,9+1       BITCNT = 10 = 9+1
0E45 3E 40           MVI  A,40H       SIM.SOD = START = 0
                   ;                  SIM.SOE = ENABLD = 1
0E47 57              MOV  D,A         D.0 = OUTBIT = START
0E48 30              SIM              OUTPUT = START
                   ;                  LOAD 8 DATA BITS
0E49 7E              MOV A,M          A = XMTBUF[N]
                   ;                  SAVE 8 DATA BITS AND 1 STOP BIT
0E4A F5              PUSH PSW

                   XMIT04;            LOOP ;BREAK IF BITCNT .EQ. 0
0E4B 3E 06           MVI  A,6           DELAY ;BIT PERIOD = 103.923 USEC
0E4D 3D              DCR  A
0E4E F2 4D 0E        JP   $-1
0E51 F0              RP
0E52 F1              POP  PSW           GET NEXT BIT
0E53 1F              RAR                PSW.CY = OUTBIT
0E54 F5              PUSH PSW
0E55 3E 80           MVI  A,80H         PSW:CY,A = SIM*2
0E57 1F              RAR                A = SIM
                   ;                    SIM.SOD = OUTBIT
                   ;                    SIM.SOE = ENABLD = 1
0E58 5A              MOV  E,D           E.0 = PRVBIT = OUTBIT
0E59 57              MOV  D,A           D.0 = OUTBIT
0E5A 05              DCR  B             BITCNT = BITCNT-1
                   ;                    IF BITCNT .EQ. 0
0E5B CA 68 0E        JZ   XMIT05          BREAK
                   ;                    ENDIF
0E5E 30              SIM                OUTPUT OUTBIT
0E5F 20              RIM                READ ECHO
                   ;                    A.0 = ECHO = RIM.SID
0E60 AB              XRA  E             IF ECHO .NE. PRVBIT
0E61 F2 4B 0E        JP   XMIT04
0E64 F1              POP  PSW             CLEAN UP STACK
0E65 C3 7B 0E        JMP  XMIT06          QUIT
                   ; >>JUMP AHEAD<<
                   ;                    ENDIF
                   XMIT05;            ENDLOOP
0E68 F1              POP  PSW         CLEAN UP STACK
0E69 20              RIM              READ ECHO
                   ;                  A.0 = ECHO = RIM.SID
0E6A AB              XRA  E           IF ECHO .NE. STOP
0E6B FA 7B 0E        JM   XMIT06        QUIT
                   ; >>JUMP AHEAD<<
                   ;                  ENDIF
0E6E 0D              DCR  C           C = BYTCNT = BYTCNT-1
```

```
0E6F C2 39 0E   JNZ  XMIT03
               ;                  ENDDO

0E72 3E C0      MVI  A,0C0H       SIM.SOD = ACK = 1
               ;                  SIM.SOE = ENABLD = 1
0E74 30         SIM               OUTPUT ACK
0E75 16 29      MVI  D,41         DELAY ;T7 = 336.914 USEC
0E77 15         DCR  D
0E78 F2 77 0E   JP   $-1
               XMIT06;            >>TARGET OF JUMP AHEAD<<
               ;                  QUIT XMIT ROUTINE
0E7B 3E 40      MVI  A,40H        SIM.SOD = IDLE = 0
               ;                  SIM.SOE = ENABLD = 1
0E7D 30         SIM               OUTPUT IDLE
0E7E 16 C8      MVI  D,200        DELAY ;T14 = 1606.908 USEC
0E80 15         DCR  D
0E81 F2 80 0E   JP   $-1
0E84 C9         RET               RETURN
CLRBLK

               ;CLRBLK(BLOCK )
               ;      (NIBSTR)
               ;      ( O    )
               ;      ( @A   )
               ;      ( C    )
               ;
               ;PSW:S, Z, P, CY = NO CHANGE
               ;
               ;CLEAR A 16 NIBBLE BLOCK TO ZEROS
               ;BLOCK[0..15] = 0
               ;
               CLRBLK;           ****ENTRY POINT
0E85 F5         PUSH PSW         SAVE A, PSW
0E86 C5         PUSH B           SAVE BC
0E87 4F         MOV  C,A         C = OFFSET, BLOCK
0E88 AF         XRA  A           A = NIBVAL = 0
0E89 06 10      MVI  B,16        B = NIBCNT = 16
0E8B C3 26 0F   JMP  FILN01      FILNIB(BLOCK,NIBVAL,NIBCNT)
               ;                        ( @C   , A    , B    )
               ;                        ( O    , I    , I    )
               ;                 RESTORE BC
               ;                 RESTORE A, PSW
               ;                 RETURN
CMPARE

               ;CMPARE(MINUEN,SUBTRA,NNIB ,SGNFLG,ZROFLG)
               ;      (NIBSTR,NIBSTR,BYTE ,BIT   ,BIT   )
               ;      ( I    , I    , I   , O    , O    )
               ;      ( @D   , @E   , A   ,PSW:S ,PSW:Z )
               ;      ( NC   , NC   , NC  , C    , C    )
               ;
               ;PSW:CY = NO CHANGE
               ;PSW:S, Z, P CHANGED
               ;
               ;COMPARE EQUAL LENGTH BCD NIBBLE STRINGS
               ;
               CMPARE;            ****ENTRY POINT
0E8E E5         PUSH H            SAVE HL
0E8F F5         PUSH PSW          SAVE A, PSW
0E90 C5         PUSH B            SAVE BC
0E91 D5         PUSH D            SAVE DE
0E92 67         MOV  H,A          H = COUNT = NNIB
               CMPAR1;            DO WHILE COUNT .GT. 0
0E93 25         DCR  H              H = COUNT-1
0E94 FA A9 0E   JM   CMPAR2
0E97 43         MOV  B,E            B = OFFSET,
               ;                        SUBTRA[SINDEX = NNIB-COUNT]
```

```
0E98 CD 35 0F   CALL GETNIB            GETNIB(SDIGIT,ZERO ,SUBTRA[SINDEX])
               ;                               ( A    ,PSW:Z, @B          )
               ;                               ( 0    , 0   , I           )
0E9B 4F          MOV  C,A              C = SDIGIT
0E9C 42          MOV  B,D              B = OFFSET,
               ;                          MINUEN[MINDEX = NNIB-COUNT]
0E9D CD 35 0F   CALL GETNIB            GETNIB(MDIGIT,ZERO ,MINUEN[MINDEX])
               ;                               ( A    ,PSW:Z, @B          )
               ;                               ( 0    , 0   , I           )
0EA0 91          SUB  C                A = DIFRNC = MDIGIT-SDIGIT
0EA1 C2 A9 0E    JNZ  CMPAR2           IF DIFRNC .NE. 0
               ;                         BREAK
               ;                       ENDIF
0EA4 1C          INR  E                E = OFFSET,
               ;                          SUBTRA[SINDEX = NNIB-(COUNT-1)]
0EA5 14          INR  D                D = OFFSET,
               ;                          MINUEN[MINDEX = NNIB-(COUNT-1)]
               ;                       H = COUNT = COUNT-1
0EA6 C3 93 0E    JMP  CMPAR1
               CMPAR2;               ENDDO
0EA9 D1          POP  D              RESTORE DE
0EAA C1          POP  B              RESTORE BC
               ;                     IF NNIB .EQ. 0
0EAB 67          MOV  H,A              H = DIFRNC = NNIB = 0
               ;                     ELSE
               ;                       H = DIFRNC
               ;                     ENDIF
0EAC F1          POP  PSW            RESTORE A, PSW:CY
               ;                     OUTPUT PSW:S = SGNFLG
               ;                     OUTPUT PSW:Z = ZROFLG
0EAD 24          INR  H
0EAE 25          DCR  H
0EAF E1          POP  H              RESTORE HL
0EB0 C9          RET                 RETURN
CRC

               ;CRC(BLOCK ,NIBCNT,CRCVAL)
               ;   (NIBSTR,UBYTE ,UBYTE )
               ;   ( I    , I    , O    )
               ;   ( @C   , B    , D    )
               ;   ( NC   , NC   , C    )
               ;
               ;PSW = NO CHANGE
               ;
               ;COMPUTE CRC FOR BLOCK OF NIBCNT NIBBLES
               ;
               CRC;                  ****ENTRY POINT
0EB1 C5          PUSH B              SAVE BC
0EB2 F5          PUSH PSW            SAVE A, PSW
0EB3 78          MOV  A,B            A = NIBCNT
0EB4 41          MOV  B,C            B = OFFSET, BLOCK[N = 0]
0EB5 4F          MOV  C,A            C = NIBCNT
0EB6 16 FF       MVI  D,0FFH         D = CRCVAL = HEXFF
               CRC1;                 DO UNTIL NIBCNT = 0
0EB8 CD 35 0F    CALL GETNIB           GETNIB(NIBVAL,ZERO ,BLOCK[N])
               ;                              ( A    ,PSW:Z, @B     )
               ;                              ( 0    , 0   , I      )
0EBB CD C6 0E    CALL CRCNIB           CRCNIB(NIBVAL,CRCVAL)
               ;                              ( A    , D    )
               ;                              ( I    , I/O  )
0EBE 04          INR  B                B = OFFSET, BLOCK[N = N+1]
0EBF 0D          DCR  C                NIBCNT = NIBCNT-1
0EC0 C2 B8 0E    JNZ  CRC1
               ;                     ENDDO
0EC3 F1          POP  PSW            RESTORE A, PSW
0EC4 C1          POP  B              RESTORE BC
0EC5 C9          RET
```

CRCNIB

```
                  ;CRCNIB(NIBVAL,CRCVAL)
                  ;      (BYTE  ,BYTE  )
                  ;      ( I    , I/O  )
                  ;      ( A    , D    )
                  ;      ( NC   , C    )
                  ;
                  ;PSW DESTROYED
                  ;
                  ;INCLUDE NIBBLE INTO DEVELOPING VALUE OF CRC
                  ;
                  CRCNIB;               ****ENTRY POINT
0EC6 C5             PUSH B              SAVE BC
0EC7 06 04          MVI  B,4            B = BITCNT = 4
                  ;                     SHIFT BITS TO HIGH ORDER OF NIBVAL
0EC9 07             RLC                 A = NIBVAL = NIBVAL*HEX10
0ECA 07             RLC
0ECB 07             RLC
0ECC 07             RLC
                  ;                     ROTATE NIBVAL ONE BIT AT A TIME
                  ;                     BACK INTO ITS ORIGINAL FORM WHILE
                  ;                     MODIFYING CRCVAL TO REFLECT
                  ;                     THE BIT'S VALUE
                  CRCNI1;               DO UNTIL BITCNT .EQ. 0
0ECD 07             RLC                   CY = NIBBIT
                  ;                       A = NIBVAL = ((NIBVAL*2) .AND.
                  ;                           HEXFF)+NIBBIT
0ECE 4F             MOV  C,A              C = NIBVAL
0ECF 7A             MOV  A,D              A = CRCVAL
0ED0 17             RAL                   CY = CRCBIT
                  ;                       A = CRCVAL = ((CRCVAL*2) .AND.
                  ;                                   HEXFF)+NIBBIT
0ED1 D2 D6 0E       JNC  CRCNI2           IF CRCBIT = 1
0ED4 EE 9B          XRI  9BH                A = CRCVAL = CRCVAL .XOR. HEX9B
                  CRCNI2;                 ENDIF
0ED6 57             MOV  D,A              D = CRCVAL
0ED7 79             MOV  A,C              A = NIBVAL
0ED8 05             DCR  B                B = BITCNT = BITCNT-1
0ED9 C2 CD 0E       JNZ  CRCNI1
                  ;                     ENDDO
0EDC C1             POP  B              RESTORE BC
0EDD C9             RET                 RETURN
```

DBLANK

```
                  ;DBLANK()(PORTA )
                  ;        (BITSTR)
                  ;        ( I/O  )
                  ;        ( 7001 )
                  ;        ( C    )
                  ;
                  ;REGISTERS DESTROYED
                  ;PSW DESTROYED
                  ;
                  ;DISPLAY BLANKING ROUTINE
                  ;
                  DBLANK;               ****ENTRY POINT
                  ;                     PREVENT INTERRUPT DISPLAY REFRESH
0EDE CD 34 01       CALL STPTMR         STPTMR(WASOFF)
                  ;                           (PSW:Z )
                  ;                           ( 0    )
                  ;                     FLUSH POSSIBLE NOISE OUT OF DISPLAY
0EE1 CD F6 0E       CALL DFLUSH         DFLUSH(ADDRESS,PORTA)
                  ;                           ( HL     , @HL )
                  ;                           ( 0      -     )
                  ;                     (PORTA .AND HEXOF) .EQ. HEXOF, FOR
                  ;                     3 DARK BITS AND IDLE DISPLAY CLOCK
```

```
0EE4 7E          MOV  A,M
0EE5 E6 F1       ANI  0F1H
0EE7 77          MOV  M,A          PORTA = PORTA .AND. HEXF1, FOR
                 ;                 3 START BITS AND IDLE DISPLAY CLOCK
0EE8 35          DCR  M            PULSE DISPLAY CLOCK
0EE9 34          INR  M
                 ;                 SET TO OUTPUT 35*3 DARK BITS
0EEA F6 0F       ORI  0FH
0EEC 77          MOV  M,A          PORTA = PORTA .OR. HEX0F, FOR
                 ;                 3 DARK BITS AND IDLE DISPLAY CLOCK
0EED 3E 22       MVI  A,34         A = COUNT = 34
                 DBLAN1;           ****ALTERNATE ENTRY POINT
                 DBLAN2;           DO UNTIL COUNT .LT. 0
0EEF 35          DCR  M              PULSE DISPLAY CLOCK
0EF0 34          INR  M
0EF1 3D          DCR  A              A = COUNT = COUNT-1
0EF2 F2 EF 0E    JP   DBLAN2
                 ;                 ENDDO
0EF5 C9          RET
DFLUSH

                 ;DFLUSH(ADDRES)(PORTA )
                 ;      (ADDRES)(BITSTR)
                 ;      ( 0    )( I/O  )
                 ;      ( HL   )( 7001 )
                 ;      ( C    )( C    )
                 ;
                 ;REGISTERS DESTROYED
                 ;PSW DESTROYED
                 ;
                 ;FLUSH POSSIBLE NOISE OUT OF DISPLAY SHIFT REGISTER
                 ;
                 DFLUSH;           ****ENTRY POINT
0EF6 21 01 70    LXI  H,PORTA      HL = ADDRESS, PORTA
0EF9 7E          MOV  A,M
0EFA F6 0F       ORI  0FH
0EFC 77          MOV  M,A          PORTA = PORTA .OR. HEX0F, FOR
                 ;                 3 DARK BITS AND IDLE DISPLAY CLOCK
                 ;                 CLOCK 36*3 DARK BITS INTO DISPLAY
0EFD 3E 23       MVI  A,35         A = COUNT = 35
0EFF C3 EF 0E    JMP  DBLAN1
                 ;                 RETURN
DSBKBD

                 ;DSBKBD()(KDCTRL,CHRBKT,CTLBKT)
                 ;        (BITSTR,BYTE  ,BYTE  )
                 ;        ( 0    , 0    , 0    )
                 ;        ( RAM  , RAM  , RAM  )
                 ;        ( C    , C    , C    )
                 ;
                 ;PSW:S, Z, P, CY = NO CHANGE
                 ;
                 ;DISABLE KEYBOARD
                 ;
                 DSBKBD;           ****ENTRY POINT
0F02 F5          PUSH PSW          SAVE A, PSW
                 ;                 PREVENT KDIO FROM SCANNING KEYBOARD
0F03 3A 27 74    LDA  KDCTRL/2+X   KDCTRL.KBDDSB = TRUE
0F06 F6 01       ORI  01H
0F08 32 27 74    STA  KDCTRL/2+X
                 ;                 CLEAR OUTPUT OF DBOUNCE ROUTINE
0F0B AF          XRA  A            CHRBKT = HEX00
0F0C 32 2C 74    STA  CHRBKT/2+X
0F0F 32 2B 74    STA  CTLBKT/2+X   CTLBKT = HEX00
0F12 F1          POP  PSW          RESTORE A, PSW
0F13 C9          RET               RETURN
```

ENAKBD

```
                ;ENAKBD()(KEYBKT,KDCTRL)
                ;        (BYTE  ,BITSTR)
                ;        ( 0    , 0    )
                ;        ( RAM  , RAM  )
                ;        ( C    , C    )
                ;
                ;PSW:S, Z, P, CY = NO CHANGE
                ;
                ;ENABLE KEYBOARD
                ;
                ENAKBD;                 ****ENTRY POINT
0F14 F5           PUSH PSW              SAVE A, PSW
                ;                       FORCE KDIO TO RESYNC KEYBOARD SCAN
0F15 3E 80        MVI  A,MULKEY         KEYBKT = MULKEY
0F17 32 2A 74     STA  KEYBKT/2+X
                ;                       ALLOW KDIO TO SCAN KEYBOARD
0F1A 3A 27 74     LDA  KDCTRL/2+X       KDCTRL.KDBDSB = FALSE
0F1D E6 FE        ANI  0FEH
0F1F 32 27 74     STA  KDCTRL/2+X
0F22 F1           POP  PSW              RESTORE A, PSW
0F23 C9           RET                   RETURN
```

FILNIB

```
                ;FILNIB(DEST  ,NIBVAL,NIBCNT)
                ;      (NIBSTR,BYTE  ,UBYTE )
                ;      ( 0    , I    , I    )
                ;      ( @C   , A    , B    )
                ;      ( C    , NC   , NC   )
                ;
                ;PSW:S, Z, P, CY = NO CHANGE
                ;
                ;FILL A NIBBLE STRING WITH A VALUE
                ;DEST[0..NIBCNT-1] = NIBVAL
                ;
                FILNIB;                 ****ENTRY POINT
0F24 F5           PUSH PSW              SAVE A, PSW
0F25 C5           PUSH B                SAVE BC
                FILN01;                 ****SPECIAL JUMP ENTRY
                ;                       C = OFFSET, DEST[N = 0]
                ;                       FILL NIBCNT NIBBLES IN DEST WITH NIBVAL
0F26 04           INR  B                CONDITION NIBCNT FOR DO WHILE
                FILN02;                 DO WHILE NIBCNT .NE. 0
0F27 05           DCR  B                  B = NIBCNT-1
0F28 CA 32 0F     JZ   FILN03
                ;                         PUT NIBVAL INTO DEST
0F2B CD EE 0F     CALL PUTNIB             PUTNIB(DEST[N],NIBVAL)
                ;                                ( @C    , A    )
                ;                                ( 0     , I    )
                ;                         POINT AT NEXT NIBBLE TO RIGHT
0F2E 0C           INR  C                  C = OFFSET, DEST[N+1]
                ;                         B = NIBCNT = NIBCNT-1
0F2F C3 27 0F     JMP  FILN02
                FILN03;                 ENDDO
0F32 C1           POP  B                RESTORE BC
0F33 F1           POP  PSW              RESTORE A, PSW
0F34 C9           RET                   RETURN
```

GETNIB

```
                ;GETNIB(NIBVAL,ZERO ,SOURCE)
                ;      (BYTE  ,BIT  ,NIB   )
                ;      ( 0    , 0   , I    )
                ;      ( A    ,PSW:Z, @B   )
                ;      ( C    , C   , NC   )
                ;
                ;PSW:CY = NO CHANGE
```

```
                  ;PSW:S, Z, P CHANGED; CORRESPOND TO VALUE OF NIBVAL
                  ;
                  ;FETCH HIGH ORDER 4 BIT VALUE FROM SOURCE[N=EVEN]
                  ;OR LOW ORDER 4 BIT VALUE FROM SOURCE[N=ODD],
                  ;AND PLACE IT IN LOW ORDER OF NIBVAL.
                  ;CLEAR HIGH ORDER OF NIBVAL.
                  ;NIBVAL = SOURCE[N],   ZERO = NIBVAL .EQ. 0
                  ;
                  GETNIB;                 ****ENTRY POINT
0F35 E5             PUSH H                SAVE HL
0F36 F5             PUSH PSW              SAVE A, PSW
                  ;                       FLAG WHETHER L/O NIBBLE OF BYTE WANTED
0F37 AF             XRA  A                A = OFFSET, SOURCE[N]/2
0F38 78             MOV  A,B
0F39 1F             RAR
                  ;                       PSW:CY = ODD = TRUE, IF N = ODD
                  ;                       CALCULATE ADDRESS OF SOURCE
0F3A 26 74          MVI  H,X/100H         HL = ADDRESS, SOURCE[N]
0F3C 6F             MOV  L,A
                  GETN01;                 ****SPECIAL JUMP ENTRY
                  ;                       FETCH BYTE CONTAINING DESIRED NIBBLE
0F3D 7E             MOV  A,M              A = SOURCE[N]
                  ;                       CHECK WHETHER NIBBLE IN HIGH ORDER
0F3E DA 45 0F       JC   GETN02           IF ODD .EQ. FALSE
                  ;                         MOVE H/O NIBBLE TO L/O
0F41 0F             RRC                     A = SOURCE[N] = SOURCE[N]/HEX10
0F42 0F             RRC
0F43 0F             RRC
0F44 0F             RRC
                  GETN02;                 ENDIF
                  ;                       CLEAR HIGH ORDER NIBBLE
0F45 E6 0F          ANI  0FH              H = NIBVAL = SOURCE[N] .AND. HEX0F
0F47 67             MOV  H,A
0F48 F1             POP  PSW              RESTORE PSW:CY
0F49 7C             MOV  A,H              A = NIBVAL
                  ;                       INDICATE NIBVAL STATUS
0F4A 3C             INR  A                PSW:Z = ZERO = NIBVAL .EQ. 0
0F4B 3D             DCR  A
0F4C E1             POP  H                RESTORE HL
0F4D C9             RET                   RETURN
LSTATE

                  ;LSTATE(FATMOD,NORMOD,SERMOD,PRVMOD)(MRSTS1,MRSTS2)
                  ;      (BIT   ,BIT   ,BIT   ,BIT   )(BITSTR,BITSTR)
                  ;      ( 0    , 0    , 0    , 0    )( I    , I    )
                  ;      (PSW:S ,PSW:Z ,PSW:P ,PSW:CY)(RAM   ,RAM   )
                  ;      ( C    , C    , C    , C    )( NC   , NC   )
                  ;
                  ;PSW:S = MINUS STATUS IF FATAL MODE
                  ;PSW:Z = ZERO STATUS IF NORMAL MODE
                  ;PSW:P = EVEN PARITY STATUS IF SERVICE MODE
                  ;PSW:CY= 1 IF PRIVILEGED MODE
                  ;
                  ;COPIES METER STATE FLAGS INTO PSW FOR EASY TESTING
                  ;
                  LSTATE;                 ****ENTRY POINT
0F4E E5             PUSH H                SAVE HL
0F4F F5             PUSH PSW              H = A, SAVED FOR RETURN
0F50 E1             POP  H
0F51 3A 25 74       LDA  MRSTS2/2+X       L = MRSTS2.FATMOD + MRSTS2.PRVMOD
0F54 E6 81          ANI  81H                  (PSW:S POS  ) , (PSW:CY POS )
0F56 6F             MOV  L,A
0F57 3A 24 74       LDA  MRSTS1/2+X       A = MRSTS1.SERMOD
0F5A E6 08          ANI  08H                  (            )
0F5C 0F             RRC                       (PSW:P POS  )
0F5D B5             ORA  L                A = FATMOD, PRVMOD, SERMOD
                  ;                           (PSW:S, PSW:CY, PSW:P)
```

```
0F5E C2 63 0F   JNZ  LSTAT1        IF NO STATUS BITS ARE SET
0F61 3E 40      MVI  A,40H           A = NORMOD
               ;                        (PSW:Z)
               LSTAT1;             ENDIF
0F63 6F         MOV  L,A           L = A = STATUS
0F64 E5         PUSH H             RESTORE A; PSW = STATUS
0F65 F1         POP  PSW
0F66 E1         POP  H             RESTORE HL
0F67 C9         RET                RETURN
MOVBIT

               ;MOVBIT(SOURCE,SBIT ,DEST  ,DBIT ,VALUE)
               ;      (BITSTR,UBYTE,BITSTR,UBYTE,BIT  )
               ;      ( I    , I   , O    , I   , O   )
               ;      ( @H   , L   , @D   , E   ,PSW:Z)
               ;      ( NC   , NC  , C    , NC  , C   )
               ;
               ;PSW:CY = NO CHANGE
               ;PSW:S, Z, P CHANGED; CORRESPOND TO VALUE OF BIT
               ;
               ;MOVE BIT FROM BIT POSITION SBIT IN SOURCE TO BIT POSITION
               ;DBIT IN DEST.  VALUE INDICATES WHETHER BIT IS 0 OR 1.
               ;BIT 0 IS HIGH ORDER BIT OF STRING.
               ;DEST[DBIT] = SOURCE[SBIT]
               ;
               MOVBIT;             ****ENTRY POINT
0F68 E5         PUSH H             SAVE HL
0F69 C5         PUSH B             SAVE BC
0F6A F5         PUSH PSW           SAVE A, PSW
0F6B D5         PUSH D             SAVE DE
               ;                   H = SRCOFS = OFFSET, SOURCE
               ;                   BUILD SOURCE ADDRESS AND MASK
0F6C CD 8A 0F   CALL MOVB01        MOVB01(SRCOFS,SBIT,SRCADR,SMASK)
               ;                          ( H    , L  , HL   , A   )
               ;                          ( I    , I  , O    , O   )
               ;                   HL = SRCADR = ADDRESS, SOURCE.SBIT
0F6F 47         MOV  B,A           B = SMASK
0F70 7E         MOV  A,M           PSW:CY = SOURCE.SBIT
0F71 A0         ANA  B
0F72 C6 FF      ADI  0FFH
               ;                   IF SOURCE.SBIT .NE. 0
0F74 9F         SBB  A               B = SRCBIT = HEXFF
0F75 47         MOV  B,A
               ;                   ELSE
               ;                     B = SRCBIT = HEX00
               ;                   ENDIF
0F76 E1         POP  H             H = DSTOFS = OFFSET, DEST
               ;                   L = DBIT
0F77 E5         PUSH H             RESAVE HL
               ;                   BUILD DESTINATION ADDRESS AND MASK
0F78 CD 8A 0F   CALL MOVB01        MOVB01(DSTOFS,DBIT,DSTADR,DMASK)
               ;                          ( H    , L  , HL   , A   )
               ;                          ( I    , I  , O    , O   )
               ;                   HL = DSTADR = ADDRESS, DEST.DBIT
0F7B 4F         MOV  C,A           C = DMASK
0F7C A0         ANA  B             B = DSTBIT = DMASK .AND. SRCBIT
0F7D 47         MOV  B,A
0F7E 79         MOV  A,C           A = DEST.DBIT = 0
0F7F 2F         CMA
0F80 A6         ANA  M
0F81 B0         ORA  B             DEST.DBIT = DEST.DBIT .OR. DSTBIT
0F82 77         MOV  M,A
0F83 D1         POP  D             RESTORE DE
0F84 F1         POP  PSW           RESTORE A, PSW:CY
0F85 04         INR  B             PSW:Z = DSTBIT .EQ. 0
0F86 05         DCR  B
0F87 C1         POP  B             RESTORE BC
0F88 E1         POP  H             RESTORE HL
0F89 C9         RET                RETURN
```

```
                  ;MOVB01(NIBOFS,BITNO,BYTADR,MASK)
                  ;      (OFFSET,UBYTE,ADDR  ,BYTE)
                  ;      ( I    , I   , O    , O  )
                  ;      ( H    , L   , HL   , A  )
                  ;      ( C    , C   , C    , C  )
                  ;
                  ;PSW:S, Z, P, CY DESTROYED
                  ;REGISTER DE DESTROYED
                  ;
                  ;CONVERT NIBBLE OFFSET AND BIT NUMBER INTO ADDRESS OF
                  ;BYTE CONTAINING BIT.  A BIT SELECTION MASK IS ALSO
                  ;PRODUCED
                  ;
                  MOVB01;                 ****ENTRY POINT FOR MOVBIT ONLY
 0F8A 7D            MOV  A,L              E = ((BITNO/4)+NIBOFS)/2
 0F8B 1F            RAR
 0F8C 1F            RAR
 0F8D E6 2F         ANI  2FH
 0F8F 84            ADD  H
 0F90 1F            RAR
 0F91 5F            MOV  E,A
 0F92 7C            MOV  A,H              PSW:CY = NIBOFS .MOD. 2
 0F93 1F            RAR
 0F94 7D            MOV  A,L              A = BITNO
 0F95 D2 9A 0F      JNC  MOVB02           IF PSW:CY .EQ. 1
                  ;                         NIBOFS NOT ON BYTE BOUNDARY
 0F98 DE 04         SBI  4                  MAKE CORRECTION TO BITNO
                  MOVB02;                 ENDIF
 0F9A E6 07         ANI  07H              A = BITNUM, WITHIN BYTE
 0F9C 16 00         MVI  D,0              DE = ((BITNO/4)+NIBOFS)/2
 0F9E 21 00 74      LXI  H,X              HL = BYTADR
 0FA1 19            DAD  D
 0FA2 E5            PUSH H                SAVE BYTADR
 0FA3 5F            MOV  E,A              DE = BITNUM
 0FA4 21 AB 0F      LXI  H,MOVB03         HL = ADDRESS, MASK
 0FA7 19            DAD  D
 0FA8 7E            MOV  A,M              A = MASK
 0FA9 E1            POP  H                HL = BYTADR
 0FAA C9            RET                   RETURN
                  ;
                  MOVB03;                 MASK TABLE
 0FAB 80            DB   80H              0 BIT MASK; HIGH ORDER
 0FAC 40            DB   40H              1
 0FAD 20            DB   20H              2
 0FAE 10            DB   10H              3
 0FAF 08            DB   08H              4
 0FB0 04            DB   04H              5
 0FB1 02            DB   02H              6
 0FB2 01            DB   01H              7 BIT MASK; LOW ORDER
MVLNIB

                  ;MVLNIB(DEST  ,SOURCE,NIBCNT,NONBCD,ZERO  )
                  ;      (NIBSTR,NIBSTR,BYTE  ,BIT   ,BIT   )
                  ;      ( O    , I     , I    , O    , O    )
                  ;      ( @C   , @B    , A    ,PSW:S ,PSW:Z )
                  ;      ( C    , NC    , NC   , C    , C    )
                  ;
                  ;PSW:CY = NO CHANGE
                  ;PSW:S, Z, P CHANGED
                  ;
                  ;FOR A STRING ADDRESSED AT THE LEFT SIDE,
                  ;FROM RIGHT TO LEFT MOVE NIBCNT NIBBLES FROM SOURCE TO
                  ;DEST.  THE NONBCD AND ZERO FLAGS REFER TO THE LARGEST
                  ;NIBBLE VALUE MOVED.
                  ;DEST[0..NIBCNT-1] = SOURCE[0..NIBCNT-1]
                  ;
                  MVLNIB;                  ****ENTRY POINT
```

```
0FB3 C5          PUSH B           SAVE  BC
                MVLN01;           ****SPECIAL JUMP ENTRY
0FB4 F5          PUSH PSW         SAVE A, PSW
0FB5 D5          PUSH D           SAVE DE
0FB6 3D          DCR  A           D = NIBCNT-1
0FB7 57          MOV  D,A
0FB8 80          ADD  B           B = OFFSET, SOURCE[N=NIBCNT-1]
0FB9 47          MOV  B,A
0FBA 7A          MOV  A,D         A = NIBCNT-1
0FBB 81          ADD  C           C = OFFSET, DEST[N=NIBCNT-1]
0FBC 4F          MOV  C,A
0FBD D1          POP  D           RESTORE DE
0FBE F1          POP  PSW         RESTORE A, PSW
0FBF C3 C3 0F    JMP  MVRN01      MVRNIB(DEST[N],SOURCE[N],NIBCNT,
                ;                       ( @C    , @B      , A    ,
                ;                       ( 0     , I       , I    ,
                ;
                ;                       NONBCD,ZERO )
                ;                       PSW:S ,PSW:Z)
                ;                        0    , 0   )
                ;                 RESTORE BC
                ;                 RETURN
                ;MVRNIB(DEST  ,SOURCE,NIBCNT,NONBCD,ZERO )
                ;      (NIBSTR,NIBSTR,BYTE  ,BIT   ,BIT  )
                ;      ( 0    , I     , I     , 0    , 0   )
                ;      ( @C   , @B    , A     ,PSW:S ,PSW:Z)
                ;      ( C    , NC    , NC    , C    , C   )
                ;
                ;PSW:CY = NO CHANGE
                ;PSW:S, Z, P CHANGED
                ;
                ;FOR A STRING ADDRESSED AT THE RIGHT SIDE,
                ;FROM RIGHT TO LEFT MOVE NIBCNT NIBBLES FROM SOURCE TO
                ;DEST.  THE NONBCD AND ZERO FLAGS REFER TO THE LARGEST
                ;NIBBLE VALUE MOVED.
                ;DEST[1-NIBCNT..0] = SOURCE[1-NIBCNT..0]
                ;
                MVRNIB;           ****ENTRY POINT
0FC2 C5          PUSH B           SAVE BC
                MVRN01;           ****SPECIAL JUMP ENTRY
0FC3 F5          PUSH PSW         SAVE A, PSW
0FC4 E5          PUSH H           SAVE HL
0FC5 67          MOV  H,A         H = NIBCNT
                ;                 B = OFFSET, SOURCE[N=0]
                ;                 C = OFFSET, DEST[N=0]
                ;                 SET FLAGS FOR RETURN IF NIBCNT .LE. 0
0FC6 2E 00       MVI  L,0         L = FLAGV = 0; WHICH WILL PRODUCE:
                ;                 PSW:Z = ZERO = TRUE
                ;                 PSW:S = NONBCD = FALSE
                ;                 MOVE NIBCNT NIBBLES
                MVRN02;           DO WHILE NIBCNT .GT. 0
0FC8 25          DCR  H             H = NIBCNT-1
0FC9 FA E7 0F    JM   MVRN06
                ;                   MOVE ONE NIBBLE
0FCC CD 35 0F    CALL GETNIB        GETNIB(NIBVAL,ZERO ,SOURCE[N])
                ;                         ( A    ,PSW:Z, @B      )
                ;                         ( 0    , 0   , I       )
0FCF CD EE 0F    CALL PUTNIB        PUTNIB(DEST[N],NIBVAL)
                ;                         ( @C    , A    )
                ;                         ( 0     , I    )
                ;                   CHECK FOR NONZERO NIBBLE
0FD2 CA DB 0F    JZ   MVRN04        IF ZERO .EQ. FALSE
                ;                     CHECK FOR NO PREVIOUS FLAGS
0FD5 2C          INR  L               IF FLAGV .EQ. 0
0FD6 2D          DCR  L
0FD7 C2 DB 0F    JNZ  MVRN03
0FDA 2C          INR  L                 L = FLAGV = 1
```

```
                         ;                   WHICH WILL PRODUCE:
                         ;                   PSW:Z = ZERO = FALSE
                         ;                   PSW:S = NONBCD = FALSE
                        MVRN03;            ENDIF
                        MVRN04;          ENDIF
                         ;               CHECK FOR NONBCD NIBBLE
 0FDB FE 0A               CPI  10        IF NIBVAL .GE. 10
 0FDD DA E2 0F            JC   MVRN05
 0FE0 2E 80               MVI  L,80H       L = FLAGV = HEX80
                         ;                 WHICH WILL PRODUCE:
                         ;                 PSW:Z = ZERO = FALSE
                         ;                 PSW:S = NONBCD = TRUE
                        MVRN05;          ENDIF
                         ;               MOVE INDICES FROM RIGHT TO LEFT
 0FE2 05                  DCR  B         B = OFFSET, SOURCE[N=N-1]
 0FE3 0D                  DCR  C         C = OFFSET.DEST[N=N-1]
                         ;               H = NIBCNT = NIBCNT-1
 0FE4 C3 C8 0F            JMP  MVRN02
                        MVRN06;        ENDDO
 0FE7 4D                  MOV  C,L     C = FLAGV
 0FE8 E1                  POP  H       RESTORE HL
 0FE9 F1                  POP  PSW     RESTORE A, PSW:CY
 0FEA 0C                  INR  C       PSW = STATUS, FLAGV
 0FEB 0D                  DCR  C
 0FEC C1                  POP  B       RESTORE BC
 0FED C9                  RET          RETURN
PUTNIB

                        ;PUTNIB(DEST  ,NIBVAL)
                        ;      (NIBBLE,BYTE  )
                        ;      ( O    , I    )
                        ;      ( @C   , A    )
                        ;      ( C    , NC   )
                        ;
                        ;PSW:S, Z, P, CY = NO CHANGE
                        ;
                        ;INSERT LOW ORDER 4 BITS OF NIBVAL INTO DEST
                        ;DEST = NIBVAL .AND. HEXOF
                        ;
                        PUTNIB;        ****ENTRY POINT
 0FEE E5                  PUSH H       SAVE HL
 0FEF C5                  PUSH B       SAVE BC
 0FF0 F5                  PUSH PSW     SAVE A, PSW
                        ;              CLEAR H/O NIBBLE OF NIBVAL
 0FF1 E6 0F               ANI  0FH     B = NIBVAL = NIBVAL .AND. HEX0F
 0FF3 47                  MOV  B,A
                        ;              FLAG WHETHER NIBBLE GOES INTO L/O
                        ;              OF BYTE CONTAINING DEST
 0FF4 AF                  XRA  A       PSW:CY = OFFSET, DEST .MOD. 2
 0FF5 79                  MOV  A,C
 0FF6 1F                  RAR
                        ;              A = (OFFSET, DEST)/2
 0FF7 26 74               MVI  H,X/100H  HL = ADDRESS, DEST
 0FF9 6F                  MOV  L,A
                        ;              MAKE MASK TO CLEAR L/O OF BYTE
 0FFA 0E F0               MVI  C,0F0H  C = MASK = HEXF0
                        ;              CHECK WHETHER NIBBLE GOES IN H/O
 0FFC DA 07 10            JC   PUTN01  IF PSW:CY .EQ. 0
                        ;                MAKE MASK TO CLEAR H/O OF BYTE
 0FFF 0E 0F               MVI  C,0FH     C = MASK = HEX0F
                        ;                SHIFT L/O NIBBLE OF NIBVAL TO H/O
 1001 78                  MOV  A,B       B = NIBVAL = NIBVAL * HEX10
 1002 07                  RLC
 1003 07                  RLC
 1004 07                  RLC
 1005 07                  RLC
 1006 47                  MOV  B,A
```

```
               PUTNO1;              ENDIF
               ;                    FETCH BYTE CONTAINING DEST
1007 7E          MOV  A,M           A = DEST
               ;                    MAKE HOLE IN BYTE FOR NIBBLE
1008 A1          ANA  C             A = DEST = 0
               ;                    PUT NIBBLE IN HOLE
1009 B0          ORA  B             DEST = NIBVAL
100A 77          MOV  M,A
100B F1          POP  PSW           RESTORE A, PSW
100C C1          POP  B             RESTORE BC
100D E1          POP  H             RESTORE HL
100E C9          RET                RETURN
RSCAN

               ;RSCAN(SOURCE,NIBCNT,NONBCD,ZERO  )
               ;     (NIBSTR,BYTE  ,BIT   ,BIT   )
               ;     ( I    , I    , 0    , 0    )
               ;     ( @B   , A    ,PSW:S ,PSW:Z )
               ;     ( NC   , NC   , C    , C    )
               ;
               ;PSW:CY= NO CHANGE
               ;PSW:S, Z, P CHANGED
               ;
               ;FOR A STRING ADDRESSED AT THE RIGHT SIDE,
               ;FROM RIGHT TO LEFT SCAN NIBCNT NIBBLES.
               ;THE NONBCD AND ZERO FLAGS REFER TO THE LARGEST
               ;NIBBLE SCANNED.
               ;SCAN SOURCE[1-NIBCNT..0]
               ;
               RSCAN;               ****ENTRY POINT
100F C5          PUSH B             SAVE BC
               ;                    SCAN BY MOVING SOURCE INTO ITSELF
1010 48          MOV  C,B           C = OFFSET, SOURCE
1011 C3 C3 0F    JMP  MVRN01        MVRNIB(SOURCE,SOURCE,NIBCNT,
               ;                           ( @C    , @B    , A    ,
               ;                           ( 0     , I     , I    ,
               ;
               ;                           NONBCD,ZERO  )
               ;                           PSW:S ,PSW:Z )
               ;                            0    , 0    )
               ;                    RESTORE BC
               ;                    RETURN
TDBITM

               ;TDBITM(SOURCE,BITCNT,DEST  ,DBIT  ,SBIT  )
               ;      (BITSTR,UBYTE ,BITSTR,UBYTE ,BYTSTR)
               ;      ( I    , I    , 0    , I    , I    )
               ;      ( @H   , L    , @D   , E    , @BC  )
               ;      ( NC   , C    , C    , C    , NC   )
               ;
               ;REGISTERS DESTROYED
               ;PSW DESTROYED
               ;
               ;TABLE DRIVEN BIT MOVE ROUTINE.
               ;MOVES BITCNT BITS INTO DEST STARTING AT DEST.DBIT;
               ;THE SOURCE BITS ARE SOURCE.SBIT[0] THROUGH
               ;SOURCE.SBIT[BITCNT-1]
               ;
               TDBITM;              ****ENTRY POINT
1014 7D          MOV  A,L           A = BITCNT = BITCNT+1
1015 3C          INR  A
               ;                    BC = ADDRESS, SBIT[N=0]
               TDBIT1;              DO WHILE BITCNT .NE. 0
1016 3D          DCR  A               A =  BITCNT = BITCNT-1
1017 C8          RZ
1018 F5          PUSH PSW             SAVE A, PSW
1019 0A          LDAX B               L = SBIT[N]
```

```
101A 6F         MOV  L,A
                ;                         MOVE BIT
101B CD 68 0F   CALL MOVBIT               MOVBIT(SOURCE,SBIT[N],DEST,DBIT,VALUE)
                ;                                ( @H   , L     , @D , E  ,PSW:Z)
                ;                                ( I    , I     , O  , I  , O   )
101E F1         POP  PSW                  A = BITCNT
101F 03         INX B                     BC = ADDRESS, SBIT[N=N+1]
1020 1C         INR  E                    E = DBIT = DBIT+1
1021 C3 16 10   JMP  TDBIT1
                ;                        ENDDO
                ;                        RETURN
VCALL

                ;VCALL(RTNADR)
                ;     (ADDR  )
                ;     ( I    )
                ;     ( HL   )
                ;
                ;REGISTER AND STATUS CHANGES DEPEND ON ROUTINE @HL
                ;
                ;VECTOR CALL TO ROUTINE WHOSE ADDRESS IS IN HL
                ;
                VCALL;                  ****ENTRY POINT
1024 E9           PCHL                  GO TO ROUTINE @HL
                ;                       RETURN VIA RTS IN THAT ROUTINE
VCALLS

                ;VCALLS(RTNADR)
                ;      (ADDR  )
                ;      ( I    )
                ;      ( HL   )
                ;      ( NC   )
                ;
                ;PSW:S, Z, P, CY = NO CHANGE
                ;
                ;VECTOR CALL TO ROUTINE @HL
                ;
                VCALLS;                 ****ENTRY POINT
1025 C5           PUSH B                SAVE ALL REGISTERS
1026 D5           PUSH D
1027 E5           PUSH H
1028 F5           PUSH PSW
                ;                       VECTOR CALL TO ROUTINE @HL
1029 CD 24 10     CALL VCALL            VCALL(RTNADR)
                ;                            ( HL    )
                ;                            ( I     )
                ;                       RESTORE ALL REGISTERS
102C F1           POP  PSW
102D E1           POP  H
102E D1           POP  D
102F C1           POP  B
1030 C9           RET
NVM30F

                ;NVM30F()(PORTA )
                ;         (BITSTR)
                ;         ( I/O  )
                ;         ( 7001 )
                ;         ( C    )
                ;
                ;REGISTERS NOT CHANGED
                ;PSW NOT CHANGED
                ;
                ;REMOVE 30 VOLTS FROM NONVOLATILE MEMORY TO DISABLE
                ;WRITING AND ERASING.
                ;
                NVM30F;                  ****ENTRY POINT
```

```
1031 F5          PUSH PSW          SAVE A,PSW
1032 C5          PUSH B            SAVE BC
                ;                  REMOVE 30 VOLTS FROM NVM
1033 3A 01 70    LDA  PORTA        PORTA = PORTA .OR. HEX40
1036 F6 40       ORI  40H
1038 32 01 70    STA  PORTA
                ;                  PAUSE FOR 10 MSEC TO ALLOW NVM
                ;                  VOLTAGE TO TRANSITION FROM
                ;                  -30 TO +5
103B 01 64 00    LXI  B,100        BC = LOOPCT = 100
                NVM30G;            DO UNTIL LOOPCT .EQ. 0
103E CD 19 0B    CALL NPAUSE         NPAUSE(LOOPCT,ZROFLG)
                ;                           ( BC    ,PSW:Z )
                ;                           ( I/O   , 0     )
1041 C2 3E 10    JNZ  NVM30G
                ;                  ENDDO
1044 C1          POP  B            RESTORE BC
1045 F1          POP  PSW          RESTORE A,PSW
1046 C9          RET               RETURN
NVM30T

                ;NVM30T()(PORTA )
                ;        (BITSTR)
                ;        ( I/O  )
                ;        ( 7001 )
                ;        ( C    )
                ;
                ;REGISTERS NOT CHANGED
                ;PSW NOT CHANGED
                ;
                ;APPLY 30 VOLTS TO NONVOLATILE MEMORY TO ENABLE
                ;WRITING AND ERASING.
                ;
                NVM30T;            ****ENTRY POINT
1047 F5          PUSH PSW          SAVE A,PSW
                ;                  SUPPLY 30 VOLTS TO NVM
1048 3A 01 70    LDA  PORTA        PORTA = PORTA .AND. HEXBF
104B E6 BF       ANI  0BFH
104D 32 01 70    STA  PORTA
                ;                  DELAY ABOUT 100 USEC BEFORE RETURNING
1050 3E 0B       MVI  A,11
1052 3D          DCR  A
1053 C2 52 10    JNZ  $-1
1056 F1          POP  PSW          RESTORE A,PSW
1057 C9          RET               RETURN
NVMBYT

                ;NVMBYT(ADRESS,NVMRED[J],BYTE)
                ;      (ADRESS,NIBSTR   ,BYTE)
                ;      ( I/O  , I       , O  )
                ;      ( HL   , @HL     , A  )
                ;      ( C    , NC      , C  )
                ;
                ;PSW DESTROYED
                ;REGISTERS NOT CHANGED
                ;
                ;ASSEMBLE 2 NIBBLES FROM NVM INTO A SINGLE BYTE
                ;
                NVMBYT;            ****ENTRY POINT
1058 C5          PUSH B            SAVE BC
1059 7E          MOV  A,M          B = HINIB = NVMRED[J]*HEX10
105A 87          ADD  A
105B 87          ADD  A
105C 87          ADD  A
105D 87          ADD  A
105E 47          MOV  B,A
                ;                  POINT AT NEXT NIBBLE
```

```
1 05F CD BB 11   CALL NVMNXT       NVMNXT(ADRESS,NVMRED[J=J+?])
                ;                         ( HL    , @HL          )
                ;                         ( I/O   , -            )
1062 7E           MOV  A,M         A = LOWNIB = NVMRED[J] .AND. HEXOF
1063 E6 OF        ANI  OFH
1065 B0           ORA  B           A = BYTE = LOWNIB .OR. HINIB
1066 C1           POP  B           RESTORE BC
1067 C9           RET              RETURN
NVMCHG

                ;NVMCHG()(NVMCTL)
                ;        (NIBSTR)
                ;        ( I    )
                ;        ( RAM  )
                ;        ( NC   )
                ;
                ;A,PSW DESTROYED
                ;REGISTERS DESTROYED
                ;
                ;PROVIDES NVM NORMAL BLOCK IF METER IN NORMAL MODE.
                ;PROVIDES NVM SERVICE BLOCK IF METER NOT IN NORMAL MODE.
                ;
                ;NVMCTL[0] = F IF NO BLOCK IS OPEN
                ;          = 0 IF NORMAL BLOCK IS OPEN
                ;          = 1 IF SERVICE BLOCK IS OPEN
                ;NVMCTL[1] = NUMBER OF OPEN BLOCK
                ;
                NVMCHG;                 ****ENTRY POINT
                ;                       FETCH BLOCK TYPE
1068 06 66        MVI  B,NVMCTL     B = OFFSET, NVMCTL[0]
106A CD 35 OF     CALL GETNIB       GETNIB(BLKTYP,ZROFLG,NVMCTL[0])
                ;                          ( A    ,PSW:Z , @B       )
                ;                          ( 0    , 0    , I        )
106D FE 02        CPI  2            IF BLKTYP .LT. 2
106F D0           RNC
                ;                     A BLOCK IS OPEN
                ;                     DETERMINE METER STATUS
1070 CD 4E OF     CALL LSTATE         LSTATE(FATMOD,NORMOD,SERMOD,PRVMOD)
                ;                           (PSW:S ,PSW:Z ,PSW:P ,PSW:C )
                ;                           ( 0    , 0    , 0    , 0    )
1073 CA 77 10     JZ   NVMCH1         IF NORMOD .EQ. FALSE
                ;                       A SERVICE BLOCK IS REQUIRED
1076 3D           DCR  A                A = DIFRNC = BLKTYP-(SRVTYP=1)
                NVMCH1;               ELSE
                ;                       A NORMAL BLOCK IS REQUIRED
                ;                       A = DIFRNC = BLKTYP-(NORHDR=0)
                ;                     ENDIF
1077 B7           ORA  A              IF DIFRNC .NE. 0
1078 C8           RZ
                ;                       CURRENT BLOCK NOT REQUIRED
1079 CD DE OE     CALL DBLANK           STOP CLOCK. BLANK DISPLAY
                ;                       CLOSE CURRENT BLOCK
107C F3           DI                    DISABLE INTERRUPTS
107D CD 9E 12     CALL NVMWR            NVMWR(ERRFLG)
                ;                            (PSW:Z )
                ;                            ( 0    )
1080 FB           EI                    ENABLE INTERRUPTS
                ;                       IF ERRFLG .EQ. FALSE
                ;                         OPEN REQUIRED BLOCK
1081 C2 C4 11     JNZ  NVMOPN             NVMOPN(ERRFLG)
                ;                               (PSW:Z )
                ;                               ( 0    )
                ;                       ENDIF
                ;                     ENDIF
                ;                   ENDIF
1084 C9           RET               RETURN
```

NVMDED

```
                 ;NVMDED(CODE,ERRFLG)(SERFLG,NVMRED)
                 ;      (BYTE,BIT   )(BIT   ,NIBSTR)
                 ;      ( I  , O    )( O    , I    )
                 ;      ( A  ,PSW:Z )( RAM  , NVM  )
                 ;      ( C  , C    )( C    , NC   )
                 ;
                 ;A,PSW DESTROYED
                 ;REGISTERS DESTROYED
                 ;
                 ;FLAG METER DEAD AND INDICATE ERROR
                 ;
                 NVMDED;                  ****ENTRY POINT
1085 47            MOV  B,A               B = CODE
                 ;                        TEST SPECIAL NVM LOCATION
1086 3A BE 46      LDA  NVMRED+KILCOD IF NVMRED[KILCOD] .EQ. HEXOF
1089 3C            INR  A
108A E6 OF         ANI  OFH
108C C2 A0 10      JNZ NVMDE2
                 ;                          LOCATION STILL CLEAR
                 ;                          WRITE ERROR CODE TO LOCATION
108F 78            MOV  A,B                 A[1] = CODE
1090 21 BE 02      LXI  H,KILCOD            H = BASE = KILCOD
1093 CD 47 10      CALL NVM30T              TURN ON -30 V TO NVM
1096 CD 61 12      CALL NVMWN               NVMWN(CODE,BASE,ERRFLG)
                 ;                               (A[1], HL ,PSW:Z )
                 ;                               ( I  , I  , O    )
                 NVMDE1;                    ****ENTRY POINT
                 ;                              NVMDE1(CODE,ERRFLG)
                 ;                                    ( B  ,PSW:Z )
                 ;                                    ( I  , O    )
                 ;                          FLAG METER DEAD
1099 21 10 74      LXI  H,SERFLG/2+X        HL = ADDRESS, SERFLG
109C 7E            MOV  A,M                 SERFLG.DEAD = TRUE
109D F6 80         ORI  80H
109F 77            MOV  M,A
                 NVMDE2;                  ENDIF
10A0 CD 31 10      CALL NVM30F            TURN OFF -30 V TO NVM
                 ;                        DECLARE FATAL ERROR
10A3 78            MOV  A,B               A = DEDCOD = HEX20+CODE
10A4 F6 20         ORI  20H
10A6 C3 80 08      JMP  FATERR            FATERR(DEDCOD,ERRFLG)
                 ;                              ( A    ,PSW:Z )
                 ;                              ( I    , O    )
                 ;                        RETURN
```

NVMDXB

```
                 ;NVMDXB(ERRFLG,BLKCTL)
                 ;      (BIT   ,NIBSTR)
                 ;      ( O    , I    )
                 ;      (PSW:Z , B    )
                 ;      ( C    , NC   )
                 ;
                 ;A,PSW DESTROYED
                 ;REGISTERS DESTROYED
                 ;
                 ;DEACTIVATES NVM BLOCK
                 ;
                 NVMDXB;                  ****ENTRY POINT
                 ;                        MOVE NVM CONTROL BYTE TO ACCUMULATOR
10A9 78            MOV  A,B               A = BLKCTL
                 ;                        FORM BASE VALUE FOR BLOCK
10AA CD 91 11      CALL NVMMAP            NVMMAP(BLKCTL,BASE,BLKTYP)
                 ;                              ( A    , HL , A[1] )
                 ;                              ( I    , O  , O    )
                 ;                        WRITE NUL HEADER TO DEACTIVATE BLOCK
```

```
10AD AF          XRA  A               A[1] = NULHDR = 0
10AE C3 61 12    JMP  NVMWN           NVMWN(NULHDR,BASE,ERRFLG)
                ;                         ( A[1] , HL ,PSW:Z )
                ;                         ( I    , I  , 0    )
                ;                     RETURN
NVMER

                ;NVMER(ERRFLG)(NVMCTL,NVMERS,NVMRED,SERFLG)
                ;     (BIT   )(NIBSTR,NIBSTR,NIBSTR,BITSTR)
                ;     ( 0    )( I    , 0    , I    , I    )
                ;     (PSW:Z )( RAM  , NVM  , NVM  , RAM  )
                ;     ( C    )( NC   , C    , NC   , C    )
                ;
                ;A,PSW DESTROYED
                ;REGISTERS DESTROYED
                ;
                ;ERASE A BLOCK OF NONVOLATILE MEMORY
                ;
                NVMER;                ****ENTRY POINT
                ;                     GET CONTROL BYTE TO ERASE NEXT BLOCK
10B1 CD 9F 11    CALL NVMNBK          NVMNBK(ERRFLG,OLDCTL,NXTCTL,
                ;                           (PSW:Z , B    , C    ,
                ;                           ( 0    , 0    , 0    ,
                ;
                ;                           ADDRESS,NVMCTL)
                ;                             HL    , @HL  )
                ;                             0     , -    )
10B4 C8          RZ                   IF ERRFLG .EQ. FALSE
                ;                       SET TO CHECK AND ERASE NEXT BLOCK
10B5 79          MOV  A,C               NVMCTL = NXTCTL .OR. HEXF0
10B6 F6 F0       ORI  0F0H
10B8 77          MOV  M,A
                ;                       FETCH BLOCK LENGTH
10B9 CD DF 11    CALL NVMPRP            NVMPRP(NIBCNT,OFFSET,RAM[I])
                ;                              ( B    , C    , @C   )
                ;                              ( 0    , 0    , -    )
10BC C5          PUSH B                 SAVE BC
                ;                       FETCH BASE ADDRESS OF CURRENT BLOCK
10BD 7E          MOV  A,M               A = NVMCTL
10BE CD 91 11    CALL NVMMAP            NVMMAP(NVMCTL,BASE,BLKTYP)
                ;                              ( A    , HL , A[1] )
                ;                              ( I    , 0  , 0    )
10C1 E5          PUSH H                 SAVE HL
                ;                       FORM NVM READ ADDRESS
10C2 11 00 44    LXI  D,NVMRED          HL = ADDRESS, NVMRED[J=BASE]
10C5 19          DAD  D
10C6 E5          PUSH H                 SAVE HL
                ;                       INITIALIZE CRC VALUE
10C7 16 FF       MVI  D,0FFH            D = CRCVAL = HEXFF
                ;                       CHECK BLOCK HEADER
10C9 7E          MOV  A,M               A = BLKHDR[0] = NVMRED[J]
10CA E6 0F       ANI  0FH               IF BLKHDR[0] .EQ. 0
10CC C2 EB 10    JNZ  NVMER4
                ;                         BLOCK IS INACTIVE AND NOT ERASED
                ;                         POINT AT START OF BLOCK'S DATA
10CF 23          INX  H                   HL = ADDRESS, NVMRED[J=J+2]
10D0 23          INX  H
                ;                         CHECK BLOCK CHECKSUM
                NVMER1;                   LOOP - WITH 1 BREAK
10D1 05          DCR  B                     B = NIBCNT = NIBCNT-1
10D2 FA DF 10    JM   NVMER2                IF NIBCNT .LT. 0
                ;                             BREAK
                ;                           ENDIF
                ;                           DEVELOP CRC
10D5 7E          MOV  A,M                   A = DATA = NVMRED[J]
10D6 CD C6 0E    CALL CRCNIB                CRCNIB(DATA,CRCVAL)
                ;                                 ( A   , D    )
```

```
                           ( I   , O    )
                  ;        POINT AT NEXT DATA
10D9 CD BB 11  CALL NVMNXT     NVMNXT(ADRESS,NVMRED[J=J+?])
                  ;              ( HL   , @HL          )
                  ;              ( I/O  , -            )
10DC C3 D1 10  JMP  NVMER1
               NVMER2;       ENDLOOP
                  ;          FETCH CRC FROM NVM
10DF CD 58 10  CALL NVMBYT   NVMBYT(ADRESS,NVMRED[J],NVMCRC)
                  ;            ( HL   , @HL     , A    )
                  ;            ( I/O  , I       , O    )
10E2 BA        CMP  D        IF NVMCRC .NE. CRCVAL
10E3 CA EB 10  JZ   NVMER3
                  ;            DECLARE DEAD METER. WEAK NVM
10E6 3E 02     MVI  A,NVMRET   A = NVMRET
10E8 CD 85 10  CALL NVMDED     NVMDED(NVMRET,ERRFLG)
                  ;              ( A    ,PSW:Z )
                  ;              ( I    , O    )
               NVMER3;       ENDIF
               NVMER4;      ENDIF
10EB D1        POP  D       DE = ADDRESS, NVMRED[J=BASE]
10EC E1        POP  H       HL = BASE
10ED 01 00 40  LXI  B,NVMERS HL = ADDRESS, NVMERS[I=BASE]
10F0 09        DAD  B
10F1 F1        POP  PSW     B = NIBCNT = NIBCNT+4
10F2 C6 04     ADI  4
10F4 47        MOV  B,A
10F5 3A 10 74  LDA  SERFLG/2+X  IF SERFLG.DEAD .EQ. TRUE
10F8 B7        ORA  A
10F9 F2 FE 10  JP   NVMER5
10FC AF        XRA  A         PSW:Z = ERRFLG = TRUE
10FD C9        RET
               NVMER5;      ELSE
10FE CD 47 10  CALL NVM30T    SUPPLY 30 VOLTS TO NVM
               NVMER6;        LOOP - WITH 2 BREAKS
1101 05        DCR  B           B = NIBCNT = NIBCNT-1
                  ;             IF NIBCNT .LT. 0
                  ;               PSW:Z = ERRFLG = FALSE
1102 FA 31 10  JM  NVM30F         REMOVE 30 VOLTS FROM NVM
                  ;               BREAK
                  ;             ENDIF
1105 F3        DI               DISABLE INTERRUPTS
                  ;             START ERASE FUNCTION
1106 77        MOV  M,A         NVMERS[J] = DUMMY
                  ;             PAUSE FOR 10 MSEC
1107 C5        PUSH B           SAVE BC
1108 01 64 00  LXI  B,100       BC = LOOPCT = 100
               NVMER7;          DO UNTIL LOOPCT .EQ. 0
110B CD 19 0B  CALL NPAUSE        NPAUSE(LOOPCT,ZROFLG)
                  ;                 ( BC   ,PSW:Z )
                  ;                 ( I/O  , O    )
110E C2 0B 11  JNZ  NVMER7
                  ;             ENDDO
1111 C1        POP  B           RESTORE BC
                  ;             STOP ERASE FUNCTION
1112 1A        LDAX D           A = GARBAGE = NVMRED[J]
1113 7B        MOV  A,E         A=(ADDRESS,NVMRED[J]).AND.HEX3F
1114 E6 3F     ANI  3FH
1116 CA 1A 11  JZ   NVMER8      IF A .EQ. 0
                  ;               HEADER[O] NOT JUST ERASED
1119 FB        EI                 ENABLE INTERRUPTS
               NVMER8;          ENDIF
                  ;             ADVANCE ERASE ADDRESS
111A CD BB 11  CALL NVMNXT      NVMNXT(ADRESS,NVMERS[I=I+?])
                  ;               ( HL   , @HL          )
                  ;               ( I/O  , -            )
                  ;             READ ERASED NIBBLE
```

```
111D 1A          LDAX D                  C = DATA = NVMRED[J] .AND. HEXF0
111E F6 F0       ORI  0F0H
1120 4F          MOV  C,A
                ;                        ADVANCE READ ADDRESS
1121 EB          XCHG
1122 CD BB 11    CALL NVMNXT             NVMNXT(ADRESS,NVMRED[J=J+?])
                ;                              ( HL   , @HL         )
                ;                              ( I/O  , -           )
1125 EB          XCHG
                ;                        CHECK FOR PROPER ERASURE
1126 0C          INR  C                  IF DATA+1 .NE. 0
1127 CA 01 11    JZ   NVMER6
                ;                          BAD ERASURE
                ;                          DECLARE DEAD METER. BAD NVM
112A 3E 01       MVI  A,NVMBAD             A = NVMBAD
112C C3 85 10    JMP  NVMDED               NVMDED(NVMBAD,ERRFLG)
                ;                                ( A     ,PSW:Z )
                ;                                ( I     , 0    )
                ;                          BREAK
                ;                        ENDIF
                ;                      ENDLOOP
                ;                    ENDIF
                ;                  ENDIF
                ;                  RETURN
NVMFND

                ;NVMFND(ERRFLG)(NVMCTL,NVMRED)
                ;      (BIT   )(NIBSTR,NIBSTR)
                ;      ( 0    )( I/O  , I     )
                ;      (PSW:Z )( RAM  , NVM   )
                ;      ( C    )( C    , NC    )
                ;
                ;A,PSW DESTROYED
                ;REGISTERS DESTROYED
                ;
                ;FIND CURRENT BLOCK CORRESPONDING TO METER MODE
                ;
                NVMFND;                  ****ENTRY POINT
112F 11 33 74    LXI  D,NVMCTL/2+X       DE = ADDRESS, NVMCTL[0..1]
1132 1A          LDAX D                  PSW:CY = OPEN = NVMCTL[0] .LT. 2
1133 FE 20       CPI  20H
1135 3E 02       MVI  A,SFTWRE           A = SFTWRE
                ;                        IF OPEN .EQ. TRUE
                ;                          LOOKING FOR BLOCK IS INAPPROPRIATE
                ;                          DECLARE DEAD METER. SOFTWARE ERROR
1137 DA 85 10    JC   NVMDED               NVMDED(SFTWRE,ERRFLG)
                ;                                ( A     ,PSW:Z )
                ;                                ( I     , 0    )
                ;                        ELSE
                ;                          SET TO LOCATE ACTIVE SERVICE HEADER
113A 06 F1       MVI  B,0F1H               B = TEST = HEXF1
                ;                          SET TO INCREMENT TO BLOCK 0
113C 1A          LDAX D                    NVMCTL[1] = HEX0F
113D F6 0F       ORI  0FH
113F 12          STAX D
                ;                          THERE ARE 2 SERVICE BLOCKS
1140 0E 02       MVI  C,2                  C = BLKCTR = 2
                ;                          DETERMINE METER MODE
1142 CD 4E 0F    CALL LSTATE               LSTATE(FATMOD,NORMOD,SERMOD,PRVMOD)
                ;                                (PSW:S ,PSW:Z ,PSW:P ,PSW:C )
                ;                                ( 0    , 0    , 0    , 0    )
1145 C2 4E 11    JNZ  NVMFN1               IF NORMOD .EQ. TRUE
                ;                            SET TO INCREMENT TO BLOCK 2
1148 1A          LDAX D                      NVMCTL[1] = HEX01
1149 A0          ANA  B
114A 12          STAX D
                ;                            SET TO LOCATE ACTIVE NORMAL HEADER
```

```
114B 05          DCR  B                  B = TEST = HEXF0
                ;                        THERE ARE 14 NORMAL BLOCKS
114C 0E 0E       MVI  C,14               C = BLKCTR = 14
                NVMFN1;                 ENDIF
                NVMFN2;                 LOOP - WITH 2 BREAKS
                ;                         INCREMENT BLOCK NUMBER
114E 1A          LDAX D                   NVMCTL[1] = NVMCTL[1]+1
114F 3C          INR  A
1150 F6 F0       ORI  0F0H
1152 12          STAX D
                ;                         FETCH CORRESPONDING BASE ADDRESS
1153 CD 91 11    CALL NVMMAP              NVMMAP(NVMCTL,BASE,BLKTYP)
                ;                               ( A     , HL , A[1] )
                ;                               ( I     , 0  , 0    )
                ;                         CONVERT TO READ ADDRESS
1156 C5          PUSH B                   SAVE BC
NVMFND

1157 01 00 44    LXI  B,NVMRED            HL = ADDRESS, NVMRED[J=BASE]
115A 09          DAD  B
115B C1          POP  B                   RESTORE BC
115C 0D          DCR  C                   C = BLKCTR = BLKCTR-1
                ;                         PSW:S = DONE = BLKCTR .LT. 0
115D 3E 01       MVI  A,NVMBAD            A = NVMBAD
                ;                         IF DONE .EQ. TRUE
                ;                           DECLARE DEAD METER. BAD NVM
115F FA 85 10    JM   NVMDED               NVMDED(NVMBAD,ERRFLG)
                ;                                 ( A    ,PSW:Z )
                ;                                 ( I    , 0    )
                ;                           BREAK
                ;                         ENDIF
                ;                         FETCH BLOCK HEADER
1162 CD 58 10    CALL NVMBYT              NVMBYT(ADRESS,NVMRED[J],HEADER)
                ;                               ( HL   , @HL     , A    )
                ;                               ( I/O  , I       , 0    )
1165 B8          CMP  B                   IF HEADER .EQ. TEST
1166 C2 4E 11    JNZ  NVMFN2
1169 04          INR  B                     PSW:Z = ERRFLG = FALSE
116A C9          RET                        BREAK
                ;                         ENDIF
                ;                       ENDLOOP
                ;                     ENDIF
                ;                     RETURN
NVMLOD

                ;NVMLOD()(NORFLG,NVMCTL,MRSTS1)
                ;         (BITSTR,NIBSTR,BITSTR)
                ;         ( 0    , 0    , 0     )
                ;         ( RAM  , RAM  , RAM   )
                ;         ( C    , C    , C     )
                ;
                ;A,PSW DESTROYED
                ;REGISTERS DESTROYED
                ;
                ;INITIALIZATION. LOAD NONVOLATILE MEMORY
                ;
                NVMLOD;               ****ENTRY POINT
116B 21 26 74    LXI  H,NORFLG/2+X    HL = ADDRESS, NORFLG
                ;                     SENT STATUS AND POSTAGE AFTER POWERUP
116E 7E          MOV  A,M             NORFLG.QUESTS = NORFLG.QUEPOS = TRUE
116F F6 C0       ORI  0C0H
1171 77          MOV  M,A
                ;                     DECLARE THAT NO BLOCK IS OPEN
1172 3E F0       MVI  A,0F0H          NVMCTL = HEXF0
1174 32 33 74    STA  NVMCTL/2+X
                ;                     METER GUARANTEED TO BE IN NORMAL MODE
                ;                     SEARCH FOR NORMAL BLOCK
```

```
1177 CD 2F 11   CALL NVMFND        NVMFND(ERRFLG)
               ;                          (PSW:Z )
               ;                          ( 0    )
               ;                   IF ERRFLG .EQ. FALSE
117A C4 EE 11   CNZ NVMRD            LOAD NORMAL BLOCK
               ;                   ENDIF
117D 21 24 74   LXI  H,MRSTS1/2+X  HL = ADDRESS, MRSTS1
               ;                   SET TO LOAD SERVICE BLOCK
               ;                   INITIALIZE CHECK DATE STATUS
1180 7E         MOV  A,M           MRSTS1.DATDOR = MRSTS1.SERMOD = TRUE
1181 F6 48      ORI  48H
1183 77         MOV  M,A
1184 E5         PUSH H             SAVE HL
               ;                   SEARCH FOR SERVICE BLOCK
1185 CD 2F 11   CALL NVMFND        NVMFND(ERRFLG)
               ;                          (PSW:Z )
               ;                          ( 0    )
               ;                   IF ERRFLG .EQ. FALSE
1188 C4 EE 11   CNZ  NVMRD           LOAD SERVICE BLOCK
               ;                   ENDIF
118B E1         POP  H             RESTORE HL
               ;                   RETURN TO NORMAL MODE
               ;                   DISABLE METER
118C 7E         MOV  A,M           MRSTS1.SERMOD = MRSTS1.ENABLD = FALSE
118D E6 F3      ANI  0F3H
118F 77         MOV  M,A
1190 C9         RET                RETURN
NVMMAP

               ;NVMMAP(NVMCTL,BASE  ,BLKTYP)
               ;      (NIBSTR,ADRESS,NIBSTR)
               ;      ( I    , 0    , 0    )
               ;      ( A    , HL   , A[1] )
               ;      ( C    , C    , C    )
               ;
               ;PSW DESTROYED
               ;REGISTERS NOT CHANGED
               ;
               ;MAPS BLOCK NUMBER IN L/O NIBBLE OF ACCUMULATOR INTO
               ;CORRESPONDING NONVOLATILE MEMORY ADDRESS
               ;
               NVMMAP;             ****ENTRY POINT
1191 0F         RRC                A = NVMCTL[1]*HEX10+NVMCTL[0]
1192 0F         RRC
1193 0F         RRC
1194 0F         RRC
1195 F5         PUSH PSW           SAVE A,PSW
1196 E6 F0      ANI  0F0H          HL = BASE = NVMCTL[1]*HEX40
1198 6F         MOV  L,A
1199 26 00      MVI  H,0
119B 29         DAD  H
119C 29         DAD  H
119D F1         POP  PSW           RESTORE A,PSW
               ;                   A[1] = BLKTYP = NVMCTL[0]
119E C9         RET                RETURN
NVMNBK

               ;NVMNBK(ERRFLG,OLDCTL,NXTCTL,ADRESS,NVMCTL)(NVMCTL)
               ;      (BIT   ,NIBSTR,NIBSTR,ADRESS,NIBSTR)(NIBSTR)
               ;      ( 0    , 0    , 0    , 0    , -    )( I     )
               ;      (PSW:Z , B    , C    , HL   , @HL  )( RAM   )
               ;      ( C    , C    , C    , C    , -    )( NC    )
               ;
               ;A,PSW DESTROYED
               ;REGISTERS DESTROYED
               ;
               ;DEVELOP CONTROL BYTE VALUES FOR DEACTIVATING BLOCK OF
```

```
                   ;CURRENT TYPE, AND FOR OPENING NEXT BLOCK.
                   ;
                   NVMNBK;                 ****ENTRY POINT
                   ;                       SET NVMCTL TO INDICATE ACTIVE CLOSED
                   ;                       BLOCK CORRESPONDING TO CURRENT STATUS
119F CD 2F 11        CALL NVMFND           NVMFND(ERRFLG)
                   ;                             (PSW:Z )
                   ;                             ( 0    )
11A2 C8              RZ                    IF ERRFLG .EQ. FALSE
                   ;                         NVMCTL[0] = HEXF, NO FILES OPEN
                   ;                         NVMCTL[1] = ACTIVE BLOCK NUMBER
11A3 21 33 74        LXI  H,NVMCTL/2+X       HL = ADDRESS, NVMCTL
11A6 46              MOV  B,M                B = OLDCTL = NVMCTL
11A7 0E 02           MVI  C,2                C = NVMCTL = HEX02
11A9 78              MOV  A,B                A = OLDCTL+1
11AA 3C              INR  A
11AB CA B9 11        JZ   NVMNB1             IF OLDCTL+1 .EQ. 0
                   ; >>JUMP AHEAD<<            OLD BLOCK WAS 15
                   ;                           NEWCTL SET FOR BLOCK 2, NORMAL
                   ;                           PSW:Z = ERRFLG = FALSE
                   ;                         ELSE
                   ;                           OLD BLOCK WAS NOT 15
11AE E6 0F           ANI  0FH                  A=OLDBLK+1=(OLDCTL+1).AND.HEX0F
11B0 4F              MOV  C,A                  C = OLDBLK+1
11B1 DE 03           SBI  3                    A = OLDBLK-2
11B3 F2 B9 11        JP   NVMNB1               IF OLDBLK-2 .GE. 0
                   ; >>JUMP AHEAD<<              OLD BLOCK WAS 2 TO 14
                   ;                             NEWCTL SET FOR BLK 3 TO 15, NORM
                   ;                             PSW:Z = ERRFLG = FALSE
                   ;                           ELSE
                   ;                             OLD BLOCK WAS 0 OR 1
                   ;                             SET NEWCTL FOR BLK 0 OR 1, SERVC
11B6 EE EF           XRI  0EFH                   C=NEWCTL=(OLDBLK-2).XOR.HEXEF
11B8 4F              MOV  C,A
                   ;                           ENDIF
                   ;                         ENDIF
                   NVMNB1;                   >>TARGET OF JUMP AHEAD<<
11B9 B1              ORA  C                  PSW:Z = ERRFLG = FALSE
11BA C9              RET
                   ;                       ENDIF
                   ;                       RETURN
NVMNXT

                   ;NVMNXT(ADRESS)
                   ;      (ADRESS)
                   ;      ( I/O  )
                   ;      ( HL   )
                   ;      ( C    )
                   ;
                   ;A,PSW DESTROYED
                   ;REGISTERS NOT CHANGED
                   ;
                   ;ADVANCE ADDRESS TO NEXT HIGHER LOCATION SKIPPING XXXF
                   ;
                   NVMNXT;                 ****ENTRY POINT
11BB 23              INX  H                HL = ADRESS = ADRESS+1
11BC 7D              MOV  A,L              IF ADRESS[3] .EQ. HEX0F
11BD E6 0F           ANI  0FH
11BF FE 0F           CPI  0FH
11C1 C0              RNZ
11C2 23              INX  H                  HL = ADRESS = ADRESS+1
                   ;                       ENDIF
11C3 C9              RET                   RETURN
NVMOPN

                   ;NVMOPN(ERRFLG)(NVMCTL,SERFLG)
                   ;      (BIT   )(NIBSTR,BITSTR)
```

```
                  ;       ( O    )( O     , I     )
                  ;       (PSW:Z )( RAM   , RAM   )
                  ;       ( C    )( C     , C     )
                  ;
                  ;A,PSW DESTROYED
                  ;REGISTERS DESTROYED
                  ;
                  ;OPENS NVM BLOCK
                  ;
                  NVMOPN;                 ****ENTRY POINT
11C4 3A 10 74       LDA  SERFLG/2+X       IF SERFLG.DEAD .EQ. TRUE
11C7 F6 7F          ORI  7FH                PSW:Z = ERRFLG = TRUE
11C9 2F             CMA
                  ;                       ELSE
                  ;                         PSW:Z = ERRFLG = FALSE
                  ;                       ENDIF
11CA C8             RZ                    IF ERRFLG .EQ. FALSE
                  ;                         ERASE NEXT BLOCK
11CB CD B1 10       CALL NVMER              NVMER(ERRFLG)
                  ;                               (PSW:Z )
                  ;                               ( O    )
11CE C8             RZ                      IF ERRFLG .EQ. FALSE
11CF CD 47 10       CALL NVM30T               TURN ON -30V TO NVM
                  ;                           DEVELOP CONTROL BYTES FOR OPENING
                  ;                           NEXT BLOCK AND DEACTIVATING
                  ;                           OLD BLOCK
11D2 CD 9F 11       CALL NVMNBK               NVMNBK(ERRFLG,OLDCTL,NXTCTL,
                  ;                                 (PSW:Z , B    , C    ,
                  ;                                 ( O    , O    , O    ,
                  ;
                  ;                                 ADRESS,NVMCTL)
                  ;                                  HL   , @HL  )
                  ;                                  O    , -    )
11D5 F3             DI                        DISABLE INTERRUPTS
                  ;                           OPEN NEXT BLOCK
11D6 71             MOV  M,C                  NVMCTL = NXTCTL
                  ;                           DEACTIVATE OLD BLOCK
11D7 CD A9 10       CALL NVMDXB               NVMDXB(ERRFLG,OLDCTL)
                  ;                                 (PSW:Z , B    )
                  ;                                 ( O    , I    )
11DA FB             EI                        ENABLE INTERRUPTS
11DB CD 31 10       CALL NVM30F               TURN OFF -30V TO NVM
                  ;                         ENDIF
                  ;                       ENDIF
11DE C9             RET                   RETURN
NVMPRP

                  ;NVMPRP(NIBCNT,OFFSET,RAM[I])(NVMCTL)
                  ;       (BYTE  ,OFFSET,NIBSTR)(NIBSTR)
                  ;       ( O    , O    , -    )( I     )
                  ;       ( B    , C    , @C   )( RAM   )
                  ;       ( C    , C    , NC   )( NC    )
                  ;
                  ;A,PSW DESTROYED
                  ;REGISTERS NOT CHANGED
                  ;
                  ;RETURN RAM PARAMETERS CORRESPONDING TO NVM BLOCK TYPE
                  ;
                  NVMPRP;                 ****ENTRY POINT
11DF 06 22          MVI  B,NORSIZ         B = NIBCNT = NORSIZ
11E1 0E 28          MVI  C,NORSTR         C = OFFSET = NORSTR
11E3 3A 33 74       LDA  NVMCTL/2+X       IF NVMCTL[1] .LT. 2
11E6 E6 0E          ANI  0EH
11E8 C0             RNZ
11E9 06 28          MVI  B,SRVSIZ           B = NIBCNT = SRVSIZ
11EB 0E 00          MVI  C,SRVSTR           C = OFFSET = SRVSTR
                  ;                       ENDIF
11ED C9             RET                   RETURN
```

NVMRD

```
                ;NVMRD()(NVMCTL,RAM[I],NVMRED)
                ;       (NIBSTR,NIBSTR,NIBSTR)
                ;       ( I    , O    , I    )
                ;       ( RAM  , RAM  , NVM  )
                ;       ( NC   , C    , NC   )
                ;
                ;A,PSW DESTROYED
                ;REGISTERS DESTROYED
                ;
                ;READ NONVOLATILE MEMORY INTO RAM
                ;
                NVMRD;                  ****ENTRY POINT
                ;                       GET RAM DESTINATION PARAMETERS
11EE CD DF 11     CALL NVMPRP           NVMPRP(NIBCNT,OFFSET,RAM[I])
                ;                             ( B     , C     , @C    )
                ;                             ( O     , O     , -     )
                ;                       DEFINE NVM SOURCE BASE
11F1 3A 33 74     LDA  NVMCTL/2+X       A = NVMCTL
11F4 CD 91 11     CALL NVMMAP           NVMMAP(NMVCTL,BASE,BLKTYP)
                ;                             ( A     , HL , A[1] )
                ;                             ( I     , O  , O    )
                ;                       FORM NVM READ ADDRESS OF SOURCE DATA
11F7 11 02 44     LXI  D,NVMRED+2       HL = ADDRESS, NVMRED[J=BASE+2]
11FA 19           DAD  D
                ;                       INITIALIZE CRC VALUE
11FB 16 FF        MVI  D,OFFH           D = CRCVAL = HEXFF
                NVMRD1;                 LOOP - WITH 1 BREAK
11FD 05           DCR  B                  B = NIBCNT = NIBCNT-1
11FE FA OF 12     JM   NVMRD2             IF NIBCNT .LT. 0
                ;                           BREAK
                ;                         ENDIF
                ;                         COPY NVM TO RAM
1201 7E           MOV  A,M                A = NVMRED[J]
1202 CD EE OF     CALL PUTNIB             PUTNIB(RAM[I],NVMRED[J])
                ;                               ( @C    , A        )
                ;                               ( O     , I        )
                ;                         UPDATE CRC
1205 CD C6 OE     CALL CRCNIB             CRCNIB(NVMRED[J],CRCVAL)
                ;                               ( A        , D    )
                ;                               ( I        , I/O  )
1208 OC           INR  C                  C = OFFSET, RAM[I=I+1]
                ;                         CALCULATE NEXT NVM SOURCE ADDRESS
1209 CD BB 11     CALL NVMNXT             NVMNXT(ADRESS,NVMRED[J=J+?])
                ;                               ( HL    , @HL          )
                ;                               ( I/O   , -            )
120C C3 FD 11     JMP  NVMRD1
                NVMRD2;                 ENDDO
                ;                       CHECK CRC VALUES
120F CD 58 10     CALL NVMBYT           NVMBYT(ADRESS,NVMRED[J],NVMCRC)
                ;                             ( HL    , @HL      , A     )
                ;                             ( I/O   , I        , O     )
1212 BA           CMP  D                IF NVMCRC .NE. CRCVAL
1213 C8           RZ
                ;                         DECLARE DEAD METER. BAD CRC
1214 3E 00        MVI  A,BADCRC           A = BADCRC
1216 C3 85 10     JMP  NVMDED             NVMDED(BADCRC,ERRFLG)
                ;                               ( A     ,PSW:Z )
                ;                               ( I     , O    )
                ;                       ENDIF
                ;                       RETURN
```

NVMSTO

```
                ;NVMSTO(ERRFLG)(MRSTS1,MRSTS2,NVMCTL)
                ;      ( BIT   )(BITSTR,BITSTR,NIBSTR)
                ;      (  O    )( I/O  , I/O  , O    )
```

```
                    ;       (PSW:Z )( RAM  , RAM  , RAM  )
                    ;       (  C   )( C    , C    , C    )
                    ;
                    ;A,PSW DESTROYED
                    ;REGISTERS DESTROYED
                    ;
                    ;STARTING WITH NO NVM BLOCKS OPEN:
                    ;WRITE NEW ACTIVE NVM BLOCK NOT CORRESPONDING TO CURRENT
                    ;METER MODE.
                    ;OPEN AN ERASED BLOCK CORRESPONDING TO CURRENT METER MODE.
                    ;
                    NVMSTO;                ****ENTRY POINT
1219 CD 4E 0F         CALL LSTATE          LSTATE(FATMOD,NORMOD,SERMOD,PRVMOD)
                    ;                            (PSW:S ,PSW:Z ,PSW:P ,PSW:C )
                    ;                            ( 0    , 0    , 0    , 0    )
121C F2 21 12         JP   NVMST1          IF FATMOD .EQ. TRUE
121F AF               XRA  A                 ERRFLG = PSW:Z = TRUE
1220 C9               RET
                    NVMST1;                ELSE
                    ;                        ERASE BLOCK FOR UNTOGGLED NORMOD
1221 CD B1 10         CALL NVMER             NVMER(ERRFLG)
                    ;                              (PSW:Z )
                    ;                              ( 0    )
                    ;                        IF ERRFLG .EQ. TRUE
1224 CA B6 01         JZ   PWRDN               REINITIALIZE METER
                    ;                        ELSE
                    ;                          SET TO TOGGLE NORMOD INDIRECTLY BY
                    ;                          TOGGLING THE SERVICE OR PRIVILEGED
                    ;                          MODE FLAGS
1227 21 24 74         LXI  H,MRSTS1/2+X        HL=ADDRESS,MRSTS?=ADDRESS,MRSTS1
122A 1E 08            MVI  E,08H               E.M = E.SERMOD = TRUE
122C EA 32 12         JPE  NVMST2              IF LSTATE(SERMOD) .EQ. FALSE
122F 23               INX  H                     HL=ADDRESS,MRSTS?=ADDRESS,MRSTS2
1230 1E 01            MVI  E,01H                 E.M = E.PRVMOD = TRUE
                    NVMST2;                    ENDIF
                    ;                          TOGGLE NORMOD
1232 7B               MOV  A,E                 MRSTS?.M = MRSTS?.M .XOR. E.M
1233 AE               XRA  M
1234 77               MOV  M,A
1235 E5               PUSH H                   SAVE HL
1236 D5               PUSH D                   SAVE DE
                    ;                          ERASE BLOCK FOR TOGGLED NORMOD
1237 CD B1 10         CALL NVMER               NVMER(ERRFLG)
                    ;                                (PSW:Z )
                    ;                                ( 0    )
                    ;                          IF ERRFLG .EQ. TRUE
123A CA B6 01         JZ   PWRDN                 REINITIALIZE METER
                    ;                          ELSE
123D F3               DI                         DISABLE INTERRUPTS
                    ;                            SET TO STORE BLK FOR TOG NORMOD
123E CD 9F 11         CALL NVMNBK                NVMNBK(ERRFLG,OLD,NXT,ADR,NVMCTL)
                    ;                                  (PSW:Z , B , C , HL, @HL  )
                    ;                                  ( 0    , 0 , 0 , 0 , -    )
                    ;                            IF ERRFLG .EQ. TRUE
NVMSTO

1241 CA B6 01         JZ   PWRDN                   REINITIALIZE METER
                    ;                            ELSE
1244 CD 47 10         CALL NVM30T                  TURN ON -30 V TO NVM
1247 E5               PUSH H                       SAVE HL
                    ;                              DEACTIVATE BLK FOR TOG NORMOD
1248 CD A9 10         CALL NVMDXB                  NVMDXB(ERRFLG,OLD)
                    ;                                    (PSW:Z , B )
                    ;                                    ( 0    , I )
                    ;                              OPEN BLK FOR TOG NORMOD
124B E1               POP  H                       RESTORE HL
124C 71               MOV  M,C                     NVMCTL = NXT
```

```
                        ;                               STORE BLK FOR TOGLED NORMOD
     124D CD 9E 12       CALL NVMWR                     NVMWR(ERRFLG)
                        ;                                    (PSW:Z )
                        ;                                    ( 0    )
                        ;                               RETURN TO UNTOGGLED NORMOD
     1250 D1             POP  D                         RESTORE DE
     1251 E1             POP  H                         RESTORE HL
     1252 7B             MOV  A,E                       MRSTS?.M =
     1253 AE             XRA  M                                 MRSTS?.M .XOR. E.M
     1254 77             MOV  M,A
                        ;                               GET CONTROL BYTES
     1255 CD 9F 11       CALL NVMNBK                    NVMNBK(ERRFLG,OLD,NXT,
                        ;                                     (PSW:Z , B , C ,
                        ;                                     ( 0    , 0 , 0 ,
                        ;
                        ;                                     ADRESS,NVMCTL)
                        ;                                      HL    , @HL  )
                        ;                                      0     , -    )
                        ;                               OPEN ERASED BLOCK
     1258 71             MOV  M,C                       NVMCTL = NXT
     1259 CD 47 10       CALL NVM30T                    TURN ON -30 V TO NVM
                        ;                               DEACTIVATE OLD BLOCK
     125C CD A9 10       CALL NVMDXB                    NVMDXB(ERRFLG,OLD)
                        ;                                     (PSW:Z , B )
                        ;                                     ( 0    , I )
     125F FB             EI                             ENABLE INTERRUPTS
     1260 C9             RET
                        ;                             ENDIF
                        ;                           ENDIF
                        ;                         ENDIF
                        ;                       ENDIF
                        ;                       RETURN
NVMWN

                        ;NVMWN(DATA  ,BASE  ,ERRFLG)(NVMRED,NVMWRT)
                        ;     (NIBBLE,ADRESS,BIT   )(NIBSTR,NIBSTR)
                        ;     ( I    , I    , O    )( I    , O     )
                        ;     ( A[1] , HL   ,PSW:Z )( NVM  , NVM   )
                        ;     ( C    , NC   , C    )( NC   , C     )
                        ;
                        ;A,PSW DESTROYED
                        ;REGISTERS NOT CHANGED
                        ;
                        ;WRITE NIBBLE TO NONVOLATILE MEMORY
                        ;
                        NVMWN;                  ****ENTRY POINT
     1261 C5             PUSH B                 SAVE REGISTERS
     1262 D5             PUSH D
     1263 E5             PUSH H
     1264 E5             PUSH H
     1265 01 00 48       LXI  B,NVMWRT          DE = ADDRESS, NVMWRT[BASE]
     1268 09             DAD  B
     1269 EB             XCHG
     126A E1             POP  H                 HL = ADDRESS, NVMRED[BASE]
     126B 01 00 44       LXI  B,NVMRED
     126E 09             DAD  B
     126F F5             PUSH PSW               SAVE A,PSW
                        ;                       START WRITING DATA
     1270 12             STAX D                 NVMWRT[BASE] = DATA
                        ;                       DELAY FOR 1 MSEC
     1271 01 0A 00       LXI  B,10              BC = LOOPCT = 10
                        NVMWN1;                 DO UNTIL LOOPCT .EQ. 0
     1274 CD 19 0B       CALL NPAUSE              NPAUSE(LOOPCT,ZROFLG)
                        ;                                ( BC    ,PSW:Z )
                        ;                                ( I/O   , O    )
     1277 C2 74 12       JNZ NVMWN1
                        ;                       ENDDO
```

```
                        ;                      STOP WRITE FUNCTION
127A 7E                   MOV  A,M             A = GARBAGE = NVMRED[BASE]
127B C1                   POP  B               B = DATA
                        ;                      C = GARBAGE
127C 7E                   MOV  A,M             A = SAVDAT = NVMRED[BASE]
127D 90                   SUB  B               A = TEST = (SAVDAT-DATA) .AND. HEXOF
127E E6 0F                ANI  0FH
1280 C2 87 12             JNZ  NVMWN2          IF TEST .EQ. 0
                        ;                        SAVDAT .EQ. DATA
1283 3C                   INR  A                 PSW:Z = ERRFLG = FALSE
1284 C3 9A 12             JMP NVMWN4
                        NVMWN2;                ELSE
                        ;                        SAVDAT .NE. DATA
1287 01 9A 12             LXI  B,NVMWN3          SET TO RETURN TO ENDIF
128A C5                   PUSH B
128B 01 42 B9             LXI  B,-(NVMRED+KILCOD)
                        ;                        BC = -(ADDRESS, NVMRED[KILCOD])
128E 09                   DAD  B                 HL = BASE-KILCOD
128F 7C                   MOV  A,H               PSW:Z = (BASE-KILCOD).EQ.0
1290 B5                   ORA  L
1291 3E 01                MVI  A,NVMBAD          A = NVMBAD
1293 47                   MOV  B,A               B = NVMBAD
                        ;                        IF (BASE-KILCOD).EQ.0
                        ;                          DECLARE DEAD METER. BAD NVM
                        ;                          DO NOT WRITE NVMBAD INTO NVM
1294 CA 99 10             JZ   NVMDE1            NVMDE1(NVMBAD,ERRFLG)
                        ;                                ( B     ,PSW:Z )
                        ;                                ( I     , O    )
                        ;                        ELSE
                        ;                          DECLARE DEAD METER. BAD NVM
                        ;                          WRITE NVMBAD INTO NVM
1297 C2 85 10             JNZ  NVMDED            NVMDED(NVMBAD,ERRFLG)
                        ;                                ( A     ,PSW:Z )
                        ;                                ( I     , O    )
                        NVMWN3;                  ENDIF
                        NVMWN4;                ENDIF
129A E1                   POP  H               RESTORE REGISTERS
129B D1                   POP  D
129C C1                   POP  B
129D C9                   RET
NVMWR

                        ;NVMWR(ERRFLG)(NVMCTL,RAM[I],SERFLG)
                        ;     (BIT   )(NIBSTR,NIBSTR,BITSTR)
                        ;     ( O    )( I/O  , I    , I    )
                        ;     (PSW:Z )( RAM  , RAM  , RAM  )
                        ;     ( C    )( C    , NC   , NC   )
                        ;
                        ;A,PSW DESTROYED
                        ;REGISTERS DESTROYED
                        ;
                        ;WRITE BLOCK FROM RAM TO NONVOLATILE MEMORY
                        ;
                        NVMWR;                 ****ENTRY POINT
                        ;                      FETCH RAM SOURCE PARAMETERS
129E CD DF 11             CALL NVMPRP          NVMPRP(NIBCNT,OFFSET,RAM[I])
                        ;                             ( B     , C     , @C   )
                        ;                             ( O     , O     , -    )
12A1 79                   MOV  A,C             C = NIBCNT
12A2 48                   MOV  C,B
12A3 47                   MOV  B,A             B = OFFSET, RAM[I]
                        ;                      INITIALIZE CRC VALUE
12A4 16 FF                MVI  D,0FFH          D = CRCVAL = HEXFF
12A6 3A 33 74             LDA NVMCTL/2+X       A = NVMCTL
12A9 FE 20                CPI  20H             IF NVMCTL[0] .LT. 2
12AB D2 E6 12             JNC  NVMWR3
12AE CD 47 10             CALL NVM30T            TURN ON -30 V TO NVM
```

```
                        ;                         FETCH NVM DESTINATION BASE
     12B1 CD 91 11       CALL NVMMAP              NVMMAP(NVMCTL,BASE,BLKTYP)
                        ;                               ( A    , HL , A[1] )
                        ;                               ( I    , O  , O    )
                        ;                         STORE BLOCK TYPE IN NVM HEADER
     12B4 23             INX  H                   HL = BASE +1
     12B5 CD 61 12       CALL NVMWN               NVMWN(BLKTYP,BASE+1,ERRFLG)
                        ;                              ( A[1] , HL   ,PSW:Z )
                        ;                              ( I    , I    , O    )
                        ;                         POINT AT START OF DATA IN NVM
     12B8 23             INX  H                   HL = BASE+2
                        NVMWR1;                   LOOP - WITH 1 BREAK
     12B9 0D             DCR  C                     C = NIBCNT = NIBCNT-1
     12BA FA CD 12       JM   NVMWR2                IF NIBCNT .LT. 0
                        ;                             BREAK
                        ;                           ENDIF
                        ;                           FETCH DATA FROM RAM
     12BD CD 35 0F       CALL GETNIB                GETNIB(DATA ,ZROFLG,RAM[I])
                        ;                                 ( A[1],PSW:Z , @B    )
                        ;                                 ( O    , O    , I    )
                        ;                           UPDATE CRC VALUE
     12C0 CD C6 0E       CALL CRCNIB                CRCNIB(DATA ,CRCVAL)
                        ;                                 ( A[1], D     )
                        ;                                 ( I    , O    )
                        ;                           WRITE DATA TO NVM
     12C3 CD 61 12       CALL NVMWN                 NVMWN(DATA ,BASE+?,ERRFLG)
                        ;                                ( A[1], HL   ,PSW:Z )
                        ;                                ( I   , I    , O    )
                        ;                           POINT AT NEXT DATA LOCATIONS
     12C6 04             INR  B                     B = OFFSET, RAM[I=I+1]
     12C7 CD BB 11       CALL NVMNXT                NVMNXT(ADRESS,BASE+?)
                        ;                                 ( HL   , @HL  )
                        ;                                 ( I/O  , -    )
     12CA C3 B9 12       JMP NVMWR1
                        NVMWR2;                   ENDDO
                        ;                         STORE CRC IN NVM
     12CD 7A             MOV  A,D                 A[1] = CRCVAL[0]
     12CE 0F             RRC
     12CF 0F             RRC
     12D0 0F             RRC
     12D1 0F             RRC
     12D2 CD 61 12       CALL NVMWN               NVMWN(CRCVAL[0],BASE+?,ERRFLG)
                        ;                              ( A[1]     , HL   ,PSW:Z )
                        ;                              ( I        , I    , O    )
     12D5 CD BB 11       CALL NVMNXT              NVMNXT(ADRESS,BASE+?)
                        ;                               ( HL   , @HL  )
                        ;                               ( I/O  , -    )
     12D8 7A             MOV  A,D                 A[1] = CRCVAL[1]
     12D9 CD 61 12       CALL NVMWN               NVMWN(CRCVAL[1],BASE+?,ERRFLG)
                        ;                              ( A[1]     , HL   ,PSW:Z )
                        ;                              ( I        , I    , O    )
                        ;                         INDICATE BLOCK NOT OPEN
     12DC 21 33 74       LXI  H,NVMCTL/2+X        HL = ADDRESS, NVMCTL
     12DF 3E F0          MVI  A,0F0H              NVMCTL[0] = HEXOF
     12E1 B6             ORA  M
     12E2 77             MOV  M,A
     12E3 CD 31 10       CALL NVM30F               TURN OFF -30V TO NVM
                        NVMWR3;                  ENDIF
     12E6 3A 10 74       LDA  SERFLG/2+X         IF SERFLG.DEAD .EQ. TRUE
     12E9 E6 80          ANI  80H                  PSW:Z = ERRFLG = TRUE
     12EB EE 80          XRI  80H
                        ;                        ELSE
                        ;                          PSW:Z = ERRFLG = FALSE
                        ;                        ENDIF
     12ED C9             RET                     RETURN
ACCODE

                        ;ACCODE(ERRFLG)(WORK1 ,DSCREG,RSTCNT,SERFLG)
                        ;       (BIT   )(NIBCTR,NIBSTR,NIBBLE,BITSTR)
```

```
                    ;       ( 0     )( 0     , I     , I     , I     )
                    ;       (PSW:Z  )( RAM   , RAM   , RAM   , RAM   )
                    ;       ( C     )( C     , NC    , NC    , NC    )
                    ;
                    ;A,PSW DESTROYED
                    ;REGISTERS DESTROYED
                    ;
                    ;BUILD ACCESS CODE MESSAGE IN TRANSMIT BUFFER
                    ;
                    ACCODE;                  ****ENTRY POINT
                    ;                        CLEAR WORK AREA
12EE 3E C0           MVI  A,WORK1            A = OFFSET, WORK1
12F0 CD 85 0E        CALL CLRBLK             CLRBLK(WORK1)
                    ;                              ( @A  )
                    ;                              ( 0   )
                    ;                        PUT 10 DGT CONTROL SUM IN WORK1[0..9]
12F3 CD 3A 06        CALL CONSUM             CONSUM(ERRFLG)
                    ;                              (PSW:Z )
                    ;                              ( 0    )
                    ;                        IF ERRFLG .EQ. TRUE
                    ;                          PROCESS ERROR
12F6 CA A1 0B        JZ   PROERR               PROERR(ERRFLG)
                    ;                                (PSW:Z )
                    ;                                ( 0    )
                    ;                        ELSE
                    ;                          MOVE CONTROL SUM TO WORK1[6..15]
12F9 01 C6 C0        LXI  B,(WORK1+0)*100H+(WORK1+6)
                    ;                          B = OFFSET, WORK1[0]
                    ;                          C = OFFSET, WORK1[6]
12FC 3E 0A           MVI  A,10                 A = NIBCNT = 10
12FE CD B3 0F        CALL MVLNIB               MVLNIB(WORK1[6],WORK1[0],NIBCNT,
                    ;                                ( @C      , @B      , A    ,
                    ;                                ( 0       , I       , I    ,
                    ;
                    ;                                NONBCD,ZROFLG)
                    ;                                PSW:S ,PSW:Z )
                    ;                                 0    , 0    )
                    ;                          PUT DESC REGISTER IN WORK1[0..4]
1301 01 C0 2F        LXI  B,DSCREG*100H+WORK1
                    ;                          B = OFFSET, DSCREG[0]
                    ;                          C = OFFSET, WORK1[0]
1304 3E 05           MVI  A,5                  A = NIBCNT = 5
1306 CD B3 0F        CALL MVLNIB               MVLNIB(WORK1[0],DSCREG[0],NIBCNT,
                    ;                                ( @C      , @B       , A    ,
                    ;                                ( 0       , I        , I    ,
                    ;
                    ;                                NONBCD,ZROFLG)
                    ;                                PSW:S ,PSW:Z )
                    ;                                 0    , 0    )
                    ;                          PARSE RSTCNT INTO RESET NUMBER AND
                    ;                          RESET BIT
1309 01 C5 12        LXI  B,RSTCNT*100H+(WORK1+5)
                    ;                          B = OFFSET, RSTCNT
                    ;                          C = OFFSET, WORK1[5]
130C CD 35 0F        CALL GETNIB               GETNIB(RSTCNT,ZROFLG,RSTCNT)
                    ;                                ( A     ,PSW:Z , @B    )
                    ;                                ( 0     , 0    , I     )
130F 0F              RRC
1310 57              MOV  D,A                  D[1] = RSTCNT/2
                    ;                          D[0].0 = RSTBIT = RSTCNT .MOD. 2
1311 07              RLC                       A = RSTBIT
1312 E6 01           ANI 01H
                    ;                          PUT RSTBIT INTO WORK1[5]
1314 CD EE 0F        CALL PUTNIB               PUTNIB(WORK1[5],RSTBIT)
                    ;                                ( @C      , A     )
                    ;                                ( 0       , I     )
                    ;                          EXTRACT RESET NUMBER FROM RIGHTMOST
```

```
                   ;                     DIGIT OF WORK1[0..4] WHICH WILL NOT
                   ;                     BE TRANSFORMED INTO A NON BCD DIGIT.
1317 0D             DCR  C               C = OFFSET, WORK1[I=4]
1318 41             MOV  B,C             B = OFFSET, WORK1[I=4]
1319 1E 05          MVI  E,5             E = NIBCNT = 5
                   ACCOD1;               DO UNTIL NIBCNT .EQ. 0; WITH 1 BREAK
131B CD 35 0F       CALL GETNIB            GETNIB(BCDDGT,ZROFLG,WORK1[I])
                   ;                             ( A     ,PSW:Z , @B      )
                   ;                             ( 0     , 0    , I       )
131E FE 08          CPI  8                 IF BCDDGT .LT. 8
1320 D2 2A 13       JNC  ACCOD2
1323 AA             XRA  D                   BCDDGT = BCDDGT .XOR. RSTNO
1324 CD EE 0F       CALL PUTNIB              PUTNIB(WORK1[I],BCDDGT)
                   ;                               ( @C      , A    )
                   ;                               ( 0       , I    )
1327 C3 30 13       JMP  ACCOD3              BREAK
                   ACCOD2;                 ENDIF
132A 05             DCR  B                 B = OFFSET, WORK1[I=I-1]
132B 0D             DCR  C                 C = OFFSET, WORK1[I=I-1]
132C 1D             DCR  E                 E = NIBCNT = NIBCNT-1
132D C2 1B 13       JNZ  ACCOD1
                   ACCOD3;               ENDDO
                   ;                     CALCULATE CRC OF WORK AREA
1330 01 C0 10       LXI  B,16*100H+WORK1
                   ;                     B = NIBCNT = 16
                   ;                     C = OFFSET, WORK1[0]
1333 CD B1 0E       CALL CRC             CRC(WORK1[0],NIBCNT,CRCVAL)
                   ;                        ( @C      , B    , D    )
                   ;                        ( I       , I    , 0    )
1336 3A 10 74       LDA  SERFLG/2+X      PSW:Z=NVMOK=SERFLG.WEKNVM .EQ. FALSE
1339 E6 20          ANI  20H
133B 7A             MOV  A,D             A = CRCVAL
133C CA 40 13       JZ   ACCOD4          IF NVMOK .EQ. FALSE
133F 2F             CMA                    A = CRCVAL = .NOT. CRCVAL
                   ACCOD4;               ENDIF
                   ;                     COMPLETE ACCESS CODE IN WORK[0..7]
                   ;                     AS FOLLOWS:
                   ;                     WORK1[4].0..3 = WORK1[4].0..3
                   ;                     WORK1[5].1..2 = WORK1[5].1..2 .OR.
                   ;                                     CRCVAL.0..1
                   ;                     WORK1[6].0 = 0
                   ;                     WORK1[6].1..3 = CRCVAL.2..4
                   ;                     WORK1[7].0 = 0
                   ;                     WORK1[7].1..3 = CRCVAL.5..7
1340 57             MOV  D,A             D = CRCVAL
1341 E6 F8          ANI  0F8H            D = FCRC2
1343 82             ADD  D
1344 57             MOV  D,A
1345 17             RAL                  A = FCRC1
1346 17             RAL
1347 17             RAL
1348 E6 06          ANI  6
134A 21 62 74       LXI  H,(WORK1+4)/2+X HL = ADDRESS, WORK1[4..5]
134D B6             ORA  M               WORK1[4..5] = WORK1[4..5] .OR. FCRC1
134E 77             MOV  M,A
134F 7A             MOV  A,D             A = FCRC3 = FCRC2 .AND. HEX77
1350 E6 77          ANI  77H
1352 23             INX  H               HL = ADDRESS, WORK1[6..7]
1353 77             MOV  M,A             WORK1[6..7] = FCRC3
                   ;                     BUILD ACCESS CODE MSG IN XMIT BUFFER
1354 11 5A 13       LXI  D,ACCOD5        DE = ADDRESS, ACCOD5
1357 C3 5B 0D       JMP  VALREQ          VALREQ(WORK1 ,ACCFMT,HACODE,ERRFLG)
                   ;                           (@@DE+0,@DE+1 ,@DE+2 ,PSW:Z )
                   ;                           ( I    , I    , I    , 0    )
                   ;                   ENDIF
                   ;                   RETURN
                   ACCOD5;             ARGUEMENTS FOR VALREQ
135A C0 8F 90       DB   WORK1,ACCFMT,HACODE
```

BINOCT

```
                  ;BINOCT(BINARY,OCTAL ,DIGCNT)
                  ;      (BITSTR,NIBSTR,BYTE  )
                  ;      ( I    , O    , I    )
                  ;      ( @H   , @D   , B    )
                  ;      ( NC   , C    , C    )
                  ;
                  ;A,PSW DESTROYED
                  ;REGISTERS DESTROYED
                  ;
                  ;INSERT BITS FROM BIT STRING 3 AT A TIME INTO A PREVIOUSLY
                  ;CLEARED NIBBLE STRING.
                  ;DIGCNT ASSUMED .NE. 0.
                  ;
                  BINOCT;               ****ENTRY POINT
135D 78             MOV  A,B            E = DBIT = DIGCNT*4-1
135E 07             RLC
135F 07             RLC
1360 3D             DCR  A
1361 5F             MOV  E,A
1362 90             SUB  B              L = SBIT = DBIT-DIGCNT
1363 6F             MOV  L,A
                  BINOC1;               DO UNTIL DBIT .LT. 0
                  ;                       SET TO MOVE 3 BITS INTO OCTAL NIBBLE
1364 0E 03          MVI  C,3              C = BITCNT = 3
                  BINOC2;                 DO UNTIL BITCNT .EQ. 0
                  ;                         MOVE 3 L/O BITS INTO NIBBLE
1366 CD 68 0F       CALL MOVBIT             MOVBIT(BINARY,SBIT,OCTAL,DBIT,ZRO)
                  ;                                ( @H   , L  , @D   , E  ,P:Z)
                  ;                                ( I    , I  , O    , I  , O )
1369 2D             DCR  L                  L = SBIT = SBIT-1
136A 1D             DCR  E                  E = DBIT = DBIT-1
136B 0D             DCR  C                  C = BITCNT = BITCNT-1
136C C2 66 13       JNZ  BINOC2
                  ;                       ENDDO
                  ;                       SKIP OVER H/O BIT IN NIBBLE
136F 1D             DCR  E                E = DBIT = DBIT-1
1370 F2 64 13       JP   BINOC1
                  ;                     ENDDO
1373 C9             RET                 RETURN
```

VRCDR

```
                  ;VRCDR(ERRFLG)(DSCREG,DSCCRC)
                  ;     (BIT   )(NIBSTR,BYTE  )
                  ;     ( O    )( O    , O    )
                  ;     (PSW:Z )( RAM  , RAM  )
                  ;     ( C    )( C    , C    )
                  ;
                  ;A,PSW DESTROYED
                  ;REGISTERS DESTROYED
                  ;
                  ;CLEAR VARIABLE RMRS DESCENDING REGISTER
                  ;
                  VRCDR;                ****ENTRY POINT
                  ;                     PERFORM RULE CHECKING AND REFORMATTING
1374 CD 03 14       CALL VRPREP         VRPREP(ERRFLG)
                  ;                           (PSW:Z )
                  ;                           ( O    )
1377 C8             RZ                  IF ERRFLG .EQ. FALSE
                  ;                       CLEAR DESCENDING REGISTER
1378 AF             XRA  A                A = NIBVAL = 0
1379 06 07          MVI  B,DSCSIZ         B = DSCSIZ
137B 0E 2F          MVI  C,DSCREG         C = OFFSET, DSCREG
137D CD 24 0F       CALL FILNIB           FILNIB(DSCREG,NIBVAL,DSCSIZ)
                  ;                              ( @C   , A    , B    )
                  ;                              ( O    , I    , I    )
```

```
                        ;                   UPDATE DESCENDING REGISTER CRC
     1380 CD B1 0E   CALL CRC               CRC(DSCREG,DSCSIZ,CRCVAL)
                        ;                      ( @C    , B    , D     )
                        ;                      ( I     , I    , C     )
     1383 7A         MOV  A,D               DSCCRC = CRCVAL
     1384 32 1D 74   STA  DSCCRC/2+X
                        ;                   CHECK METER STATUS
     1387 CD 4E 0F   CALL LSTATE            LSTATE(FATMOD,NORMOD,SERMOD,PRVMOD)
                        ;                         (PSW:S ,PSW:Z ,PSW:P ,PSW:C )
                        ;                         ( 0    , 0    , 0    , 0    )
                        ;                   IF FATMOD .EQ. FALSE
                        ;                     EXECUTE RESET
     138A F2 03 14   JP   VRXEQ               VRXEQ(ERRFLG)
                        ;                          (PSW:Z )
                        ;                          ( 0    )
                        ;                   ELSE
                        ;                     DECLARE DEAD METER. FATAL RESET
     138D 3E 03      MVI  A,FATRST            A = FATRST
     138F C3 85 10   JMP  NVMDED              NVMDED(FATRST,ERRFLG)
                        ;                           ( A    ,PSW:Z )
                        ;                           ( I    , 0    )
                        ;                   ENDIF
                        ;                 ENDIF
                        ;                 RETURN
VRCLR

                        ;VRCLR(ERRFLG)(AMTBUF)
                        ;     (BIT   )(NIBSTR)
                        ;     ( 0    )( I    )
                        ;     (PSW:Z )( RAM  )
                        ;     ( C    )( NC   )
                        ;
                        ;A,PSW DESTROYED
                        ;REGISTERS DESTROYED
                        ;
                        ;SELECT VARIABLE RMRS CLEAR REGISTER FUNCTION
                        ;
                        VRCLR;            ****ENTRY POINT
                        ;                 SELECT FUNCTION VIA AMOUNT FORMAT
     1392 21 70 74   LXI  H,AMTBUF/2+X    HL = ADDRESS, AMTBUF[0..1]
     1395 7E         MOV  A,M             A = AMTBUF[0..1]
                        ;                 CASE (AMTBUF[0..1])
     1396 FE 1F      CPI  1FH               **1F: CLEAR RESET ERROR COUNTER
     1398 CA A3 13   JZ   VRCREC                  VRCREC(ERRFLG,ADRESS,AMTBUF)
                        ;                                (PSW:Z , HL    , @HL   )
                        ;                                ( 0    , I     , -     )
     139B FE 22      CPI  22H               **22: CLEAR DESCENDING REGISTER
     139D CA 74 13   JZ   VRCDR                   VRCDR(ERRFLG)
                        ;                               (PSW:Z )
                        ;                               ( 0    )
                        ;                   **ELSE:
                        ;                         PROCESS ERROR
     13A0 C3 A1 0B   JMP  PROERR                  PROERR(ERRFLG)
                        ;                                (PSW:Z )
                        ;                                ( 0    )
                        ;                 ENDCASE
                        ;                 RETURN
VRCREC

                        ;VRCREC(ERRFLG,ADRESS,AMTBUF)(AMTBUF)
                        ;      (BIT   ,ADRESS,NIBSTR)(NIBSTR)
                        ;      ( 0    , I    , -    )( 0    )
                        ;      (PSW:Z , HL   , @HL  )( RAM  )
                        ;      ( C    , C    , -    )( C    )
                        ;
                        ;A,PSW DESTROYED
                        ;REGISTERS DESTROYED
```

```
                    ;
                    ;CLEAR VARIABLE RMRS RESET ERROR COUNTER
                    ;
                    VRCREC;             ****ENTRY POINT
                    ;                   CHECK AMOUNT BUFFER
13A3 23               INX  H            HL = ADDRESS, AMTBUF[2..3]
13A4 7E               MOV  A,M          IF AMTBUF[2..3] .EQ. HEX00
13A5 B7               ORA  A
                    ;                     DON'T CLEAR DES REG BY MISTAKE
13A6 CA A1 0B         JZ   PROERR         PROERR(ERRFLG)
                    ;                           (PSW:Z )
                    ;                           ( 0    )
                    ;                   ELSE
                    ;                     CHECK METER STATUS
13A9 CD 4D 0F         CALL LSTATE         LSTATE(FATMOD,NORMOD,SERMOD,PRVMOD)
                    ;                           (PSW:S ,PSW:Z ,PSW:P ,PSW:C )
                    ;                           ( 0    , 0    , 0    , 0    )
                    ;                     IF FATMOD .EQ. TRUE
                    ;                       PROCESS ERROR
13AC FA A1 0B         JM   PROERR           PROERR(ERRFLG)
                    ;                             (PSW:Z )
                    ;                             ( 0    )
                    ;                     ELSE
                    ;                       ALTER AMOUNT FORMAT
13AF 3A 35 74         LDA  DIEDCM/2+X       A = DIEDCM
13B2 0E E1            MVI  C,AMTBUF+1       C = OFFSET, AMTBUF[1]
13B4 CD EE 0F         CALL PUTNIB           PUTNIB(AMTBUF[1],DIEDCM)
                    ;                             ( @C       , A    )
                    ;                             ( 0        , I    )
                    ;                       PERFORM RULE CHECK AND REFORMATTING
13B7 CD 03 14         CALL VRPRE1           VRPRE1(ERRFLG)
                    ;                             (PSW:Z )
                    ;                             ( 0    )
                    ;                       IF ERRFLG .EQ. FALSE
                    ;                         EXECUTE RESET
13BA C2 03 14         JNZ  VRXEQ              VRXEQ(ERRFLG)
                    ;                               (PSW:Z )
                    ;                               ( 0    )
                    ;                       ENDIF
                    ;                     ENDIF
                    ;                   ENDIF
13BD C9               RET               RETURN
VRMRS

                    ;VRMRS(ERRFLG)(CMBBUF)
                    ;     (BIT   )(NIBSTR)
                    ;     ( 0    )( I     )
                    ;     (PSW:Z )( RAM   )
                    ;     ( C    )( NC    )
                    ;
                    ;A,PSW DESTROYED
                    ;REGISTERS DESTROYED
                    ;
                    ;SELECT VARIABLE RMRS FUNCTION
                    ;
                    VRMRS;              ****ENTRY POINT
                    ;                   SELECT FUNCTION VIA COMBINATION FORMAT
13BE 3A 78 74         LDA  CMBBUF/2+X   A = CMBBUF[0..1]
                    ;                   CASE (CMBBUF[0..1])
13C1 FE 4F            CPI  4FH            **4F: CLEAR REGISTERS
13C3 CA 92 13         JZ   VRCLR                VRCLR(ERRFLG)
                    ;                                (PSW:Z )
                    ;                                ( 0    )
13C6 FE 6F            CPI  6FH            **6F: RESET POSTAGE
13C8 CA CE 13         JZ   VRSET                VRSET(ERRFLG)
                    ;                                (PSW:Z )
                    ;                                ( 0    )
```

```
                 ;                  **ELSE:
                 ;                        PROCESS ERROR
13CB C3 A1 0B     JMP  PROERR             PROERR(ERRFLG)
                 ;                              (PSW:Z )
                 ;                              ( 0    )
                 ;                  ENDCASE
                 ;                  RETURN
VRSET

                 ;VRSET(ERRFLG)(AMTBUF,DSCREG,DSCCRC)
                 ;     (BIT   )(NIBSTR,NIBSTR,BYTE  )
                 ;     ( 0    )( I    , 0    , 0    )
                 ;     (PSW:Z )( RAM  , RAM  , RAM  )
                 ;     ( C    )( NC   , C    , C    )
                 ;
                 ;A,PSW DESTROYED
                 ;REGISTERS DESTROYED
                 ;
                 ;RESET VARIABLE RMRS DESCENDING REGISTER
                 ;
                 VRSET;             ****ENTRY POINT
                 ;                  CHECK METER STATUS
13CE CD 4E 0F     CALL LSTATE       LSTATE(FATMOD,NORMOD,SERMOD,PRVMOD)
                 ;                        (PSW:S ,PSW:Z ,PSW:P ,PSW:C )
                 ;                        ( 0    , 0    , 0    , 0    )
                 ;                  IF NORMOD .EQ. FALSE
                 ;                    PROCESS ERROR
13D1 C2 A1 0B     JNZ  PROERR         PROERR(ERRFLG)
                 ;                          (PSW:Z )
                 ;                          ( 0    )
                 ;                  ELSE
                 ;                    CHECK AMOUNT FORMAT
13D4 3A 70 74     LDA  AMTBUF/2+X     IF AMTBUF[1] .EQ. HEX0F
13D7 E6 0F        ANI  0FH
13D9 FE 0F        CPI  0FH
                 ;                      PROCESS ERROR. NO DECIMAL ENTERED
13DB CA A1 0B     JZ   PROERR           PROERR(ERRFLG)
                 ;                            (PSW:Z )
                 ;                            ( 0    )
                 ;                    ELSE
                 ;                      PERFORM RULE CHECK AND REFORMATTING
13DE CD 03 14     CALL VRPREP           VRPREP(ERRFLG)
                 ;                            (PSW:Z )
                 ;                            ( 0    )
13E1 C8           RZ                    IF ERRFLG .EQ. FALSE
                 ;                        CALC NEW DESC REGISTER VALUE
13E2 0E E7        MVI  C,AMTBUF+8-1       C = OFFSET, AMTBUF[7]
13E4 06 35        MVI  B,DSCREG+DSCSIZ-1  B = OFFSET, DSCREG[I=DSCSIZ-1]
13E6 11 07 07     LXI  D,DSCSIZ*100H+DSCSIZ
                 ;                        D = DSCSIZ
                 ;                        E = DSCSIZ
13E9 CD F8 06     CALL DECADD             DECADD(AMTBUF[7],DSCREG[I],
                 ;                               ( @C      , @B      ,
                 ;                               ( I/O     , I       ;
                 ;
                 ;                               DSCSIZ,DSCSIZ,OVRFLO)
                 ;                               D     , E    ,PSW:C )
                 ;                               I     , I    , 0    )
                 ;                        IF OVRFLO .EQ. TRUE
                 ;                          PROCESS ERROR. OVERFLOW
13EC DA A1 0B     JC   PROERR               PROERR(ERRFLG)
                 ;                                (PSW:Z )
                 ;                                ( 0    )
                 ;                        ELSE
                 ;                          UPDATE DESCENDING REGISTER
13EF 0E 2F        MVI  C,DSCREG             C = OFFSET, DSCREG
13F1 06 E1        MVI  B,AMTBUF+8-DSCSIZ    B = OFFSET, AMTBUF[I=8-DSCSIZ]
```

```
13F3 3E 07      MVI  A,DSCSIZ               A = DSCSIZ
13F5 CD B3 0F   CALL MVLNIB                 MVLNIB(DSCREG,AMTBUF[I],DSCSIZ,
                ;                                 ( @C    , @B      , A    ,
                ;                                 ( 0     , I       , I    ,
                ;
                ;                                 NONBCD,NONZRO)
                ;                                 PSW:S ,PSW:Z )
                ;                                  0    , 0    )
                ;                           UPDATE DESC REGISTER CRC
13F8 47         MOV  B,A                    B = DSCSIZ
13F9 CD B1 0E   CALL CRC                    CRC(DSCREG,DSCSIZ,CRCVAL)
                ;                              ( @C   , B     , D     )
                ;                              ( I    , I     , 0     )
13FC 7A         MOV  A,D                    DSCCRC = CRCVAL
13FD 32 1B 74   STA  DSCCRC/2+X
                ;                           EXECUTE RESET
1400 C3 03 14   JMP  VRXEQ                  VRXEQ(ERRFLG)
                ;                                (PSW:Z )
                ;                                ( 0    )
                ;                         ENDIF
                ;                       ENDIF
                ;                     ENDIF
                ;                   ENDIF
                ;                   RETURN
                ;  Recharging programs have been deleted.
                VRPREP;
                VRPRE1; and
                VRXEQ;  are two (2) of the modules which have been removed for security
                ;  purposes.  One suitable system for the deleted set of modules
                ;  is disclosed in U. S. Patent No. 4,097,923 for REMOTE POSTAGE
                ;  METER CHARGING SYSTEM USING AN ADVANCED MICROCOMPUTERIZED
                ;  POSTAGE METER issued on June 27,1978 to Alton B. Eckert, Howell
                ;  A. Jones, Jr. and Frank T. Check, Jr.  This patent is hereby
                ;  incorporated by reference into the subject patent application.
                ; (*************************************************************)
                ;
                ;THIS IS THE DEMO PROGRAM FOR 6 STEPS/DIGIT MECHANISM
                ;  USED FOR 45 DEG ENCODER  & 30 DEG SENSOR MOUNTING
                ;Objective
                ;  Position the stepper motor through specified number of steps.
                ;  Flag the errors if
                ;                  1. the move fails
                ;                  2. if the sensors are not in home position
                ;                     after the completion of a move
                ;Level:
                ;  Calls RENC , BKLASH routines
                ;  utilizes look up table setup for determining the step count
                ;  requirements for retries.
                ;  Exits with the power held on to both motors.  It is the duty of the
                ;  invoking routine to judiciously hold the appropriate home phase.
                ;Procedure MOVCLS(MOTOR,RETRIES,MCOUNT,SPEED:ERROR)
                ;ERROR := 0
                ;Input (PORT.SENSOR,SENSPTN)
                ;SENSPTN := SENSPTN and MSNMASK
                ;If SENSPTN = (BODO or BODC or BCDO or BCDC) then PASSFLAG := 0
                ;                                               go to Loop1
                ;                                         else ERROR := 5
                ;                                               End MOVCLS
                ;Loop1:     Do while (RETRIES > 0 and MCOUNT <> 0 and ERROR > 0 )
                ;           If PASSFLAG = 0 then  ECOUNT := MCOUNT * 2
                ;                                 MSTEP := MCOUNT * 6
                ;           Input (PORT.SENSOR,SENSPTN)
                ;           If MOTOR = BANK then
                ;                          SENSPTN := (SENSPTN / 4) and MASKDSENSR
                ;           If SENSPTN = 11 then MOTPTN := PHASE1    (....  11H..)
                ;                          else MOTPTN := PHASE2          44H
                ;           If MCOUNT > 0 then MOTPTN := MOTPTN * 4
```

```
                ;           Input (PORTB,MOTHPTN)
                ;           IF MOTOR = BANK then MOTPTN := MOTPTN and MASKMSN
                ;                                MOTHPTN := MOTHPTN and MASKLSN
                ;                                MOTHPTN := MOTHPTN or MOTPTN
                ;                           else MOTPTN := MOTPTN and MASKLSN
                ;                                MOTHPTN := MOTHPTN and MASKMSN
                ;                                MOTHPTN := MOTHPTN or MOTPTN
                ;           Output ( PORTB,MOTHPTN)
                ;           If MCOUNT > 0 then  MSTEP := MSTEP-1
                ;                               MOTPTN := MOTPTN * 2
                ;                         else  MSTEP := MSTEP + 1
                ;                               MOTPTN := MOTPTN / 2
                ;           For X = 1 to SPEED by 1
                ;                   Procedure RENC (MOTOR,SPEED,OLDPTN :ERROR,ADJCOUNT)
                ;           End For
                ;           If MSTEP <> 0 then
                ;                   If ERROR = 0 then Continue Do
                ;           else For Y =1 to 60 by 1
                ;                       Procedure RENC (MOTOR,OLDPTN: ERRORT,ADJCOUNT)
                ;                End For
                ;           MSTEP := MSTEP (look-up)
                ;           PASSFLAG := PASSFLAG + 1
                ;           Continue Do
                ;   End Do
                ;   If RETRIES = 0 or MCOUNT = 0 then
                ;                                Procedure BKLASH
                ;If ERROR > 0 THEN End
                ;If BNKPAT = 01 then ERROR := 5; End
                ;            else if BNKPAT = 10 then ERROR :5; End
                ;                                else if MCOUNT = 0 THEN    End
                ;                                                   else ERROR := 6;End
                ;If DGTPAT = 01 then ERROR := 5; End
                ;           else if DGTPAT = 10 then ERROR := 5 ; End
                ;                               else if MCOUNT = 0 then End
                ;                                                   else ERROR := 6
                ;End movcls
                ;
                ;
                ; PARAM     (*C-REG*) COUNT : BYTE; (*- FOR CW, + FOR CCW*)
                ;   (*E-REG*) MOTOR : MOTORS; (*1 FOR BANK, 0 FOR DIGIT*)
                ;   (*H-REG*) SPEED : BYTE  ;Stepping speed of motor
                ;   (*L-REG*) TRIES : BYTE;
                ;
                ; VAR       (*B-REG*) ENC_COUNT : BYTE;
                ;   (*C-REG*) MOT_COUNT : BYTE;
                ;   (*D-REG*) PATTERN : BYTE;
                ;
0000            BODO        EQU     0000B
0003            BODC        EQU     0011B
000C            BCDO        EQU     1100B
000F            BCDC        EQU     1111B
0000            PFLAG0      EQU     00
0003            DGTMSK      EQU     03H
000C            BNKMSK      EQU     0CH
000F            LSNMSK      EQU     0FH
00F0            MSNMSK      EQU     0F0H
0011            PHASE1      EQU     11H
0044            PHASE2      EQU     44H
0003            SENSCL      EQU     03H
0005            ERROR5      EQU     05H
0006            ERROR6      EQU     06H
 .              MOVCLS:                                          ; BEGIN
1403 AF             XRA     A       ; ERROR := NO_ERRORS;
1404 32 38 74       STA     ERROR
                ;
                ;
1407 3A 00 68   MOVC4:      LDA     PORT2A  ;Combination sensor check
```

```
140A E6 0F          ANI     LSNMSK
140C FE 00          CPI     BODO
140E CA 23 14       JZ      MOVC7
1411 FE 03          CPI     BODC
1413 CA 23 14       JZ      MOVC7
1416 FE 0C          CPI     BCDO
1418 CA 23 14       JZ      MOVC7
141B FE 0F          CPI     BCDC
141D CA 23 14       JZ      MOVC7
1420 C3 F9 14       JMP     MOVC60
                ;
                ;
1423 3E 00      MOVC7:      MVI     A,PFLAG0  ;Passflag:=0
1425 F5             PUSH    PSW
1426 7D         MOVC05:     MOV     A,L      ; WHILE (TRIES > 0) AND (COUNT <> 0)
1427 B7             ORA     A       ;        AND (ERROR = NO_ERRORS) DO
1428 CA DB 14       JZ      MOVC50  ;branch here to movc70 for backlash correction
142B 79             MOV     A,C
142C B7             ORA     A
142D CA DB 14       JZ      MOVC50  ;branch here to movc70 for backlash correction
1430 3A 38 74       LDA     ERROR
1433 B7             ORA     A
1434 C2 DB 14       JNZ     MOVC50
                                    ;     BEGIN
1437 F1             POP     PSW     ;Passflag check.
1438 B7             ORA     A
1439 F5             PUSH    PSW     ;
143A C2 56 14       JNZ     MOVC8
143D 79         MOVC1:      MOV     A,C         ;
143E 87             ADD     A
143F 47             MOV     B,A             ;ENC COUNT=2*COUNT
1440 87             ADD     A
1441 80             ADD     B               ;STEP = 6*COUNT
1442 4F             MOV     C,A
                ;
                ;
1443 7B             MOV     A,E
1444 B7             ORA     A
1445 3A 00 68       LDA     PORT2A
1448 CA 4D 14       JZ      MOVC6
                ;
                ;
144B 0F             RRC                     ;BANK MOTOR
144C 0F             RRC                     ;
                                    ;     CASE SIGN (MOT_COUNT) OF
144D E6 03      MOVC6:      ANI     DGTMSK          ;
144F 16 44          MVI     D,PHASE2        ;
1451 CA 56 14       JZ      MOVC8           ;
1454 16 11          MVI     D,PHASE1
                MOVC8:                      ;
1456 79             MOV     A,C             ;
1457 B7             ORA     A               ;
1458 7A             MOV     A,D             ;
                                    ;
1459 FA 5F 14       JM      MOVC15          ;
145C 07             RLC
145D 07             RLC
                                                        ;
                                    ;           AND PHASED AND PHASEA;
145E 57         MOVC10:     MOV     D,A     ;     END;
                MOVC15:                     ;     REPEAT
145F 7B             MOV     A,E     ;     CASE MOTOR OF
1460 B7             ORA     A
1461 7A             MOV     A,D
1462 CA 73 14       JZ      MOVC20
1465 E6 F0          ANI     MSNMSK
1467 C5             PUSH    B
1468 47             MOV     B,A
```

```
1469 3A 02 70      LDA     PORTB
146C E6 0F         ANI     LSNMSK
146E B0            ORA     B
146F C1            POP     B
1470 C3 7E 14      JMP     MOVC25
1473 E6 0F    MOVC20:      ANI     LSNMSK  ;         DIGIT: PORTB := (PATTERN OR PHASESOFF R
1475 C5            PUSH    B
1476 47            MOV     B,A
1477 3A 02 70      LDA     PORTB                 ;
147A E6 F0         ANI     MSNMSK                ;
147C B0            ORA     B                     ;
147D C1            POP     B                     ;
                                   ;             IS BEING MOVED
147E 32 02 70 MOVC25:      STA     PORTB   ;        END;
1481 79            MOV     A,C     ;        CASE SIGN (MOT_COUNT) OF
1482 B7            ORA     A
1483 7A            MOV     A,D
1484 FA 8C 14      JM      MOVC30
                           ;              +1: BEGIN
1487 0D            DCR     C       ;          MOT_COUNT := MOT_COUNT - 1;
1488 07            RLC             ;          PATTERN := PATTERN ROL 1
1489 C3 8E 14      JMP     MOVC35  ;          END;
              MOVC30:              ;              -1: BEGIN
148C 0C            INR     C       ;          MOT_COUNT := MOT_COUNT - 1;
148D 0F            RRC             ;          PATTERN := PATTERN ROR 1
                                   ;          END;
148E 57       MOVC35:      MOV     D,A     ;          END;
148F C5            PUSH    B       ;        READ_ENCODERS (10, MOTOR, ENC_COUNT)
1490 48            MOV     C,B
1491 D5            PUSH    D
1492 E5            PUSH    H
1493 6C            MOV     L,H
1494 CD 99 19      CALL    RENC
1497 E1            POP     H
1498 D1            POP     D
1499 79            MOV     A,C
149A C1            POP     B
149B 47            MOV     B,A
149C 79            MOV     A,C     ;     UNTIL (MOT_COUNT = 0) OR (ERROR <> NO_ERRORS);
149D B7            ORA     A
149E CA A8 14      JZ      MOVC40
14A1 3A 38 74      LDA     ERROR
14A4 B7            ORA     A
14A5 CA 5F 14      JZ      MOVC15
14A8 C5       MOVC40:      PUSH    B       ;     READ_ENCODERS (60, MOTOR, ENC_COUNT);
14A9 48            MOV     C,B
14AA D5            PUSH    D
14AB E5            PUSH    H
14AC 2E 3C         MVI     L,60.
14AE CD 99 19      CALL    RENC
14B1 E1            POP     H
14B2 D1            POP     D
14B3 79            MOV     A,C
14B4 C1            POP     B
14B5 47            MOV     B,A
14B6 B7            ORA     A       ;     COUNT := ENC_COUNT / 2;
14B7 F2 BC 14      JP      MOVC45
14BA 2F            CMA
14BB 3C            INR     A
14BC E5       MOVC45:      PUSH    H
14BD D5            PUSH    D
14BE 16 00         MVI     D,00H   ;Step error computation/lookup
14C0 5F            MOV     E,A
14C1 21 08 15      LXI     H,TABBASE
14C4 19            DAD     D
14C5 4E            MOV     C,M
14C6 78            MOV     A,B
```

```
1407 B7                ORA     A
14C8 F2 CF 14          JP      MOVC42
14CB 79                MOV     A,C
14CC 2F                CMA
14CD 3C                INR     A
14CE 4F                MOV     C,A
14CF D1         MOVC42:        POP     D
14D0 E1                POP     H
14D1 2D                DCR     L
14D2 F1                POP     PSW
14D3 3C                INR     A                   ;PASSFLAG:=PASSFLAG+1
14D4 F5                PUSH    PSW
14D5 C3 26 14          JMP     MOVC05
                ;
                ;
                ;
14D8 CD 1B 15   MOVC70:        CALL    BKLASH
14DB F1         MOVC50:        POP     PSW         ;retrieve passflag;
14DC 3A 38 74          LDA     ERROR
14DF B7                ORA     A
14E0 C0                RNZ
                       ;
                ;
                ;
14E1 3A 39 74          LDA     BNKPAT  ; IF BANK_PAT NOT IN [00H, 03H]
14E4 B7                ORA     A       ;    OR DIGIT_PAT NOT IN [00H,03H] THEN
14E5 CA ED 14          JZ      MOVC55
14E8 FE 03             CPI     SENSCL
14EA C2 F9 14          JNZ     MOVC60
14ED 3A 3A 74   MOVC55:        LDA     DGTPAT
14F0 B7                ORA     A
14F1 CA FF 14          JZ      MOVC65
14F4 FE 03             CPI     SENSCL
14F6 CA FF 14          JZ      MOVC65
                               ;     BEGIN
14F9 3E 05      MOVC60:        MVI     A,ERROR5        ;      ERROR := NOT_HOME;
14FB 32 38 74          STA     ERROR
14FE C9                RET             ;     RETURN
                               ;     END;
14FF 79         MOVC65:        MOV     A,C     ; IF COUNT <> 0 THEN ERROR := MOVE_FAILED
1500 B7                ORA     A
1501 C8                RZ
1502 3E 06             MVI     A,ERROR6
1504 32 38 74          STA     ERROR
1507 C9                RET
                               ; END;
                ;
                ;
1508 00         TABBASE:DB     0
1509 04                DB      4H
150A 06                DB      6D
150B 08                DB      8D
150C 0C                DB      12D
150D 10                DB      16D
150E 12                DB      18D
150F 14                DB      20D
1510 18                DB      24D
1511 1C                DB      28D
1512 1E                DB      30D
1513 22                DB      34D
1514 24                DB      36D
1515 28                DB      40D
1516 2A                DB      42D
1517 2C                DB      44D
1518 30                DB      48D
1519 34                DB      52D
151A 36                DB      54D
```

```
                ;
                ;
                ;BACKLASH CORRECTION ROUTINE
                ;This routine advances the digit stepper motor by one step
                ;beyond the expected settling point and then drives one
                ;step backwards  to the final settling point
                ;None of the registers are affected.
                ;This routine will be invoked only if all retries are exhausted or if al
                ;motor phases are applied.
                ;This routine will not be invoked in case of an error condition arises
                ;in RENC routine before the specified number of pulses are applied
                ;
151B F5         BKLASH:     PUSH    PSW
151C C5             PUSH    B
151D 7B             MOV     A,E             ;motor type check
151E B7             ORA     A
151F C2 3C 15       JNZ     BKL50
1522 3A 02 70       LDA     PORTB
1525 F5             PUSH    PSW
1526 E6 F0          ANI     MSNMSK
1528 F5             PUSH    PSW
1529 7A             MOV     A,D             ;D register has the next pattern output
152A E6 0F          ANI     LSNMSK
152C 47             MOV     B,A
152D F1             POP     PSW
152E B0             ORA     B
152F 32 02 70       STA     PORTB
1532 CD A9 17       CALL    DEL30M          ;forward pulse
1535 F1             POP     PSW
1536 32 02 70       STA     PORTB
1539 CD A9 17       CALL    DEL30M          ;backward pulse to final settling point
153C C1         BKL50:      POP     B
153D F1             POP     PSW
153E C9             RET
                ;
                ;
                ;   LEDON ROUTINE
                ;   TURNS ON THE STROBE FOR LEDS
                ;
                ;
153F F5         LEDON:      PUSH    PSW             ;SAVE CONTENTS
1540 3A 01 70       LDA     PORTA           ;LOADS THE CURRENT STATUS
1543 E6 DF          ANI     0DFH            ;BIT RESET
1545 32 01 70       STA     PORTA           ;PORT RESET
1548 F1             POP     PSW
1549 C9             RET                     ;
                ;
                ;
                ;   LEDOFF ROUTINE
                ;   TURNS THE STROBE OFF
                ;
                ;
154A F5         LEDOFF:     PUSH    PSW                     ;
154B 3A 01 70       LDA     PORTA                   ;
154E F6 20          ORI     20H                     ;
1550 32 01 70       STA     PORTA                   ;
1553 F1             POP     PSW             ;
1554 C9             RET                     ;
                ;
                ;
                ;
                ;
                ;
                ;
                ;   DELAY ROUTINES
                ;
                ;
```

```
1555 00       DEL300:     NOP
1556 00           NOP              ;ADJUST TIME
1557 CD 64 15     CALL      DEL75  ;75 MICRO SECS
155A CD 64 15     CALL      DEL75  ;
155D CD 64 15     CALL      DEL75        ;
1560 CD 64 15     CALL      DEL75        ;
1563 C9           RET                    ;
              ;
              ;
              ;
1564 F5       DEL75:      PUSH    PSW                ;
1565 3E 0A        MVI       A,0AH            ;
1567 3D       DEL1:       DCR     A                  ;
1568 C2 67 15     JNZ       DEL1             ;
156B F1           POP       PSW              ;
156C C9           RET                        ;
              ;
              ;
              ;   SENSOR INITIALISATION ROUTINE
              ;
              ;
156D          INITSM:
156D CD 3F 15 SENSR:      CALL    LEDON              ;LED STROBE ON
1570 CD 64 15     CALL      DEL75            ;SETTLING TIME
1573 3A 00 68     LDA       PORT2AD
1576 47           MOV       B,A              ;
1577 E6 03        ANI       DGTMSK
1579 CA 9E 15     JZ        SENS35
157C FE 03        CPI       DGTMSK
157E C2 A3 15     JNZ       SENS40
1581 3E 02        MVI       A,02H
1583 32 02 70 SENS25:     STA     PORTB
1586 CD A9 17     CALL      DEL30M
1589 3A 00 68     LDA       PORT2AD
158C 47           MOV       B,A
158D E6 03        ANI       DGTMSK           ;
158F 32 3A 74     STA       DGTPAT           ;DIGIT PATTERN
1592 78           MOV       A,B              ;
1593 0F           RRC                        ;
1594 0F           RRC                        ;
1595 E6 03        ANI       DGTMSK           ;
1597 32 39 74     STA       BNKPAT           ;BANK PATTERN
159A CD 4A 15     CALL      LEDOFF
159D C9           RET                        ;
              ;
              ;
159E 3E 08    SENS35:     MVI     A,08H
15A0 C3 83 15     JMP       SENS25
              ;
              ;
15A3 3E 0F    SENS40:     MVI     A,15D
15A5 32 38 74     STA       ERROR
15A8 C3 9E 15     JMP       SENS35
              ;
              ; (************************************************************)
              ;Objective: To compare present encoder status to previous encoder value
              ;           and determine the deviation as no change, clockwise movement
              ;           of one step, counterclockwise movement of one step or as an
              ;           error, which corresponds to a two step jump in the status.
              ;
              ;           Does not call any subroutines
              ;
              ;
              ; FUNCTION (*A-REG*) ENCODER_MOVE : BYTE;
              ;
              ; PARAM     (*C-REG*) PATTERN : ENCODER_PATTERNS;
              ;   (*E-REG*) NEW_PATTERN : ENCODER_PATTERNS;
```

```
                  ;
                  ENCMOV:                       ; BEGIN
15AB 79               MOV    A,C      ; CASE PATTERN ROL 2 OR NEW_PATTERN OF
15AC 07               RLC
15AD 07               RLC
15AE B3               ORA    E
15AF 5F               MOV    E,A
15B0 AF               XRA    A
15B1 57               MOV    D,A
15B2 21 B8 15         LXI    H,ENCT
15B5 19               DAD    D
15B6 7E               MOV    A,M
15B7 C9               RET
15B8 00           ENCT:      DB     0         ;     00H: ENCODER_MOVE := 0;
15B9 01               DB      1       ;     01H: ENCODER_MOVE := +1;
15BA FF               DB     -1       ;     02H: ENCODER_MOVE := -1;
15BB 02               DB     +2       ;     03H: ENCODER_MOVE := +2;
15BC FF               DB     -1       ;     04H: ENCODER-MOVE := -1;
15BD 00               DB     0        ;     05H: ENCODER_MOVE := 0;
15BE 02               DB     +2       ;     06H: ENCODER_MOVE := +2;
15BF 01               DB     +1       ;     07H: ENCODER_MOVE := +1;
15C0 01               DB     +1       ;     08H: ENCODER_MOVE := +1;
15C1 02               DB     +2       ;     09H: ENCODER_MOVE := +2;
15C2 00               DB     0        ;     0AH: ENCODER_MOVE := 0;
15C3 FF               DB     -1       ;     0BH: ENCODER_MOVE := -1;
15C4 02               DB     +2       ;     0CH: ENCODER_MOVE := +2;
15C5 FF               DB     -1       ;     0DH: ENCODER_MOVE := -1;
15C6 01               DB     +1       ;     0EH: ENCODER_MOVE := +1;
15C7 00               DB     0        ;     0FH: ENCODER_MOVE := 0;
                                      ; END
                                      ; END;
                  ; (*****************************************************************)
                  ;THIS SEGMENT IS USED TO MOVE THE BANK & DIGIT IN TO HOME
                  ;POSITION UPON DETECTION OF AN ERROR IN ATTEMPT TO
                  ;POSITION THE RACKS TO 00.00
                  ;
                  ; PROCEDURE ENDMOV_CLOSED;
                  ;
                  ; PARAM     (*C-REG*) COUNT : BYTE; (*- FOR CW, + FOR CCW*)
                  ;   (*E-REG*) MOTOR : MOTORS; (*1 FOR BANK, 0 FOR DIGIT*)
                  ;
                  ; VAR       (*B-REG*) ENC_COUNT : BYTE;
                  ;   (*C-REG*) MOT_COUNT : BYTE;
                  ;   (*D-REG*) PATTERN : BYTE;
                  ;
                  ;
                  ;
00F0              MSNMASK     EQU     0F0H
000F              LSNMASK     EQU     0FH
0014              NUMRD1      EQU     20D
003C              SETLTIM     EQU     60D
                  ;
                  ;
                  ;
                  ;
                  ;
15C8 AF           ENDMOV:     XRA     A                         ;     REPEAT
15C9 32 38 74         STA     ERROR
15CC 7B           ENDM05:     MOV     A,E     ;         CASE MOTOR OF
15CD B7               ORA     A
15CE 7A               MOV     A,D
15CF CA E0 15         JZ      ENDM20          ;MOTOR(BANK,DIGIT)
                  ;
                  ;
15D2 E6 F0            ANI     MSNMASK
15D4 C5               PUSH    B
15D5 47               MOV     B,A
```

```
15D6 3A 02 70      LDA     PORTB
15D9 E6 0F         ANI     LSNMASK
15DB B0            ORA     B
15DC C1            POP     B
15DD C3 EB 15      JMP     ENDM25
                ;
                ;
15E0 E6 0F      ENDM20:    ANI     LSNMASK     ;   DIGIT: PORTB := (PATTERN OR PHASESOFF ROL 4)
15E2 C5            PUSH    B
15E3 47            MOV     B,A
15E4 3A 02 70      LDA     PORTB                   ;
15E7 E6 F0         ANI     MSNMASK                 ;
15E9 B0            ORA     B                       ;
15EA C1            POP     B                       ;
                           ;                       IS BEING MOVED
15EB 32 02 70 ENDM25:      STA     PORTB   ;         END;
15EE 79            MOV     A,C     ;        CASE SIGN (MOT_COUNT) OF
15EF B7            ORA     A
15F0 7A            MOV     A,D
15F1 FA F9 15      JM      ENDM30
                           ;               +1: BEGIN
15F4 0D            DCR     C       ;           MOT_COUNT := MOT_COUNT - 1;
15F5 07            RLC             ;           PATTERN := PATTERN ROL 1
15F6 C3 FB 15      JMP     ENDM35  ;           END;
                ;
                ;
                ENDM30:                ;           -1: BEGIN
15F9 0C            INR     C       ;           MOT_COUNT := MOT_COUNT - 1;
15FA 0F            RRC             ;           PATTERN := PATTERN ROR 1
                           ;                   END;
15FB 57         ENDM35:    MOV     D,A     ;       END;
15FC C5            PUSH    B       ;        READ_ENCODERS (10, MOTOR, ENC_COUNT)
15FD 48            MOV     C,B
15FE D5            PUSH    D
15FF E5            PUSH    H
1600 2E 14         MVI     L,NUMRD1
1602 CD 99 19      CALL    RENC
1605 E1            POP     H
1606 D1            POP     D
1607 79            MOV     A,C
1608 C1            POP     B
1609 47            MOV     B,A
160A 79            MOV     A,C     ;    UNTIL (MOT_COUNT = 0) OR (ERROR <> NO_ERRORS);
160B B7            ORA     A
160C C2 CC 15      JNZ     ENDM05
                ;
                ;
160F C5         ENDM40:    PUSH    B       ;     READ_ENCODERS (60, MOTOR, ENC_COUNT);
1610 48            MOV     C,B
1611 D5            PUSH    D
1612 E5            PUSH    H
1613 2E 3C         MVI     L,SETLTIM
1615 CD 99 19      CALL    RENC
1618 E1            POP     H
1619 D1            POP     D
161A 79            MOV     A,C
161B C1            POP     B
161C 47            MOV     B,A
161D B7            ORA     A       ;    COUNT := ENC_COUNT / 2;
161E 3E 07         MVI     A,07H               ;ERROR 7
1620 C8            RZ                          ;NORMAL EXIT
                ;
                ;
1621 32 38 74      STA     ERROR
1624 C9            RET                         ;ERROR EXIT
                ;
0044            HPHAM1     EQU     044H
```

```
0088                HPHASE      EQU      88H
0000                SENS00      EQU      00H
0001                SENS01      EQU      01H
0002                SENS02      EQU      02H
0003                SENS03      EQU      03H
0004                SENS04      EQU      04H
0005                SENS05      EQU      05H
0006                SENS06      EQU      06H
0007                SENS07      EQU      07H
0008                SENS08      EQU      08H
0009                SENS09      EQU      09H
000A                SENS10      EQU      0AH
000B                SENS11      EQU      0BH
000C                SENS12      EQU      0CH
000D                SENS13      EQU      0DH
000E                SENS14      EQU      0EH
000F                SENS15      EQU      0FH
0003                SENMSK      EQU      03H
                    ;
                    ;
1625 CD 6D 15 SEKPOS:      CALL     SENSR
1628 CD 3F 15          CALL     LEDON
162B CD 3B 16          CALL     HDSEEK
162E CD 4A 15          CALL     LEDOFF
1631 CD BC 18          CALL     MODLN
1634 CD B0 18          CALL     ERRHDR
1637 C4 B5 18          CNZ      EXTERR
163A C9                RET
                    ;
                    ;
                    ;
                    ;
                    ;
                    ;Procedure HDSEEK
                    ;Objective
                    ;    This segment initialises the print wheels to 00.00 position.
                    ;    Prior to the movement of the racks this segment aligns the
                    ;    bank and digit motors to legitimate home positions. The 00.00
                    ;    location is attained by hitting against the mechanical blocks.
                    ;    Three retries will be provided before coming to the conclusion
                    ;    that an error in movement is detected.
                    ;Level
                    ;;
                    ;
                    ;   RCOUNTERB := 4
                    ;   RCOUNTERC := 8                    ;RETRY COUNTERS
                    ;SEKP00:RCOUNTERB:= RCOUNTERB-1
                    ;   If RCOUNTERB = 0 then ERROR := 12 ;     End.
                    ;   MOTPATN := HOMEPHASE-1
                    ;   Output(PORTB,MOTPATN)
                    ;   Procedure TIMEDELAY(30msec)
                    ;   MOTPATN := HOMEPHASE
                    ;   Output (PORTB,MOTPATN)
                    ;   Procedure TIMEDELAY(30msec)
                    ;   RCOUNTERC := RCOUNTERC - 1
                    ;   If RCOUNTERC = 0 then ERROR := 12 ;             End.
                    ;   Input (PORT.SENSOR,SENSRPTN)
                    ;   SENSRPTN := SENSRPTN.LSNMASK
                    ;   Case SENSRPTN   00,03,12,15     SEKP85
                    ;                   01,02,13,14     SEKP01
                    ;                   04,07,08,11     SEKP02
                    ;                   05,06,09,10     SEKP03
                    ;
                    ;   SEKP01: Procedure DALIGN(,TYPE 2 ERROR)
                    ;           If TYPE2ERROR = FALSE then go to STEP0
                    ;           else MOTPTN:= NOPHASEON
                    ;                Output (PORTB,MOTPTN)
```

```
;                 Procedure TIMEDELAY (30msec)
;                 Go to SEEKP00
;   SEKP02: Procedure BALIGN(TYPE2ERROR)
;           If TYPE2ERROR = FALSE then go to STEP0
;           else MOTPTN := NOPHASEON
;                 Procedure TIMEDELAY(30msec)
;                 Go to SEEKP00
;   SEKP03: Procedure DALIGN(TYPE2 ERROR)
;           If TYPE2ERROR = FALSE then go to STEP0
;           else  Procedure BALIGN(TYPE2ERROR)
;           If TYPE2ERROR = FALSE then go to STEP0
;           else Input (PORTB,MOTPTN)
;                 MOTPTN := MOTPTN.LSNMSK
;                 Output (PORTB,MOTPTN)
;                 Procedure TIMEDELAY(30msec)
;                 Procedure DALIGN(TYPE2ERROR)
;                 If TYPE2ERROR = TRUE then Input (PORTB,MOTPTN)
;                                           MOTPTN := NOPHASEON
;                                           Output(PORTB,MOTPTN)
;                                           Procedure TIMEDELAY(30msec)
;                                           Go to SEEKP00
;                else        Input (PORTB,MOTPTN)
;                           MOTPTN:=(( MOTPTN.LSNMSK)+HOMEPHASEBANK))
;                           Output (PORTB,MOTPTN)
;                           Procedure TIMEDELAY(30msec)
;                           Go to STEP0
;   SEKP85:
;           Procedure PTNCHK(DIGIT:PTNFLAG)
;           If PTNFLAG <> 0 then go to SEKP00
;           Procedure PTNCHK(BANK,PTNFLAG)
;           If PTNFLAG <> 0 then go to SEKP00
;end case
;
;   SEKP05: Procedure MOVE(DIGIT,CCW,1,SPD8:ERROR)
;           Do while ERROR = 0
;                  Procedure MOVE(DIGIT,CCW,1,SPD8:ERROR)
;           End do.
;           Procedure SELDRN(:DRN)
;           Procedure POHOME(DRN:ERROR)
;           If ERROR <>0 then End hdseek.
;
;           Procedure MOVE(BANK,CCW,1,SPD8:ERROR)
;           Do while ERROR = 0
;                  Procedure MOVE (BANK,CCW,1,SPD8:ERROR)
;           end do.
;           If BNKPAT = 01 then DRN:=CW else DRN:=CCW
;           Procedure POHOME(DRN,ERROR)
;           If ERROR <> 0 then End Hdseek.
;           Procedure MOVE(BANK,CW,4,SPD8:ERROR)
;           If ERROR <> 0 then End Hdseek.
;           For BANK:=0 TO 4 by 1 Do
;                  Procedure MOVE(DIGIT,CCW,1,SPD8:ERROR)
;                  Do while ERROR =FALSE
;                         Procedure MOVE(DIGIT,CCW,1,SPD8:ERROR)
;                  end do
;                  Procedure SELDRN(:DRN)
;                  Procedure POHOME(DRN:ERROR)
;                  If ERROR = TRUE then End hdseek.
;                  Procedure MOVE(DIGIT,CW,9,SPD8:ERROR)
;                  If ERROR = TRUE then End Hdseek.
;                  BANK:= BANK+1
;                  If BANK = 2 then
;                             Procedure MOVE(BANK,CCW,1,SPD8:ERROR)
;                             If ERROR = TRUE then end Hdseek.
;                  end do
;           end for.
;           Procedure MOVE (BANK,CW,2,SPD8:ERROR)
```

```
                ;           If ERROR = TRUE then end hdseek.
                ;           Procedure MOVE (DIGIT,CW,2,SPD8:ERROR)
                ;           If ERROR = TRUE then end hdseek.
                ;           Input (PORTB.MOTPTN)
                ;           MOTPTN:=MOTPTN.MSNMSK
                ;           Output(PORTB,MOTPTN)
                ;END.
                ;
                ;
163B 01 08 04 HDSEEK:      LXI     B,408H                 ;RETRY COUNT
163E C5          PUSH       B
163F C1       SEKP00:      POP     B
1640 05          DCR        B
1641 CA 5A 16    JZ         EREXIT
                ;
                ;
1644 C5          PUSH       B
1645 3E 44       MVI        A,HPHAM1
1647 32 02 70    STA        PORTB
164A CD A9 17    CALL       DEL30M
164D 3E 88       MVI        A,HPHASE
164F 32 02 70    STA        PORTB
1652 CD A9 17    CALL       DEL30M
1655 C1       STEPO:       POP     B
1656 0D          DCR        C
1657 C2 60 16    JNZ        CSTEPO
165A 3E 0C    EREXIT:      MVI     A,12D
165C 32 38 74    STA        ERROR
165F C9          RET
                ;
                ;
1660 C5       CSTEPO:      PUSH    B
1661 3A 00 68    LDA        PORT2A                  ;
1664 E6 0F       ANI        LSNMSK
                ;
                ;
1666 21 73 16    LXI        H,BASE5
1669 16 00       MVI        D,00H
166B 87          ADD        A
166C 5F          MOV        E,A
166D 19          DAD        D
166E 5E          MOV        E,M
166F 23          INX        H
1670 56          MOV        D,M
1671 EB          XCHG
1672 E9          PCHL
                ;
                ;
1673 D2 16    BASE5:       DW      SEKP85
1675 93 16       DW         SEKP01
1677 93 16       DW         SEKP01
1679 D2 16       DW         SEKP85
167B A5 16       DW         SEKP02
167D AF 16       DW         SEKP03
167F AF 16       DW         SEKP03
1681 A5 16       DW         SEKP02
1683 A5 16       DW         SEKP02
1685 AF 16       DW         SEKP03
1687 AF 16       DW         SEKP03
1689 A5 16       DW         SEKP02
168B D2 16       DW         SEKP85
168D 93 16       DW         SEKP01
168F 93 16       DW         SEKP01
1691 D2 16       DW         SEKP85
                ;
                ;
                ;  JZ       SEKP90
```

```
                     ;                      ;CHECKING DIGIT POSITION
                     ;  CPI      SENS01
                     ;  JZ       SEKP01
                     ;
                     ;  CPI      SENS02
                     ;  JZ       SEKP01
                     ;;
                     ;  CPI      SENS13
                     ;  JZ       SEKP01
                     ;;
                     ;  CPI      SENS14
                     ;  JZ       SEKP01
                     ;;
                     ;  CPI      SENS04
                     ;  JZ       SEKP02
                     ;;
                     ;  CPI      SENS07
                     ;  JZ       SEKP02
                     ;;
                     ;  CPI      SENS08
                     ;; JZ       SEKP02
                     ;;
                     ;  CPI      SENS11
                     ;  JZ       SEKP02
                     ;;;
                     ;  CPI      SENS05
                     ;  JZ       SEKP03
                     ;;
                     ;  CPI      SENS06
                     ;  JZ       SEKP03
                     ;;
                     ;  CPI      SENS09
                     ;  JZ       SEKP03
                     ;;
                     ;  CPI      SENS10
                     ;  JZ       SEKP03
                     ;;
                     ;  CPI      SENS03
                     ;  JZ       SEKP90
                     ;;
                     ;  JMP      SEKP05
                     ;
                     ;
                     ;                      DIGIT NOT IN HOME
1693 CD E7 17 SEKP01:   CALL     DALIGN
1696 B7                 ORA      A
1697 CA 55 16           JZ       STEP0              ;No Error condition
                                                    ;Digit aligned and phased
                                                    ;Bank aligned and phased
169A
                                                    ;Type 1 error
                                                    ;Digit aligned and phased
                                                    ;Bank not aligned and/or phased
                                                    ;
169A 3E 00    SEKP04:   MVI      A,00H                      ;Type 2 error
                                                    ;Digit not aligned and/or phased
                                                    ;Bank don't care
169C 32 02 70 SEP11:    STA      PORTB
169F CD A9 17           CALL     DEL30M
16A2 C3 3F 16           JMP      SEKP00
16A5 CD 12 18 SEKP02:   CALL     BALIGN
16A8 B7                 ORA      A
16A9 CA 55 16           JZ       STEP0              ;No Error condition
                                                    ;Digit aligned and phased
                                                    ;Bank aligned and phased
                                                    ;
                                                    ;Type 1 Error
```

```
                                    ;Bank aligned and phased
                                    ;Digit not aligned and/or phased
16AC C3 9A 16      JMP     SEKP04
16AF CD E7 17 SEKP03:     CALL    DALIGN
16B2 B7            ORA     A
16B3 CA 55 16      JZ      STEP0          ;NO error condition
              ;
              ;
16B6
                                    ;Type 2 error
16B6 CD 12 18      CALL    BALIGN
16B9 B7            ORA     A
16BA CA 55 16      JZ      STEP0          ;No error condition
              ;
              ;
                                    ;Type 1 Error condition
              ;
              ;
16BD 3A 02 70      LDA     PORTB
16C0 E6 0F         ANI     LSNMSK
16C2 32 02 70      STA     PORTB
16C5 CD A9 17      CALL    DEL30M
              ;
              ;
              ;
              ;
16C8 CD E7 17      CALL    DALIGN
16CB B7            ORA     A
16CC C2 9A 16      JNZ     SEKP04
              ;
              ;
              ;
              ;    LDA     PORTB
              ;    ANI     LSNMSK
              ;    ORI     80H
              ;    STA     PORTB
              ;    CALL    DEL30M
16CF C3 55 16      JMP     STEP0
              ;;
              ;
              ;
              ;
16D2 1E 00    SEKP85:     MVI     E,00
16D4 CD 2A 19      CALL    PTNCHK
16D7 C2 3F 16      JNZ     SEKP00
16DA 1C            INR     E
16DB CD 2A 19      CALL    PTNCHK
16DE C2 3F 16      JNZ     SEKP00
              ;;
              ;
16E1 C1       SEKP05:     POP     B
16E2 3A 3A 74 SEKP06:     LDA     DGTPAT
16E5 F5            PUSH    PSW
16E6 0E 01         MVI     C,1                ;
16E8 1E 00         MVI     E,00               ;DIGIT MOTOR
16EA 21 03 08      LXI     H,803H             ;RE TRIES
16ED CD 03 14      CALL    MOVCLS             ;EXIT FROM LOCK TRY
16F0 3A 38 74      LDA     ERROR              ;
16F3 B7            ORA     A                  ;
16F4 C2 FB 16      JNZ     SEKP07
16F7 F1            POP     PSW
16F8 C3 E2 16      JMP     SEKP06             ;
              ;
              ;
              ;
16FB F1       SEKP07:     POP     PSW
16FC CD 40 18      CALL    SELDRN
```

```
                ;
16FF CD C5 18 SEKP19:     CALL    POHOME
                ;
1702 C0             RNZ
1703            SEKP10:
1703 0E 01          MVI     C,01                    ;CLOCKWISE 1STEP
1705 1E 01          MVI     E,01
1707 21 03 08       LXI     H,803H                  ;BANK MOTOR
170A CD 03 14       CALL    MOVCLS                  ;BANK POSITION IDENTIFICATION
170D 3A 38 74       LDA     ERROR                   ;
1710 B7             ORA     A                       ;
1711 CA 03 17       JZ      SEKP10                  ;
                ;
                ;
1714 3A 39 74       LDA     BNKPAT
1717 2E 00          MVI     L,00H
1719 FE 01          CPI     01
171B CA 1F 17       JZ      SEKP12
171E 2C             INR     L
                ;
                ;
171F CD C5 18 SEKP12:     CALL    POHOME
1722 C0             RNZ
                ;
                ;
                ;
1723 1E 01          MVI     E,01                    ;
1725 0E FC          MVI     C,-4H                   ;
1727 21 03 08       LXI     H,803H                  ;BANK IS BEING POSITIONED TO EXTREME
172A CD 03 14       CALL    MOVCLS                  ;
172D CD B0 18       CALL    ERRHDR                  ;
1730 C0             RNZ                             ;EXITS ON FATAL ERROR
                ;
                ;
1731 0E 05          MVI     C,5H                    ;
1733 C5         SEKP15:   PUSH    B                         ;INDEX STORAGE
1734 3A 3A 74 SEKP20:     LDA     DGTPAT
1737 F5             PUSH    PSW
1738 0E 01          MVI     C,1                     ;CLOCKWISE 1 STEP
173A 1E 00          MVI     E,00                    ;DIGIT MOTOR
173C 21 03 08       LXI     H,803H                  ;RETRIES
173F CD 03 14       CALL    MOVCLS                  ;MOVE DIGIT TO EXTREME..9
1742 3A 38 74       LDA     ERROR                   ;
1745 B7             ORA     A                       ;
1746 C2 4D 17       JNZ     SEKP21                  ;
1749 F1             POP     PSW
174A C3 34 17       JMP     SEKP20
                ;
                ;
                ;
174D F1         SEKP21:   POP     PSW
174E CD 40 18       CALL    SELDRN
1751 CD C5 18 SEKP23:     CALL    POHOME                    ;
                ;
1754 C2 B3 17       JNZ     SEEK26
1757 0E F7          MVI     C,-9H                   ;CLOCKWISE 9STEPS
1759 1E 00          MVI     E,00                    ;
175B 21 03 08       LXI     H,803H                  ;RE TRIES
175E CD 03 14       CALL    MOVCLS                  ;POSITION TO 0
1761 CD B0 18       CALL    ERRHDR                  ;
1764 C1             POP     B                       ;RESTORE STACK
1765 C0             RNZ                             ;FATAL ERROR  EXIT
1766 00             NOP
1767 00             NOP
1768 00             NOP
1769 00             NOP
                ;
```

```
                  ;
                  ;
                  ;
176A 0D           SEKP22:   DCR     C                 ;
176B CA 87 17       JZ      SEKP30          ;
176E C5           SEKP25:   PUSH    B                 ;INDEX RESTORE
176F 0E 01          MVI     C,1             ;CLOCWISE 1 STEP
1771 1E 01          MVI     E,01            ;BANK MOTOR
1773 21 03 08       LXI     H,803H          ;RETRIES
1776 CD 03 14       CALL    MOVCLS          ;GO  TO NEXT BANK
1779 CD B0 18       CALL    ERRHDR          ;
177C C1             POP     B               ;
177D C0             RNZ                     ;FATAL ERROR EXIT
                  ;
177E 79             MOV     A,C             ;
177F FE 03          CPI     03              ;HOME?
1781 C2 33 17       JNZ     SEKP15          ;
1784 C3 6A 17       JMP     SEKP22          ;
                  ;
                  ;
                  ;
1787 0E FE        SEKP30:   MVI     C,-2H             ;COUNTER CLOCKWISE 2 STEPS
1789 1E 01          MVI     E,01            ;BANK MOTOR
178B 21 03 08       LXI     H,803H          ;
178E CD 03 14       CALL    MOVCLS          ;MOVE BANK TO HOME
1791 CD B0 18       CALL    ERRHDR          ;
1794 C0             RNZ                     ;FATAL ERROR EXIT
                  ;
                  ;
1795 0E FE          MVI     C,-2H           ;COUNTER CLOCKWISE 1 STEP
1797 1E 00          MVI     E,00            ;DIGIT MOTOR
1799 21 03 08       LXI     H,803H          ;
179C CD 03 14       CALL    MOVCLS          ;SET DIGIT IN TO LOCK
179F CD B0 18       CALL    ERRHDR          ;
17A2 C9             RET
                  ;
                    ;
17A3 C5           DEL6M:    PUSH    B
17A4 06 14          MVI     B,20D
17A6 C3 AC 17       JMP     DELM1
                  ;
                  ;
                  ;
17A9 C5           DEL30M:   PUSH    B
17AA 06 64          MVI     B,100D
17AC CD 55 15 DELM1:        CALL    DEL300
17AF 05             DCR     B
17B0 C2 AC 17       JNZ     DELM1
17B3 C1           SEEK26:   POP     B
17B4 C9             RET
                  ;
                  ;
                  ;
                  ;
17B5 01 DC 17 DPTSP:        LXI     B,BASEAD
17B8 21 02 70       LXI     H,PORTB
17BB 7B             MOV     A,E
17BC B7             ORA     A
17BD 7E             MOV     A,M
17BE CA D4 17       JZ      DPTS05
                  ;
                  ;
17C1 7E             MOV     A,M
17C2 E6 E0          ANI     0E0H
17C4 07             RLC
17C5 07             RLC
17C6 07             RLC
```

```
17C7 E5        DPTS10:   PUSH    H
17C8 26 00        MVI      H,00H
17CA 6F           MOV      L,A
17CB 09           DAD      B
17CC 7E           MOV      A,M
17CD E1           POP      H
17CE A6           ANA      M
17CF 77           MOV      M,A
               ;  STA      PORTB
17D0 CD A9 17     CALL     DEL30M
17D3 C9           RET
               ;
               ;
               ;
17D4 E6 0E     DPTS05:   ANI     0EH
17D6 0F           RRC
17D7 C6 04        ADI      04
17D9 C3 C7 17     JMP      DPTS10
               ;
               ;
               ;
               ;
               ;
17DC FF        BASEAD:   DB      0FFH
17DD DF           DB       0DFH
17DE FF           DB       0FFH
17DF BF           DB       0BFH
17E0 EF           DB       0EFH
17E1 FD           DB       0FDH
17E2 7F           DB       7FH
17E3 FB           DB       0FBH
17E4 FE           DB       0FEH
17E5 FF           DB       0FFH
17E6 F7           DB       0F7H
               ;
               ;
               ;
               ;Procedure DALIGN
               ;Objective:       this segment makes an attempt to align the digit motors to
               ;           a legitimate home position.
               ;
               ;Level.
               ;
               ;DALIGN:
               ;   MOTOR := DIGIT
               ;   PHASE := DPHASE1
               ;   DIRECTION := CW
               ;   Procedure DPHOME(:ERROR)
               ;   If ERROR = TRUE then
               ;                         MOTOR := DIGIT
               ;                         PHASE := DPHASE1
               ;                         DIRECTION := CCW
               ;                         Procedure DPHOME(:ERROR)
               ;                         If ERROR <>0 then ERROR := TYPE2ERROR
               ;                                      Procedure DPTSP(DIGIT)
               ;                                      end.
               ;                         else MOTOR := BANK
               ;                              Procedure PTNCHK(:ERROR)
               ;                              Procedure DPTSP(DIGIT)
               ;                              If ERROR <> 0 then ERROR := TYPE2ERROR
               ;                              end
               ;End.
               ;
               ;
               ;
17E7 2E 00     DALIGN:   MVI     L,00
17E9 16 33        MVI      D,33H
```

```
17EB 1E 00          MVI     E,00H
17ED CD 86 19       CALL    DPHOME
17F0 CA FF 17       JZ      SEKP11
                   ;
                   ;
                   ;
                   ;
                   ;
17F3 2E 01         SEKP09:  MVI     L,01
17F5 16 33          MVI     D,33H
17F7 1E 00          MVI     E,00H
17F9 CD 86 19       CALL    DPHOME
17FC C2 0C 18       JNZ     ERSET
                   ;
                   ;
17FF 1E 01         SEKP11:  MVI     E,01H
1801 CD 2A 19       CALL    PTNCHK
1804 F5             PUSH    PSW
1805 1E 00          MVI     E,00
1807 CD B5 17       CALL    DPTSP
180A F1             POP     PSW
180B C8             RZ                      ;No Error condition
                   ;  MVI     A,01
                   ;  RET                   ;Type 1 Error set
180C CD B5 17 ERSET:       CALL    DPTSP
180F 3E 02          MVI     A,02            ;Type 2 error set
1811 C9             RET
                   ;
                   ;
                   ;;
                   ;Procedure BALIGN
                   ;Objective:        this segment makes an attempt to align the bank motors to
                   ;             a legitimate home position.
                   ;
                   ;Level.
                   ;
                   ;DALIGN:
                   ;   MOTOR := BANK
                   ;   PHASE := DPHASE1
                   ;   DIRECTION := CW
                   ;   Procedure DPHOME(:ERROR)
                   ;   If ERROR = TRUE then
                   ;                            MOTOR := BANK
                   ;                            PHASE := DPHASE1
                   ;                            DIRECTION := CCW
                   ;                            Procedure DPHOME(:ERROR)
                   ;                            If ERROR <>0 then ERROR := TYPE2ERROR
                   ;                                             Procedure DPTSP(BANK)
                   ;                                             end.
                   ;                            else MOTOR := DIGIT
                   ;                                 Procedure PTNCHK(:ERROR)
                   ;                                 Procedure DPTSP(BANK)
                   ;                                 If ERROR <> 0 then ERROR := TYPE2ERROR
                   ;                                 end
                   ;End.
                   ;
                   ;
                   ;
                   ;
1812               BALIGN:
1812 2E 00          MVI     L,00
1814 16 33         SEKP17:  MVI     D,33H
1816 1E 01          MVI     E,01H
1818 CD 86 19       CALL    DPHOME
181B C2 31 18       JNZ     SEKP14
181E 1E 00         SEKP13:  MVI     E,00
1820 CD 2A 19       CALL    PTNCHK
```

```
1823 F5          PUSH    PSW
1824 1E 01       MVI     E,01
1826 CD B5 17    CALL    DPTSP
1829 F1          POP     PSW
182A C8          RZ                         ;No error condition
               ; MVI     A,01
               ; RET                        ;Type 1 error set
               ;
               ;
182B CD B5 17 BERSET:    CALL    DPTSP
182E 3E 02       MVI     A,02       ;       type 2 error set
1830 C9          RET
               ;
               ;
               ;
               ;
1831 2E 01    SEKP14:    MVI     L,01
1833 16 33       MVI     D,33H
1835 1E 01       MVI     E,01H
1837 CD 86 19    CALL    DPHOME
183A C2 2B 18    JNZ     BERSET
               ;
               ;
183D C3 1E 18    JMP     SEKP13
               ;
               ;
               ;
               ;
               ;
               ;
               ;
               ; Accumulator contains the last sucessfully attained
               ;digit sensor readings
               ;this sensor reading is compared with the new sensor readings to
               ;determine the direction of POHOME
               ;drive
               ;
               ;
1840 47       SELDRN:    MOV     B,A
1841 3A 00 68    LDA     PORT2A
1844 E6 03       ANI     DGTMSK
1846 2E 00       MVI     L,00
1848 A8          XRA     B                  ;CLEARS CARRY
1849 1F          RAR
184A D2 4E 18    JNC     SEKP08
184D 2C          INR     L
184E C9       SEKP08:    RET
               ;
184F 16 88    MOPEN:     MVI     D,088H
1851 79       MOP05:     MOV     A,C
1852 B7          ORA     A
1853 7A          MOV     A,D
1854 FA 68 18    JM      MOP01
1857 07          RLC
1858 0D          DCR     C
1859 CA 6D 18    JZ      MOP10
185C 57       MOP02:     MOV     D,A
185D E6 0F       ANI     0FH
185F 32 02 70    STA     PORTB
1862 CD A3 17    CALL    DEL6M
1865 C3 51 18    JMP     MOP05
1868 0F       MOP01:     RRC
1869 0C          INR     C
186A C2 5C 18    JNZ     MOP02
186D CD A9 17 MOP10:     CALL    DEL30M
1870 C9          RET
               ;
```

```
                   ;
                   ;
                   ;
1871 0E F4     SEKTRP:     MVI     C,-12D
1873 CD 4F 18      CALL    MOPEN
1876 0E 0C         MVI     C,12D
1878 CD 4F 18      CALL    MOPEN
187B C9            RET
                   ;
187C
                   ;           THIS SEGMENT CONTAINS THE PROCEDURES USED IN STEPPER MOTOR
                   ;           CONTROL OF THE SELECTION AND TRIP MECHANISMS.
                   ;
                   ;
                   ;           PROCEDURE MVTRIP
                   ;
                   ;
                   ;           THIS PROCEDURE MOVES THE DIGIT MOTOR FROM THE LOCKED POSITION
                   ;           TO THE TRIP POSITION OF THE TRIP SHAFT.
                   ;           ON DETECTION OF AN ERROR IN THE PROCEDURE, A FATAL ERROR
                   ;           ROUTINE IS INVOKED . UPON EXIT  FROM THE FATAL ERROR ROUTINE
                   ;           THE ZERO FLAG OF THE PROCESSOR STATUS WORD IS RESET TO ZERO
                   ;           IF A FATAL ERROR HAS OCCURED.THE ACCUMULATOR WILL HAVE THE ERRO;
                   ;
                   ;
187C CD 3F 15 MVTRIP:      CALL    LEDON
187F 21 03 10 MVTR05:      LXI     H,1003H             :# OF RE TRIES
1882 1E 00         MVI     E,00                ;DIGIT MOTOR SELECTED
1884 0E FE         MVI     C,-2                ;COUNTER CLOCKWISE 2 STEPS
1886 CD 03 14      CALL    MOVCLS
1889 CD 4A 15      CALL    LEDOFF              ;
188C CD BC 18      CALL    MODLN               ;
188F CD B0 18      CALL    ERRHDR
1892 C4 B5 18      CNZ     EXTERR
1895 C9            RET                         ;
                   ;
                   ;
                   ;
                   ;
                   ;***********************************************************************
                   ;
                   ;
                   ;   PROCEDURE MVLOCK
                   ;
                   ;
                   ;   THIS PROCEDURE MOVES THE DIGIT MOTOR FROM THE TRIP POSITION TO THE
                   ;   LOCK POSITION OF THE TRIP SHAFT. ON DETECTION OF AN ERROR ,THE FATAL E
                   ;
1896 CD 3F 15 MVLOCK:      CALL    LEDON
1899 21 03 08 MVL005:      LXI     H,803H              ;RE TRIES
189C 1E 00         MVI     E,00                ;DIGIT MOTOR
189E 0E 02         MVI     C,2H                ;CLOCKWISE 2 STEP
18A0 CD 03 14      CALL    MOVCLS              ;
18A3 CD 4A 15      CALL    LEDOFF
18A6 CD BC 18      CALL    MODLN               ;
18A9 CD B0 18      CALL    ERRHDR
18AC C4 B5 18      CNZ     EXTERR              ;
18AF C9            RET
                           ;
                   ;
                   ;
                   ;
                   ;***********************************************************************
                   ;
                                               ;THIS PROCEDURE ASSUMES THAT THE
                   ;
                   ;
```

```
                   ;
                   ;***********************************************************************
                   ;
                   ;
                   ;          ERRHDR  ROUTINE
                   ;          THIS ROUTINE IS CALLED ON DETECTION OF AN ERROR IN
                   ;          THE MOTOR MOVE ROUTINES.THE ZERO FLAG AND THE
                   ;          ACCUMULATOR RETURN THE FLAG INDICATION AND ERROR CODE
                   ;
                   ;
18B0               ERRHDR:
18B0 3A 38 74      ERRH05:    LDA     ERROR                 ;
18B3 B7               ORA     A                       ;SETTING FLAGS
18B4 C9               RET                             ;
                   ;
                   ;
                   ;***********************************************************************
                   ;
                   ;
                   ;EXTERR ROUTINE
                   ;   This segment creates  a BCD coded error code from the
                   ;   error storage location .  Before converting to the BCD pattern
                   ;   30D is added to the error value from motor move routines.
                   ;   this routine is called upon only when an Error is detected by
                   ;   the errhdr routine.
18B5               EXTERR:
18B5 3A 38 74         LDA     ERROR   ;
18B8 C6 1E            ADI     30D
18BA 27               DAA             ;
18BB C9               RET             ;
                   ;
                   ;
                   ;
                   ;***********************************************************************
                   ;MODLN routine
                   ;
                   ;
                   ;   This routine masks off the bank home position hold and provides
                   ;the digit motor hold pattern to the interface for modulation purpose.
                   ;
18BC               MODLN:
18BC 3A 02 70         LDA     PORTB
18BF E6 0F            ANI     0FH
18C1 32 02 70         STA     PORTB
18C4 C9               RET
                   ;
                   ;
                   ;
                   ;
                   ;THIS ROUTINE PLACES THE MOTOR IN TO THE APPROPRIATE HOME
                   ;POSITION WHEN AN ERROR OCCURS ON SEEK
                   ;THIS ROUTINE MOVES THE MOTORS TWO STEPS AT A TIME
                   ;DEPENDING ON THE SENSOR READINGS THE MOTOR MOVEMENT DIRECTION IS DETERM
                   ;THIS ROUTINE TRANSFORMS THE THE LAST PATTERN OUTPUT FROM DMOVE ROUTINE
                   ;BREGISTER WILL BE LOADED BY THE EXPECTED ENCODER COUNT
                   ;C REGISTER WILL BE LOADED BY THE MOTOR STEP COUNT
                   ;MOTOR STEP COUNT WILL BE DETERMINED BY THE ENCODER READINGS
                   ;BEFORE REACHING THE ERROR CONDITION THE MOTOR WAS BEING DRIVEN IN
                   ;THE CW DIRECTION
                   ;
                   ;
18C5               POHOME:
18C5 CD 79 19      PLHOME:    CALL    SENSIN
18C8 CA D4 18         JZ      PLH12           ;SENSOR (00)
18CB FE 03            CPI     03H
18CD CA D9 18         JZ      PLH14           ;SENSOR (00,11)
18D0 CD FD 18         CALL    PH0110          ;SENSOR (01,10)
```

```
18D3 C9           RET
                ;
                ;
18D4 16 11      PLH12:      MVI     D,11H
18D6 C3 DB 18     JMP       PLH10           ;check phases/
                ;
18D9 16 44      PLH14:      MVI     D,44H
18DB CD DF 18   PLH10:      CALL    PH0011          ;
18DE C9           RET                       ;
                ;
                ;
                ;Procedure PH0011
                ;Objective: This segments positions the motors to a legitimate home posi
                ;           when the sensor patterns are , to start with , at 00 or 11, (the
                ;           sensors are either both pen or closed)
                ;PH0011:DIRECTION := CW
                ;   MSTEP:=-4
                ;   ECOUNT := -1
                ;   Procedure ENDMOV(NEXTPTN,MOTOR,DIRECTION,MSTEP,ECOUNT:ERROR)
                ;   If ERROR <> 0  then NEXTPTN := RRC(NEXTPTN)
                ;                       NEXTPTN := RRC(NEXTPTN)
                ;                       DIRECTION := CCW
                ;                       MSTEP       :=2
                ;                       ECOUNT:=    1
                ;                       Procedure ENDMOV(NEXTPTN,MOTOR,DIRECTION,MSTEP,ECOUNT:ERROR)
                ;   Procedure PTNCHK(MOTOR:ERROR)
                ;   end
                ;End.
                ;
                ;
                ;
18DF            PH0011:
18DF 0E FC          MVI     C,-4H           ;4STEPS CW
18E1 06 FF          MVI     B,-1H
18E3 CD C8 15       CALL    ENDMOV          ;POSITION TO 2STEPS BEFORE HOME
                                            ;1ENCODER STEP AWAY FROM HOME
18E6 3A 38 74       LDA     ERROR
18E9 FE 07          CPI     07H
18EB CA F9 18       JZ      PH05            ;EXIT 1. ERROR FROM TRYING TO MOVE
                                            ;TO MOVE CW (TOWARDS LOCK FROM A
                                            ;SENSOR (00,11) AFTER IDENTIFYING
                                            ;A BLOCK
18EE 7A             MOV     A,D
18EF 0F             RRC
18F0 0F             RRC                     ;MOTOR PATTERN FOR
18F1 57             MOV     D,A
18F2 0E 02          MVI     C,02H
18F4 06 01          MVI     B,01
18F6 CD C8 15       CALL    ENDMOV
                                            ;TWO MSTEPS TOWARDS SENSORS (00,11)
                                            ;IN CCW DIRECTION
18F9 CD 2A 19 PH05:         CALL    PTNCHK
18FC C9             RET
                ;
                ;
                ;
                ;Procedure PH0110
                ;Objective :        This segment positions the motors to a legitimate home
                ;           position wherein there is agreement between the phase applied
                ;           to the motor and the sensor readings observed.  Four single
                ;           step attempts will be made to position the motor to the
                ;           home position.  If a home position is reached before all
                ;           four attempts are completed, an exit will be done from this
                ;           segment.  The error will be flagged by the pattern check segment.
                ;
```

```
                ;PH0110:    If DIRECTION = CW then
                ;                                    NEXTPTN := RLC (NEXTPTN)
                ;                                    NEXTPTN := RLC (NEXTPTN)
                ;                                    MSTEP:= -1
                ;                                    ECOUNT := -1
                ;           else MSTEP:= 1
                ;                ECOUNT := 1
                ;           For TRIES = 4 to 0 by 1 do
                ;                    Procedure ENDMOV(NEXTPTN,MOTOR,DIRECTION,MSTEP,ECOUNT:ERROR)
                ;                    Procedure PTNCHK(MOTOR:ERROR)
                ;                    If ERROR = TRUE then TRIRES:= TRIES-1
                ;                    else end
                ;           End
                ;End.
                ;
                ;
                ;
                ;
 18FD           PH0110:
                ;
                ;
 18FD 7D            MOV     A,L             ;SENSOR (01)
 18FE FE 01         CPI     01H
 1900 C2 0D 19      JNZ     PLH57           ;DIRECTION(CW,CCW)
                ;
                ;
 1903 7A        PLH52:      MOV     A,D             ;DIGIT SEEKING 00----------
 1904 07            RLC
 1905 07            RLC
 1906 0E FF         MVI     C,-1H
 1908 06 FF         MVI     B,-1H
 190A C3 12 19      JMP     PLH65
                ;
                ;
 190D 7A        PLH57:      MOV     A,D
 190E 0E 01         MVI     C,01H
 1910 06 01         MVI     B,01H
 1912 57        PLH65:      MOV     D,A             ;PATTERN IN D REGISTER
 1913 2E 04         MVI     L,04H
 1915 C5        PLH66:      PUSH    B
 1916 CD C8 15  PLH67:      CALL    ENDMOV
 1919 C1        PLH68:      POP     B
 191A CD 2A 19      CALL    PTNCHK
 191D C8            RZ                      ;EXIT 4 .NORMAL EXIT
                                            ;STILL ERRORS COULD EXIST
                                            ;DUE TO PTNCHK RESULTS
 191E 7A        PLH70:      MOV     A,D
 191F 2D            DCR     L
 1920 C2 15 19      JNZ     PLH66           ;2 + 2 MSTEPS OVER?
                                            ;AGAINST A STOP
 1923 3E 09     PLH83:      MVI     A,09H
 1925 32 38 74      STA     ERROR
 1928 B7            ORA     A
 1929 C9            RET                     ;EXIT 6. THERE IS NO 00/11
                                            ; IN THIE DIRECTION OF MOVEMENT
                ;
                ;
                ;
                ;
                ;
                ;
                ;
                ;
                ;*********************************************************************
                ;
                ;
                ;
```

```
                ;PROCEDURE  PTNCHK( MOTOR:ERROR)
                ;
                ;Input (PORTB,MOTPTN)
                ;   IF MOTOR = BANK then MOTPTN:=MOTPTN.MSNMSK
                ;                        MOTPTN:= 4*RRC(MOTPTN)
                ;
                ;                           IF BNKPAT =( 01,02) THEN ERROR:=8; END.
                ;                        IF BNKPAT = 00 AND MOTPTN = (08,05) THEN ERROR :=0
                ;                                                                  END.
                ;                        IF MOTPTN (02,06) THEN ERROR := 0
                ;                                         ELSE ERROR:=8
                ;                                             END.
                ;
                ;
                ;                        ENDIF
                ;       ELSE        MOTPTN:= MOTPTN.LSNMSK
                ;              IF DGTPAT =(01,02)THEN ERROR:=8;    END.
                ;          IF DGTPAT = 0 AND MOTPTN = (08,09) THEN ERROR := 0
                ;                                                  END.
                ;          IF MOTPATN =(02,06) THEN ERROR:=0       ;END.
                ;END                                                  ELSE ERROR := 8
                ;                                                  END
                ;;
                ;
                ;
                ;  E REGISTER  ......      MOTOR(BANK,DIGIT)
                ;  ERROR   CODE.....       8       FAILURE TO  ARRIVE AT HOME
                ;
192A 7B         PTNCHK:    MOV    A,E                   ;MOTOR (BANK,DIGIT)
192B B7                    ORA    A                     ;MOTOR
192C 3A 02 70              LDA    PORTB
192F CA 68 19              JZ     PTNC10
                ;
                ;
1932 E6 F0                 ANI    0F0H
1934 0F                    RRC
1935 0F                    RRC
1936 0F                    RRC
1937 0F                    RRC
1938 F5                    PUSH   PSW
1939 3A 39 74              LDA    BNKPAT
193C FE 01      PTNC15:    CPI    01
193E CA 71 19              JZ     PTNC20
                ;
                ;
                ;
1941 FE 02                 CPI    02H
1943 CA 71 19              JZ     PTNC20
1946 B7                    ORA    A
1947 CA 5A 19              JZ     PTNC30
                ;
                ;
                ;
194A F1                    POP    PSW
194B FE 02                 CPI    02H
194D CA 55 19              JZ     PTNC40
1950 FE 06                 CPI    06H
1952 C2 72 19              JNZ    PTNC25
                ;
                ;
                ;
1955 AF         PTNC40:    XRA    A
1956 32 38 74              STA    ERROR
1959 C9                    RET
                ;
                ;
                ;
195A F1         PTNC30:    POP    PSW
```

```
1958 FE 08          CPI     08H
195D CA 55 19       JZ      PTNC40
1960 FE 09          CPI     09H
1962 CA 55 19       JZ      PTNC40
1965 C3 72 19       JMP     PTNC25
                 ;
                 ;
                 ;
1968 E6 0F       PTNC10:    ANI     0FH
196A F5             PUSH    PSW
196B 3A 3A 74       LDA     DGTPAT
196E C3 3C 19       JMP     PTNC15
                 ;
                 ;
1971 F1          PTNC20:    POP     PSW
1972 3E 08       PTNC25:    MVI     A,08H                  ;ERROR :=8
1974 32 38 74       STA     ERROR
1977 B7             ORA     A                      ;NOT HOME ERROR
1978 C9             RET                            ;EXIT
                 ;;
                 ;
                 ;
1979             SENSIN:
1979 7B             MOV     A,E             ;CHECK MOTOR BANK/DIGIT
197A B7             ORA     A
197B 3A 00 68       LDA     PORT2A
197E CA 83 19       JZ      PLH05           ;MOTOR (BANK,DIGIT)
1981 0F             RRC
1982 0F             RRC
1983 E6 03       PLH05:     ANI     DGTMSK
1985 C9             RET
                 ;
                 ;
                 ;
1986 CD 79 19 DPHOME:       CALL    SENSIN
1989 CA 91 19       JZ      DPH1
198C FE 03          CPI     03H
198E C2 95 19       JNZ     DPH5
1991 CD DF 18 DPH1:         CALL    PH0011
1994 C9             RET
                 ;
                 ;
                 ;
1995 CD FD 18 DPH5:         CALL    PH0110
1998 C9             RET
                 ;
                 ; (****************************************************************)
                 ;
                 ; PROCEDURE READ_ENCODERS;
                 ;
                 ;Objective: Read the encoder status and store the information in ram
                 ;           storage and update the terminal count.  Flag errors of
                 ;           1.  digit motor moved on a bank motor move
                 ;           2.  digit motor moved too fast
                 ;           3.  bank motor moved on a digit motor move
                 ;           4.  bank motor moved too fast
                 ;
                 ;Initialisation requirements:
                 ;           Initial patterns of bank and digit sensors be stored in the
                 ;           respective locations before this module is invoked, during
                 ;           power up activities.
                 ;Level:
                 ;           Calls ENCMOV, DEL300 and DEL75 modules.
                 ;           Delay routines are used for adjusting the stepper motor rate.
                 ;
                 ;
```

```
              ;Procedure READENC(DGTPAT,BNKPAT,NUMREAD,MOTOR,ENCCOUNT: ENCCOUNT,ERROR)
              ;Do While (NUMREAD greater than 0 and ERROR  equal to 0
              ;   NUMREAD := NUMREAD - 1
              ;   Input (PORT.SENSOR,SENSPTN)
              ;   SENSPTN1 := SENSPTN
              ;   SENSPTN := SENSPTN.DSNSRMASK
              ;   SENSPTN1 := (SENSPTN.BSNSRMASK)/4
              ;   Case MOTOR = BANK
              ;           If SENSPTN = (DGTPAT) then
              ;                           Procedure ENCMOV(BNKPAT,SENSPTN1:COUNTINC)
              ;                           If COUNTINC = 2 then
              ;                                           ERROR:= 3
              ;                                           End Case
              ;                           If ENCCOUNT greater than 0 then
              ;                                           ENCCOUNT:= ENCCOUNT-COUNTINC
              ;                           else            ENCCOUNT:= ENCCOUNT+COUNTINC
              ;           else            ERROR:= 1       ;DIGIT ON BANK
              ;           End If
              ;
              ;        MOTOR = DIGIT
              ;           If SENSPTN1 = BNKPAT then
              ;                           Procedure ENCMOV(DGTPAT,SENSPTN:COUNTINC)
              ;                           If COUNTINC = 2 then
              ;                                           ERROR = 4
              ;                                           End Case
              ;                           If ENCCOUNT greater than 0 then
              ;                                           ENCCOUNT=ENCCOUNT-COUNTINC
              ;                           else            ENCCOUNT=ENCCOUNT+COUNTINC
              ;           else            ERROR:= 2
              ;           End If
              ;       End Case
              ;End Do
              ;BNKPAT := SENSPTN1
              ;DGTPAT := SENSPTN
              ;End RENC
              ;
              ;
              ;
              ; PARAM VAR (*C-REG*) COUNT : BYTE;
              ;   (*E-REG*) MOTOR : MOTORS;
              ;   (*L-REG*) NUM_READS : BYTE;
              ;
              ; VAR       (*A-REG*) COUNT_INC : BYTE;
              ;   (*B-REG*) NEW_BANK_PAT : ENCODER_PATTERNS;
              ;   (*D-REG*) NEW_DIGIT_PAT : ENCODER_PATTERNS;
              ;
0001          ERRR1       EQU     01H
0002          ERROR2      EQU     02H
0003          ERROR3      EQU     03H
0004          ERROR4      EQU     04H
              RENC:                          ; BEGIN
1999
1999 7D       RENC05:     MOV     A,L        ; WHILE (NUM_READS > 0) AND (ERROR = NO_ERRORS) DO
199A B7           ORA     A
199B C8           RZ
199C 3A 38 74     LDA     ERROR
199F B7           ORA     A
19A0 C0           RNZ
                                    ;     BEGIN
19A1 2D           DCR     L         ;     NUM_READS := NUM_READS - 1;
19A2 3A 00 68     LDA     PORT2AD ;       NEW_BANK_PAT := (PORTA AND 0CH) ROR 2;
19A5 E6 0C        ANI     BNKMSK
19A7 0F           RRC
19A8 0F           RRC
19A9 47           MOV     B,A
19AA 3A 00 68     LDA     PORT2AD ;       NEW_DIGIT_PAT := PORTA AND 03H;
```

```
19AD E6 03          ANI     DGTMSK
19AF 57             MOV     D,A
19B0 7B             MOV     A,E     ;     CASE MOTOR OF
19B1 B7             ORA     A
19B2 CA E6 19       JZ      RENC20
19B5 3A 3A 74       LDA     DGTPAT  ;        BANK:  IF NEW_DIGIT_PAT <> DIGIT_PAT THEN
19B8 BA             CMP     D
19B9 CA C4 19       JZ      RENC10
19BC 3E 01          MVI     A,ERRR1 ;                  ERROR := DIG_ON_BANK
19BE 32 38 74       STA     ERROR
19C1 C3 14 1A       JMP     RENC35
              RENC10:                       ;                 ELSE
                                    ;                  BEGIN
19C4 C5             PUSH    B       ;                  COUNT_INC := ENCODER_
19C5 3A 39 74       LDA     BNKPAT  ;                      MOVE (NEW_BANK_PAT, BANK_PAT);
19C8 4F             MOV     C,A
19C9 D5             PUSH    D
19CA 58             MOV     E,B
19CB E5             PUSH    H
19CC CD AB 15       CALL    ENCMOV
19CF E1             POP     H
19D0 D1             POP     D
19D1 C1             POP     B
19D2 FE 02          CPI     2.      ;                  IF COUNT_INC = 2 THEN
19D4 C2 DF 19       JNZ     RENC15
19D7 3E 03          MVI     A,ERROR3        ;                  ERROR := BANK_TOO_FAST
19D9 32 38 74       STA     ERROR
19DC C3 14 1A       JMP     RENC35
19DF 2F       RENC15:       CMA             ;                  ELSE COUNT := COUNT - COUNT_INC
19E0 3C             INR     A
19E1 81             ADD     C
19E2 4F             MOV     C,A
19E3 C3 14 1A       JMP     RENC35
                                    ;                  END;
19E6 3A 39 74 RENC20:       LDA     BNKPAT  ;      DIGIT: IF NEW_BANK_PAT <> BANK_PAT THEN
19E9 B8             CMP     B
19EA CA F5 19       JZ      RENC25
19ED 3E 02          MVI     A,ERROR2        ;                  ERROR := BANK_ON_DIG
                                            ;NOTE .ERROR CODE MASKED FOR DEMO.........
19EF 32 38 74       STA     ERROR
19F2 C3 14 1A       JMP     RENC35
              RENC25:                       ;                 ELSE
                                    ;                  BEGIN
19F5 C5             PUSH    B       ;                  COUNT_INC := ENCODER_
19F6 3A 3A 74       LDA     DGTPAT  ;                      MOVE (NEW_DIGIT_PAT, DIGIT_PAT);
19F9 4F             MOV     C,A
19FA D5             PUSH    D
19FB 5A             MOV     E,D
19FC E5             PUSH    H
19FD CD AB 15       CALL    ENCMOV
1A00 E1             POP     H
1A01 D1             POP     D
1A02 C1             POP     B
1A03 FE 02          CPI     2.      ;                  IF COUNT_INC = 2 THEN
1A05 C2 10 1A       JNZ     RENC30
1A08 3E 04          MVI     A,ERROR4;                      ERROR := DIG_TOO_FAST
1A0A 32 38 74       STA     ERROR
1A0D C3 14 1A       JMP     RENC35
1A10 2F       RENC30:       CMA             ;                  ELSE COUNT := COUNT - COUNT_INC
1A11 3C             INR     A
1A12 81             ADD     C
1A13 4F             MOV     C,A
                                    ;                  END;
              RENC35:                       ;     END;
1A14 78             MOV     A,B     ;     BANK_PAT := NEW_BANK_PAT;
1A15 32 39 74       STA     BNKPAT
1A18 7A             MOV     A,D     ;     DIGIT_PAT := NEW_DIGIT_PAT;
```

```
1A19 32 3A 74     STA       DGTPAT
1A1C CD 55 15     CALL      DEL300  ;     DELAY (375)
1A1F CD 64 15     CALL      DEL75
1A22 C3 99 19     JMP       RENC05  ;     END
                                    ; END;
                  ;
                  ; (*****************************************************************)
                  ;
                  ; PROCEDURE SET_CLOSED;
                  ;
                  ;
                  ; VAR       (*C-REG*) CUR_BANK_VAL : BYTE;
                  ;   (*E-REG*) INDEX : PRINT_BANKS;
                  ;
1A25              MVPOST:
1A25 CD 3F 15     SETCLS:     CALL    LEDON
1A28 CD 38 1A     CALL      CHPOST
1A2B CD 4A 15     CALL      LEDOFF
1A2E CD BC 18     CALL      MODLN
1A31 CD B0 18     CALL      ERRHDR
1A34 C4 B5 18     CNZ       EXTERR
1A37 C9           RET
                  ;
                  ;
                  ;Procedure MOVPOST
                  ;Objective
                  ;    sets the print wheels to a new postage value upon execution.
                  ;    updates the postage value upon a sucessfull completion of a
                  ;    new setting.
                  ;Level
                  ;   Calls GNIB, MOVCLS, ERRHDR
                  ;Note:      What action is to be taken up on detection of an error is
                  ;   determined solely by the invoking routine.
                  ;
                  ;INDEX1 := 0
                  ;Do while INDEX1 <> 4
                  ;   VALUE1 := GNIB(POSVAL,INDEX1:VALUE)
                  ;   VALUE2 := GNIB(POSREQ,INDEX1:VALUE)
                  ;   If VALUE1 = VALUE2 then INDEX1 := INDEX1+1; Continue Do
                  ;   MOTOR := DIGIT
                  ;   DIRECTION := CCW
                  ;   RETRIES := 3
                  ;   MCOUNT := 2
                  ;   SPEED := 8 .................... CORRESPONDING TO 160 STEPS/SEC
                  ;   Procedure MOVCLS( MOTOR,DIRECTION,MCOUNT,RETRIES,SPEED: ERROR)
                  ;   Procedure ERRHDR( ERRORFLAG )
                  ;   If ERRORFLAG = 0 then CURBNKVAL := 0
                  ;                         BNKVAL(HOM) := 0
                  ;                         INDEX := 0
                  ;                         Do while INDEX <> 4
                  ;                                   DELTA :=(GNIB (POSREQ,INDEX:VALUE)-
                  ;                                            GNIB (POSVAL,INDEX:VALUE))
                  ;                                   If DELTA <> 0 then
                  ;                                        If INDEX >= 2 then
                  ;                                            INDEX2:= INDEX - 1
                  ;                                        else INDEX2:= INDEX-2
                  ;                                        INDEX2 := COMPLMNT(INDEX2)
                  ;                                        BNKVALINDEX := INDEX2 + 1
                  ;                                        MOTOR := BANK
                  ;                                        MCOUNT := BNKVALINDEX - CURBNKVAL
                  ;                                        RETRIES := 3
                  ;                                        SPEED := 08
                  ;                                        Procedure MOVCLS(MOTOR,MCOUNT,-
                  ;                                                 -RETRIES,SPEED:ERROR)
                  ;                                        Procedure ERRHDR(ERRFLAG)
                  ;                                        If ERRFLAG = 0 then
                  ;                                                 MOTOR := DIGIT
```

```
                ;                                      RETRIES := 3
                ;                                      MCOUNT := DELTA
                ;                                      SPEED := 08
                ;                                      Procedure MOVCLS
                ;                                             (MOTOR,RETRIES,
                ;                                             MCOUNT,SPEED:ERROR)
                ;                                      ProcedureERRHDR(ERRFLAG))
                ;                                      If ERRFLAG<>0 then End
                ;                                      end if
                ;                            end if
                ;                        else INDEX := INDEX + 1
                ;
                ;                     End do
                ;                     MOTOR := BANK
                ;                     RETRIES := 3
                ;                     SPEED := 08
                ;                     MCOUNT := BNKVALHOM - CURMBNKVAL
                ;                     Procedure MOVCLS (MOTOR,SPEED,RETRIES,
                ;                                      MCOUNT:ERROR)
                ;                     Procedure ERRHDR(ERRFLAG)
                ;                     If ERRFLAG = 0 then
                ;                                RETRIES := 3
                ;                                MOTOR := DIGIT
                ;                                MCOUNT := 2
                ;                                SPEED := 08
                ;                                Procedure MOVCLS(
                ;                                   MOTOR,MCOUNT,
                ;                                   SPEED,RETRIES:ERROR)
                ;                                Procedure ERRHDR(EFLAG)
                ;                                If ERRFLAG = 0 then
                ;                                        For Z=1 to 4 by 1
                ;                                            POSTVAL(Z)
                ;                                              := POSREQ(Z)
                ;                                            Z:= Z + 1
                ;                                        end for
                ;                                end if
                ;                 end
                ;   end
                ;End movpost
7421            PREG        EQU     7421H          ;POSTAGE VALUE LOCATION
7460            TWORK1      EQU     7460H          ;
7466            POSREQ      EQU     7466H          ;WORK1+((16-NBANKS)/2))
7421            POSVAL      EQU     PREG
                ;
                ;
                ;
                ;
                            ;
1A38 1E 00      CHPOST:     MVI     E,00.   ; IF POST_REQ = POST_VAL THEN RETURN;
1A3A 21 21 74   SETC05:     LXI     H,POSVAL
1A3D CD DB 1A       CALL    GNIB                   ;
1A40 47             MOV     B,A                    ;
1A41 21 66 74       LXI     H,POSREQ               ;
1A44 CD DB 1A       CALL    GNIB                           ;
1A47 90             SUB     B                      ;
1A48 C2 54 1A       JNZ     SETC10                 ;
1A4B 7B             MOV     A,E                    ;
1A4C 3C             INR     A                      ;
1A4D FE 04          CPI     04                     ;ALL BANKS CHECKED?
1A4F C8             RZ                             ;EXIT
1A50 5F             MOV     E,A                    ;
1A51 C3 3A 1A       JMP     SETC05                 ;
                ;
                ;
1A54 0E 02      SETC10:     MVI     C,+2    ; MOVE_CLOSED (DIGIT_TRIES, DIGIT,
1A56 1E 00          MVI     E,00H   ;           DIGIT_VALUE (SET) - DIGIT_VALUE (LOCK));
```

```
1A58 21 03 08       LXI     H,803H
1A5B CD 03 14       CALL    MOVCLS
1A5E CD B0 18       CALL    ERRHDR          ;ERROR PROCESSING
1A61 C0             RNZ                     ;FATAL ERROR EXIT
1A62 4F             MOV     C,A     ; CUR_BANK_VAL := BANK_VALUE (HOME);
1A63 57             MOV     D,A     ; FOR INDEX := PENNIES TO TEN_DOLLARS DO
1A64 5F     SETC15: MOV     E,A
1A65 21 21 74       LXI     H,POSVAL;     IF POST_REQ [INDEX] <> POST_VAL [INDEX] THEN
1A68 CD DB 1A       CALL    GNIB
1A6B 47             MOV     B,A
1A6C 21 66 74       LXI     H,POSREQ                    ;
1A6F CD DB 1A       CALL    GNIB                                ;
1A72 90             SUB     B
1A73 CA A5 1A       JZ      SETC25
1A76 F5             PUSH    PSW     ;       BEGIN
1A77 7B             MOV     A,E     ;       MOVE_CLOSED (BANK_TRIES, BANK,
1A78 FE 02          CPI     02H     ;                 BANK_VALUE (INDEX) - CUR_BANK_VAL;
1A7A D2 7E 1A       JNC     SETC20
1A7D 3D             DCR     A
1A7E 3D     SETC20: DCR     A
          ;  CMA
          ;  INR    A
1A7F F5             PUSH    PSW
1A80 91             SUB     C
1A81 4F             MOV     C,A
1A82 D5             PUSH    D
1A83 1E 01          MVI     E,01H
1A85 21 03 08       LXI     H,803H
1A88 CD 03 14       CALL    MOVCLS
1A8B D1             POP     D
1A8C F1             POP     PSW     ;       CUR_BANK_VAL := BANK_VALUE (INDEX);
1A8D 4F             MOV     C,A
1A8E F1             POP     PSW
1A8F 6F             MOV     L,A
1A90 CD B0 18       CALL    ERRHDR          ;
1A93 C0             RNZ                     ;FATAL ERROR EXIT
1A94 C5             PUSH    B       ;       MOVE_CLOSED (DIGIT_TRIES, DIGIT,
1A95 4D             MOV     C,L     ;                 POST_REQ [INDEX] - POST_VAL [INDEX];
1A96 D5             PUSH    D
1A97 1E 00          MVI     E,00H
1A99 21 03 08       LXI     H,803H
1A9C CD 03 14       CALL    MOVCLS
1A9F D1             POP     D
1AA0 C1             POP     B
1AA1 CD B0 18       CALL    ERRHDR          ;
1AA4 C0             RNZ                     ;FATAL ERROR EXIT
                                    ;       END;
1AA5 7B     SETC25: MOV     A,E
1AA6 3C             INR     A
1AA7 FE 04          CPI     04H
1AA9 DA 64 1A       JC      SETC15
1AAC 79             MOV     A,C     ; MOVE_CLOSED (BANK_TRIES, BANK, BANK_VALUE (HOME)
1AAD 2F             CMA             ;             - CUR_BANK_VAL;
1AAE 3C             INR     A
1AAF 4F             MOV     C,A
1AB0 1E 01          MVI     E,01
1AB2 21 03 08       LXI     H,803H
1AB5 CD 03 14       CALL    MOVCLS
1AB8 CD B0 18       CALL    ERRHDR                      ;
1ABB C0             RNZ                                 ;FATAL ERROR EXIT
1ABC 0E FE          MVI     C,-2.   ; MOVE_CLOSED (DIGIT_TRIES, DIGIT, DIGIT_VALUE (LOCK)
1ABE 1E 00          MVI     E,00H   ;             - DIGIT_VALUE (SET));
1AC0 21 03 08       LXI     H,803H
1AC3 CD 03 14       CALL    MOVCLS
1AC6 CD B0 18       CALL    ERRHDR          ;
1AC9 C0             RNZ                     ;FATAL ERROR
1ACA 0E 02          MVI     C,2.    ; FOR INDEX := PENNIES TO TEN_DOLLARS DO
```

```
9469 1ACC 11 66 74      LXI     D,POSREQ;      POST_VAL [INDEX] := POST_REQ [INDEX]
9470 1ACF 21 21 74      LXI     H,POSVAL
9471 1AD2 1A        SETC30:     LDAX    D
9472 1AD3 77            MOV     M,A
9473 1AD4 13            INX     D
9474 1AD5 23            INX     H
9475 1AD6 0D            DCR     C
9476 1AD7 C2 D2 1A      JNZ     SETC30
9477 1ADA C9            RET             ; END;
9478                ;
9479                ;
9480                ;
9481                ;
9482                ;
9483                ;GETNIB ROUTINE
9484                ;HLREGISTER HAS THE BASE ADDRESS:E REGISTER HAS THE BANK INDEX
9485                ;RETURNS THE INDEXED NIBBLE IN ACCUMULATOR
9486                ;
9487                ;
9488 1ADB D5        GNIB:       PUSH    D               ;SAVE REGISTER DE
9489 1ADC AF            XRA     A               ;SET CY = 0
9490 1ADD 57            MOV     D,A             ;SETTING FOR DAD OPERATION
9491 1ADE 7B            MOV     A,E             ;
9492 1ADF 1F            RAR                     ;DIVIDE BY 2
9493 1AE0 5F            MOV     E,A             ;
9494 1AE1 19            DAD     D               ;ADDRESS GENERATION
9495 1AE2 D1            POP     D               ;
9496 1AE3 7B            MOV     A,E             ;MSB/LSB SELECTION
9497 1AE4 E6 01         ANI     01H             ;00,02,04ETC  &01,03,05....
9498 1AE6 3E 0F         MVI     A,0FH           ;MASK FOR LSB
9499 1AE8 C2 F3 1A      JNZ     GNI10           ;
9500                ;
9501                ;
9502 1AEB 3E F0         MVI     A,0F0H          ;MASK FOR MSB SELECTION
9503 1AED A6            ANA     M               ;
9504 1AEE 0F            RRC                     ;
9505 1AEF 0F            RRC                     ;
9506 1AF0 0F            RRC                     ;
9507 1AF1 0F            RRC                     ;
9508 1AF2 C9            RET                     ;
9509                ;
9510                ;
9511 1AF3 A6        GNI10:      ANA     M               ;
9512 1AF4 C9            RET                     ;
9513                ;
9514                ;
9515                ;
9516 1AF5
9517                ;
9518 1AF5               END
M85 assembly errors =   0
```

CROSS REFERENCE

| LABEL | VALUE | REFERENCE |
|---|---|---|
| ACCFMT | 008F | -375 7167 |
| ACCOD1 | 131B | -7105 7120 |
| ACCOD2 | 132A | 7110 -7116 |
| ACCOD3 | 1330 | 7115 -7121 |
| ACCOD4 | 1340 | 7132 -7134 |
| ACCOD5 | 135A | 7160 -7166 |
| ACCODE | 12EE | 3374 -7042 |
| AMTBUF | 00E0 | -254 3107 4568 4756 4773 7274 7327 7401 7415 7435 |
| ASCCRC | 0040 | -101 2796 3845 4146 |
| ASCFMT | 0080 | -376 2605 |

| | | | | | | | | | |
|---|---|---|---|---|---|---|---|---|---|
| ASCREG | 0038 | -96 | 2451 | 2605 | 2778 | 2789 | 3839 | 4143 | |
| ASCSIZ | 0008 | -360 | 2451 | 2454 | 2473 | 2484 | 2484 | 2607 | 2775 |
| | | 2778 | 2789 | 3822 | 3839 | 4143 | | | |
| BADCRC | 0000 | -410 | 2427 | 4238 | 6754 | | | | |
| BADCYC | 0004 | -414 | 2881 | 2927 | 4292 | | | | |
| BADRAM | 000A | -421 | 1111 | | | | | | |
| BADSW | 0011 | -397 | | | | | | | |
| BALIGN | 1812 | 8312 | 8329 | -8651 | | | | | |
| BARF | 0017 | -399 | 3240 | | | | | | |
| BASE5 | 1673 | 8218 | -8231 | | | | | | |
| BASEAD | 17DC | 8510 | -8547 | | | | | | |
| BCDC | 000F | -7553 | 7578 | | | | | | |
| BCDO | 000C | -7552 | 7576 | | | | | | |
| BERSET | 182B | -8668 | 8679 | | | | | | |
| BINOC1 | 1364 | -7191 | 7206 | | | | | | |
| BINOC2 | 1366 | -7194 | 7202 | | | | | | |
| BINOCT | 135D | -7183 | | | | | | | |
| BKL50 | 153C | 7790 | -7805 | | | | | | |
| BKLASH | 151B | 7721 | -7786 | | | | | | |
| BLKTMR | 0050 | -136 | 699 | | | | | | |
| BNKMSK | 000C | -7556 | 9193 | | | | | | |
| BNKPAT | 7439 | -210 | 7729 | 7885 | 8401 | 9036 | 9213 | 9233 | 9265 |
| BODC | 0003 | -7551 | 7574 | | | | | | |
| BODO | 0000 | -7550 | 7572 | | | | | | |
| BUFOVR | 0012 | -398 | 3685 | | | | | | |
| CDBUF | 0316 | -1435 | 1781 | 1839 | | | | | |
| CDBUF1 | 0320 | 1414 | -1443 | | | | | | |
| CDBUFC | 0306 | -1409 | 1777 | 1799 | 1870 | | | | |
| CDBUFD | 030F | -1424 | | | | | | | |
| CHPOST | 1A38 | 9284 | -9303 | | | | | | |
| CHRBKT | 0058 | -156 | 573 | 1553 | 5484 | | | | |
| CLKD01 | 0046 | 531 | -539 | | | | | | |
| CLKD02 | 0049 | 538 | -543 | | | | | | |
| CLKDEC | 0040 | -530 | 654 | | | | | | |
| CLKDGT | 0043 | -537 | 634 | | | | | | |
| CLRBLK | 0E85 | 1234 | 3381 | 4081 | 4120 | 4660 | 4844 | 4973 | -5252 |
| | | 7045 | | | | | | | |
| CMBBUF | 00F0 | -259 | 3113 | 4538 | 7359 | | | | |
| CMDDSB | 05CD | -2272 | 3358 | | | | | | |
| CMDENB | 05F3 | -2317 | 3356 | | | | | | |
| CMPAR1 | 0E93 | -5283 | 5306 | | | | | | |
| CMPAR2 | 0EA9 | 5285 | 5298 | -5307 | | | | | |
| CMPARE | 0E8E | 3799 | 4189 | 4210 | 4678 | -5277 | | | |
| CONFIG | 062C | -2383 | 2583 | | | | | | |
| CONSU1 | 0647 | 2415 | -2425 | | | | | | |
| CONSU2 | 064C | 2424 | -2431 | | | | | | |
| CONSUM | 063A | -2410 | 2565 | 4164 | 7049 | | | | |
| CRC | 0EB1 | 1282 | 2487 | 2792 | 2815 | 3842 | 3850 | 4227 | -5334 |
| | | 7126 | 7236 | 7446 | | | | | |
| CRC1 | 0EB8 | -5341 | 5350 | | | | | | |
| CRCNI1 | 0ECD | -5379 | 5394 | | | | | | |
| CRCNI2 | 0ED6 | 5388 | -5390 | | | | | | |
| CRCNIB | 0EC6 | 5345 | -5367 | 6295 | 6737 | 6985 | | | |
| CSMFMT | 0080 | -377 | 2607 | | | | | | |
| CSTEP0 | 1660 | 8207 | -8213 | | | | | | |
| CTLBKT | 0056 | -151 | 574 | 1503 | 3543 | 5485 | | | |
| CTLCRC | 0010 | -31 | 2422 | 3837 | | | | | |
| CTLREG | 7000 | -324 | 899 | 961 | 1087 | | | | |
| CTLSU1 | 065B | 2462 | -2465 | | | | | | |
| CTLSUM | 064E | 2412 | -2449 | 3833 | | | | | |
| CURBKT | 005A | -161 | 1550 | 1967 | | | | | |
| DALIGN | 17E7 | 8296 | 8322 | 8345 | -8590 | | | | |
| DATA1 | 6800 | -325 | 330 | 4288 | | | | | |
| DBCTR | 005C | -166 | 565 | 1190 | | | | | |
| DBLAN1 | 0EEF | -5433 | 5462 | | | | | | |
| DBLAN2 | 0EEF | -5434 | 5438 | | | | | | |
| DBLANK | 0EDE | 1063 | 1494 | 1962 | 2922 | -5411 | 6147 | | |

| | | | | | | | | | |
|---|---|---|---|---|---|---|---|---|---|
| DBLH01 | 068D | -2531 | 3386 | | | | | | |
| DBLH02 | 06A6 | 2518 | -2551 | | | | | | |
| DBLH03 | 06C5 | 2564 | -2576 | | | | | | |
| DBLH04 | 06E2 | 2516 | -2598 | | | | | | |
| DBLH05 | 06E3 | 2521 | 2532 | 2537 | 2554 | 2559 | 2568 | 2578 | -2601 |
| DBLHDR | 0671 | -2512 | 3390 | | | | | | |
| DBOUN1 | 005D | 568 | -575 | | | | | | |
| DBOUNC | 004C | -562 | 733 | | | | | | |
| DBUF | 0080 | -219 | 1412 | 1439 | 1442 | 1653 | 1719 | 1803 | 1803 |
| | | 1879 | 1904 | 1910 | 1933 | 2050 | 2056 | 2168 | 2182 |
| | | 2186 | 2217 | 3642 | 5039 | 5050 | 5075 | 5087 | |
| DBVAL | 0002 | -342 | 580 | | | | | | |
| DECAD1 | 06FE | -2633 | 2654 | | | | | | |
| DECADD | 06F8 | 2476 | -2624 | 2781 | 2829 | 7430 | | | |
| DECCOM | 070C | 2636 | -2675 | 2736 | | | | | |
| DECERR | 0720 | 2629 | -2704 | 2729 | | | | | |
| DECSU1 | 0731 | -2733 | 2757 | | | | | | |
| DECSUB | 072B | -2724 | 2804 | | | | | | |
| DEFDCM | 006C | -201 | 1164 | 3906 | | | | | |
| DEL1 | 1567 | -7855 | 7856 | | | | | | |
| DEL300 | 1555 | -7843 | 8500 | 9268 | | | | | |
| DEL30M | 17A9 | 7801 | 7804 | 7876 | 8201 | 8204 | 8310 | 8340 | -8498 |
| | | 8532 | 8726 | | | | | | |
| DEL6M | 17A3 | -8492 | 8721 | | | | | | |
| DEL75 | 1564 | 7845 | 7846 | 7847 | 7848 | -7853 | 7867 | 9269 | |
| DELM1 | 17AC | 8494 | -8500 | 8502 | | | | | |
| DFLUSH | 0EF6 | 737 | 5417 | -5454 | | | | | |
| DGTMSK | 0003 | -7555 | 7616 | 7870 | 7872 | 7879 | 7884 | 8700 | 9094 |
| | | 9198 | | | | | | | |
| DGTPAT | 743A | -211 | 7734 | 7880 | 8371 | 8423 | 9074 | 9203 | 9244 |
| | | 9267 | | | | | | | |
| DIAFMT | 005F | -378 | 2604 | | | | | | |
| DIEDCM | 006A | -196 | 1161 | 3910 | 4790 | 4867 | 4936 | 7326 | |
| DIMAGE | 0000 | -265 | 776 | 1462 | 1633 | 1649 | 1688 | 1847 | 1849 |
| | | 1850 | 2179 | 2243 | | | | | |
| DISAB1 | 05D5 | 2276 | -2282 | | | | | | |
| DISAB2 | 05EF | 2292 | -2300 | | | | | | |
| DISABL | 05D3 | -2278 | 4182 | | | | | | |
| DISP01 | 0072 | 607 | -609 | | | | | | |
| DISP02 | 0072 | 605 | -610 | | | | | | |
| DISP03 | 007D | -620 | 658 | | | | | | |
| DISP04 | 007F | -623 | 642 | | | | | | |
| DISPLY | 0062 | -596 | 738 | | | | | | |
| DOACCT | 0744 | 1018 | -2773 | 2964 | | | | | |
| DOSTAT | 0778 | -2850 | 3509 | | | | | | |
| DOTR01 | 07D9 | -2973 | 2983 | | | | | | |
| DOTR02 | 07ED | 2978 | -2994 | | | | | | |
| DOTR03 | 07F7 | -3008 | 3018 | | | | | | |
| DOTR04 | 080D | 3013 | -3030 | | | | | | |
| DOTR05 | 080F | 3026 | -3036 | | | | | | |
| DOTR06 | 0811 | -3040 | 3310 | | | | | | |
| DOTRIP | 07A5 | -2921 | 3220 | 3584 | | | | | |
| DPH1 | 1991 | 9100 | -9103 | | | | | | |
| DPH5 | 1995 | 9102 | -9108 | | | | | | |
| DPHOME | 1986 | 8593 | 8603 | 8655 | 8678 | -9099 | | | |
| DPTS05 | 17D4 | 8515 | -8537 | | | | | | |
| DPTS10 | 17C7 | -8523 | 8540 | | | | | | |
| DPTSP | 17B5 | -8510 | 8611 | 8616 | 8661 | 8668 | | | |
| DSBKBD | 0F02 | 3370 | -5476 | | | | | | |
| DSCCRC | 0036 | -91 | 1286 | 2819 | 3854 | 4156 | 7240 | 7450 | |
| DSCFMT | 0070 | -379 | 2606 | | | | | | |
| DSCRDG | 002F | -86 | 1274 | 2466 | 2471 | 2606 | 2801 | 2812 | 3847 |
| | | 4153 | 4206 | 7071 | 7231 | 7416 | 7434 | | |
| DSCSIZ | 0007 | -361 | 1274 | 2471 | 2473 | 2798 | 2801 | 2812 | 3822 |
| | | 3847 | 4089 | 4123 | 4153 | 4209 | 4556 | 7230 | 7416 |
| | | 7417 | 7417 | 7435 | 7436 | | | | |

| | | | | | | | | | |
|---|---|---|---|---|---|---|---|---|---|
| DSPCHR | 0008 | -349 | 1884 | 1891 | 2239 | | | | |
| DSPTMR | 0052 | -141 | 704 | 1515 | 1544 | 1853 | 2254 | | |
| DSPVAL | 0007 | -343 | 1543 | 1852 | 2253 | | | | |
| EJEC | 0000 | -473 | | | | | | | |
| ENABL1 | 05FC | 2321 | -2327 | | | | | | |
| ENABL2 | 0627 | 2355 | -2362 | | | | | | |
| ENABL3 | 0627 | 2342 | -2363 | | | | | | |
| ENABL4 | 0627 | 2337 | -2364 | | | | | | |
| ENABLE | 05F9 | -2323 | 4196 | | | | | | |
| ENAKBD | 0F14 | 3368 | -5500 | | | | | | |
| ENCMOV | 15AB | -7913 | 9218 | 9249 | | | | | |
| ENCT | 15B8 | 7921 | -7925 | | | | | | |
| ENDENT | 0819 | -3062 | 3378 | | | | | | |
| ENDM05 | 15CC | -7971 | 8024 | | | | | | |
| ENDM20 | 15E0 | 7974 | -7987 | | | | | | |
| ENDM25 | 15EB | 7984 | -7995 | | | | | | |
| ENDM30 | 15F9 | 7999 | -8006 | | | | | | |
| ENDM35 | 15FB | 8003 | -8010 | | | | | | |
| ENDM40 | 160F | -8027 | | | | | | | |
| ENDMOV | 15C8 | -7969 | 8898 | 8912 | 8969 | | | | |
| ENTAMT | 082E | -3106 | 3464 | | | | | | |
| ENTCM1 | 0839 | 3110 | -3116 | | | | | | |
| ENTCMB | 0835 | -3112 | 3468 | | | | | | |
| ENTSER | 0848 | -3146 | 3360 | | | | | | |
| EREXIT | 165A | 8195 | -8208 | | | | | | |
| ERRCNT | 0016 | -51 | 3254 | 3831 | | | | | |
| ERRCOD | 0014 | -46 | 3246 | 3829 | | | | | |
| ERRH05 | 18B0 | -8808 | | | | | | | |
| ERRHDR | 18B0 | 8072 | 8417 | 8446 | 8464 | 8479 | 8487 | 8762 | 8785 |
| | | -8807 | 9287 | 9404 | 9436 | 9446 | 9460 | 9466 | |
| ERROR | 7438 | -209 | 7567 | 7591 | 7679 | 7723 | 7741 | 7748 | 7895 |
| | | 7970 | 8043 | 8209 | 8377 | 8396 | 8429 | 8808 | 8823 |
| | | 8900 | 8980 | 9058 | 9080 | 9187 | 9207 | 9225 | 9238 |
| | | 9256 | | | | | | | |
| ERROR2 | 0002 | -9179 | 9236 | | | | | | |
| ERROR3 | 0003 | -9180 | 9224 | | | | | | |
| ERROR4 | 0004 | -9181 | 9255 | | | | | | |
| ERROR5 | 0005 | -7562 | 7740 | | | | | | |
| ERROR6 | 0006 | -7563 | 7747 | | | | | | |
| ERRR1 | 0001 | -9178 | 9206 | | | | | | |
| ERRST | 0013 | -41 | 2604 | | | | | | |
| ERSET | 180C | 8604 | -8616 | | | | | | |
| EXTERR | 18B5 | 8073 | 8763 | 8786 | -8822 | 9288 | | | |
| EXTSER | 0852 | -3166 | 3362 | | | | | | |
| EXTIRP | 0860 | -3190 | 3364 | | | | | | |
| FATE01 | 089E | 3245 | -3260 | | | | | | |
| FATERR | 0880 | 1041 | 1220 | 1242 | 2706 | 2953 | 2988 | 3002 | -3241 |
| | | 3330 | 3603 | 3688 | 4707 | 6205 | | | |
| FATINT | 087E | 502 | 506 | -3237 | | | | | |
| FATRST | 0003 | -413 | 1270 | 7252 | | | | | |
| FILDI1 | 0327 | -1464 | 1469 | | | | | | |
| FILDIM | 0322 | 1145 | -1459 | 1672 | 1842 | 2159 | | | |
| FILN01 | 0F26 | 5258 | -5527 | | | | | | |
| FILN02 | 0F27 | -5531 | 5541 | | | | | | |
| FILN03 | 0F32 | 5533 | -5542 | | | | | | |
| FILNIB | 0F24 | 1140 | 1212 | 1229 | 1278 | 1326 | 3825 | 4234 | -5524 |
| | | 7232 | | | | | | | |
| FINTR1 | 08AA | -3287 | 3291 | | | | | | |
| FINTR2 | 08B3 | -3295 | 3306 | | | | | | |
| FINTR3 | 08BF | 3301 | -3309 | | | | | | |
| FINTR4 | 08D0 | 3022 | -3327 | | | | | | |
| FINTRP | 08A0 | 1026 | 2991 | -3276 | | | | | |
| FIXSED | 0000 | -21 | 351 | 1136 | 1136 | | | | |
| GETN01 | 0F3D | -5574 | | | | | | | |
| GETN02 | 0F45 | 5578 | -5584 | | | | | | |

| | | | | | | | | | |
|---|---|---|---|---|---|---|---|---|---|
| GETNIB | 0F35 | 1654 | 1806 | 1905 | 2169 | 2174 | 2223 | 2679 | 2689 |
| | | 3122 | 3661 | 3890 | 3899 | 4085 | 4651 | 4667 | 4757 |
| | | 4762 | 4806 | 4858 | 4917 | 4957 | 5288 | 5294 | 5342 |
| | | -5563 | 5816 | 6127 | 6981 | 7087 | 7106 | | |
| GNI10 | 1AF3 | 9499 | -9511 | | | | | | |
| GNIB | 1ADB | 9385 | 9388 | 9410 | 9413 | -9488 | | | |
| HACODE | 0090 | -486 | 7167 | | | | | | |
| HAREG | 0082 | -477 | 2605 | | | | | | |
| HCLRSV | 0047 | -436 | 3361 | | | | | | |
| HCONFG | 00AB | -487 | 2389 | | | | | | |
| HCSUM | 0084 | -479 | 2607 | | | | | | |
| HDIAGS | 008D | -484 | 2604 | | | | | | |
| HDISAB | 0042 | -433 | 1427 | 3357 | 3410 | | | | |
| HDISKB | 0063 | -439 | 3369 | | | | | | |
| HDLOCK | 008A | -481 | 2602 | | | | | | |
| HDREG | 0083 | -478 | 2606 | | | | | | |
| HDR001 | 091C | 3371 | -3393 | | | | | | |
| HDR002 | 091F | 3352 | -3398 | | | | | | |
| HDR003 | 092D | 3402 | -3407 | | | | | | |
| HDR004 | 093F | 3414 | -3420 | | | | | | |
| HDR005 | 093F | 3411 | -3421 | | | | | | |
| HDRONY | 08D5 | -3349 | 3635 | 5063 | | | | | |
| HDRP01 | 0954 | 3447 | -3452 | | | | | | |
| HDRP02 | 0954 | 3445 | -3453 | | | | | | |
| HDRP03 | 0979 | 3471 | -3485 | | | | | | |
| HDRP04 | 097C | 3460 | -3489 | | | | | | |
| HDRPLS | 0941 | -3439 | 3672 | 5051 | | | | | |
| HDSEEK | 163B | 8069 | -8191 | | | | | | |
| HENABL | 0041 | -432 | 2078 | 3355 | | | | | |
| HENAKB | 0062 | -438 | 3367 | | | | | | |
| HENDEN | 0043 | -434 | 1496 | 3377 | | | | | |
| HENTAM | 00C5 | -444 | 2018 | 3444 | 3463 | | | | |
| HENTCO | 00C6 | -445 | 2017 | 3446 | 3467 | | | | |
| HEXTRP | 004E | -437 | 3363 | | | | | | |
| HHSLIM | 008E | -485 | 2542 | | | | | | |
| HLOPOS | 008B | -482 | 2526 | | | | | | |
| HMTRNO | 008C | -483 | 2603 | | | | | | |
| HPCNT | 0085 | -480 | 2608 | | | | | | |
| HPHAM1 | 0044 | -8046 | 8199 | | | | | | |
| HPHASE | 0088 | -8047 | 8202 | | | | | | |
| HPSET | 0081 | -476 | 2077 | 2198 | 4511 | | | | |
| HREQAD | 0040 | -453 | 1723 | 3373 | | | | | |
| HREQAR | 0052 | -456 | 2032 | 2553 | 3546 | | | | |
| HREQCF | 005B | -460 | 2582 | | | | | | |
| HREQCS | 0054 | -458 | 2563 | | | | | | |
| HREQDL | 0052 | -467 | 2520 | | | | | | |
| HREQDR | 0053 | -457 | 2028 | 2558 | 3555 | | | | |
| HREQDS | 0055 | -470 | 2536 | | | | | | |
| HREQLP | 0053 | -468 | 2525 | | | | | | |
| HREQMN | 0054 | -469 | 2530 | | | | | | |
| HREQPC | 0055 | -459 | 2024 | 2577 | 3564 | | | | |
| HREQPO | 0051 | -455 | 1532 | 3381 | 3525 | 3639 | | | |
| HREQSL | 0056 | -471 | 2541 | | | | | | |
| HREQSN | 005C | -461 | 3385 | | | | | | |
| HREQST | 0050 | -454 | 3365 | | | | | | |
| HSETDA | 00C4 | -443 | 2016 | 2586 | 5044 | | | | |
| HSETMN | 00C0 | -441 | 3473 | | | | | | |
| HSETPO | 00C1 | -442 | 2064 | 3477 | | | | | |
| HSETSV | 0046 | -435 | 1757 | 3359 | | | | | |
| HSTAT | 0080 | -475 | 3991 | | | | | | |
| IDLE | 097E | 1191 | -3503 | 3506 | | | | | |
| IDLE01 | 09A4 | 3523 | -3529 | | | | | | |
| IDLE02 | 09D1 | 3538 | -3572 | | | | | | |
| IDLE03 | 09D1 | 3534 | -3573 | | | | | | |
| IDLE04 | 09E6 | 3580 | -3587 | | | | | | |
| INITSM | 156D | 1134 | -7865 | | | | | | |
| INT75 | 009D | 514 | -673 | | | | | | |

```
KDCTRL      004E       -131   598   723  1487  1510  1588  1621  1834
                       1838  2163  2210  3194  3581  4018  5479  5481
                       5506  5508
KDIO        00A7       -697  1564
KDIO01      00B7        706  -708
KDIO02      00B7        702  -709
KDIO03      00D0        721  -731
KDSKIP      0002       -344  1565
KEYB01      034A       1489  1493 -1501
KEYB02      0370       1524 -1530
KEYB03      0375       1529 -1536
KEYB04      0375       1517 -1537
KEYB05      0375       1513 -1538
KEYB06      0378       1508 -1540
KEYB07      038C       1547 -1555
KEYB08      038C       1539 -1556
KEYB09      038C       1500 -1557
KEYBKT      0054       -146   563   736   851  5504
KEYBRD      032E      -1486  3588
KEYINT      4C96       -345  1566
KILCOD      02BE       -326  1126  1168  6179  6186  6912
LEDOFF      154A      -7827  7886  8070  8760  8783  9285
LEDON       153F      -7815  7866  8068  8755  8778  9283
LOKFMT      0040       -380  2602
LOWWRN      001C        -61  2526  4084  4556
LSNMAS      000F      -7961  7981  7987
LSNMSK      000F      -7557  7571  7639  7643  7796  8215  8738
LSTAT1      0F63       5622 -5625
LSTATE      0F4E       1030  1153  1180  1315  1521  1627  1679  2339
                       2513  2873  3072  3531  3728  4528  4627 -5610
                       6134  6422  6777  7242  7316  7391
MANRST      09E9       3083 -3600
MAXINT      7FA1       -346
MEMORY    M 0000          0
MESAG1      0A17       3640 -3655
MESAG2      0A17       3638 -3656
MESAG3      0A1A       3632 -3658
MESAG4      0A2E       3669 -3676
MESAG5      0A31       3675 -3681
MESAG6      0A31       3657 -3682
MESAGE      09EE       3576 -3620
MODD01      03AD       1593 -1599
MODD02      03D8       1637 -1639
MODD03      03E3       1645 -1647
MODD04      03F5       1630 -1664
MODD05      03FC       1668 -1671
MODD06      03FF       1663 -1675
MODD07      03FF       1598 -1676
MODD08      0408       1682 -1684
MODD09      040E      -1690  1702
MODD10      0419       1693 -1699
MODDSP      03A0       1562 -1586
MODLN       18BC       8071  8761  8784 -8837  9286
MOP01       1868       8714 -8723
MOP02       185C      -8718  8725
MOP05       1851      -8711  8722
MOP10       186D       8717 -8726
MOPEN       184F      -8710  8734  8736
MOVB01      0F8A       5654  5672 -5705
MOVB02      0F9A       5716 -5719
MOVB03      0FAB       5726 -5732
MOVBIT      0F68      -5647  5965  7196
MOVC05      1426      -7585  7717
MOVC1       143D      -7599
MOVC10      145E      -7629
MOVC15      145F       7625 -7630  7681
```

| | | | | | | | | | |
|---|---|---|---|---|---|---|---|---|---|
| MOVC20 | 1473 | 7634 | -7643 | | | | | | |
| MOVC25 | 147E | 7642 | -7651 | | | | | | |
| MOVC30 | 148C | 7655 | -7660 | | | | | | |
| MOVC35 | 148E | 7659 | -7664 | | | | | | |
| MOVC4 | 1407 | -7570 | | | | | | | |
| MOVC40 | 14A8 | 7678 | -7682 | | | | | | |
| MOVC42 | 14CF | 7706 | -7711 | | | | | | |
| MOVC45 | 14BC | 7694 | -7697 | | | | | | |
| MOVC50 | 14DB | 7587 | 7590 | 7593 | -7722 | | | | |
| MOVC55 | 14ED | 7731 | -7734 | | | | | | |
| MOVC6 | 144D | 7610 | -7616 | | | | | | |
| MOVC60 | 14F9 | 7580 | 7733 | -7740 | | | | | |
| MOVC65 | 14FF | 7736 | 7738 | -7744 | | | | | |
| MOVC7 | 1423 | 7573 | 7575 | 7577 | 7579 | -7583 | | | |
| MOVC70 | 14D8 | -7721 | | | | | | | |
| MOVC8 | 1456 | 7598 | 7618 | -7620 | | | | | |
| MOVCLS | 1403 | -7565 | 8376 | 8395 | 8416 | 8428 | 8445 | 8463 | 8478 |
| | | 8486 | 8759 | 8782 | 9403 | 9430 | 9443 | 9459 | 9465 |
| MRSTS1 | 0048 | -116 | 1009 | 1020 | 1204 | 1307 | 1330 | 1602 | 2289 |
| | | 2343 | 2588 | 2966 | 3147 | 3167 | 3200 | 3535 | 3998 |
| | | 4102 | 4169 | 4286 | 4491 | 4640 | 5617 | 6502 | 6794 |
| MRSTS2 | 004A | -121 | 354 | 2862 | 3242 | 5614 | | | |
| MSERN1 | 0A6D | 3766 | -3794 | | | | | | |
| MSERNO | 0A38 | 3474 | -3713 | 4571 | | | | | |
| MSG2M1 | 0AC4 | 3904 | -3907 | | | | | | |
| MSG2M2 | 0AF2 | 3966 | -3971 | | | | | | |
| MSG2M3 | 0AF2 | 3939 | -3972 | | | | | | |
| MSG2M4 | 0AF2 | 3921 | -3973 | | | | | | |
| MSG2M5 | 0AF2 | 3912 | -3974 | | | | | | |
| MSG2MU | 0AAA | -3878 | 4577 | 4636 | | | | | |
| MSNFMT | 007F | -381 | 2603 | | | | | | |
| MSNMAS | 00F0 | -7960 | 7977 | 7991 | | | | | |
| MSNMSK | 00F0 | -7558 | 7635 | 7647 | 7793 | | | | |
| MTRCHR | 0046 | -111 | 1136 | 1159 | 2394 | | | | |
| MTRSTS | 0AF4 | 3520 | -3990 | 4261 | | | | | |
| MULKEY | 0080 | -347 | 855 | 5503 | | | | | |
| MVDD01 | 00F0 | -779 | 803 | | | | | | |
| MVDD02 | 00FA | 783 | -791 | | | | | | |
| MVDDAT | 00DE | 626 | 646 | -760 | | | | | |
| MVLN01 | 0FB4 | -5761 | | | | | | | |
| MVLNIB | 0FB3 | 1913 | 3129 | 3647 | 3770 | 3783 | 4093 | 4127 | 4591 |
| | | 4716 | 4779 | 4853 | 5001 | 5079 | -5759 | 7063 | 7075 |
| | | 7437 | | | | | | | |
| MVLO05 | 1899 | -8779 | | | | | | | |
| MVLOCK | 1896 | 2997 | -8778 | | | | | | |
| MVPOST | 1A25 | 1215 | 1237 | 4700 | -9282 | | | | |
| MVRN01 | 0FC3 | 5773 | -5801 | 5929 | | | | | |
| MVRN02 | 0FC8 | -5812 | 5846 | | | | | | |
| MVRN03 | 0FDB | 5827 | -5832 | | | | | | |
| MVRN04 | 0FDB | 5823 | -5833 | | | | | | |
| MVRN05 | 0FE2 | 5836 | -5841 | | | | | | |
| MVRN06 | 0FE7 | 5814 | -5847 | | | | | | |
| MVRNIB | 0FC2 | 1938 | 2455 | 3930 | -5799 | | | | |
| MVTR05 | 187F | -8756 | | | | | | | |
| MVTRIP | 187C | 2948 | -8755 | | | | | | |
| NARG | 0000 | 0 | | | | | | | |
| NBANKS | 0004 | -362 | 383 | 1208 | 1208 | 1225 | 1322 | 2775 | 2778 |
| | | 2798 | 2801 | 4123 | 4126 | 4188 | 4562 | 4587 | 4588 |
| | | 4635 | 4674 | 4674 | 4677 | 4712 | 4715 | | |
| NDISP | 0002 | -348 | 349 | 773 | 1461 | 1462 | 1649 | 1687 | 1688 |
| | | 2179 | 2243 | | | | | | |
| NINCYC | 0018 | -400 | 2987 | | | | | | |
| NORFLG | 004C | -126 | 1490 | 1558 | 1761 | 2089 | 2285 | 2331 | 3063 |
| | | 3117 | 3399 | 3442 | 3516 | 4320 | 4487 | 4691 | 5092 |
| | | 5127 | 6486 | | | | | | |
| NORSIZ | 0022 | -354 | 6689 | | | | | | |
| NORSTR | 0028 | -352 | 353 | 354 | 6690 | | | | |

| | | | | | | | | | |
|---|---|---|---|---|---|---|---|---|---|
| NPAUS1 | 0B1B | -4045 | 4047 | | | | | | |
| NPAUSE | 0B19 | 1367 | 2980 | 3015 | 3288 | 3303 | -4042 | 6041 | 6345 |
| | | 6892 | | | | | | | |
| NUMRD1 | 0014 | -7962 | 8015 | | | | | | |
| NVM30F | 1031 | 1391 | -6029 | 6201 | 6335 | 6671 | 7020 | | |
| NVM30G | 103E | -6040 | 6044 | | | | | | |
| NVM30T | 1047 | 1361 | -6063 | 6187 | 6330 | 6652 | 6821 | 6850 | 6963 |
| NVMBAD | 0001 | -411 | 1378 | 6378 | 6452 | 6917 | | | |
| NVMBYT | 1058 | -6088 | 6305 | 6461 | 6748 | | | | |
| NVMCH1 | 1077 | 6137 | -6140 | | | | | | |
| NVMCHG | 1068 | 2707 | 3511 | -6124 | | | | | |
| NVMCTL | 0066 | -186 | 2335 | 6126 | 6402 | 6493 | 6574 | 6691 | 6717 |
| | | 6960 | 7016 | | | | | | |
| NVMDE1 | 1099 | 1266 | -6191 | 6922 | | | | | |
| NVMDE2 | 10A0 | 6182 | -6200 | | | | | | |
| NVMDED | 1085 | 1117 | 1381 | 2428 | 2885 | 2931 | 4239 | 4293 | -6176 |
| | | 6312 | 6379 | 6409 | 6455 | 6755 | 6928 | 7253 | |
| NVMDXB | 10A9 | -6222 | 6667 | 6824 | 6852 | | | | |
| NVMER | 10B1 | -6248 | 6648 | 6785 | 6807 | | | | |
| NVMER1 | 10D1 | -6288 | 6302 | | | | | | |
| NVMER2 | 10DF | 6290 | -6303 | | | | | | |
| NVMER3 | 10EB | 6309 | -6315 | | | | | | |
| NVMER4 | 10EB | 6282 | -6316 | | | | | | |
| NVMER5 | 10FE | 6326 | -6329 | | | | | | |
| NVMER6 | 1101 | -6331 | 6375 | | | | | | |
| NVMER7 | 110B | -6344 | 6348 | | | | | | |
| NVMER8 | 111A | 6355 | -6358 | | | | | | |
| NVMERS | 4000 | -329 | 1363 | 6319 | | | | | |
| NVMFN1 | 114E | 6425 | -6474 | | | | | | |
| NVMFN2 | 114E | -6435 | 6465 | | | | | | |
| NVMFND | 112F | -6401 | 6496 | 6510 | 6568 | | | | |
| NVMLOD | 116B | 1151 | -6485 | | | | | | |
| NVMMAP | 1191 | 6226 | 6269 | 6442 | -6537 | 6718 | 6965 | | |
| NVMNB1 | 11B9 | 6579 | 6588 | -6599 | | | | | |
| NVMNBK | 119F | 6250 | -6565 | 6656 | 6815 | 6841 | | | |
| NVMNXT | 11BB | 6097 | 6299 | 6360 | 6369 | -6617 | 6742 | 6994 | 7008 |
| NVMOPN | 11C4 | 1300 | 6156 | -6639 | | | | | |
| NVMPRP | 11DF | 6263 | -6688 | 6713 | 6952 | | | | |
| NVMRD | 11EE | 6500 | 6514 | -6711 | | | | | |
| NVMRD1 | 11FD | -6726 | 6745 | | | | | | |
| NVMRD2 | 120F | 6728 | -6746 | | | | | | |
| NVMRED | 4400 | -328 | 1126 | 1168 | 1336 | 1373 | 1375 | 6179 | 6274 |
| | | 6447 | 6722 | 6884 | 6912 | | | | |
| NVMRET | 0002 | -412 | 6311 | | | | | | |
| NVMST1 | 1221 | 6780 | -6783 | | | | | | |
| NVMST2 | 1232 | 6796 | -6799 | | | | | | |
| NVMSTO | 1219 | 1356 | 3858 | -6776 | | | | | |
| NVMWN | 1261 | 1388 | 6188 | 6231 | -6875 | 6970 | 6989 | 7005 | 7012 |
| NVMWN1 | 1274 | -6891 | 6895 | | | | | | |
| NVMWN2 | 1287 | 6904 | -6908 | | | | | | |
| NVMWN3 | 129A | 6910 | -6931 | | | | | | |
| NVMWN4 | 129A | 6907 | -6932 | | | | | | |
| NVMWR | 129E | 1065 | 1351 | 3810 | 6150 | 6831 | -6950 | | |
| NVMWR1 | 12B9 | -6975 | 6997 | | | | | | |
| NVMWR2 | 12CD | 6977 | -6998 | | | | | | |
| NVMWR3 | 12E6 | 6962 | -7021 | | | | | | |
| NVMWRT | 4800 | -327 | 6880 | | | | | | |
| OLDSWT | 0068 | -191 | | | | | | | |
| PAUTHK | 041F | -1717 | 2002 | | | | | | |
| PCEFMT | 007F | -382 | 2608 | | | | | | |
| PCEREG | 0028 | -81 | 352 | 2608 | 2826 | 3822 | | | |
| PCESIZ | 0007 | -363 | 2823 | 2826 | 3822 | | | | |
| PCLRK | 0447 | -1776 | 1993 | | | | | | |
| PDCMK | 0450 | -1796 | 1996 | | | | | | |
| PDCMK1 | 0461 | 1810 | -1816 | | | | | | |
| PERDSP | 0464 | -1831 | 3259 | 4269 | | | | | |

| | | | | | | | | | |
|---|---|---|---|---|---|---|---|---|---|
| PFLAG0 | 0000 | -7554 | 7583 | | | | | | |
| PH0011 | 18DF | 8871 | -8895 | 9103 | | | | | |
| PH0110 | 18FD | 8863 | -8947 | 9108 | | | | | |
| PH05 | 18F9 | 8902 | -8915 | | | | | | |
| PHASE1 | 0011 | -7559 | 7619 | | | | | | |
| PHASE2 | 0044 | -7560 | 7617 | | | | | | |
| PLH05 | 1983 | 9091 | -9094 | | | | | | |
| PLH10 | 18DB | 8868 | -8871 | | | | | | |
| PLH12 | 18D4 | 8860 | -8867 | | | | | | |
| PLH14 | 18D9 | 8862 | -8870 | | | | | | |
| PLH52 | 1903 | -8955 | | | | | | | |
| PLH57 | 190D | 8952 | -8963 | | | | | | |
| PLH65 | 1912 | 8960 | -8966 | | | | | | |
| PLH66 | 1915 | -8968 | 8977 | | | | | | |
| PLH67 | 1916 | -8969 | | | | | | | |
| PLH68 | 1919 | -8970 | | | | | | | |
| PLH70 | 191E | -8975 | | | | | | | |
| PLH83 | 1923 | -8979 | | | | | | | |
| PLHOME | 18C5 | -8859 | | | | | | | |
| PNUMK | 048A | -1868 | 1988 | | | | | | |
| PNUMK1 | 04A5 | 1895 | -1899 | | | | | | |
| POHOME | 18C5 | 8388 | 8408 | 8439 | -8858 | | | | |
| PORT2A | 6800 | -330 | 7570 | 7609 | 7868 | 7877 | 8214 | 8699 | 9090 |
| | | 9192 | 9197 | | | | | | |
| PORTA | 7001 | -331 | 612 | 840 | 1062 | 1092 | 1186 | 2959 | 3042 |
| | | 3278 | 4452 | 5455 | 6033 | 6035 | 6066 | 6068 | 7816 |
| | | 7818 | 7828 | 7830 | | | | | |
| PORTB | 7002 | -332 | 712 | 908 | 963 | 1060 | 7638 | 7646 | 7651 |
| | | 7791 | 7800 | 7803 | 7875 | 7980 | 7990 | 7995 | 8200 |
| | | 8203 | 8309 | 8337 | 8339 | 8511 | 8720 | 8838 | 8840 |
| | | 9026 | | | | | | | |
| PORTBI | 006E | -206 | 209 | 210 | 211 | 711 | 907 | 964 | |
| PORTC | 7003 | -333 | 847 | 4459 | | | | | |
| POSFMT | 0040 | -383 | 4511 | | | | | | |
| POSREG | 0042 | -106 | 1225 | 1322 | 2778 | 2801 | 4123 | 4185 | 4511 |
| | | 4712 | | | | | | | |
| POSREQ | 7466 | -9376 | 9387 | 9412 | 9469 | | | | |
| POSUP1 | 0B85 | 4111 | 4138 | -4205 | | | | | |
| POSUP2 | 0B92 | 4147 | 4157 | -4226 | | | | | |
| POSUPD | 0B23 | 3510 | -4074 | | | | | | |
| POSVAL | 7421 | -9377 | 9384 | 9409 | 9470 | | | | |
| PREG | 7421 | -9374 | 9377 | | | | | | |
| PROERR | 0BA1 | 494 | 496 | 498 | 500 | 504 | 508 | 512 | 1736 |
| | | 1745 | 2547 | 2587 | 3068 | 3192 | 3482 | 3678 | 3715 |
| | | -4260 | 4494 | 4533 | 4542 | 4551 | 4582 | 4625 | 4753 |
| | | 5008 | 7054 | 7287 | 7311 | 7321 | 7371 | 7396 | 7405 |
| | | 7429 | | | | | | | |
| PROKE1 | 04DB | -1974 | 1978 | | | | | | |
| PROKE2 | 04E3 | 1976 | -1979 | | | | | | |
| PROKE3 | 0502 | 1982 | -2012 | | | | | | |
| PROKEY | 04CE | 1554 | -1961 | | | | | | |
| PSETK | 0516 | 1999 | -2048 | | | | | | |
| PSETK1 | 052F | 2052 | -2075 | | | | | | |
| PSETK2 | 0536 | 2054 | -2087 | | | | | | |
| PTNC10 | 1968 | 9027 | -9072 | | | | | | |
| PTNC15 | 193C | -9037 | 9075 | | | | | | |
| PTNC20 | 1971 | 9038 | 9043 | -9078 | | | | | |
| PTNC25 | 1972 | 9053 | 9068 | -9079 | | | | | |
| PTNC30 | 195A | 9045 | -9063 | | | | | | |
| PTNC40 | 1955 | 9051 | -9057 | 9065 | 9067 | | | | |
| PTNCHK | 192A | 8362 | 8365 | 8608 | 8658 | 8915 | 8971 | -9024 | |

| | | | | | | | | | |
|---|---|---|---|---|---|---|---|---|---|
| PTR | 0010 | -16 | 21 | -23 | 23 | 26 | -28 | 28 | 31 |
| | | -33 | 33 | 36 | -38 | 38 | 41 | -43 | 43 |
| | | 46 | -48 | 48 | 51 | -53 | 53 | 56 | -58 |
| | | 58 | 61 | -63 | 63 | 66 | -68 | 68 | 71 |
| | | -73 | 73 | 76 | -78 | 78 | 81 | -83 | 83 |
| | | 86 | -88 | 88 | 91 | -93 | 93 | 96 | -98 |
| | | 98 | 101 | -103 | 103 | 106 | -108 | 108 | 111 |
| | | -113 | 113 | 116 | -118 | 118 | 121 | -123 | 123 |
| | | 126 | -128 | 128 | 131 | -133 | 133 | 136 | -138 |
| | | 138 | 141 | -143 | 143 | 146 | -148 | 148 | 151 |
| | | -153 | 153 | 156 | -158 | 158 | 161 | -163 | 163 |
| | | 166 | -168 | 168 | 171 | -173 | 173 | 176 | -178 |
| | | 178 | 181 | -183 | 183 | 186 | -188 | 188 | 191 |
| | | -193 | 193 | 196 | -198 | 198 | 201 | -203 | 203 |
| | | 206 | -208 | 208 | 214 | -216 | 216 | 216 | 219 |
| | | -221 | 221 | 224 | -226 | 226 | 229 | -231 | 231 |
| | | 234 | -236 | 236 | 239 | -241 | 241 | 241 | 244 |
| | | -246 | 246 | 249 | -251 | 251 | 254 | -256 | 256 |
| | | 259 | -261 | 261 | -262 | 265 | -267 | 267 | |
| PUTN01 | 1007 | 5886 | -5896 | | | | | | |
| PUTNIB | 0FEE | 1813 | 1928 | 2650 | 2753 | 4670 | 4815 | 4821 | 4987 |
| | | 4992 | 5535 | 5819 | -5868 | 6733 | 7096 | 7112 | 7328 |
| PWRAB1 | 01A7 | 1014 | -1025 | | | | | | |

What is claimed is:

1. In a postage meter having means for entering data, means for displaying numerical values and other data, means for printing postage, computer means electrically connected to each of the aforesaid means and programmed for processing data for controlling the operation thereof, wherein said data entering means includes a keyboard having a plurality of depressable numeric keys, and wherein said computer means includes means for storing data and calculating amounts pertaining to the operation of said postage meter, an improvement in the operation of said postage meter, the improvement comprising:

(a) said keyboard including a depressable special purpose key;

(b) said computer means programmed for causing said displaying means to display a numerical value in response to the depression of selected numeric keys;

(c) said computer means programmed for automatically processing said numerical value on display in response to the depression of said special purpose key; and (d) said computer means programmed for causing a particular operation of said postage meter to be performed in response to the depression of said special purpose key when said displayed numerical value is a predetermined value corresponding to said particular operation.

2. The improvement according to claim 1, wherein said predetermined value does not include a decimal.

3. The improvement according to claim 1, wherein said predetermined value includes at least one numeral.

4. The improvement according to claim 1, wherein said predetermined value includes at least one numeral and does not include a decimal.

5. The improvement according to claim 1, wherein said predetermined value is one of a plurality thereof, and each of said predetermined values corresponding to unique data pertaining to the operation of said postage meter.

6. The improvement according to claim 1, wherein said predetermined value is one of a plurality thereof, each of said predetermined values corresponding to unique data pertaining to the operation of said postage meter when said postage meter is not in a service mode of operation, and a plurality of said predetermined values corresponding to other unique data when said postage meter is in said service mode of operation.

7. The improvement according to claim 1, wherein said computer means is programmed for causing said displaying means to display data corresponding to an access code if a numerical value is not on display and said special purpose key is depressed.

8. The improvement according to claim 1, wherein said computer means is programmed for causing said displaying means to display data indicating a procedural error has occurred when said displayed numerical value is not said predetermined value.

9. The improvement according to claim 1, wherein said predetermined value corresponds to a process said computer means is commanded to perform in response to the depression of said special purpose key.

10. The improvement according to claim 1, wherein said operation caused to be performed is that said printing is enabled in response to the depression of said special purpose key.

11. The improvement according to claim 1, wherein said operation caused to be performed is that said printing is disabled in response to the depression of said special purpose key.

12. The improvement according to claim 1, wherein said operation caused to be performed is that said postage is caused to enter a service mode of operation.

13. The improvement according to claim 1, wherein said operation caused to be performed is that said postage is caused to exit a service mode of operation.

14. The improvement according to claim 1, wherein said operation caused to be performed is that said keyboard is caused to be disabled.

15. In a postage meter having means for entering data, means for displaying numerical values and other data, means for printing postage, computer means electrically connected to each of the aforesaid means and programmed for processing data for controlling the operation thereof, wherein said data entering means includes a keyboard having a plurality of depressable numeric keys, and wherein said computer means includes means for storing data and calculating amounts pertaining to the operation of said postage meter, a method of operation of said postage meter, said method comprising:

(a) providing said keyboard with a depressable special purpose key;

(b) depressing selected numeric keys for causing the display of a predetermined numerical value;

(c) depressing said special purpose key when said numerical value on display; and (d) programming said computer means for causing an operation of said postage meter corresponding to said predetermined numerical value to be performed in response to the depression of said special purpose key.

16. The method according to claim 15, wherein step (b) includes the step of utilizing a predetermined value which includes at least one numeral.

17. The method according to claim 15, wherein step (b) includes the step of utilizing a predetermined value which does not include a decimal.

18. The method according to claim 15, including the step of programming said computer means for causing said displaying means to display data indicating that a procedural error has occurred if said special purpose key is depressed when the value on display is not said predetermined value.

19. The method according to claim 15, including the step of programming said computer means for causing said displaying means to display a numerical value associated with the depression of said key if said predetermined value is not on display when said special purpose key is depressed.

20. The improvement according to claim 15, wherein step (d) includes the step of providing a plurality of predetermined values respectively causing said displaying means to display data associated therewith.

21. The method of claim 15, wherein step (d) includes the step of causing said printing means to be disabled.

22. The method of claim 15, wherein step (d) includes the step of causing said printing means to be enabled.

23. The method of claim 15, wherein step (d) includes the step of causing said keyboard to be disabled.

24. The method according to claim 15, wherein step (d) includes the step of causing said postage meter to enter a service mode of operation.

25. The method according to claim 15, wherein step (d) includes the step of causing said postage meter to exit a service mode of operation.

* * * * *